(12) United States Patent
Shinoda et al.

(10) Patent No.: US 8,472,300 B2
(45) Date of Patent: Jun. 25, 2013

(54) OPTICAL HEAD DEVICE AND OPTICAL DISC DEVICE

(75) Inventors: Masahisa Shinoda, Tokyo (JP); Hironori Nakahara, Tokyo (JP); Masayuki Omaki, Tokyo (JP); Kenya Nakai, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/380,791

(22) PCT Filed: Jan. 17, 2011

(86) PCT No.: PCT/JP2011/000204
§ 371 (c)(1),
(2), (4) Date: Dec. 23, 2011

(87) PCT Pub. No.: WO2011/086951
PCT Pub. Date: Jul. 21, 2011

(65) Prior Publication Data
US 2012/0106310 A1    May 3, 2012

(30) Foreign Application Priority Data

Jan. 18, 2010   (JP) ................................. 2010-008370
Jun. 3, 2010    (JP) ................................. 2010-127984
Oct. 19, 2010   (JP) ................................. 2010-234166

(51) Int. Cl.
*G11B 7/00*   (2006.01)
(52) U.S. Cl.
USPC ................. 369/112.07; 369/44.42; 369/44.37

(58) Field of Classification Search
USPC ............... 369/44.23, 44.37, 44.41, 44.42, 94, 369/112.01, 112.05, 112.07, 112.12, 112.03
See application file for complete search history.

(56) References Cited

U.S. PATENT DOCUMENTS 5,923,632 A    7/1999   Kato et al.
(Continued)

FOREIGN PATENT DOCUMENTS

JP          8-63778 A       3/1996
JP     2005-203090 A       7/2005
(Continued)

*Primary Examiner* — Thang Tran
(74) *Attorney, Agent, or Firm* — Birch, Stewart, Kolasch & Birch, LLP

(57) ABSTRACT

An optical head device mounted in an optical disc device. The optical head device is provided with a diffractive optical element and a photodetector. The diffractive optical element has: a primary diffraction region at a location on which the positive and negative first-order components and some of the zero-order component of a reflectively diffracted light beam are incident; and secondary diffraction regions at locations on which the rest of the zero-order component but none of the positive or negative first-order components of the reflectively diffracted light beam are incident. A main light-receiving section of the photodetector receives the zero-order component of a transmissively diffracted light beam that has passed through the primary diffraction region and the secondary diffraction regions. Secondary light-receiving sections receive the positive first-order component and/or the negative first-order component of the transmissively diffracted light beam that has passed through the secondary diffraction regions.

19 Claims, 67 Drawing Sheets

U.S. PATENT DOCUMENTS

| | | | |
|---|---|---|---|
| 7,518,976 B2 * | 4/2009 | Sano et al. | 369/44.41 |
| 2005/0161579 A1 | 7/2005 | Kim et al. | |
| 2006/0164951 A1 * | 7/2006 | Yamasaki et al. | 369/44.41 |
| 2008/0130431 A1 * | 6/2008 | Yim | 369/44.23 |
| 2008/0175110 A1 | 7/2008 | Yamasaki et al. | |
| 2008/0219119 A1 * | 9/2008 | Izumi et al. | 369/53.17 |
| 2010/0014410 A1 * | 1/2010 | Nakao et al. | 369/112.23 |
| 2011/0013502 A1 * | 1/2011 | Tatsu et al. | 369/112.03 |
| 2011/0128832 A1 * | 6/2011 | Nakahara | 369/112.03 |

FOREIGN PATENT DOCUMENTS

| | | |
|---|---|---|
| JP | 3687100 B2 | 8/2005 |
| JP | 2008-198336 A | 8/2008 |
| JP | 2009-9628 A | 1/2009 |
| WO | WO 96/20473 A1 | 7/1996 |
| WO | WO 2010018653 A1 * | 2/2010 |

* cited by examiner

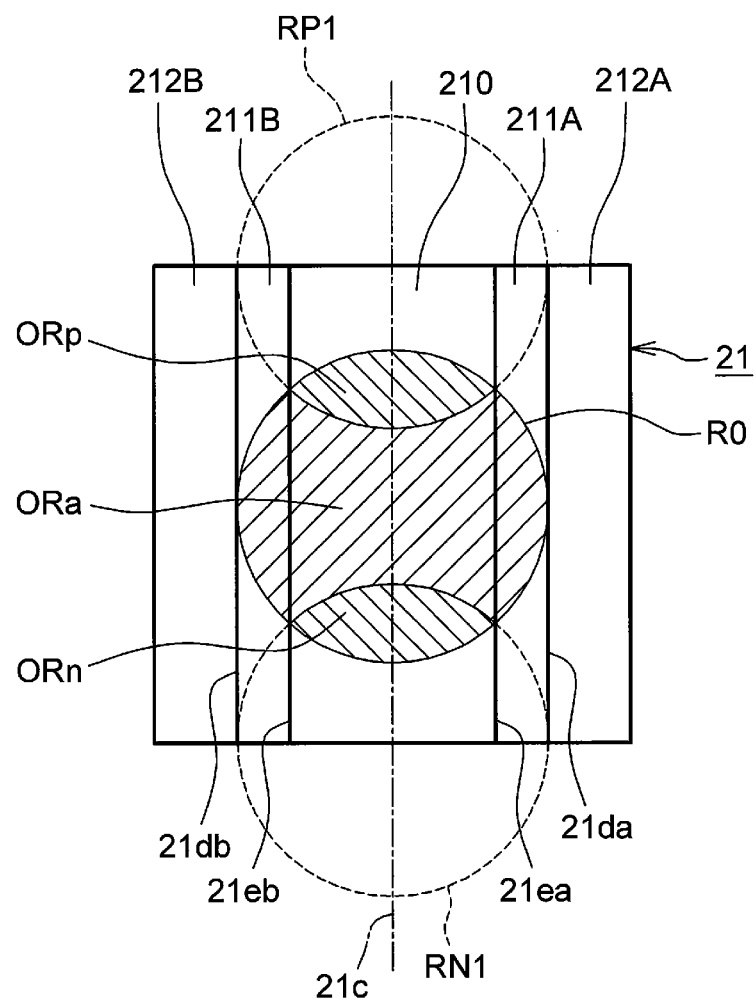
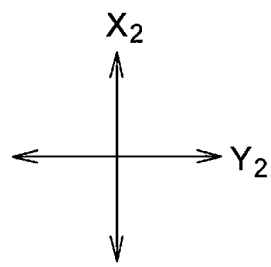
FIG. 3

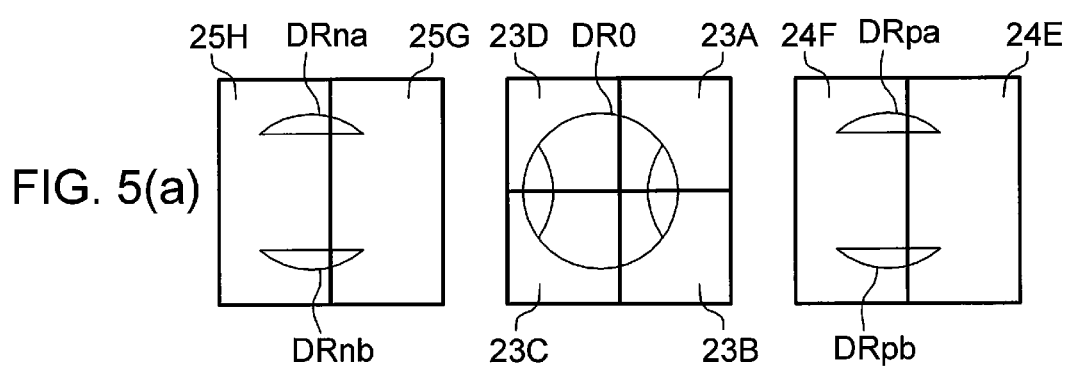
FIG. 5(a)
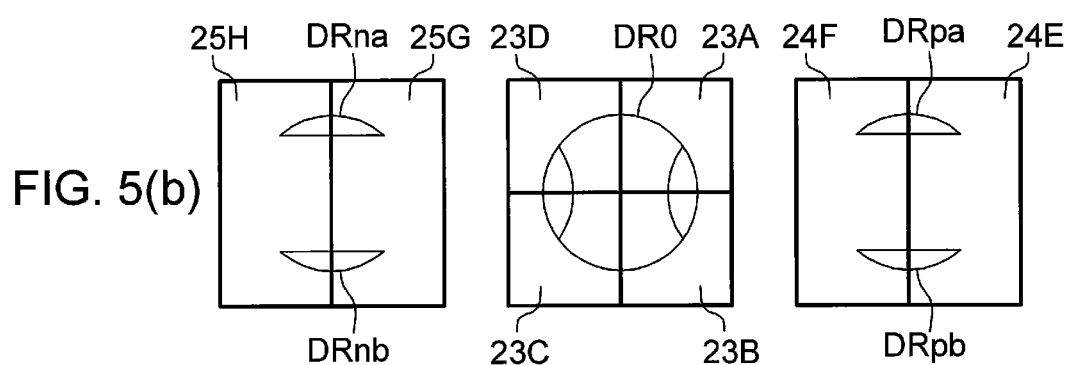
FIG. 5(b)
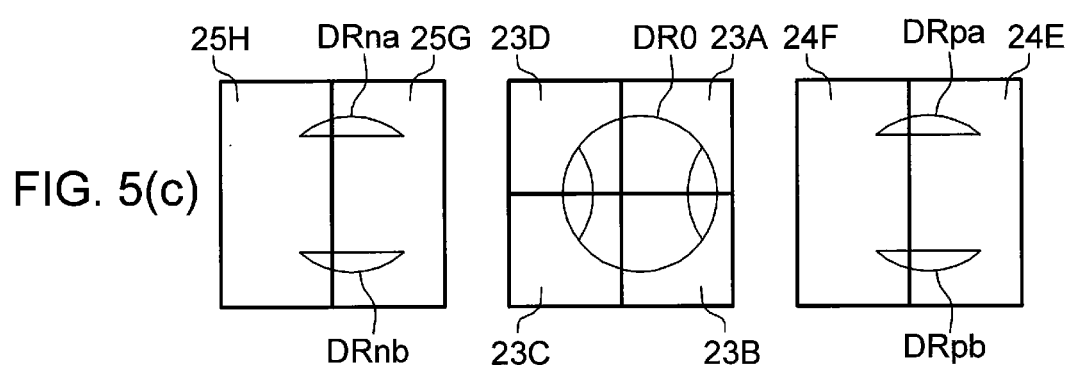
FIG. 5(c)
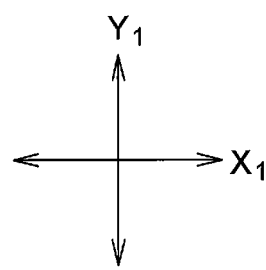

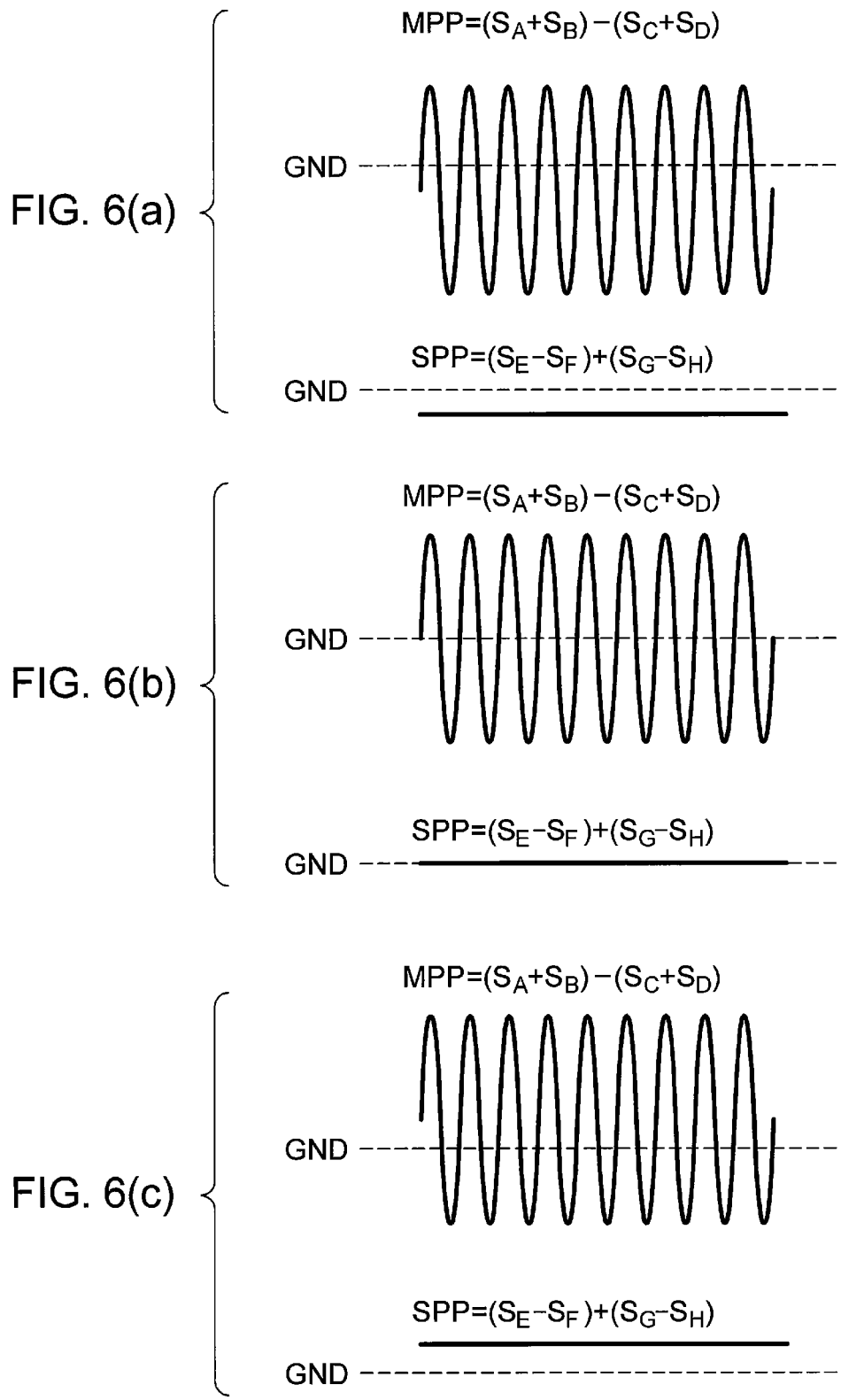

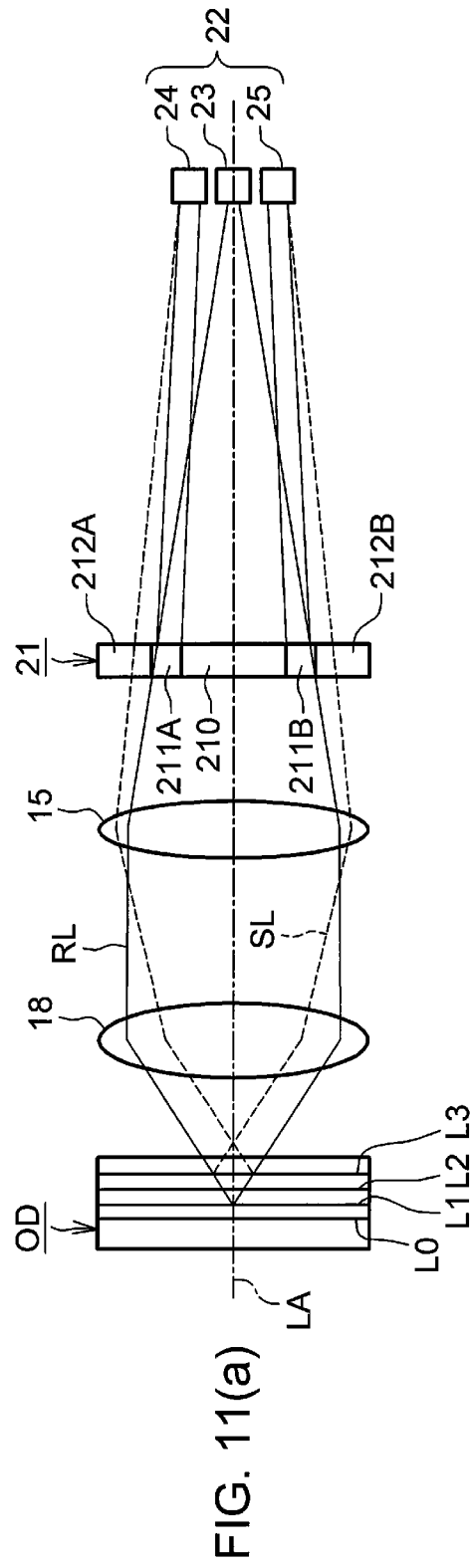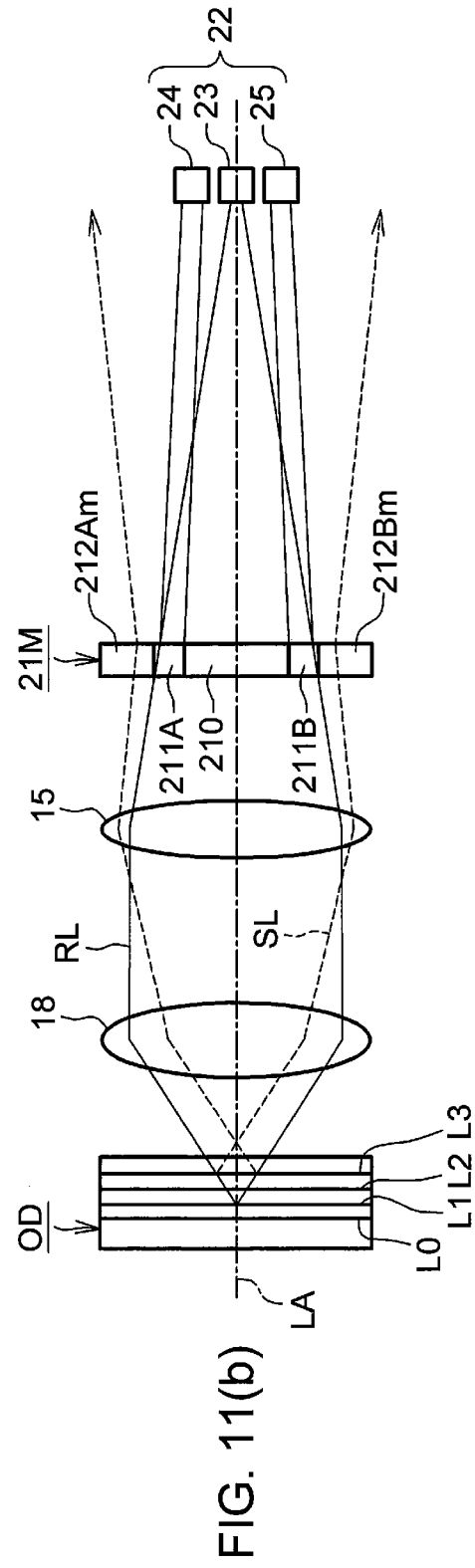

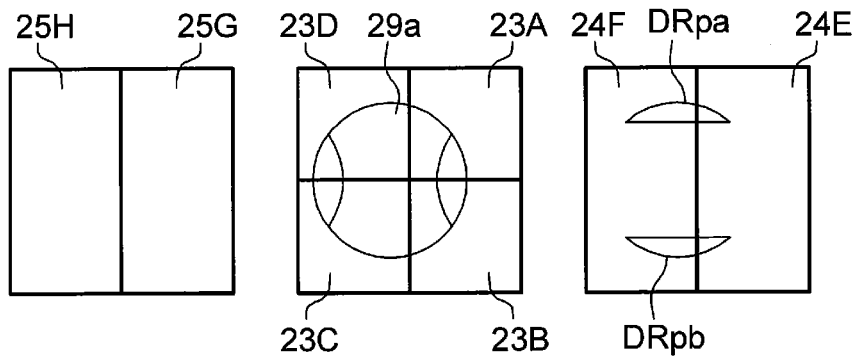
FIG. 17(a)
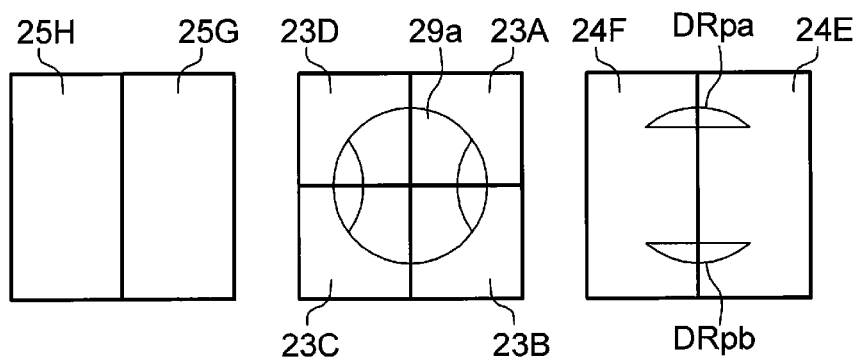
FIG. 17(b)
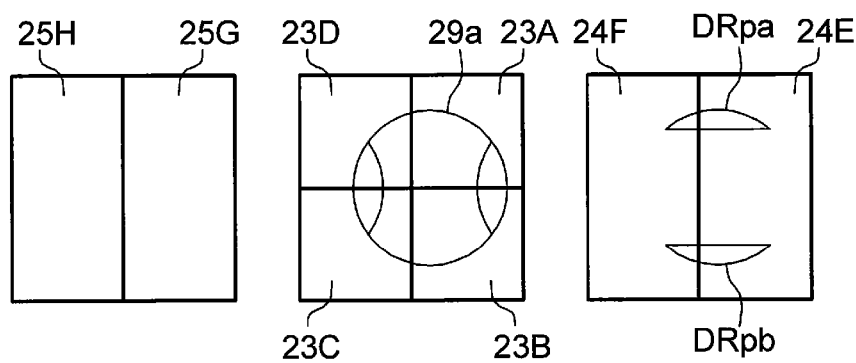
FIG. 17(c)
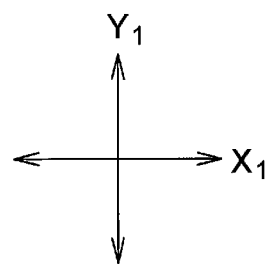

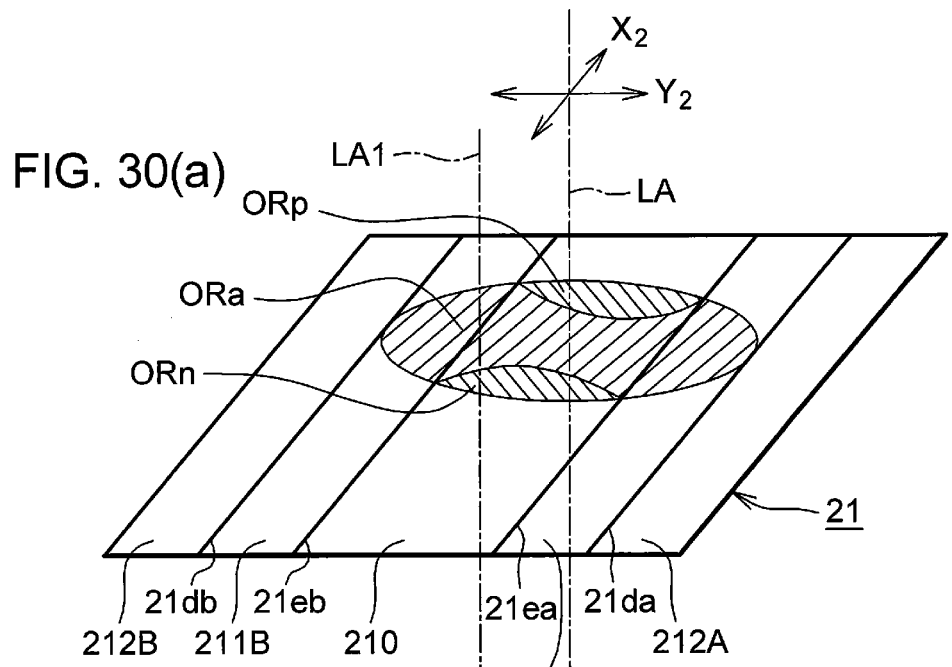
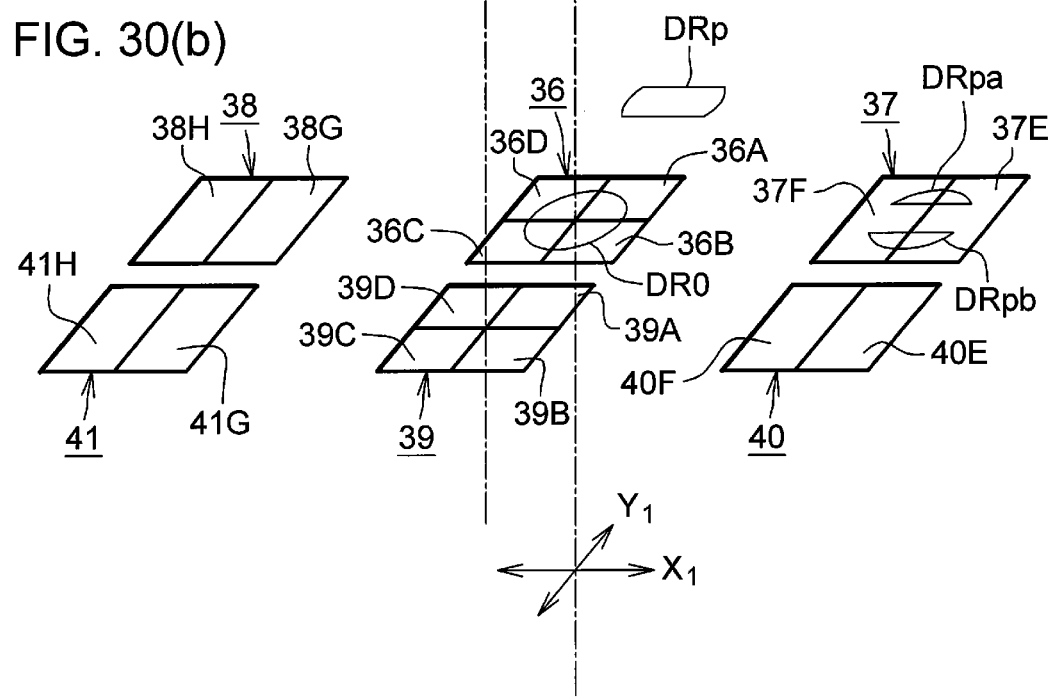

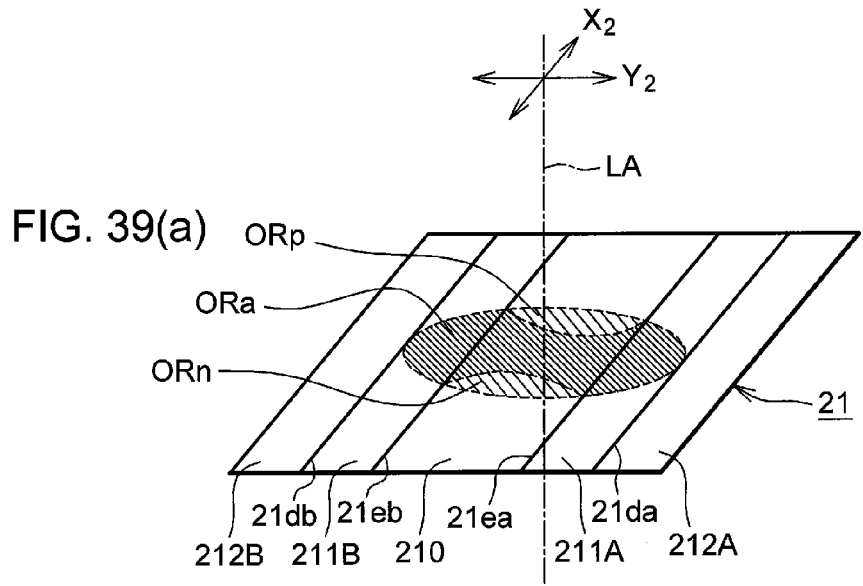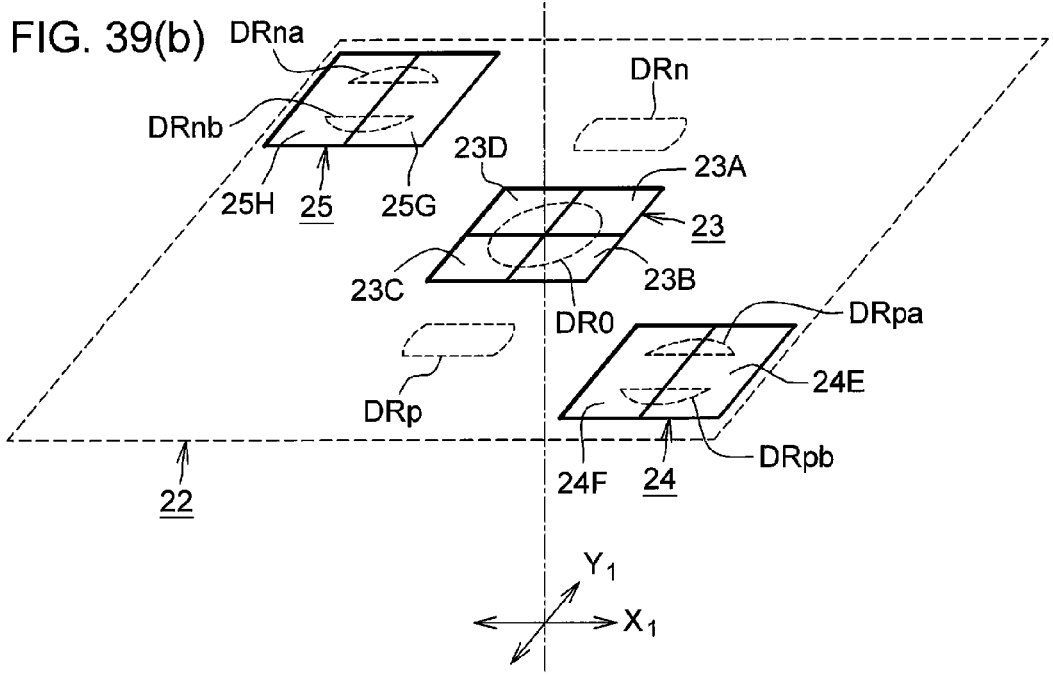

| LAYER | DEPTH FROM SUBSTRATE SURFACE ($\mu$m) | SPACING ($\mu$m) |
|---|---|---|
| L0 | 100 | |
| L1 | 84.5 | 15.5 |
| L2 | 65.0 | 19.5 |
| L3 | 53.5 | 11.5 |

FIG. 40

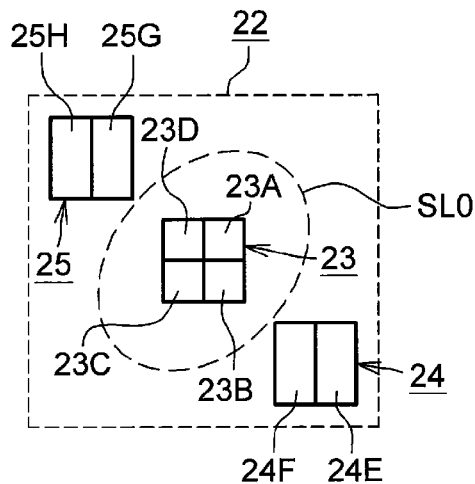
FIG. 41(a)
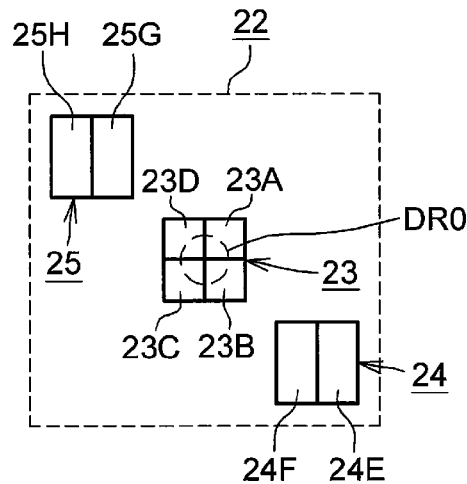
FIG. 41(b)
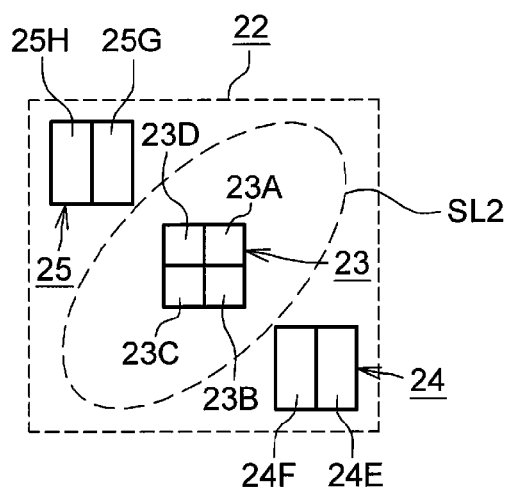
FIG. 41(c)
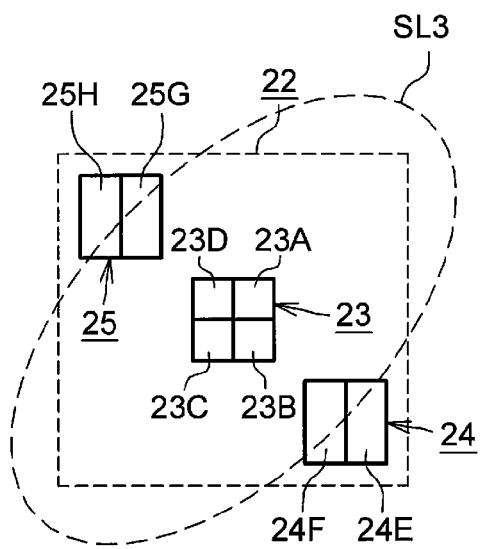
FIG. 41(d)
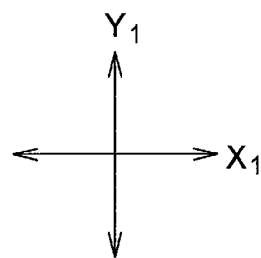

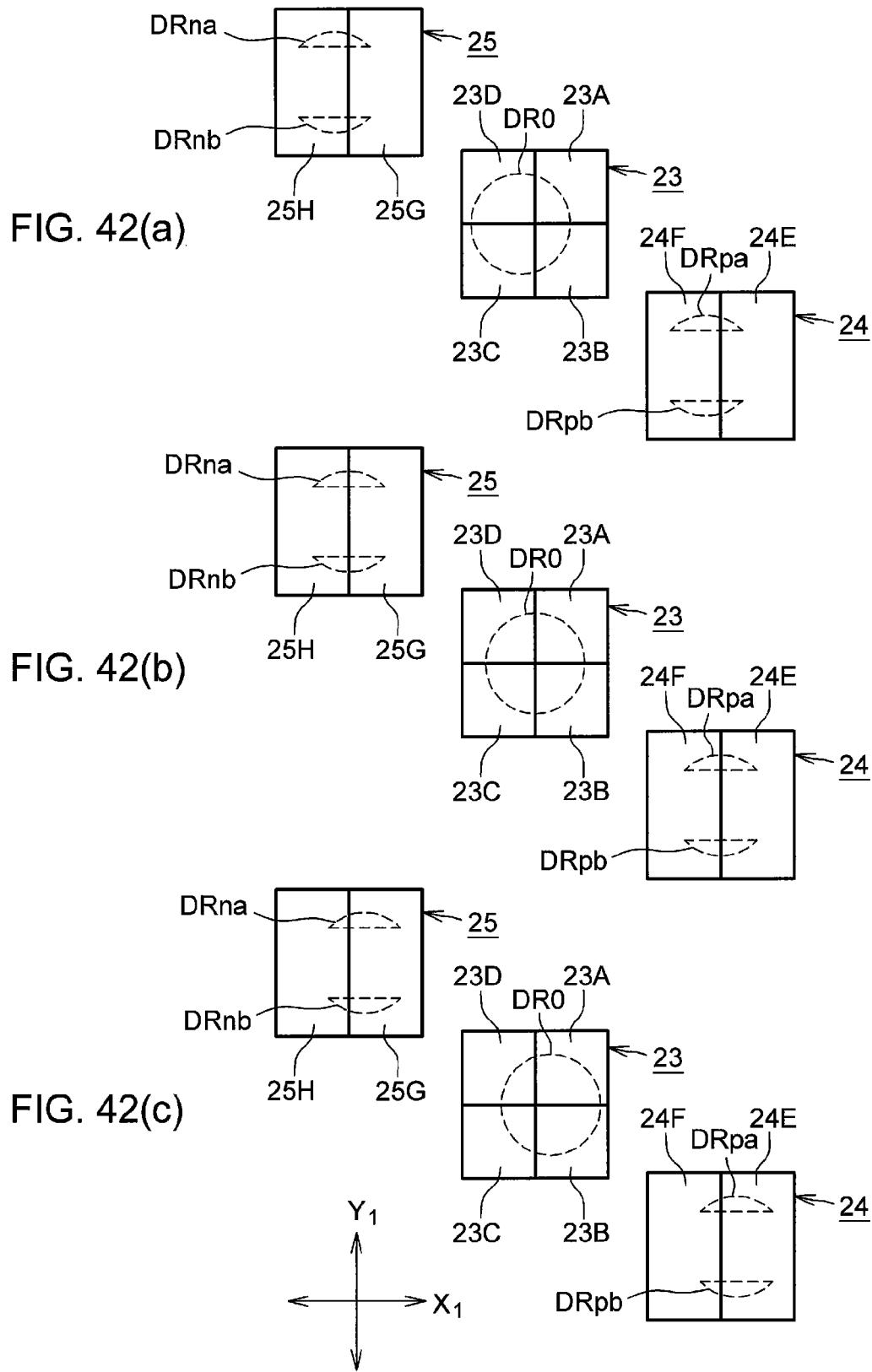

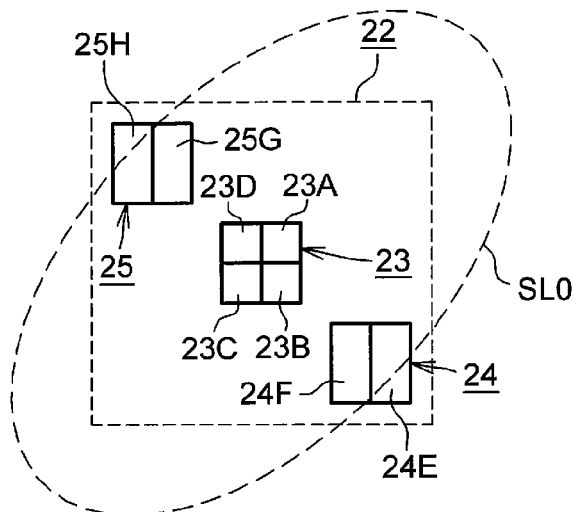
FIG. 45(a)
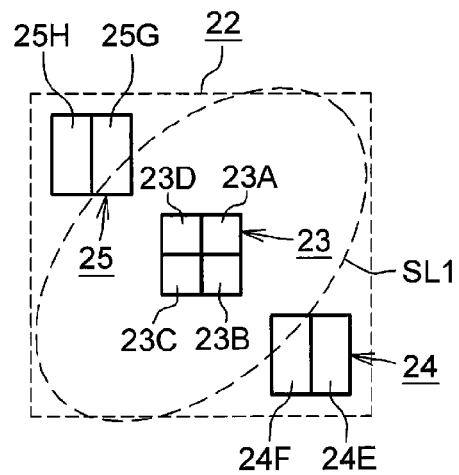
FIG. 45(b)
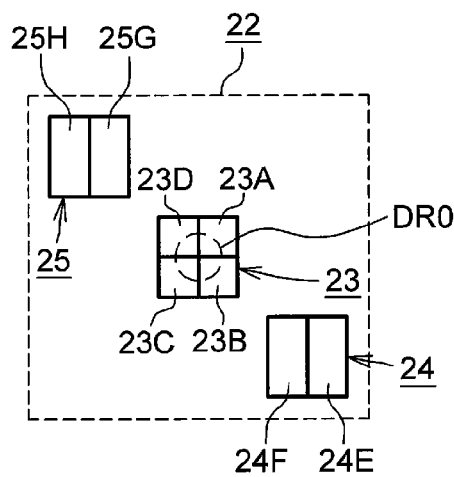
FIG. 45(c)
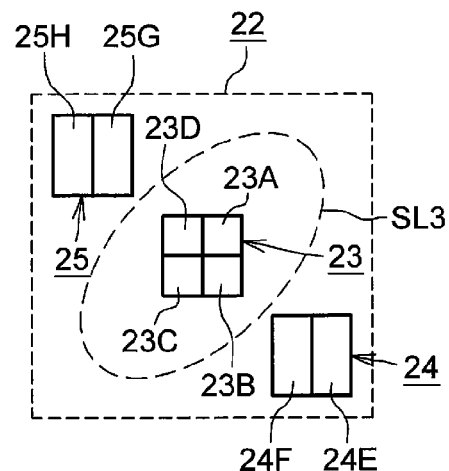
FIG. 45(d)
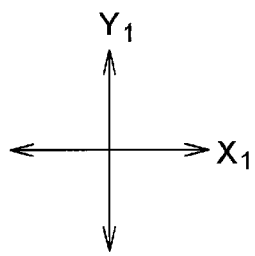

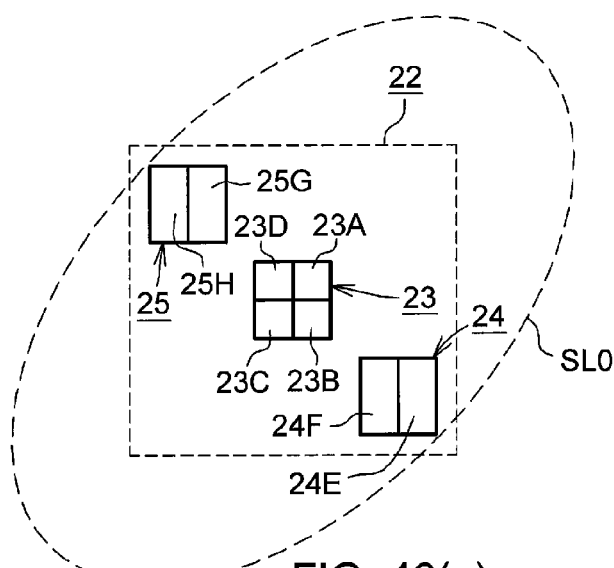
FIG. 46(a)
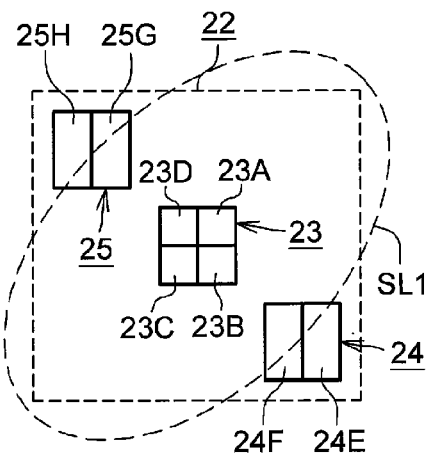
FIG. 46(b)
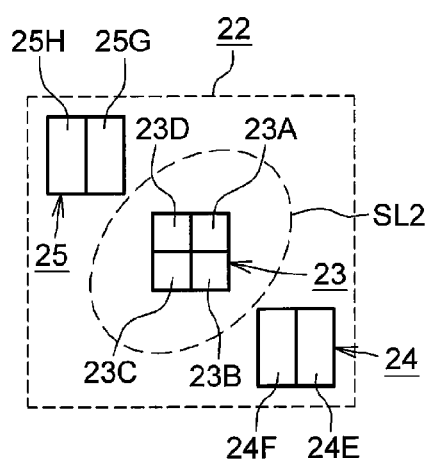
FIG. 46(c)
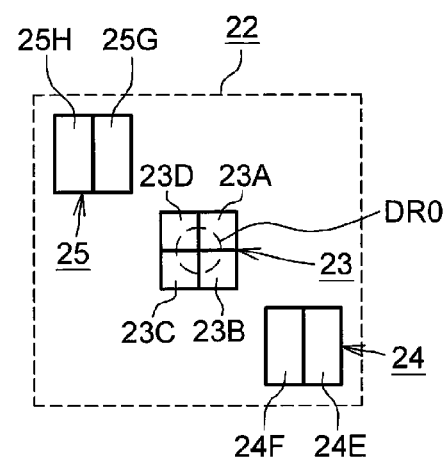
FIG. 46(d)
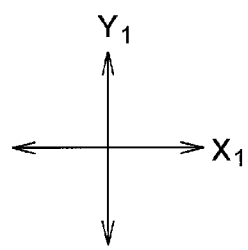

FIG. 52(a)
FIG. 52(b)
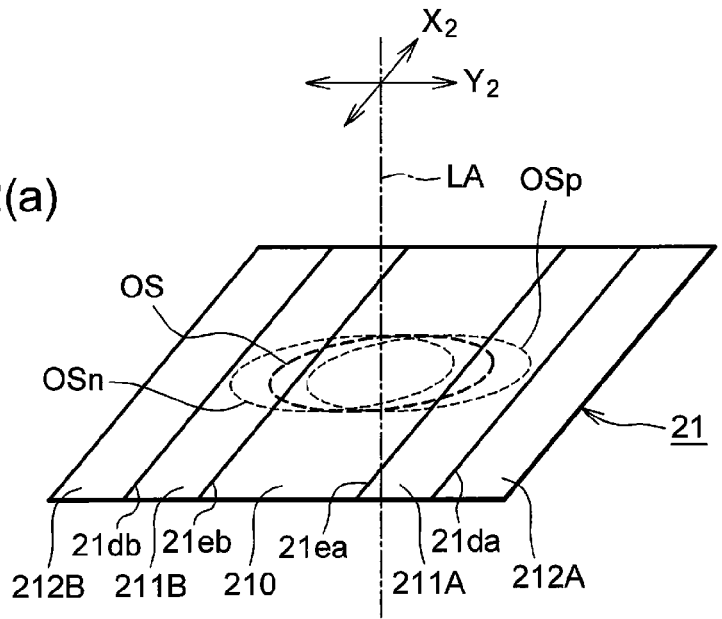
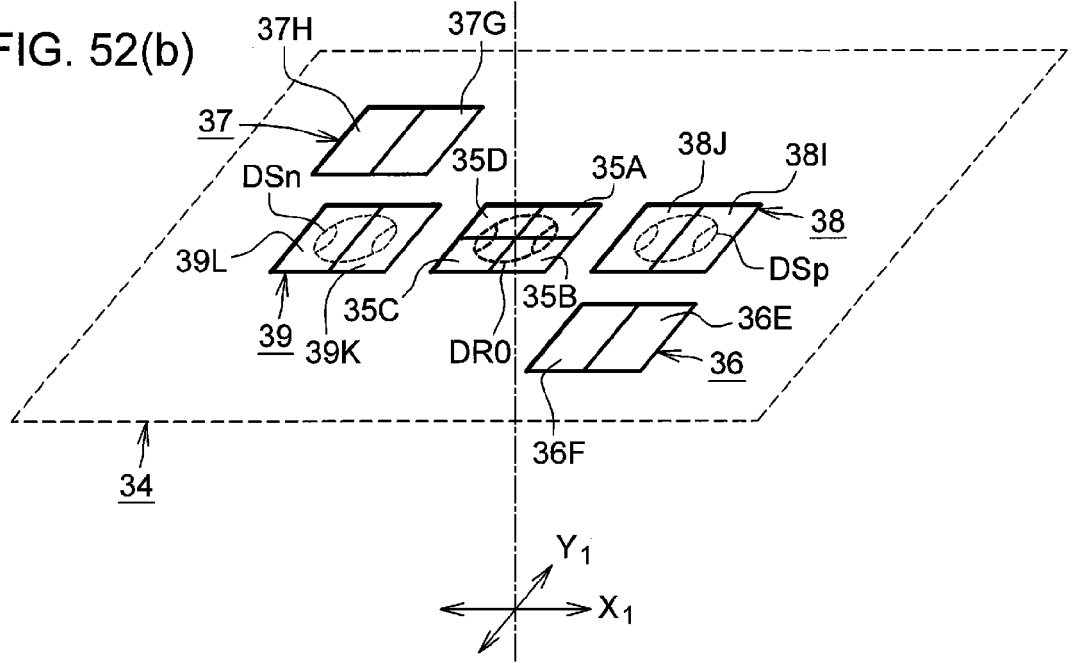

OPTICAL HEAD DEVICE AND OPTICAL DISC DEVICE

FIELD OF THE INVENTION

The present invention relates to an optical head device, and to an optical disc device in which the optical head device is mounted.

BACKGROUND ART

The single-beam push-pull method of making a light beam emitted from a semiconductor laser and focused onto an information recording layer of an optical disc follow an information track is widely known. In the push-pull method, the light beam reflected and diffracted by the information track (the returning light beam) is detected in a photodetector by a light-receiving section divided into two light-receiving surfaces. The push-pull signal can be obtained as the difference between the signals detected by these light-receiving surfaces. The light beam can be made to follow the recorded track by having an actuator shift the objective lens in the radial direction of the optical disc in such a way that the push-pull signal approaches zero.

In the conventional single-beam push-pull method, however, when the objective lens is driven by the actuator so that it shifts in the radial direction of the optical disc, the position of the objective lens may become offset from the position of the photodetector. The light spot that illuminates the light-receiving surfaces is then centered at a position removed from the dividing line separating the two light receiving regions, and this is known to add a direct-current offset (referred to below simply as an offset component) to the push-pull signal.

A technique for canceling this type of offset is disclosed in, for example, patent document 1 (Japanese Patent Application Publication No. H08 (1996)-63778). The optical pickup disclosed in patent document 1 has a polarization hologram that separates the returning light beam reflected by the optical disc into zero-order light and ±1-order light. The separated zero-order light, +1-order light, and −1-order light are detected by corresponding light-receiving surfaces, and the difference between the +1-order light and −1-order light detection signals is used as the push-pull signal. The light-receiving surfaces that detect the +1-order light and −1-order light have areas such that they are not affected by the amount of movement that occurs if the objective lens moves relative to the photodetector, so a push-pull signal with no offset component can be obtained.

One means of expanding the amount of information that can be recorded on a single optical disc is to use a multilayer optical disc in which a plurality of information recording layers are disposed one above another, increasing the amount of information that can be recorded by a factor substantially equal to the number of layers. Dual-layer discs having two information recording layers as in the commercial DVD (Digital Versatile Disc) and BD (Blu-ray Disc: registered trademark) standards are already in use.

In an optical disc device that is recording on or reproducing from an optical disc of this multilayer type, in addition to the light reflected from the information recording layer selected for the recording or reproduction of information, light reflected from other information recording layers is detected as so-called stray light. To record information on or reproduce information from the desired information recording layer accurately and at high speed, it is necessary to find means of excluding this stray light as far as possible, to reduce its effect on the recording or reproducing process. In the tracking error detection system, in particular, the differential push-pull method is generally used to cancel the offset component arising from objective lens shift. In the differential push-pull system, the light beam emitted from the laser light source is split by a diffraction grating into three light beams, including one main beam and two sub-beams, and three light spots are formed on the information recording layer on the information recording surface of the optical disc. Information is recorded on or reproduced from the information recording layer by the light spot of the main beam, formed in the center; the light spots of the sub-beams formed on the two sides are used to generate a tracking error signal. The beams are separated by the diffraction grating in such a way that the light intensity of the sub-beams is much lower than the light intensity of the main beam. A problem has been that the light intensity of the sub-beams reflected from the intended information recording layer and the light intensity of the stray light reflected from the other information recording layers, especially the light intensity of the stray light due to the main beam, may be about the same, causing major variations in the tracking error signal due to the stray light reflected from the other information recording layers, and impairing the quality of the tracking error signal.

A readily conceivable way of further expanding the recording capacity of multilayer optical discs is to increase the number of information recording layers. It then becomes necessary to reduce the spacing between adjacent information recording layers, which tends to increase the light intensity of the stray light from information recording layers other than the intended information recording layer. In a dual-layer disc, for example, there is only one other information recording layer that can give rise to stray light, but in an N-layer disc, stray light arises from (N−1) layers, so the light intensity of the stray light tends to increase still further.

Techniques for mitigating the effects of such stray light are described in, for example, patent document 2 (PCT publication No. WO 96/020473), patent document 3 (Japanese Patent Application Publication No. 2008-198336), and patent document 4 (Japanese Patent Application Publication No. 2005-203090). Patent document 2 discloses an optical head device in which the photodetector light-receiving surfaces that receive sub-beam light are disposed in positions at which the main beams reflected from other information recording layers are not incident. In this optical head device the stray light component is not detected by the photodetector, so the quality of the tracking error signal is not impaired.

PRIOR ART REFERENCES

Patent Documents

Patent document 1: Japanese Patent Application Publication No. H08 (1996)-63778 (para. 0017, FIG. 1)
Patent document 2: PCT publication No. WO 96/020473 (p. 12, FIG. 5)
Patent document 3: Japanese Patent Application Publication No. 2008-198336 (paras. 0149-0155, FIG. 23)
Patent document 4: Japanese Patent Application Publication No. 2005-203090 (para. 0057, FIG. 6)

SUMMARY OF THE INVENTION

Problem to be Solved by the Invention

The technique disclosed in patent document 1, however, requires a special configuration dependent on the polarization hologram pattern to be used as the light-receiving surface pattern of the photodetector; a consequent problem is that the configuration of the optical head device is complex and its manufacturing cost is increased.

A problem in the technique disclosed in patent document 2 is that since the tracking error signal is generated only from the innately weak sub-beams split off by the diffraction grating, the tracking error signal itself is extremely weak. The problem is that the quality of the weak tracking error signal is impaired by variations in stray light due to variations in the spacing between the intended information recording layer and the other information recording layers, and by abnormal stray light generated when the light beams are disrupted by the effects of dust or scratches on the surface of the optical disc.

It is therefore an object of the present invention to provide an optical head device that can cancel the offset component due to objective lens shift by using a photodetector having a light-receiving surface pattern with a simple configuration, and an optical disc device in which this optical head device is mounted.

Another object of the invention is to provide an optical head device that can mitigate stray light from information recording layers other than the intended information recording layer in a multilayer optical disc, and eliminate the offset component due to objective lens shift without incurring a loss of optical intensity of the light beam emitted from the laser light source to illuminate the optical disc.

Means for Solving the Problem

An optical head device according to a first aspect of the invention comprises: a laser light source; an objective lens for focusing a light beam emitted from the laser light source onto an optical disc; a diffractive optical element for diffracting a returning light beam that has been reflected by the optical disc and has passed through the objective lens and outputting a transmissively diffracted light beam; and a photodetector for receiving the transmissively diffracted light beam; the diffractive optical element includes a primary diffraction region disposed in a position where ±1-order reflectively diffracted light beam components and part of a zero-order reflectively diffracted light beam component included in the returning light beam are incident, having a zero-order diffractive function and at least one ±1-order diffractive function, and secondary diffraction regions disposed outward of the primary diffraction region in a first direction corresponding to a tangential direction of the optical disc, in positions where the ±1-order reflectively diffracted light beam components are not incident and a different part of the zero-order reflectively diffracted light beam component is incident, having the zero-order diffractive function and at least one ±1-order diffractive function; the photodetector includes a main light-receiving section for receiving a zero-order transmissively diffracted light beam component that has passed through the primary diffraction region and the secondary diffraction regions, and a secondary light-receiving section for receiving at least one of a +1-order and a −1-order transmissively diffracted light beam component that has passed through the secondary diffraction regions.

An optical head device according to a second aspect of the invention comprises: a plurality of laser light sources for emitting respective light beams having different wavelengths; an objective lens for focusing a light beam emitted from one of the plurality of laser light sources onto an optical disc; a diffractive optical element for diffracting a returning light beam that has been reflected by the optical disc and has passed through the objective lens and outputting a transmissively diffracted light beam; and a photodetector for receiving the transmissively diffracted light beam; the diffractive optical element includes a primary diffraction region disposed in a position where ±1-order reflectively diffracted light beam components and part of a zero-order reflectively diffracted light beam component included in the returning light beam, having a first wavelength among the wavelengths of the light beams emitted from the plurality of laser light sources, are incident, the primary diffraction region having a zero-order diffractive function and a +1-order diffractive function for the first wavelength, and secondary diffraction regions disposed outward of the primary diffraction region in a first direction corresponding to a tangential direction of the optical disc, in positions where the ±1-order reflectively diffracted light beam components having the first wavelength are not incident and a different part of the zero-order reflectively diffracted light beam component is incident, the secondary diffraction regions having the zero-order diffractive function and the +1-order diffractive function for the first wavelength; the photodetector includes a main light-receiving section for receiving a zero-order transmissively diffracted light beam component that has passed through the primary diffraction region and the secondary diffraction regions, and a secondary light-receiving section for receiving a +1-order transmissively diffracted light beam component that has passed through the secondary diffraction regions.

An optical head device according to a third aspect of the invention comprises: a laser light source; an objective lens for focusing a light beam emitted from the laser light source onto an optical disc; a diffractive optical element for diffracting a returning light beam that has been reflected by the optical disc and has passed through the objective lens and outputting a transmissively diffracted light beam; and a photodetector for receiving the transmissively diffracted light beam; the diffractive optical element includes a primary diffraction region disposed in a position where parts of ±1-order reflectively diffracted light beam components and part of a zero-order reflectively diffracted light beam component included in the returning light beam are incident, having a zero-order diffractive function and a ±1-order diffractive function, and secondary diffraction regions disposed outward of the primary diffraction region in a second direction orthogonal to a first direction, the first direction being the direction of a row formed by the zero-order reflectively diffracted light beam component and the ±1-order reflectively diffracted light beam components, in positions where a different part of the zero-order reflectively diffracted light beam component and different parts of the ±1-order reflectively diffracted light beam components are incident, having the zero-order diffractive function and the ±1-order diffractive function; the photodetector includes a main light-receiving section for receiving a zero-order transmissively diffracted light beam component that has passed through the primary diffraction region and the secondary diffraction regions, and a secondary light-receiving section for receiving a ±1-order transmissively diffracted light beam component that has passed through the secondary diffraction regions; the secondary light-receiving section has at least a pair of light-receiving surfaces.

An optical head device according to a fourth aspect of the invention comprises: a plurality of laser light sources for emitting respective light beams having different wavelengths; an objective lens for focusing a light beam emitted from one of the plurality of laser light sources onto an optical disc; a diffractive optical element for diffracting a returning light beam that has been reflected by the optical disc and has passed through the objective lens and outputting a transmissively diffracted light beam; and a photodetector for receiving the transmissively diffracted light beam; the diffractive optical element includes a primary diffraction region disposed in a position where parts of ±1-order reflectively diffracted light beam components and part of a zero-order reflectively diffracted light beam component included in the returning light beam, having a first wavelength among the wavelengths of the light beams emitted from the plurality of laser light sources, are incident, the primary diffraction region having a zero-order diffractive function and a ±1-order diffractive function for light having the first wavelength, and secondary diffraction regions disposed outward of the primary diffraction region in a second direction orthogonal to a first direction, the first direction being the direction of a row formed by the zero-order reflectively diffracted light beam component and the ±1-order reflectively diffracted light beam components, in a position where a different part of the zero-order reflectively diffracted light beam component and different parts of the ±1-order reflectively diffracted light beam components are incident, having the zero-order diffractive function and at least one of the ±1-order diffractive functions for light having the first wavelength; the photodetector includes a main light-receiving section for receiving a zero-order transmissively diffracted light beam component having the first wavelength that has passed through the primary diffraction region and the secondary diffraction regions, and a secondary light-receiving section for receiving ±1-order light components of the transmissively diffracted light beam having the first wavelength that have passed through the secondary diffraction regions; the secondary light-receiving section has at least a pair of light-receiving surfaces.

An optical head device according to a fifth aspect of the invention comprises: a plurality of laser light sources for emitting respective light beams having different wavelengths; an objective lens for focusing a light beam emitted from one of the plurality of laser light sources onto an optical disc; a diffractive optical element for diffracting a returning light beam that has been reflected by the optical disc and has passed through the objective lens and outputting a transmissively diffracted light beam; and a photodetector for receiving the transmissively diffracted light beam; the diffractive optical element includes a primary diffraction region disposed in a position where parts of ±1-order reflectively diffracted light beam components and part of a zero-order reflectively diffracted light beam component included in the returning light beam having a first wavelength among the wavelengths of the light beams emitted from the plurality of laser light sources are incident, having a zero-order diffractive function and a ±1-order diffractive function for light having the first wavelength, and secondary diffraction regions disposed outward of the primary diffraction region in a second direction orthogonal to a first direction, the first direction being the direction of a row formed by the zero-order reflectively diffracted light beam component and the ±1-order reflectively diffracted light beam components, in a position where a different part of the zero-order reflectively diffracted light beam component and different parts of the ±1-order reflectively diffracted light beam components are incident, having a zero-order diffractive function and a ±1-order diffractive function for light having the first wavelength; the photodetector includes a first main light-receiving section for receiving a zero-order transmissively diffracted light beam component having the first wavelength that has passed through the primary diffraction region and the secondary diffraction regions, a first secondary light-receiving section for receiving a ±1-order transmissively diffracted light beam component having the first wavelength that has passed through the secondary diffraction regions, a second main light-receiving section for receiving a zero-order transmissively diffracted light beam component having a wavelength other than the first wavelength that has passed through the primary diffraction region and the secondary diffraction regions, and a second secondary light-receiving section for receiving a zero-order transmissively diffracted light beam component having a wavelength other than the first wavelength that has passed through the secondary diffraction regions; the first secondary light-receiving section and the second secondary light-receiving section each include at least a pair of light-receiving surfaces.

An optical disc device according to a sixth aspect of the invention comprises: the optical head device of any one of the first to fifth aspects; a disc drive unit for spinning an optical disc; and a signal processing unit for generating a tracking error signal on the basis of a signal detected by the photodetector of the optical head device; the signal processing unit generates a push-pull signal on the basis of a signal detected by the main light-receiving section included in the photodetector, generates an offset component attributable to relative displacement of the objective lens with respect to the photodetector, on a basis of a signal detected by the secondary light-receiving section included in the photodetector, and generates the tracking error signal by deducting the offset component from the push-pull signal.

Effects of the Invention

With the present invention, it is possible to generate an offset-free tracking error signal by using a photodetector having a light-receiving surface pattern with a simple configuration. With the present invention it is also possible to mitigate stray light from information recording layers other than the intended information recording layer in a multilayer optical disc and eliminate the offset component due to objective lens shift without incurring a loss of optical intensity of the light beam emitted from the laser light source.

BRIEF DESCRIPTION OF THE DRAWINGS

FIG. 3 is a plan view schematically illustrating the configuration of the light incidence surface of the hologram optical element in the first embodiment.

FIGS. 5(a), 5(b), and 5(c) schematically illustrate the relation between objective lens shift and the positions of the light spots on the photodetector.

FIGS. 6(a), 6(b), and 6(c) schematically illustrate the relation between objective lens shift and the signal components of the tracking error signal.

FIG. 11(a) schematically illustrates part of the configuration of an optical head device including the hologram optical element in the first embodiment.

FIG. 11(b) schematically illustrates part of the configuration of an optical head device including the hologram optical element in a third embodiment of the invention.

FIGS. 17(a), 17(b), and 17(c) schematically illustrate the relation between objective lens shift and the positions of the light spots on the photodetector in the fifth embodiment.

FIGS. 30(a) and 30(b) are perspective views of the hologram optical element and photodetector in the seventh embodiment when the first semiconductor laser is operating.

FIGS. 39(a) and 39(b) are perspective views of the hologram optical element and photodetector in the eleventh embodiment.

FIG. 40 is a table describing the information recording layers defined for a four-layer BD optical disc.

FIGS. 41(a) to 41(d) are plan views illustrating the distribution of stray light on the photodetector in the eleventh embodiment.

FIGS. 42(a), 42(b), and 42(c) schematically illustrate the relation between objective lens shift and the positions of the light spots on the photodetector in the eleventh embodiment.

FIGS. 45(a) to 45(d) are plan views illustrating the distribution of stray light on the photodetector in the eleventh embodiment.

FIGS. 46(a) to 46(d) are plan views illustrating the distribution of stray light on the photodetector in the eleventh embodiment.

FIGS. 52(a) and 52(b) are perspective views of the hologram optical element and photodetector in the twelfth embodiment.

MODE FOR CARRYING OUT THE INVENTION

Embodiments of the invention will be described below with reference to the drawings.

Figure 1:
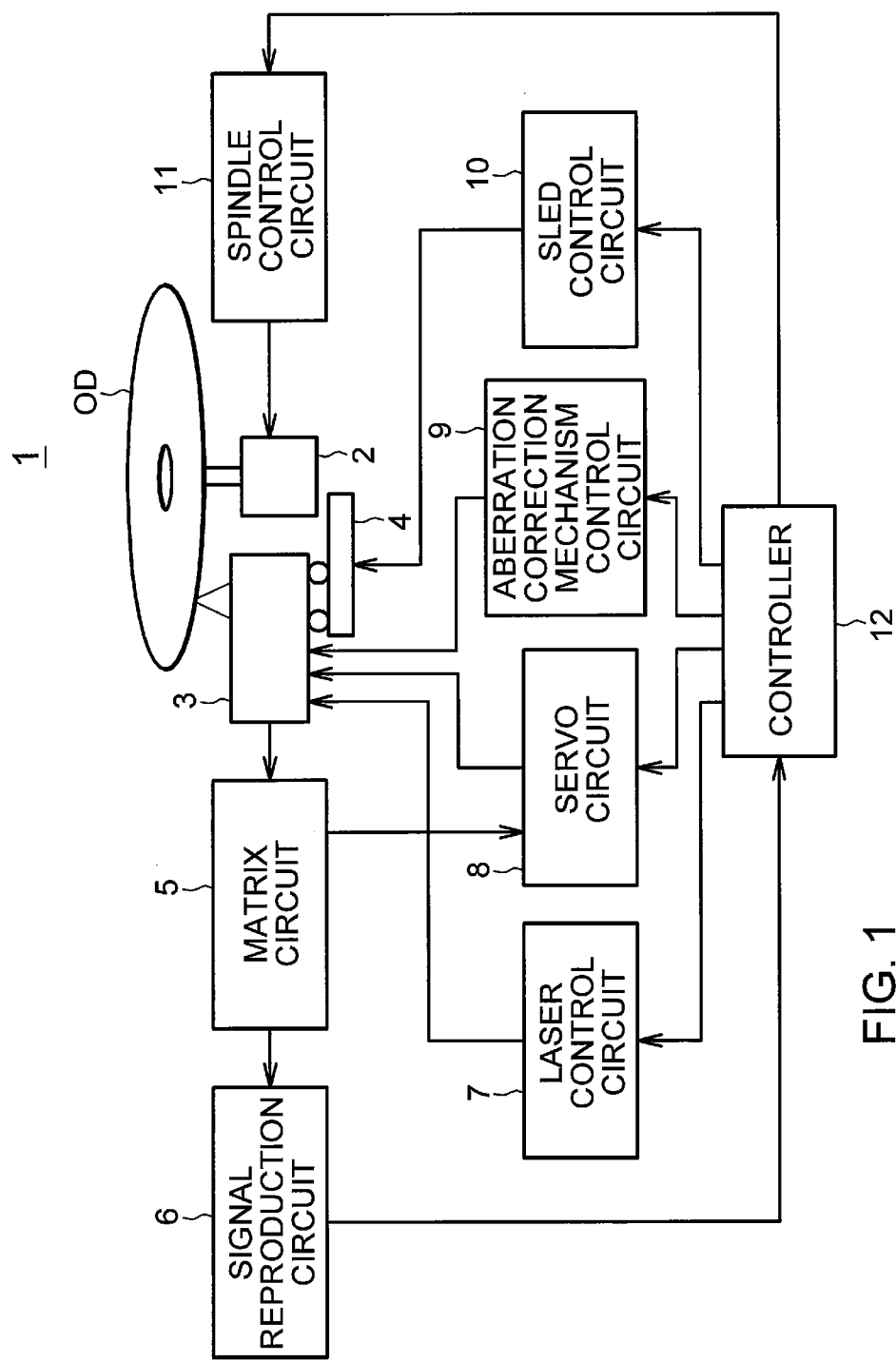
FIG. 1 schematically shows the configuration of an optical disc device in a first embodiment of the invention.

Basic Structure of the Optical Disc Device FIG. 1 schematically shows the basic configuration of the optical disc device 1 in first to twentieth embodiments of the invention. As shown in FIG. 1, the optical disc device 1 includes a spindle motor 2, an optical head device 3, a sled mechanism 4, a matrix circuit 5, a signal reproduction circuit 6, a laser control circuit 7, a servo circuit 8, an aberration correction mechanism control circuit 9, a sled control circuit 10, a spindle control circuit 11, and a controller 12. The controller 12 controls the operation of the signal reproduction circuit 6, laser control circuit 7, servo circuit 8, aberration correction mechanism control circuit 9, sled control circuit 10, and spindle control circuit 11 in accordance with commands from a host device (not shown).

An optical disc OD is detachably mounted on a turntable (not shown) secured to the drive shaft (spindle) of the spindle motor 2. Under control of the spindle control circuit 11, the spindle motor 2 spins the optical disc OD when information is recorded or reproduced. The spindle control circuit 11 has the function of executing spindle servo control in accordance with commands from the controller 12 to bring the actual rotational speed to the target rotational speed on the basis of a pulse signal representing the rotational speed supplied from the spindle motor 2. The optical disc OD may be a single-layer disc having a single information recording layer or a multilayer disc having a plurality of information recording layers and may be a current-generation optical disc such as a CD (Compact Disc), DVD (Digital Versatile Disc), or BD (Blu-ray Disc), or a next-generation optical disc.

The optical head device 3 has the function of recording information on the information recording layer of the optical disc OD or reading information from this information recording layer. The sled mechanism 4 operates under control of the sled control circuit 10, moves the optical head device 3 in the radial direction of the optical disc OD (the direction of a radius of the optical disc OD), and enables the optical head device 3 to form light spots on a desired information track of the optical disc OD. The configuration of the optical head device 3 is the same as the configuration of any of the optical head devices 3A, 3B, 3C, 3D, 3E, 3F, 3G that will be described later.

The matrix circuit 5 generates a variety of signals needed to record or reproduce information, such as a reproduced RF signal that represents the result of detection of recorded information in the optical disc OD, focus and tracking error signals, and other servo control signals, by performing a matrix calculation process on electrical signals supplied from the optical head device 3. The reproduced RF signal is output to the signal reproduction circuit 6. The signal reproduction circuit 6 generates a modulated signal by performing a binarizing process on the reproduced RF signal, extracts a reproduction clock from this modulated signal, and generates a reproduced information signal by carrying out demodulation, error correction, and decoding processes on the modulated signal. The reproduced information signal is transferred by the controller 12 to a host device (not shown) such as an audio-video device or a personal computer.

The servo circuit 8 operates on the basis of commands from the controller 12, generates drive signals for focus and tracking adjustments on the basis of the focus and tracking error signals supplied from the matrix circuit 5, and supplies the drive signals to the actuator in the optical head device 3.

The aberration correction mechanism control circuit 9 controls the operation of an aberration correction mechanism provided in the optical head device 3 in accordance with the quality of the reproduced information signal input to the controller 12.

First Embodiment

Figure 2:
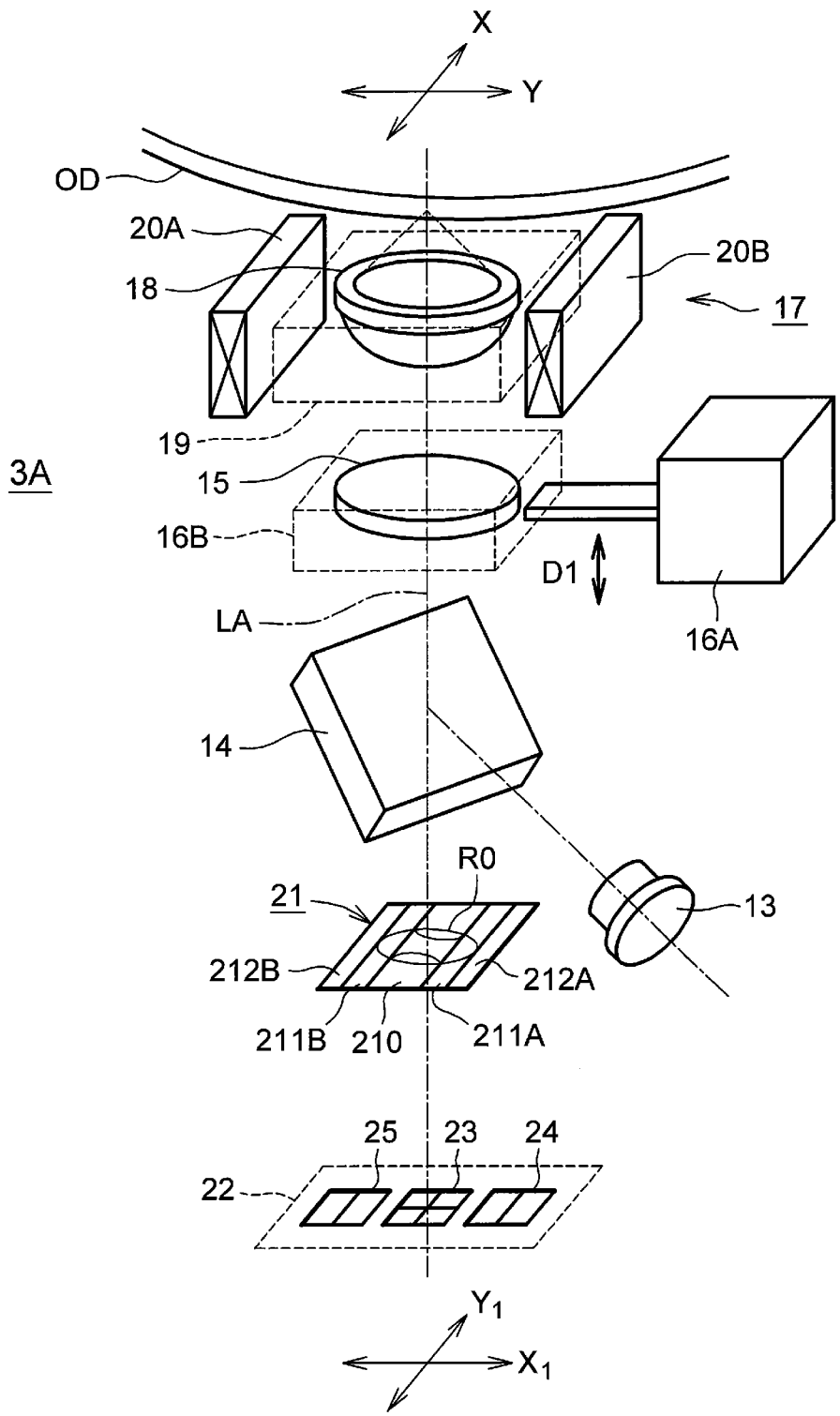
FIG. 2 is a perspective view showing the main elements in the configuration of the optical head device in the first embodiment.

FIG. 2 is a perspective view showing the main elements in the configuration of the optical head device 3A in the first embodiment of the invention. As shown in FIG. 2, the optical head device 3A has a semiconductor laser 13 as a laser light source, a beam splitter 14, a collimator lens 15, an actuator 17, an objective lens 18, a hologram optical element 21, and a photodetector 22. The semiconductor laser 13 operates under control of the laser control circuit 7 in FIG. 1; the laser control circuit 7 controls the optical intensity of laser light emitted from the semiconductor laser 13 on the basis of commands from the controller 12. Laser light emitted from the semiconductor laser 13 is reflected by the beam splitter 14 and enters the objective lens 18 through the collimator lens 15. The objective lens 18 focuses the incident light beam from the beam splitter 14 onto the information recording layer of the optical disc OD and forms a light spot on the information recording layer. The returning light beam reflected by the optical disc OD passes through the objective lens 18, collimator lens 15, and beam splitter 14 in that order and is then incident on the hologram optical element 21. The hologram optical element 21, which is a diffractive optical element, transmits and diffracts the incident light, splitting it into a plurality of transmissively diffracted light beams, and directs these transmissively diffracted light beams toward the light-receiving sections 23, 24, 25, respectively, of the photodetector 22. As shown in FIG. 2, the light-receiving sections 23, 24, 25 of the photodetector 22 are aligned in an $X_1$-axis direction corresponding to the radial direction (X-axis direction). Each of the light-receiving sections 23, 24, 25 has a plurality of light-receiving surfaces; each light-receiving surface generates an electrical signal by performing photoelectric conversion of the transmissively diffracted light beam incident from the hologram optical element 21 and outputs the electrical signal to the matrix circuit 5. The X-axis direction, which is the radial direction of the optical disc OD, and the $X_1$-axis direction, which corresponds to the radial direction, are shown as substantially orthogonal to each other in FIG. 2. This is because of astigmatism induced by the beam splitter 14.

The servo circuit 8 in FIG. 1 operates in accordance with commands from the controller 12, generates drive signals for focus and for tracking adjustment on the basis of the focus and tracking error signals supplied from the matrix circuit 5, and supplies these drive signals to the actuator 17. The actuator 17 includes magnetic circuits 20A, 20B and a movable section 19 disposed between the magnetic circuits 20A, 20B, as schematically shown in FIG. 2. The movable section 19 includes a lens holder (not shown) for securing the objective lens 18 and a focus coil and tracking coil (both not shown) wound around projections on the lens holder. The focus coil is wound around the central axis of the objective lens 18, and the tracking coil is wound around an axis orthogonal to the light axis LA and the X-axis direction of the optical disc OD. The objective lens 18 can be moved in the focusing direction by supplying drive current (a drive signal) to the focus coil, and can be moved in the X-axis direction by supplying drive current (a drive signal) to the tracking coil. As described above, the laser control circuit 7, optical head device 3A, matrix circuit 5, and servo circuit 8 form a focus servo loop and a tracking servo loop.

The aberration correction mechanism control circuit 9 in FIG. 1 controls the operation of an aberration correction mechanism 16A in the optical head device 3A on the basis of the quality of the reproduced information signal input to the controller 12. The collimator lens 15 is an optical component that corrects optical aberration such as spherical aberration; the aberration correction mechanism control circuit 9 can correct optical aberration appropriately and with high precision by moving the lens holder 16B holding the collimator lens 15 in a direction D1 along the light axis LA.

FIG. 3 is a plan view schematically illustrating the configuration of the light incidence surface of the hologram optical element 21. The hologram optical element 21 has three types of diffraction regions: a primary diffraction region 210, a pair of secondary diffraction regions 211A, 211B, and a pair of peripheral diffraction regions 212A, 212B. A separate diffractive pattern (e.g., the profile and spacing of the diffraction grooves) may be formed in each of these three types of diffraction regions. The secondary diffraction regions 211A, 211B are disposed outward of the inner primary diffraction region 210 in a $Y_2$-axis direction corresponding to the tangential direction (Y-axis direction) of the optical disc OD. The peripheral diffraction regions 212A, 212B are disposed outward of the secondary diffraction regions 211A, 211B in the $Y_2$-axis direction. The shapes of the secondary diffraction regions 211A, 211B are symmetric with respect to a centerline 21c running in an $X_2$-axis direction (corresponding to the radial direction), which is orthogonal to the $Y_2$-axis direction; the shapes of the peripheral diffraction regions 212A, 212B are also symmetric with respect to the centerline 21c. The primary diffraction region 210 and secondary diffraction region 211A are separated by a boundary line 21ea parallel to the $X_2$-axis direction, and the primary diffraction region 210 and secondary diffraction region 211B are separated by a boundary line 21eb parallel to the $X_2$-axis direction. Peripheral diffraction region 212A and secondary diffraction region 211A are separated by a boundary line 21da parallel to the $X_2$-axis direction, and peripheral diffraction region 212B and secondary diffraction region 211B are separated by a boundary line 21db parallel to the $X_2$-axis direction.

The returning light beam from the optical disc OD includes diffracted light beams (reflectively diffracted light beams) caused by the radial or X-axis direction structure of the information recording layers (mainly by the structure of the information tracks) of the optical disc OD. The light incidence surface of the hologram optical element 21 is illuminated by light spots of the returning light. As shown in FIG. 3, the light spots include a light component ORp where a zero-order light component R0 represented by a solid circle overlaps a +1-order light component RP1 represented by a dotted circle, a light component ORn where the zero-order light component R0 represented by the solid circle overlaps a −1-order light component RN1 represented by another dotted circle, and a light component ORa where the zero-order light component R0 does not overlap the ±1-order light components RP1, RN1. The primary diffraction region 210 is formed in a position where part of the zero-order light component R0 (the central part of the light spot of the zero-order light component R0) and the ORp and ORn light components are incident. The secondary diffraction regions 211A, 211B are formed in positions where the remaining part of the zero-order light component R0 is incident and the ORp and ORn light components are not incident. The peripheral diffraction regions 212A, 212B are formed in positions where neither the zero-order light component R0 nor the ±1-order light components RP1, RN1 are incident.

The width of the primary diffraction region 210 in the $Y_2$-axis direction is designed to be less than the diameter of the light spot of the zero-order light component R0 in the $Y_2$-axis direction and equal to or greater than the width of light components ORp and ORn in the $Y_2$-axis direction, as shown in FIG. 3. In this embodiment, for efficient use of the returning light beam, boundary lines 21da, 21db are disposed in positions where they are substantially tangent to the outer diameter extremities of the zero-order light component R0 in the $Y_2$-axis direction. Boundary lines 21ea, 21eb are disposed in positions where they touch the extremities of light components ORp and ORn in the $Y_2$-axis direction, so that the light component ORa consisting of the part of the zero-order diffracted light R0 that does not overlap either the +1-order diffracted light RP1 or the −1-order diffracted light RN1 occupies as much area as possible in the secondary diffraction regions 211A, 211B. The primary diffraction region 210 therefore has a rectangular shape with a width substantially equal to the width of light components ORp and ORn in the $Y_2$-axis direction, and the secondary diffraction regions 211A, 211B have rectangular shapes with a width substantially equal to the spacing between the outer diameter extremities of the zero-order light component R0 and the extremities of light components ORp and ORn in the $Y_2$-axis direction. Although for efficient use of the returning light beam boundary lines 21ea, 21eb are preferably disposed in positions touching the extremities of light components ORp and ORn, this is not a limitation.

Figure 4A:
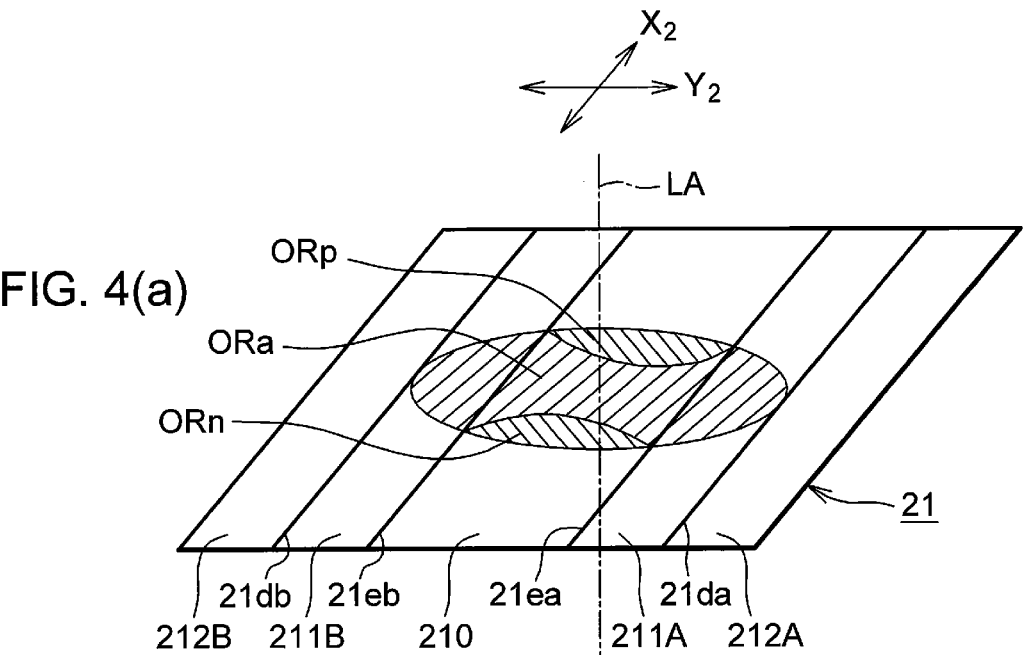
FIGS. 4(a) and 4(b) are perspective views of the hologram optical element and photodetector in the first embodiment.
Figure 4B:
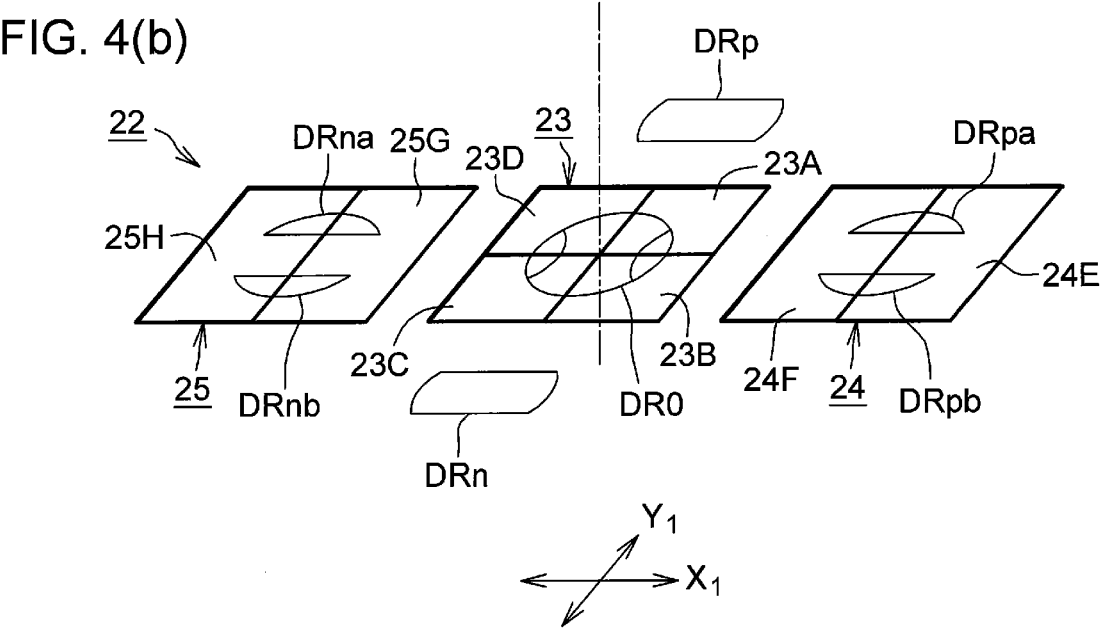

FIGS. 4(a) and 4(b) are perspective views of the hologram optical element 21 and photodetector 22 aligned on the light axis LA. In FIGS. 4(a) and 4(b) the $X_2$-axis direction corresponding to the radial direction is shown substantially orthogonal to the $X_1$-axis direction. That is because of the function of the beam splitter 14 disposed between the hologram optical element 21 and photodetector 22 that induces astigmatism in the returning light beam.

As shown in FIG. 4(b), the photodetector 22 includes a main light-receiving section 23 having light-receiving surfaces 23A to 23D orthogonal to the light axis LA, and a first secondary light-receiving section 24 and a second secondary light-receiving section 25 disposed on two sides of the main light-receiving section 23. The plurality of light-receiving surfaces 23A, 23B, 23C, 23D included in the main light-receiving section 23 are arranged in a matrix aligned with the $X_1$-axis and $Y_1$-axis directions. The pair of light-receiving surfaces 23A, 23B is adjacent to the pair of light-receiving surfaces 23C, 23D in the $X_1$-axis direction, light-receiving surfaces 23A, 23B being mutually aligned in the $Y_1$-axis direction and light-receiving surfaces 23C, 23D also being mutually aligned in the $Y_1$-axis direction. The first secondary light-receiving section 24 has a pair of light-receiving surfaces 24E, 24F mutually aligned in the $X_1$-axis direction, and the second secondary light-receiving section 25 has a pair of light-receiving surfaces 25G, 25H mutually aligned in the $X_1$-axis direction.

The principal diffraction efficiencies of the primary diffraction region 210 with respect to the returning light beam are the zero-order and ±1-order diffraction efficiencies; the principal diffraction efficiencies of the secondary diffraction regions 211A, 211B with respect to the returning light beam are the zero-order and ±1-order diffraction efficiencies. The zero-order light component DR0 of the light beam (referred to below as the transmissively diffracted light beam) exiting the primary diffraction region 210 and the secondary diffraction region 211A, 211B illuminates the light-receiving surfaces 23A to 23D of the main light-receiving section 23, forming a light spot. This light spot include the zero-order and ±1-order reflectively diffracted light beam components produced by the radial structure of the optical disc OD. The +1-order light component DRp and −1-order light component DRn of the transmissively diffracted light beam exiting the primary diffraction region 210 illuminate areas lying outside the main light-receiving section 23 in the $Y_1$-axis direction, as shown in FIG. 4(b). The photodetector 22 does not receive these ±1-order light components DRp and DRn. The +1-order light components DRpa and DRpb of the transmissively diffracted light beams exiting the secondary diffraction regions 211A and 211B illuminate the light-receiving surfaces 24E, 24F of the first secondary light-receiving section 24, and the −1-order light components DRna, DRnb illuminate the light-receiving surfaces 25G, 25H of the second secondary light-receiving section 25.

The pattern of the eight light-receiving surfaces 23A to 23D, 24E, 24F, 25G, 25H is the same as the light-receiving surface pattern used in the general differential push-pull method to generate a tracking error signal. The light-receiving surfaces 23A, 23B, 23C, 23D of the main light-receiving section 23 output respective detection signals $S_A$, $S_B$, $S_C$, $S_D$ by photoelectric conversion of the zero-order light component DR0, the light-receiving surfaces 24E, 24F of the first secondary light-receiving section 24 output respective detection signals $S_E$, $S_F$ by photoelectric conversion of the +1-order light components DRpa, DRpb, and the light-receiving surfaces 25G, 25H of the second secondary light-receiving section 25 output respective detection signals $S_G$, $S_H$ by photoelectric conversion of the −1-order light components DRna, DRnb. The matrix circuit 5 then generates a focus error signal FES having a signal level obtained from the equation (1) below in accordance with the astigmatic method.

$$\text{FES}=(S_A+S_C)-(S_B+S_D) \tag{1}$$

The matrix circuit 5 generates a reproduced RF signal having a signal level obtained from the following equation (2).

$$\text{RF}=S_A+S_B+S_C+S_D \tag{2}$$

The matrix circuit 5 also generates a tracking error signal TES having a signal level obtained from the following equation (3).

$$\text{TES}=\text{MPP}-k\times\text{SPP} \tag{3}$$

Here, k is a gain coefficient. MPP represents a main push-pull signal, and SPP represents a sub-push-pull signal. The main push-pull signal MPP and sub-push-pull signal SPP are given by the following equations (3a, 3b).

$$\text{MPP}=(S_A+S_B)-(S_C+S_D) \tag{3a}$$

$$\text{SPP}=(S_E-S_F)+(S_G-S_H) \tag{3b}$$

The main push-pull signal MPP and sub-push-pull signal SPP have the same phase in relation to objective lens shift, and an offset component attributable to objective lens shift is obtained as a signal component k×SPP. Therefore, a tracking error signal TES in which the offset component arising from the objective lens shift is cancelled out can be obtained by appropriate adjustment of the gain coefficient k and amplification of the sub-push-pull signal SPP with the adjusted gain.

FIGS. 5(a), 5(b), and 5(c) schematically illustrate the relation between objective lens shift (displacement of the objective lens 18 in the radial direction with respect to the photodetector 22) and the positions of the illuminated light spots on the photodetector 22. FIG. 5(b) shows the positions (reference positions) in which the light beams illuminate the light-receiving surfaces of the photodetector 22 when the central axis of the objective lens 18 is on the light axis LA. In this case, the light spot of the zero-order light component DR0 is positioned at the center of the main light-receiving section 23 in both the $X_1$-axis and $Y_1$-axis directions, the +1-order light components DRpa, DRpb are positioned at the center of the first secondary light-receiving section 24 in the $X_1$-axis direction, and the −1-order light components DRna, DRnb are positioned at the center of the second secondary light-receiving section 25 in the $X_1$-axis direction. FIG. 5(a) shows the positions of the light beams illuminating the light-receiving surfaces of the photodetector 22 when the objective lens 18 is displaced toward the inner perimeter of the optical disc OD. In this case, the light spot of the zero-order light component DR0 is displaced toward light-receiving surfaces 23C and 23D, the +1-order light components DRpa, DRpb are displaced toward light-receiving surface 24F, and the −1-order light components DRna, DRnb are displaced toward light-receiving surface 25H. FIG. 5(c) shows the positions of the light beams illuminating the light-receiving surfaces of the photodetector 22 when the objective lens 18 is displaced toward the outer perimeter of the optical disc OD. In this case, the light spot of the zero-order light component DR0 is displaced toward light-receiving surfaces 23A, 23B, the +1-order light components DRpa, DRpb are displaced toward light-receiving surface 24E, and the −1-order light components DRna, DRnb are displaced toward light-receiving surface 25G.

FIGS. 6(a), 6(b), and 6(c) schematically illustrate the relation between objective lens shift and the signal components MPP, SPP of the tracking error signal TES. FIGS. 6(a), 6(b), and 6(c) show the waveform of the main push-pull signal MPP and the sub-push-pull signal SPP detected when the optical head device 3A has moved in the radial direction at a constant speed. These main push-pull signals MPP and sub-push-pull signals SPP are obtained when focus control is performed but tracking control is not performed. FIGS. 6(a), 6(b), and 6(c) correspond respectively to FIGS. 5(a), 5(b), and 5(c). If the objective lens 18 is on the light axis LA and is not displaced in the radial direction, the DC component (direct-current component) of the main push-pull signal MPP matches the GND level and the DC component of the sub-push-pull signal SPP also matches the GND level, as shown in FIG. 6(b). The sub-push-pull signal SPP has a direct-current waveform. The reason is that the +1-order components DRpa, DRpb and the −1-order components DRna, DRnb of the transmissively diffracted light beam contributing to the sub-push-pull signal SPP do not include light components ORp, ORn in FIG. 3 (the light components in which the zero-order light R0 and the ±1-order light RP1, RN1 of the reflectively diffracted light beam from the optical disc OD overlap). If the objective lens 18 is displaced toward the inner perimeter, the waveform of the DC component of the main push-pull signal MPP has a negative offset, and the direct-current waveform of the sub-push-pull signal SPP also has a negative offset, as shown in FIG. 6(a). If the objective lens 18 is displaced toward the outer perimeter, the waveform of the DC component of the main push-pull signal MPP has a positive offset, and the direct-current waveform of the sub-push-pull signal SPP also has a positive offset, as shown in FIG. 6(c). Therefore, the main push-pull signal MPP and sub-push-pull signal SPP have the same phase in relation to objective lens shift, and the offset of the sub-push-pull signal SPP has a value corresponding to the amount by which the objective lens 18 is displaced. Therefore, by deducting the value obtained by multiplying the value of the sub-push-pull signal SPP by k from the value of the main push-pull signal MPP, a tracking error signal TES in which the offset component arising from objective lens shift is cancelled out can be generated.

The $S_E$-$S_F$ signal component of the sub-push-pull signal SPP has the same phase as the main push-pull signal MPP in relation to objective lens shift, and the $S_G$-$S_H$ signal component also has the same phase as the main push-pull signal MPP in relation to objective lens shift. Therefore, the tracking error signal TES given by the following equation (4a) or (4b) instead of the equation (3) given earlier can be used.

$$\text{TES}=\text{MPP}-k\times(S_E-S_F) \quad (4a)$$

$$\text{TES}=\text{MPP}-k\times(S_G-S_H) \quad (4b)$$

When the above equation (4a) is used, the photodetector 22 need not include the second secondary light-receiving section 25, and when the above equation (4b) is used, the photodetector 22 need not include the first secondary light-receiving section 24. The advantage in these cases is therefore that the configuration of the optical head device 3A can be simplified. From the viewpoint of improving the offset cancellation accuracy, however, it is better to use equation (3) than equation (4a) or (4b).

Since the sub-push-pull signal SPP is generated by the ±1-order light diffracted in the secondary diffraction regions 211A, 211B of the hologram optical element 21, its signal intensity is affected by the ±1-order diffraction efficiency defined by the secondary diffraction regions 211A, 211B. If the intensity of the sub-push-pull signal SPP is low, for example, the noise component becomes proportionately large, and the noise component is greatly amplified when the sub-push-pull signal SPP is amplified by the factor of k. From the viewpoint of suppressing amplification of the noise component, it is preferable to set the ±1-order diffraction efficiency of the secondary diffraction regions 211A, 211B to a large value, in order to increase the intensity of the sub-push-pull signal SPP.

Next the relation between the signal length of information recorded in the information recording layer of the optical disc OD and the reproduced information signal will be described. In general, in an optical disc OD on which information has been recorded, recorded mark regions and space regions are formed along an information track. The specifications of the optical disc OD define signal lengths nT (where n is a positive integer and T is a unit time such as a reproduction clock cycle) corresponding to the lengths of the recorded marks or spaces. For example, the Blu-ray Disc standard defines seven signal lengths 2T, 3T, 4T, 5T, 6T, 7T, 8T. Since the light beam illuminating the information recording layer of the optical disc OD is diffracted when it is reflected by the recorded marks and spaces formed in the tangential direction (Y-axis direction), the returning light beam from the optical disc OD may include diffracted light caused by the tangential structure of the information recording layer.

Figure 7A:
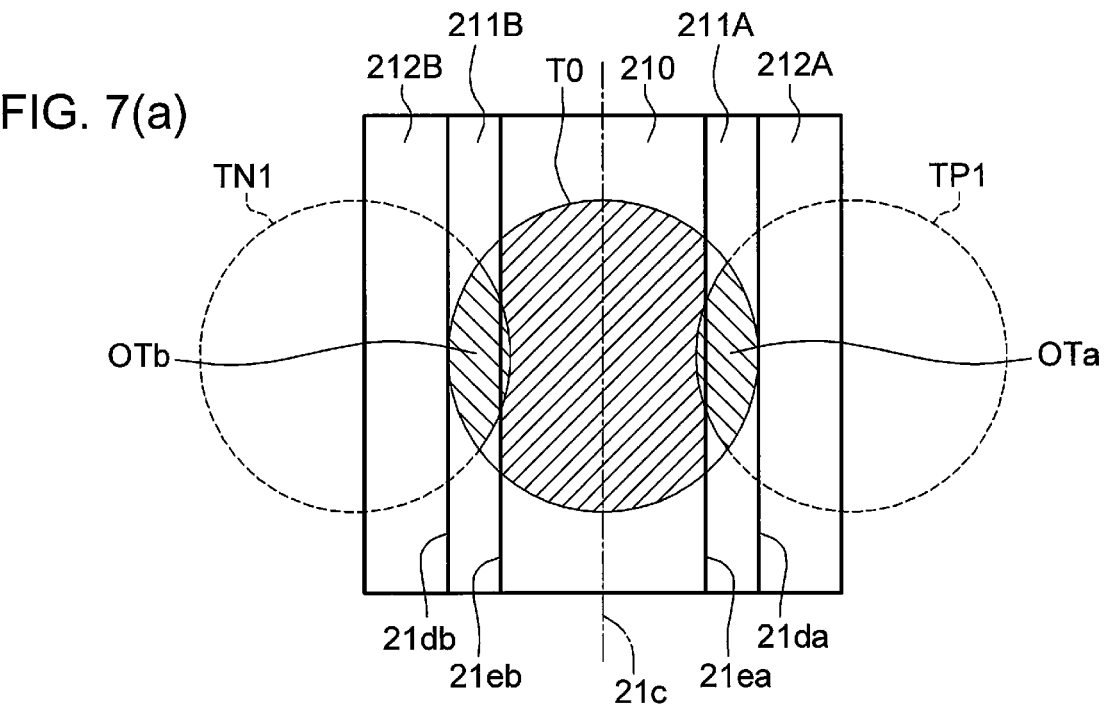
FIGS. 7(a) and 7(b) are plan views schematically illustrating the illumination of the hologram optical element by diffracted light as a function of signal length on the optical disc.
Figure 7B:
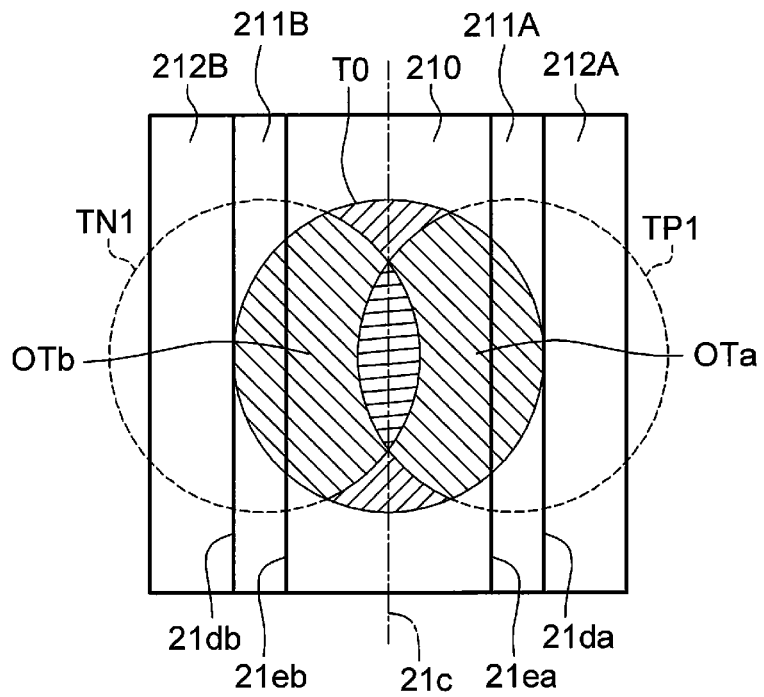

FIGS. 7(a) and 7(b) are plan views schematically illustrating the illumination of the hologram optical element 21 by diffracted light attributable to the signal length on the optical disc OD. FIG. 7(a) shows the light spots of diffracted light corresponding to the 2T signal length defined by the Blu-ray Disc standard, and FIG. 7(b) shows the light spots of diffracted light corresponding to a relatively long signal length recorded on the optical disc OD. As shown in FIGS. 7(a) and 7(b), these light spots illuminate the primary diffraction region 210 and the secondary diffraction regions 211A, 211B and include a zero-order light component T0 represented by a solid circle, part of the +1-order light component TP1 that overlaps the zero-order light component T0 in the $Y_2$-axis direction, and part the of −1-order light component TN1 that overlaps the zero-order light component T0 in the $Y_2$-axis direction. The illuminated areas of the light components OTa, OTb where the zero-order light component T0 overlaps the ±1-order light components TP1, TN1 depend on the signal length. If the signal length is short, the illuminated areas of the light components OTa, OTb are small, as shown in FIG. 7(a), and light components OTa and OTb substantially fit within the secondary diffraction regions 211A, 211B. If the signal length is relatively long, the illuminated areas of the light components OTa and OTb where the zero-order light component T0 overlaps the ±1-order light components TP1, TN1 are large, light component OTa illuminates both the primary diffraction region 210 and secondary diffraction region 211A, and light component OTb illuminates both the primary diffraction region 210 and secondary diffraction region 211B, as shown in FIG. 7(b). If no information is recorded on the optical disc OD, the ±1-order light components TP1, TN1 are not generated, and the zero-order light component T0 matches the zero-order light component R0 shown in FIG. 3.

The reproduced RF signal ($=S_A+S_B+S_C+S_D$) has a value corresponding to the intensity of the diffracted light illuminating the main light-receiving section 23. The size of the amplitude of the reproduced RF signal depends on the illuminated areas of light components OTa and OTb, which correspond to the signal length. Therefore, the intensity of the reproduced RF signal mainly depends on the zero-order diffraction efficiency of the primary diffraction region 210 and the zero-order diffraction efficiency of the secondary diffraction regions 211A, 211B in the hologram optical element 21. To increase the intensity of the reproduced RF signal, it suffices to form the primary diffraction region 210 and secondary diffraction regions 211A, 211B so that the zero-order diffraction efficiency of the primary diffraction region 210 and the zero-order diffraction efficiency of the secondary diffraction regions 211A, 211B of the hologram optical element 21 all have high values. If the signal length is short, the zero-order diffraction efficiency of the secondary diffraction regions 211A, 211B has a dominant effect; if the signal length is long, the intensity is affected by the zero-order diffraction efficiency of the primary diffraction region 210 as well as the zero-order diffraction efficiency of the secondary diffraction regions 211A, 211B. The reproduced RF signal corresponding to a short signal length generally has a low intensity, so detection errors are likely to occur in signal detection. To avoid detection errors, it is desirable to increase the intensity of the reproduced RF signals corresponding to short signal lengths by raising the zero-order diffraction efficiency of the secondary diffraction regions 211A, 211B to a level higher than the zero-order diffraction efficiency of the primary diffraction region 210 (hereinafter, requirement A). Let the zero-order diffraction efficiency of the primary diffraction region 210 be $\eta_x$ and the zero-order diffraction efficiency of the secondary diffraction regions 211A, 211B be $\eta_y$; then the range of $\eta_x$ and $\eta_y$ that satisfies requirement A is the range in which the following inequality holds.

$$\eta_x \leq \eta_y$$

Figure 8A:
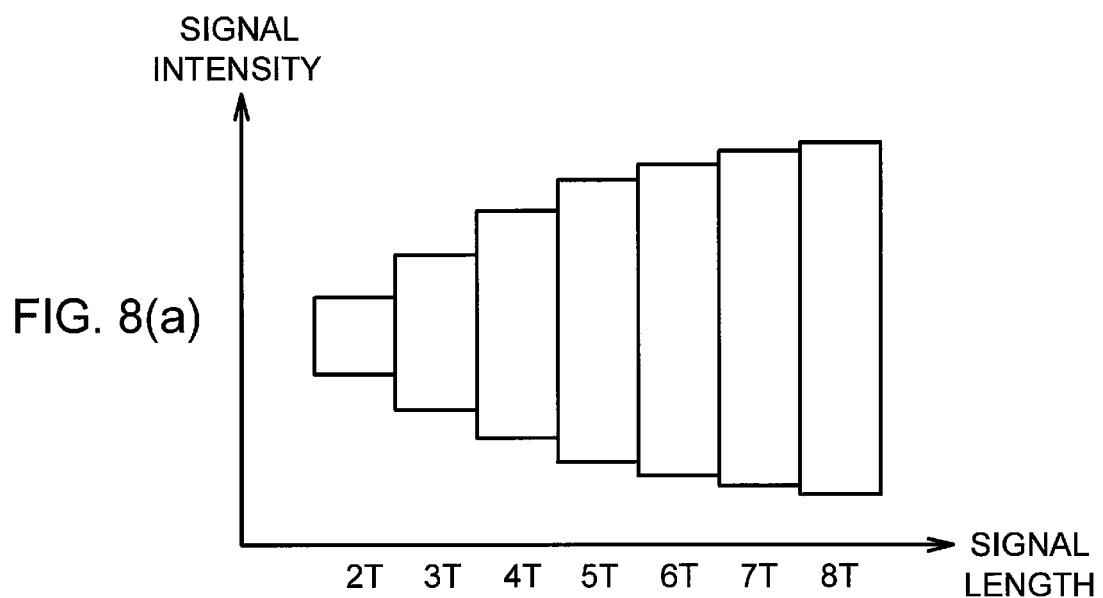
FIGS. 8(a) and 8(b) are plan views schematically illustrating exemplary intensity characteristics of the reproduced RF signal in relation to signal length.
Figure 8B:
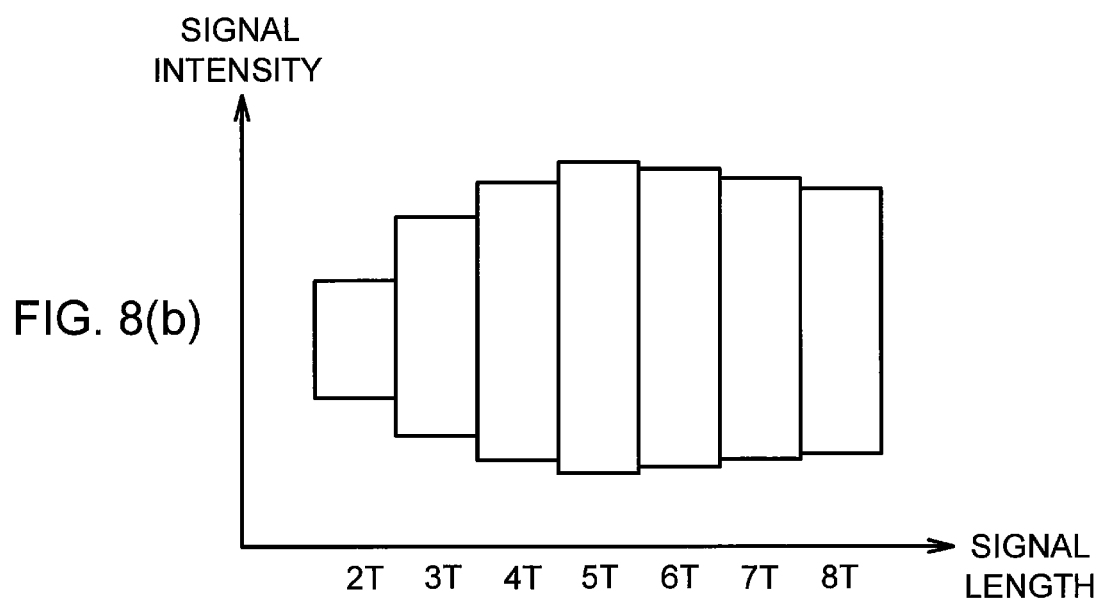

FIGS. 8(a) and 8(b) schematically illustrate exemplary intensity characteristics of the reproduced RF signal in relation to signal length. The graphs in FIGS. 8(a) and 8(b) were obtained by numerical simulation based on the Blu-ray Disc standard. FIG. 8(a) shows signal characteristics obtained when the zero-order diffraction efficiency $\eta_x$ of the primary diffraction region 210 equals the zero-order diffraction efficiency $\eta_y$ of the secondary diffraction regions 211A, 211B, or when the hologram optical element 21 is not used. As shown in FIG. 8(a), as the signal length increases, the signal intensity increases. FIG. 8(b) schematically illustrates the intensity characteristics when the zero-order diffraction efficiency $\eta_y$ of the secondary diffraction regions 211A, 211B is greater than the zero-order diffraction efficiency $\eta_x$ of the primary diffraction region 210 ($\eta_x < \eta_y$). The graph in FIG. 8(b) is preferable in that the signal intensity corresponding to the short signal length of 2T is strengthened, but although the signal intensity increases monotonically in the signal length range up to 5T, the signal intensity decreases monotonically in the signal length range above 5T, and the signal intensity at 6T is lower than the signal intensity at 5T. A change from monotonic increase to monotonic decrease in signal intensity (a reversal of signal intensity) thus occurs as the signal length increases. The signal reproduction circuit 6 generates a binary signal having a pulse width corresponding to the signal length by binarizing the reproduced RF signal supplied from the matrix circuit 5. If a reversal of signal intensity occurs, a pulse width corresponding to the signal length may not be obtained. Therefore, it is preferable that a reversal of signal intensity does not occur (hereinafter, requirement B).

To increase the signal intensity of the sub-push-pull signal SPP ($=(S_E-S_F)+(S_G-S_H)$) in the tracking error signal, as described above, the ±1-order diffraction efficiency of the secondary diffraction regions 211A, 211B should be high, but if the ±1-order diffraction efficiency is too high, the zero-order diffraction efficiency $\eta_y$ of the secondary diffraction regions 211A, 211B becomes low, lowering the amount of light detected by the main light-receiving section 23. This would make it impossible to satisfy the requirement B for strengthening the signal intensity of the reproduced RF signal corresponding to short signal lengths. From numerical simulation, the range of zero-order diffraction efficiencies $\eta_x$, $\eta_y$ for satisfying requirement B is preferably the range in which the following inequality holds.

$$\eta_y \leq 2 \times \eta_x$$

Figure 9A:
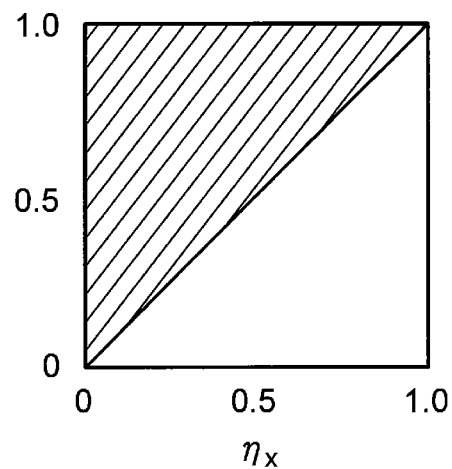
FIGS. 9(a), 9(b), and 9(c) are distribution diagrams illustrating desirable ranges of the zero-order diffraction efficiencies in the secondary diffraction regions and primary diffraction region.
Figure 9B:
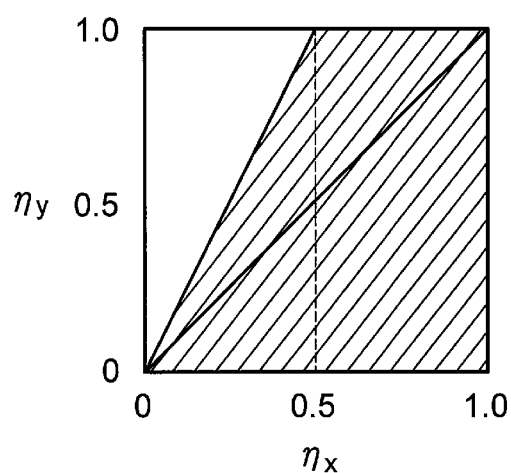
Figure 9C:
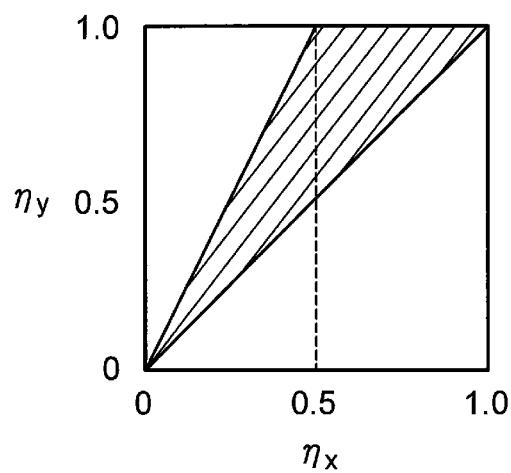

FIGS. 9(a), 9(b), and 9(c) are distribution diagrams illustrating desirable ranges of the zero-order diffraction efficiencies $\eta_x$, $\eta_y$ from the perspective of the signal intensity characteristics of the reproduced RF signal when the zero-order diffraction efficiency $\eta_y$ of the secondary diffraction regions 211A, 211B and the zero-order diffraction efficiency $\eta_x$ of the primary diffraction region 210 are taken as variables. In the graphs shown in FIGS. 9(a), 9(b), and 9(c), the horizontal axis indicates the zero-order diffraction efficiency $\eta_x$ of the primary diffraction region 210, and the vertical axis indicates the zero-order diffraction efficiency $\eta_y$ of the secondary diffraction regions 211A, 211B. The value of "0" on the horizontal and vertical axes is defined to indicate the absence of the zero-order light component of the transmissively diffracted light, and the value of "1" is defined to indicate the absence of all light components of orders other than the zero order of the transmissively diffracted light. FIG. 9(a) is a distribution diagram in which the hatched part indicates the range of zero-order diffraction efficiencies $\eta_x$ and $\eta_y$ satisfying requirement A $\eta_x \leq \eta_y$), and FIG. 9(b) is a distribution diagram in which the hatched part indicates the range of zero-order diffraction efficiencies $\eta_x$ and $\eta_y$ satisfying requirement B ($\eta_x \leq 2 \times \eta_x$). From the perspective of the signal intensity characteristics of the information RF signal, the desirable range is the range of zero-order diffraction efficiencies $\eta_x$ and $\eta_y$ satisfying both requirement A and requirement B ($\eta_x \leq \eta_y$ and $\eta_y \leq 2 \times \eta_x$). The hatched part in FIG. 9(c) indicates the range of zero-order diffraction efficiencies $\eta_x$ and $\eta_y$ satisfying both requirements A and B.

As described above, the hologram optical element 21 in the first embodiment has a primary diffraction region 210 in which part of the zero-order light component ORa and the ±1-order light components ORp, ORn of the reflectively diffracted light beam are incident, and secondary diffraction regions 211A, 211B in which the remaining part of the zero-order light component ORa is incident and the ±1-order light components ORp, ORn of the reflectively diffracted light beam are not incident. The photodetector 22 includes a main light-receiving section 23 for receiving the zero-order light component DR0 of the transmissively diffracted light beam that has passed through the primary diffraction region 210 and the secondary diffraction regions 211A, 211B, and secondary light-receiving sections 24, 25 that receive the +1-order light components DRpa, DRpb and −1-order light components DRna, DRnb of the transmissively diffracted light beam that has passed through the secondary diffraction regions 211A, 211B. Therefore, by using a photodetector 22 having a simple light-receiving surface pattern, a tracking error signal TES in which the offset component attributable to objective lens shift has been cancelled out can be generated.

The signal intensity of the reproduced RF signal corresponding to short signal lengths can be increased by setting the zero-order diffraction efficiency $\eta_y$ of the secondary diffraction regions 211A, 211B to a value greater than or equal to the zero-order diffraction efficiency $\eta_x$ of the primary diffraction region 210. Consequently, signal detection performance can be improved by using the optical head device 3A of the first embodiment. Moreover, by setting the zero-order diffraction efficiency $\eta_y$ of the secondary diffraction regions 211A, 211B to a value not greater than twice the zero-order diffraction efficiency $\eta_x$ of the primary diffraction region 210, a reversal in the relation between signal length and signal intensity can be avoided, and signal detection performance can be further improved.

Second Embodiment

Figure 10:
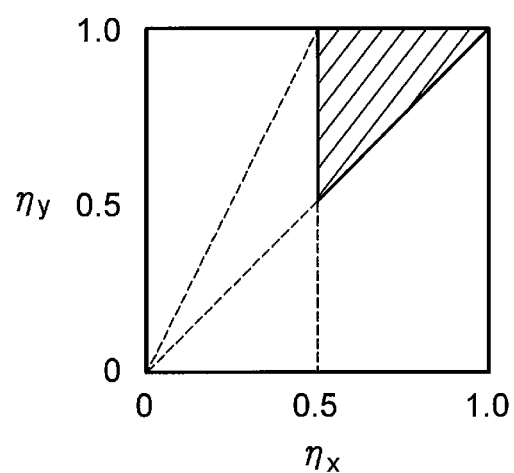
FIG. 10 is a distribution diagram illustrating a preferred range of the zero-order diffraction efficiencies in the secondary diffraction regions and primary diffraction region in a second embodiment.

A second embodiment of the present invention will now be described. The configuration of the optical head device in this embodiment is the same as the configuration of the optical head device 3A in the first embodiment, except for the relation between the zero-order diffraction efficiency $\eta_y$ of the secondary diffraction regions 211A, 211B and the zero-order diffraction efficiency $\eta_x$ of the primary diffraction region 210 in the hologram optical element 21. FIG. 10 is a distribution diagram including a hatched part indicating a desirable range of the zero-order diffraction efficiencies $\eta_y$, $\eta_x$ in the optical head device of the second embodiment. The range satisfies $\eta_x \geq 0.5$, $\eta_x \leq \eta_y$, and $\eta_y \leq 2 \times \eta_x$. This range is essentially the same as the range satisfying $\eta_x \geq 0.5$, $\eta_x \leq \eta_y$, and $\eta_y \leq 1.0$.

In the first embodiment, the range of zero-order diffraction efficiencies $\eta_x$ and $\eta_y$ that simultaneously satisfy requirements A and B is the range satisfying the two inequalities $\eta_x \leq \eta_y$ and $\eta_y \leq 2 \times \eta_x$, as shown in FIG. 9(c). A zero-order diffraction efficiency $\eta_x$ close to zero means that most of the transmissively diffracted light is diffracted light other than zero-order diffracted light. When the zero-order diffraction efficiency $\eta_x$ of the primary diffraction region 210 is close to zero, for example, this means that the intensities of the first-order light components DRp, DRn (FIG. 4(b)) that are not incident on the photodetector 22 increase, while the intensity of the zero-order light component DR0 incident on the photodetector 22 decreases. In the second embodiment, in order to stabilize signal detection, a minimum value of 0.5 is specified for the zero-order diffraction efficiency $\eta_x$.

As described above, according to the second embodiment, the intensity of the light beam incident on the photodetector 22 can be increased because the zero-order diffraction efficiency $\eta_x$ of the hologram optical element 21 is set to a value not less than 0.5. Use of the optical head device in the second embodiment can therefore stabilize signal detection performance.

Third Embodiment

A third embodiment of the present invention will now be described. The configuration of the optical head device in this embodiment is the same as the configuration of the optical head device 3A in the first embodiment except for the hologram optical element. FIG. 11(a) schematically illustrates part of the configuration of the optical head device 3A including the hologram optical element 21 in the first embodiment, and FIG. 11(b) schematically illustrates part of the configuration of the optical head device 3B including the hologram optical element 21M in the third embodiment. The optical disc OD shown in FIGS. 11(a) and 11(b) is a multilayer disc including a plurality of information recording layers L0, L1, L2, L3.

FIGS. 11(a) and 11(b) show the paths of propagation of two returning light beams RL, SL reflected by the optical disc OD. The returning light beam RL from the information recording layer L1 where information is recorded or reproduced is incident on the hologram optical element 21 after successive passage through the objective lens 18 and collimator lens 15. With this multilayer disc, spherical aberration occurs separately for information recording layers L0 to L3. The aberration correction mechanism 16A provided in the optical head device 3A can correct the spherical aberration of each information recording layer appropriately by displacing the collimator lens 15 along the light axis LA. This returning light beam RL is diffracted by the primary diffraction region 210 and secondary diffraction regions 211A, 211B and split into three transmissively diffracted light beams. These three transmissively diffracted light beams are incident on the main light-receiving section 23, first secondary light-receiving section 24, and second secondary light-receiving section 25, respectively.

Returning light beam SL is a stray light beam reflected by information recording layers (such as information recording layer L3) other than the information recording layer L1 where information is recorded or reproduced. As shown in FIG. 11(a), after successive passage through the objective lens 18 and collimator lens 15, this type of stray light SL is incident on the peripheral diffraction regions 212A, 212B of the hologram optical element 21. If the zero-order diffraction efficiency of the peripheral diffraction regions 212A, 212B is not zero, part of the stray light SL can pass straight through the peripheral diffraction regions 212A, 212B and illuminate the main light-receiving section 23, first secondary light-receiving section 24, or second secondary light-receiving section 25 of the photodetector 22, as shown in FIG. 11(a). This, however, is not desirable because an unwanted signal component other than the necessary signal components will be detected. FIG. 11(a) illustrates exemplary stray light SL reflected by information recording layer L3, but the same applies to light reflected from information recording layer L1 or L2. Even if the zero-order diffraction efficiency of the peripheral diffraction regions 212A, 212B in the hologram optical element 21 is zero, stray light may enter the main light-receiving section 23, first secondary light-receiving section 24, or second secondary light-receiving section 25 of the photodetector 22, depending on the diffraction efficiency and diffraction directions of non-zero orders.

The hologram optical element 21M in this embodiment includes a primary diffraction region 210 and secondary diffraction regions 211A, 211B having the same configuration as in the hologram optical element 21 described earlier. Instead of the peripheral diffraction regions 212A, 212B of the hologram optical element 21, however, the hologram optical element 21M has secondary diffractive regions 212Am, 212Bm which have a diffractive structure that diffracts incident light in a direction other than the direction toward the photodetector 22. Light incident on the secondary diffractive regions 212Am, 212Bm is diffracted and propagates without striking the photodetector 22. The characteristics of the secondary diffractive regions 212Am, 212Bm, including their diffraction orders, diffraction efficiency, and diffraction directions, for example, can be optimized so that the stray light SL is diffracted through such a large angle that it misses the photodetector 22. The diffraction orders, diffraction efficiency, and diffraction directions of the secondary diffractive regions 212Am, 212Bm may be set as appropriate for the number of layers in the optical disc OD or the size of the photodetector 22, for example.

As described above, since the hologram optical element 21M in the third embodiment does not allow stray light generated by a multilayer disc to strike the photodetector 22, the photodetector 22 does not detect unwanted signal components other than the innately necessary signal components. Use of the optical head device in the third embodiment can therefore stabilize signal detection performance.

Fourth Embodiment

Figure 12:
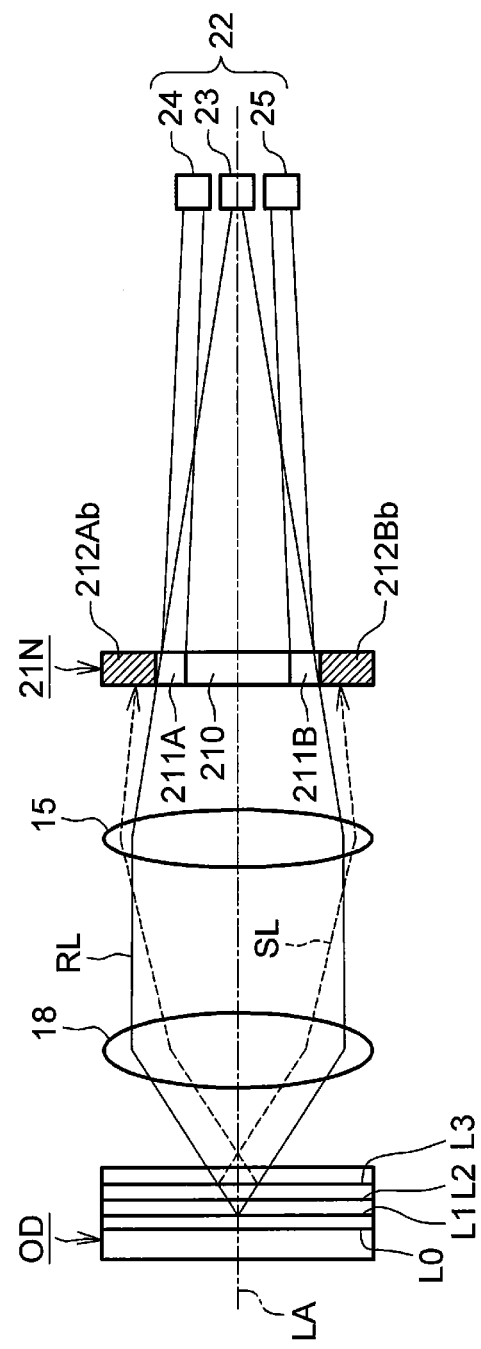
FIG. 12 schematically illustrates part of the configuration of an optical head device including the hologram optical element in a fourth embodiment of the invention.

A fourth embodiment of the present invention will now be described. The configuration of the optical head device in this embodiment is the same as the configuration of the optical head device 3A in the first embodiment except for the hologram optical element. FIG. 12 schematically illustrates part of the configuration of an optical head device including the hologram optical element 21N in the fourth embodiment. The optical disc OD shown in FIG. 12 is a multilayer disc having a plurality of information recording layers L0, L1, L2, and L3 disposed one above another.

FIG. 12 shows the paths of propagation of two returning light beams RL, SL reflected by the optical disc OD. The returning light beam RL from the information recording layer L1 where information is recorded or reproduced is incident on the hologram optical element 21N after successive passage through the objective lens 18 and collimator lens 15. This returning light beam RL is diffracted by the primary diffraction region 210 and secondary diffraction regions 211A, 211B and split into three transmissively diffracted light beams. These three transmissively diffracted light beams are incident on the main light-receiving section 23, first secondary light-receiving section 24, and second secondary light-receiving section 25, respectively.

Returning light beam SL is a stray light beam reflected by information recording layers (such as information recording layer L3) other than the information recording layer L1 where information is recorded or reproduced. The hologram optical element 21N in this embodiment includes a primary diffraction region 210 and secondary diffraction regions 211A, 211B, having the same structure as in the hologram optical element 21 described above, and also includes light-blocking regions 212Ab, 212Bb instead of peripheral diffraction regions 212A, 212B. The stray light SL reflected by information recording layer L3, for example, can therefore be blocked by the light-blocking regions 212Ab, 212Bb of the hologram optical element 21N and prevented from illuminating the main light-receiving section 23, first secondary light-receiving section 24, or second secondary light-receiving section 25 of the photodetector 22. The light-blocking regions 212Ab, 212Bb can be formed by applying an opaque material or a light absorbing material to, depositing an opaque metal film on, or attaching an opaque metal sheet to the regions corresponding to the peripheral diffraction regions 212A, 212B (regions where a diffractive pattern has not been formed).

As described above, since the hologram optical element 21N in the fourth embodiment does not allow stray light generated by a multilayer disc to strike the photodetector 22, the photodetector 22 does not detect unwanted signal components other than the innately necessary signal components. Use of the optical head device in the fourth embodiment can therefore stabilize signal detection performance. If peripheral diffraction regions 212A, 212B were present, light diffracted by the peripheral diffraction regions 212A, 212B might be reflected by peripheral hardware and detected by the photodetector 22 as stray light, but the hologram optical element 21N, having light-blocking regions 212Ab, 212Bb, can prevent such stray light from occurring.

Fifth Embodiment

Figure 13:
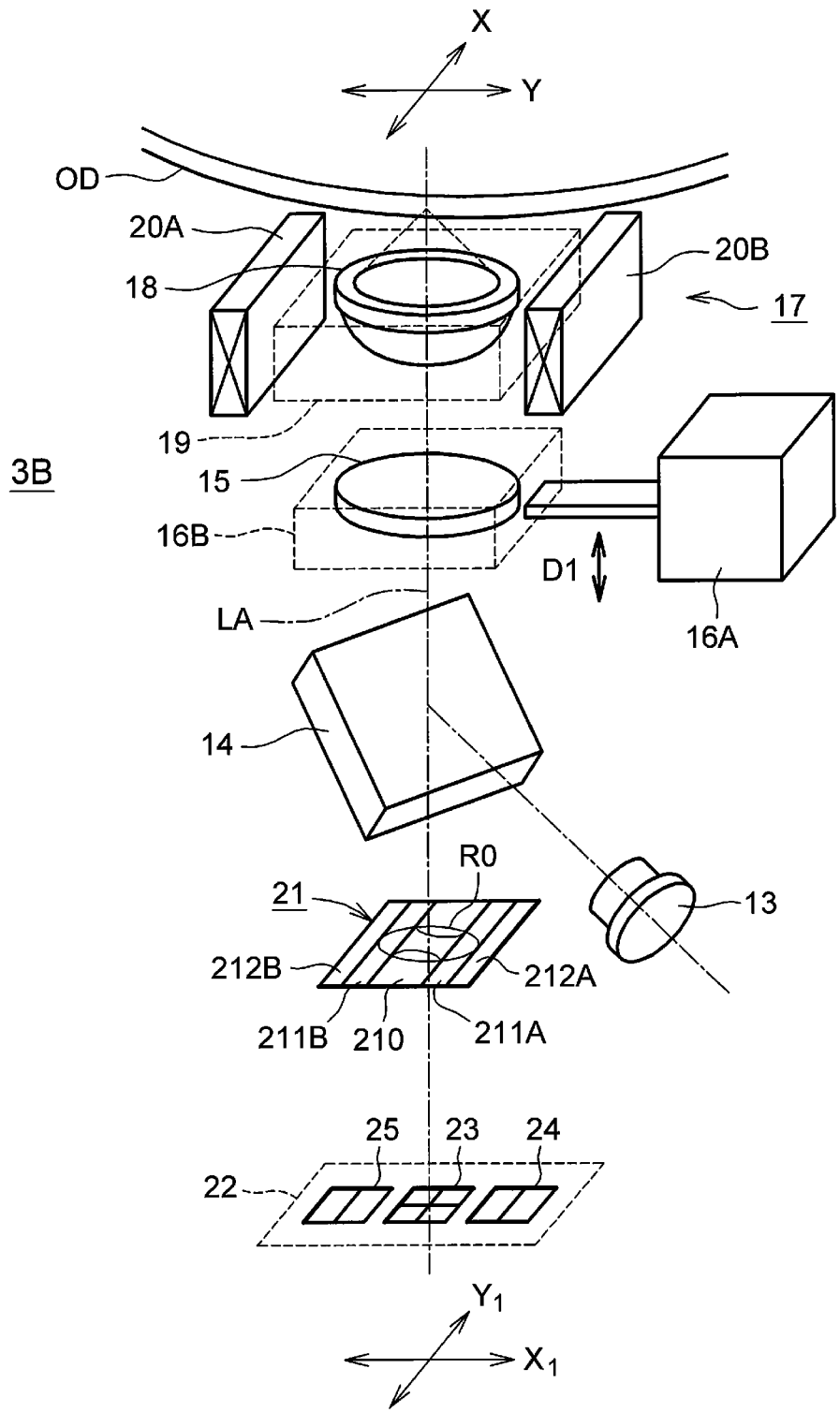
FIG. 13 is a perspective view showing the main elements in the configuration of the optical head device in a fifth embodiment.

A fifth embodiment according to the present invention will now be described. FIG. 13 is a perspective view schematically showing the main elements in the configuration of the optical head device 3B in the fifth embodiment. As shown in FIG. 13, the optical head device 3B includes a semiconductor laser 13, which is a laser light source, a beam splitter 14, a collimator lens 15, an objective lens 18, an actuator 17, a hologram optical element 21, and a photodetector 22. The semiconductor laser 13 operates under control of the laser control circuit 7 in FIG. 1, and the laser control circuit 7 controls the optical intensity of laser light emitted from the semiconductor laser 13 on the basis of commands from the controller 12. Laser light emitted from the semiconductor laser 13 is reflected by the beam splitter 14 and is incident on the objective lens 18 through the collimator lens 15. The objective lens 18 focuses the incident light beam from the beam splitter 14 onto the information recording layer of the optical disc OD and forms a light spot on the information recording layer. The returning light beam reflected by the optical disc OD passes through the objective lens 18, collimator lens 15, and beam splitter 14 in that order and is then incident on the hologram optical element 21. The hologram optical element 21, which is a diffractive optical element, transmits and diffracts the incident light, splitting it into a plurality of transmissively diffracted light beams, and directs these transmissively diffracted light beams toward the light-receiving sections 23, 24, 25, respectively, of the photodetector 22. As shown in FIG. 13, the light-receiving sections 23, 24, 25 of the photodetector 22 are aligned in an $X_1$-axis direction corresponding to the radial direction (X-axis direction). Each of the light-receiving sections 23, 24, 25 has a plurality of light-receiving surfaces; each light-receiving surface generates an electrical signal by performing photoelectric conversion of the transmissively diffracted light beam incident from the hologram optical element 21 and outputs the electrical signal to the matrix circuit 5. The X-axis direction, which is the radial direction of the optical disc OD, and the $X_1$-axis direction, which corresponds to the radial direction, are shown as substantially orthogonal to each other in FIG. 13. This is because of astigmatism induced by the beam splitter 14.

In FIG. 1, the matrix circuit 5 generates a variety of signals needed to record or reproduce information, such as a reproduced RF signal that represents the result of detection of recorded information on the optical disc OD, focus and tracking error signals, and other servo control signals, by performing a matrix calculation process on electrical signals supplied from the optical head device 3B. The reproduced RF signal is output to the signal reproduction circuit 6. The signal reproduction circuit 6 generates a modulated signal by performing a binarizing process on the reproduced RF signal, extracts a reproduction clock from this modulated signal, and generates a reproduced information signal by carrying out demodulation, error correction, and decoding processes on the modulated signal. The reproduced information signal is transferred by the controller 12 to a host device (not shown) such as an audio-video device or a personal computer.

The servo circuit 8 operates on the basis of commands from the controller 12, generates drive signals for focus and tracking adjustments on the basis of the focus and tracking error signals supplied from the matrix circuit 5, and supplies the drive signals to the actuator 17, shown in FIG. 13, of the optical head device 3B. The actuator 17 includes magnetic circuits 20A, 20B and a movable section 19 disposed between the magnetic circuits 20A and 20B, as schematically shown in FIG. 13. The movable section 19 includes a lens holder (not shown) for securing the objective lens 18 and a focus coil and tracking coil (both not shown) wound around the lens holder. The focus coil is wound around the central axis of the objective lens 18, and the tracking coil is wound around an axis orthogonal to the light axis LA and the X-axis direction of the optical disc OD. The objective lens 18 can be moved in the focusing direction by supplying drive current (a drive signal) to the focus coil, and can be moved in the X-axis direction by supplying drive current (a drive signal) to the tracking coil. As described above, the laser control circuit 7, optical head device 3B, matrix circuit 5, and servo circuit 8 form a focus servo loop and a tracking servo loop.

The aberration correction mechanism control circuit 9 controls the operation of the aberration correction mechanism 16A provided in the optical head device 3B shown in FIG. 13, in accordance with the quality of the reproduced information signal input to the controller 12. The collimator lens 15 is an optical component that corrects optical aberration such as spherical aberration; the aberration correction mechanism control circuit 9 can correct optical aberration appropriately and with high precision by moving the lens holder 16B holding the collimator lens 15 in a direction D1 along the light axis LA. The method of correcting spherical aberration is not limited to movement of the lens. For example, a method using a liquid crystal element and performing phase control of the liquid crystal element to cancel optical aberration of laser light may be used.

The aberration correction mechanism control circuit 9 controls the operation of the aberration correction mechanism 16A provided in the optical head device 3B shown in FIG. 13, in accordance with the quality of the reproduced information signal input to the controller 12. The collimator lens 15 is an optical component that corrects optical aberration such as spherical aberration; the aberration correction mechanism control circuit 9 can correct optical aberration appropriately and with high precision by moving the lens holder 16B holding the collimator lens 15 in a direction D1 along the light axis LA. The method of correcting spherical aberration is not limited to movement of the lens. For example, a method using a liquid crystal element and performing phase control of the liquid crystal element to cancel optical aberration of laser light may be used.

The aberration correction mechanism control circuit 9 controls the operation of the aberration correction mechanism 16A provided in the optical head device 3B shown in FIG. 13 in accordance with the quality of the reproduced information signal input to the controller 12. The collimator lens 15 is an optical component that corrects optical aberration such as spherical aberration; the aberration correction mechanism control circuit 9 can correct optical aberration appropriately and with high precision by moving the lens holder 16B holding the collimator lens 15 in a direction D1 along the light axis LA. The method of correcting spherical aberration is not limited to movement of the lens. For example, a method using a liquid crystal element and performing phase control of the liquid crystal element to cancel optical aberration of laser light may be used.

Figure 14:
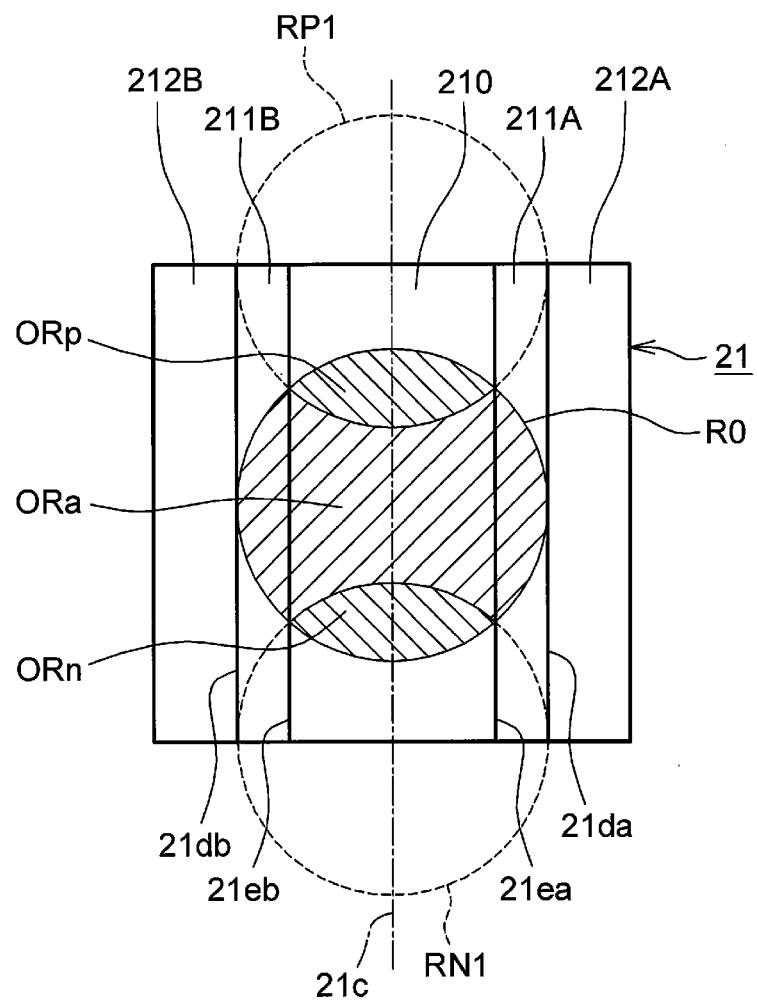
FIG. 14 is a plan view schematically illustrating the configuration of the light incidence surface of the hologram optical element in the fifth embodiment.

FIG. 14 is a plan view schematically illustrating the configuration of the light incidence surface of the hologram optical element 21. The hologram optical element 21 has three types of diffraction regions: a primary diffraction region 210, a pair of secondary diffraction regions 211A, 211B, and a pair of peripheral diffraction regions 212A, 212B. A separate diffractive pattern (e.g., the profile and spacing of the diffraction grooves) may be formed in each of these three types of diffraction regions. The secondary diffraction regions 211A, 211B are disposed outward of the inner primary diffraction region 210 in a $Y_2$-axis direction corresponding to the tangential direction (Y-axis direction) of the optical disc OD. The peripheral diffraction regions 212A, 212B are disposed outward of the secondary diffraction regions 211A, 211B in the $Y_2$-axis direction. The shapes of the secondary diffraction regions 211A, 211B are symmetric with respect to a centerline 21c running in an $X_2$-axis direction (corresponding to the radial direction), which is orthogonal to the $Y_2$-axis direction; the shapes of the peripheral diffraction regions 212A, 212B are also symmetric with respect to the centerline 21c. The primary diffraction region 210 and secondary diffraction region 211A are separated by a boundary line 21ea parallel to the $X_2$-axis direction, and the primary diffraction region 210 and secondary diffraction region 211B are separated by a boundary line 21eb parallel to the $X_2$-axis direction. Peripheral diffraction region 212A and secondary diffraction region 211A are separated by a boundary line 21da parallel to the $X_2$-axis direction, and peripheral diffraction region 212B and secondary diffraction region 211B are separated by a boundary line 21db parallel to the $X_2$-axis direction.

The returning light beam from the optical disc OD includes diffracted light beams (reflectively diffracted light beams) caused by the radial or X-axis-direction structure of the information recording layers (mainly by the structure of the information tracks) of the optical disc OD. The light incidence surface of the hologram optical element 21 is illuminated by light spots of the returning light. As shown in FIG. 14, the light spots include a light component ORp where a zero-order light component R0 represented by a solid circle overlaps a +1-order light component RP1 represented by a dotted circle, a light component ORn where the zero-order light component R0 represented by the solid circle overlaps a −1-order light component RN1 represented by another dotted circle, and a light component ORa where the zero-order light component R0 does not overlap the ±1-order light components RP1, RN1. The primary diffraction region 210 is formed in a position where part of the zero-order light component R0 (the central part of the light spot of the zero-order light component R0) and the ORp and ORn light components are incident. The secondary diffraction regions 211A, 211B are formed in positions where the remaining part of the zero-order light component R0 is incident and the ORp and ORn light components are not incident. The peripheral diffraction regions 212A, 212B are formed in positions where neither the zero-order light component R0 nor the ±1-order light components RP1, RN1 are incident.

The width of the primary diffraction region 210 in the $Y_2$-axis direction is designed to be less than the diameter of the light spot of the zero-order light component R0 in the $Y_2$-axis direction and equal to or greater than the width of light components ORp and ORn in the $Y_2$-axis direction, as shown in FIG. 14. In this embodiment, for efficient use of the returning light beam, boundary lines 21da, 21db are disposed in positions where they are substantially tangent to the outer diameter extremities of the zero-order light component R0 in the $Y_2$-axis direction. Boundary lines 21ea, 21eb are disposed in positions where they touch the extremities of light components ORp and ORn in the $Y_2$-axis direction, so that the light component ORa consisting of the part of the zero-order diffracted light R0 that does not overlap either the +1-order diffracted light RP1 or the −1-order diffracted light RN1 occupies as much area as possible in the secondary diffraction regions 211A, 211B. The primary diffraction region 210 therefore has a rectangular shape with a width substantially equal to the width of light components ORp and ORn in the $Y_2$-axis direction, and the secondary diffraction regions 211A, 211B have rectangular shapes with a width equal to the spacing between the outer diameter extremities of the zero-order light component R0 and the extremities of light components ORp and ORn in the $Y_2$-axis direction. Although for efficient use of the returning light beam the boundary lines 21ea, 21eb are preferably disposed in positions touching the extremities of light components ORp and ORn, this is not a limitation.

Figure 15:
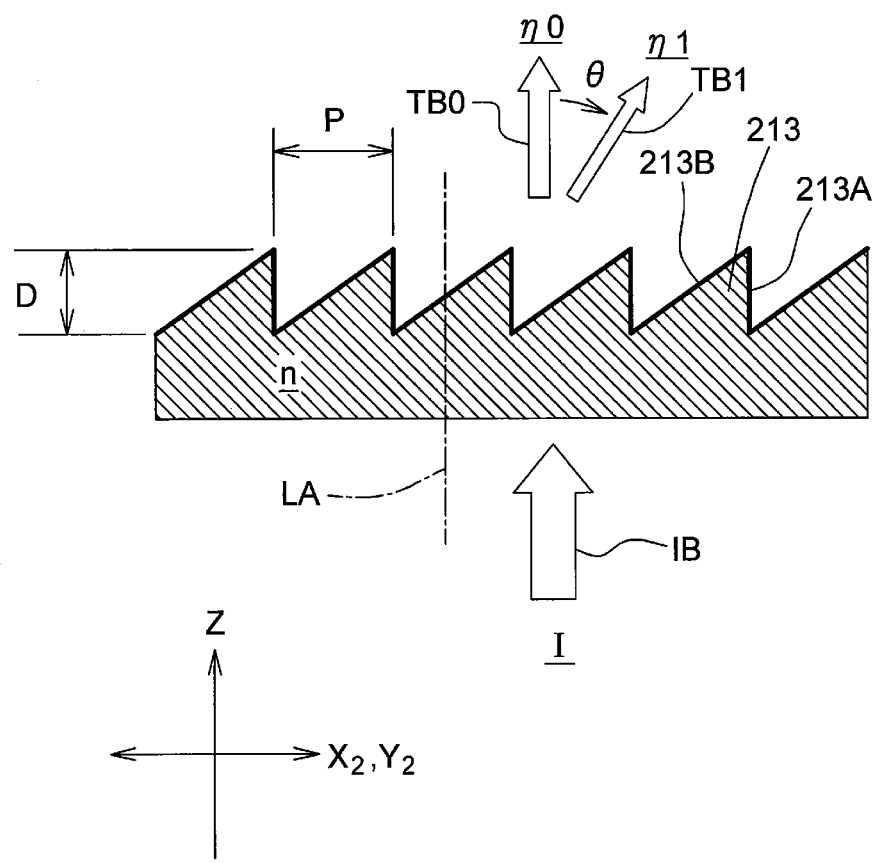
FIG. 15 is a sectional diagram illustrating the diffractive pattern of the diffraction region of the hologram optical element in the fifth embodiment.

FIG. 15 is a sectional diagram illustrating a specific diffractive pattern of the three types of diffraction regions, which are the primary diffraction region 210, the pair of secondary diffraction regions 211A, 211B, and the pair of peripheral diffraction regions 212A, 212B, of the hologram optical element 21. In FIG. 15, diffraction grating grooves 213 are formed repeatedly in the direction of the $X_2$ axis or $Y_2$ axis, perpendicular to the Z axis, which is parallel to the light axis LA. In more detail, the diffraction grating grooves of the primary diffraction region 210 are formed repeatedly in the $Y_2$-axis direction, and the diffraction grating grooves of the secondary diffraction regions 211A, 211B are formed repeatedly in the $X_2$-axis direction. The diffraction grating grooves of the peripheral diffraction regions 212A, 212B are formed repeatedly in the $X_2$-axis direction, the $Y_2$-axis direction, or an oblique direction. The diffraction grating grooves 213 have a structure known as a blazed structure, with a sawtooth sectional profile. That is, sawtooth diffraction grating grooves 213 are formed in which one grating wall 213A is parallel to the Z-axis and the other grating wall 213B is in an oblique plane canted with respect to the Z-axis.

In a hologram optical element 21 as shown in FIG. 15, let n be the refractive index of the material of the optical element, let P be the period of the diffraction grating grooves 213, and let D be the depth of the diffraction grating grooves 213. Let $\lambda$ be the wavelength of the semiconductor laser 13. From a light beam IB incident on the hologram optical element 21, the blazed structure generally generates a zero-order diffracted light beam TB0 that passes through the hologram optical element 21 directly and a first-order diffracted light beam TB1 angled in one oblique direction with respect to the zero-order diffracted light beam TB0. Here, the first-order diffracted light beam TB1 may be defined as the +1-order diffraction component. The conditions that determine the proportions of the diffraction efficiency $\eta_0$ of the zero-order diffracted light beam TB0 and the diffraction efficiency $\eta_1$ of the +1-order diffracted light beam TB1 with respect to the light intensity I of the incident light beam IB are the refractive index n and depth D of the hologram optical element 21 and the wavelength $\lambda$. The conditions that determine the diffraction angle $\theta$ at which the +1-order diffracted light beam TB1 is oblique to the zero-order diffracted light beam TB0 are the period P of the hologram optical element 21 and the wavelength $\lambda$. In the optical head device 3B, the wavelength $\lambda$ of the semiconductor laser 13 is usually fixed at a specific value, and the refractive index n is determined by the glass, plastic, or other optical material used in the hologram optical element 21, so the proportions of diffraction efficiencies $\eta_0$, $\eta_1$ and the diffraction angle $\theta$ can be adjusted to desired design values by using the period P and depth D of the diffraction grating grooves 213 as variables.

Figure 16A:
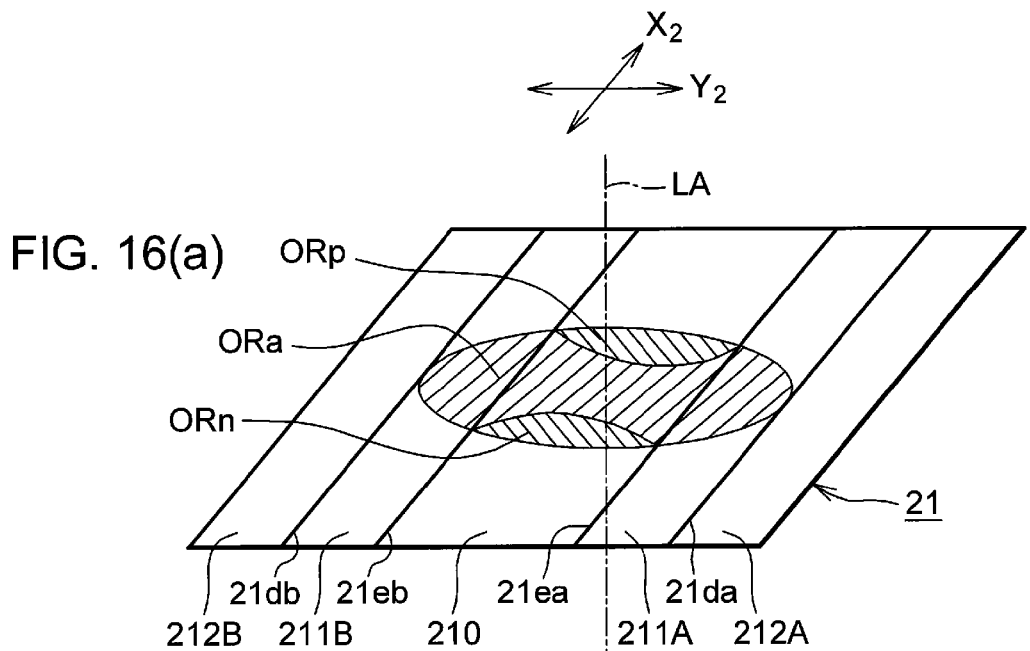
FIGS. 16(a) and 16(b) are perspective views of the hologram optical element and photodetector in the fifth embodiment.
Figure 16B:
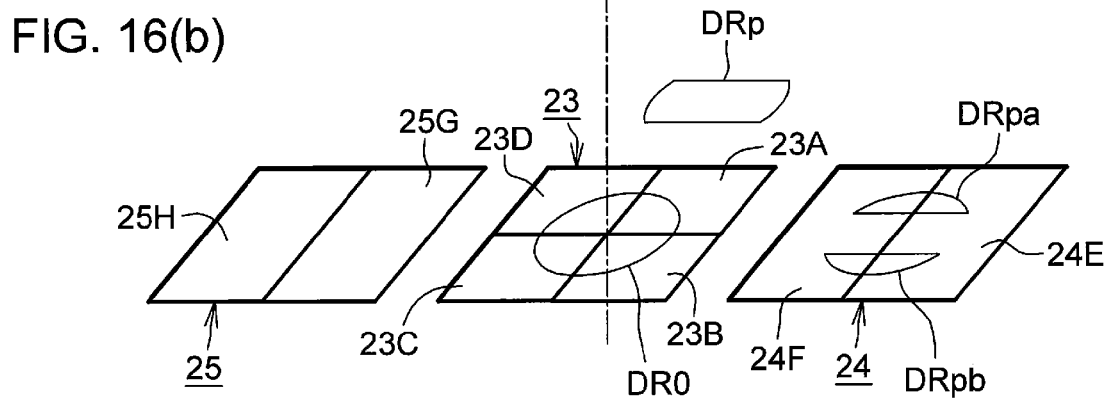

FIGS. 16(a) and 16(b) are perspective views of the hologram optical element 21 and photodetector 22 aligned on the light axis LA. The $X_2$-axis direction, which corresponds to the radial direction of the optical disc OD, and the $X_1$-axis direction are shown as substantially orthogonal to each other in FIGS. 16(a), 16(b). That is because of the function of the beam splitter 14 disposed between the hologram optical element 21 and photodetector 22 that induces astigmatism in the returning light beam.

The photodetector 22 as shown in FIG. 16(b) is the same as the one generally used for performing tracking error detection by the well-known differential push-pull method. The photodetector 22 includes a main light-receiving section 23 having light-receiving surfaces 23A to 23D orthogonal to the light axis LA, and a first secondary light-receiving section 24 and a second secondary light-receiving section 25 disposed on two sides of the main light-receiving section 23. The plurality of light-receiving surfaces 23A, 23B, 23C, 23D included in the main light-receiving section 23 are arranged in a matrix aligned with the $X_1$-axis and $Y_1$-axis directions. The pair of light-receiving surfaces 23A, 23B is adjacent to the pair of light-receiving surfaces 23C, 23D in the $X_1$-axis direction, light-receiving surfaces 23A, 23B being mutually aligned in the $Y_1$-axis direction and light-receiving surfaces 23C, 23D also being mutually aligned in the $Y_1$-axis direction. The first secondary light-receiving section 24 has a pair of light-receiving surfaces 24E, 24F aligned in $X_1$-axis direction, and the second secondary light-receiving section 25 has a pair of light-receiving surfaces 25G, 25H mutually aligned the $X_1$-axis direction.

The principal diffraction efficiencies of the primary diffraction region 210 with respect to the returning light beam are the zero-order and +1-order diffraction efficiencies; the principal diffraction efficiencies of the secondary diffraction regions 211A, 211B with respect to the returning light beam are the zero-order and +1-order diffraction efficiencies. The case of an optical disc OD having a single information recording layer will be described below. The zero-order light component DR0 of the light beam (referred to below as the transmissively diffracted light beam) exiting the primary diffraction region 210 and the secondary diffraction region 211A, 211B illuminates the light-receiving surfaces 23A to 23D of the main light-receiving section 23, forming a light spot. This light spot includes zero-order and ±1-order reflectively diffracted light beam components caused by the radial structure of the optical disc OD. The +1-order light component DRp of the transmissively diffracted light beam exiting the primary diffraction region 210 illuminates an area lying outside the main light-receiving section 23 in the $Y_1$-axis direction, as shown in FIG. 16(b). The photodetector 22 does not receive this +1-order light component DRp. The +1-order light components DRpa and DRpb of the transmissively diffracted light beams exiting the secondary diffraction region 211A and 211B illuminate the light-receiving surfaces 24E and 24F, respectively, of the first secondary light-receiving section 24. The light-receiving surfaces 25G, 25H of the second secondary light-receiving section 25 are not illuminated by any transmissively diffracted light beam.

The pattern of the eight light-receiving surfaces 23A to 23D, 24E, 24F, 25G, 25H is the same as the light-receiving surface pattern used in the well-known general differential push-pull method to generate a tracking error signal. The light-receiving surfaces 23A, 23B, 23C, 23D of the main light-receiving section 23 output respective detection signals $S_A$, $S_B$, $S_C$, $S_D$ by photoelectric conversion (photocurrent-voltage conversion) of the zero-order light component DR0, and the light-receiving surfaces 24E, 24F of the first secondary light-receiving section 24 output respective detection signals $S_E$, $S_F$ by photoelectric conversion of the +1-order light components DRpa, DRpb. The light-receiving surfaces 25G, 25H of the second secondary light-receiving section 25 are not illuminated by any transmissively diffracted light beams, so photoelectric conversion does not take place and they do not output detection signals. The matrix circuit 5 then generates a focus error signal FES having a signal level obtained from the equation (5) below in accordance with the astigmatic method.

$$FES = (S_A + S_C) - (S_B + S_D) \quad (5)$$

The matrix circuit 5 generates a reproduced RF signal having a signal level obtained from the following equation (6).

$$RF = S_A + S_B + S_C + S_D \quad (6)$$

The matrix circuit 5 also generates a tracking error signal TES having a signal level obtained from the following equation (7).

$$TES = MPP - k \times SPP \quad (7)$$

Here, k is a gain coefficient. MPP represents a main push-pull signal, and SPP represents a sub-push-pull signal. The main push-pull signal MPP and sub-push-pull signal SPP are given by the following equations (8a, 8b).

$$MPP = (S_A + S_B) - (S_C + S_D) \quad (8a)$$

$$SPP = S_E - S_F \quad (8b)$$

The main push-pull signal MPP and sub-push-pull signal SPP have the same phase in relation to objective lens shift, and an offset component attributable to objective lens shift is obtained as a signal component k×SPP. Therefore, a tracking error signal TES in which the offset component arising from the objective lens shift is cancelled out can be obtained by appropriate adjustment of the gain coefficient k and amplification of the sub-push-pull signal SPP with the adjusted gain. Note that the detection of the tracking error signal TES by the above calculation is similar to the well-known differential push-pull method but differs from the general differential push-pull method.

In the general differential push-pull method, a conventional optical head device is configured to let the light beam emitted from the semiconductor laser pass through a diffraction grating in the optical path preceding incidence on the objective lens as shown, for example, in patent document 1 or 2. Before becoming incident on the objective lens, the light beam emitted from the semiconductor laser is split into three light beams: one main light spot on the optical disc surface and a pair of sub light spots on two sides of the main light spot. When the three returning light beams reflected by the optical disc surface are incident on the photodetector 22 as shown in FIG. 13, the returning light beam from the main light spot illuminates the main light-receiving section 23, and the returning light beams from the pair of sub light spots illuminate the first secondary light-receiving section 24 and second secondary light-receiving section 25, respectively. In the general differential push-pull method, the sub-push-pull signal SPP is given by the following equation (8c).

$$SPP = (S_E - S_F) + (S_G - S_H) \quad (8c)$$

In contrast to the general push-pull method described above, since the optical head device in this embodiment does not have a diffraction grating in the optical path between the semiconductor laser and the objective lens, the light beam emitted from the semiconductor laser is incident on the objective lens directly without being split, and a single light spot is formed on the optical disc surface. When it passes through the hologram optical element 21, the returning light beam reflected by the optical disc surface is split into a plurality of transmissively diffracted light beams, which illuminate the main light-receiving section 23 and first secondary light-receiving section 24.

Since a single light spot is formed on the optical disc surface in this embodiment, the method employed will be referred to as the differential push-pull method of the present invention, to distinguish it from the general differential push-pull method. The general differential push-pull method will be referred to as the three-beam differential push-pull method.

FIGS. 17(*a*), 17(*b*), and 17(*c*) schematically illustrate the relation between objective lens shift (displacement of the objective lens 18 in the radial direction with respect to the photodetector 22) and the positions of the light spots on the photodetector 22. FIG. 17(*b*) shows the positions (reference positions) in which the light beams illuminate the light-receiving surfaces of the photodetector 22 when the central axis of the objective lens 18 is on the light axis LA. In this case, the light spot of the zero-order light component DR0 is positioned at the center of the main light-receiving section 23 in both the $X_1$-axis and $Y_1$-axis directions, and the +1-order light components DRpa, DRpb are positioned at the center of the first secondary light-receiving section 24 in the $X_1$-axis direction. FIG. 17(*a*) shows the positions of the light beams illuminating the light-receiving surfaces of the photodetector 22 when the objective lens 18 is displaced toward the inner perimeter of the optical disc OD. In this case, the light spot of the zero-order light component DR0 is displaced toward light-receiving surface 23C or 23D, and the +1-order light components DRpa, DRpb are displaced toward light-receiving surface 24F. FIG. 17(*c*) shows the positions of the light beams illuminating the light-receiving surfaces of the photodetector 22 when the objective lens 18 is displaced toward the outer perimeter of the optical disc OD. In this case, the light spot of the zero-order light component DR0 is displaced toward light-receiving surfaces 23A, 23B, and the +1-order light components DRpa, DRpb are displaced toward light-receiving surface 24E.

Figure 18A:
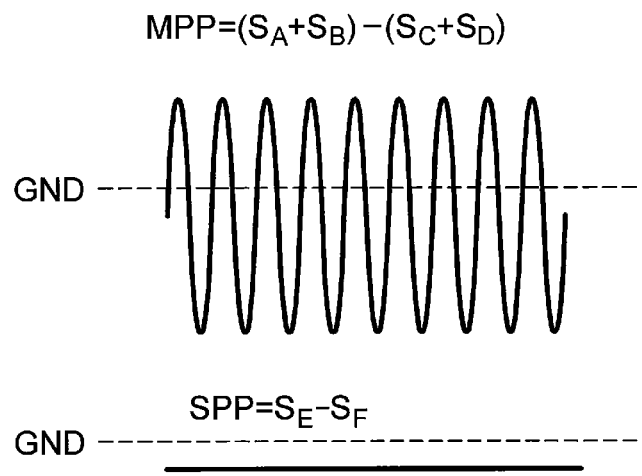
FIGS. 18(a), 18(b), and 18(c) schematically illustrate the relation between objective lens shift and the signal components of the tracking error signal in the fifth embodiment.
Figure 18B:
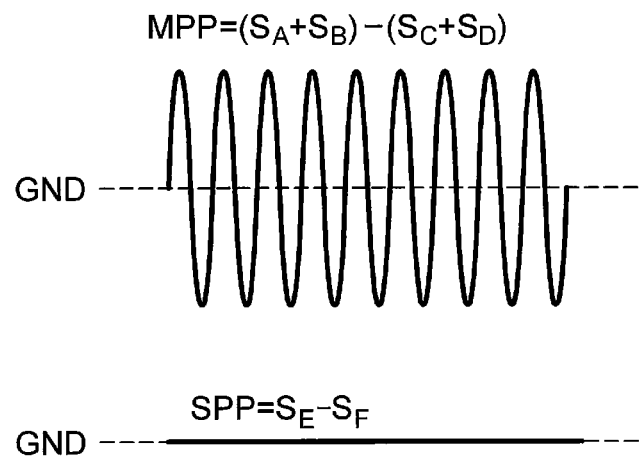
Figure 18C:
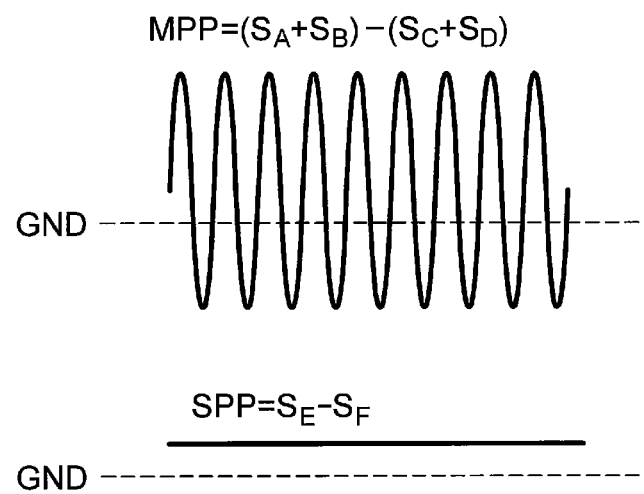

FIGS. 18(*a*), 18(*b*), and 18(*c*) schematically illustrate the relation between objective lens shift and the signal components MPP, SPP of the tracking error signal TES. FIGS. 18(*a*), 18(*b*), and 18(*c*) show the waveform of the main push-pull signal MPP and the sub-push-pull signal SPP detected when the optical head device 3B has moved in the radial direction at a constant speed. These main push-pull signals MPP and sub-push-pull signals SPP are obtained when focus control is performed but tracking control is not performed. FIGS. 18(*a*), 18(*b*), and 18(*c*) correspond respectively to FIGS. 17(*a*), 17(*b*), and 17(*c*). If the objective lens 18 is on the light axis LA and is not moving in the radial direction, the DC component (direct-current component) of the main push-pull signal MPP matches the GND level and the DC component of the sub-push-pull signal SPP also matches the GND level, as shown in FIG. 18(*b*). The sub-push-pull signal SPP has a direct-current waveform. The reason is that the +1-order light components DRpa, DRpb of the transmissively diffracted light beams contributing to the sub-push-pull signal SPP do not include light components ORp, ORn in FIG. 14 (the light components in which the zero-order light R0 and the ±1-order light RP1, RN1 of the reflectively diffracted light beam from the optical disc OD overlap). If the objective lens 18 is displaced toward the inner perimeter, the waveform of the DC component of the main push-pull signal MPP has a negative offset, and the direct-current waveform of the sub-push-pull signal SPP also has a negative offset, as shown in FIG. 18(*a*). If the objective lens 18 is displaced toward the outer perimeter, the waveform of the DC component of the main push-pull signal MPP has a positive offset, and the direct-current waveform of the sub-push-pull signal SPP also has a positive offset, as shown in FIG. 18(*c*). Therefore, the main push-pull signal MPP and sub-push-pull signal SPP have the same phase in relation to objective lens shift, and the offset of the sub-push-pull signal SPP has a value corresponding to the amount by which the objective lens 18 is displaced. Therefore, by deducting the value obtained by multiplying the value of the sub-push-pull signal SPP by k from the value of the main push-pull signal MPP, a tracking error signal TES in which the offset component arising from objective lens shift is cancelled out can be generated.

Figure 19A:
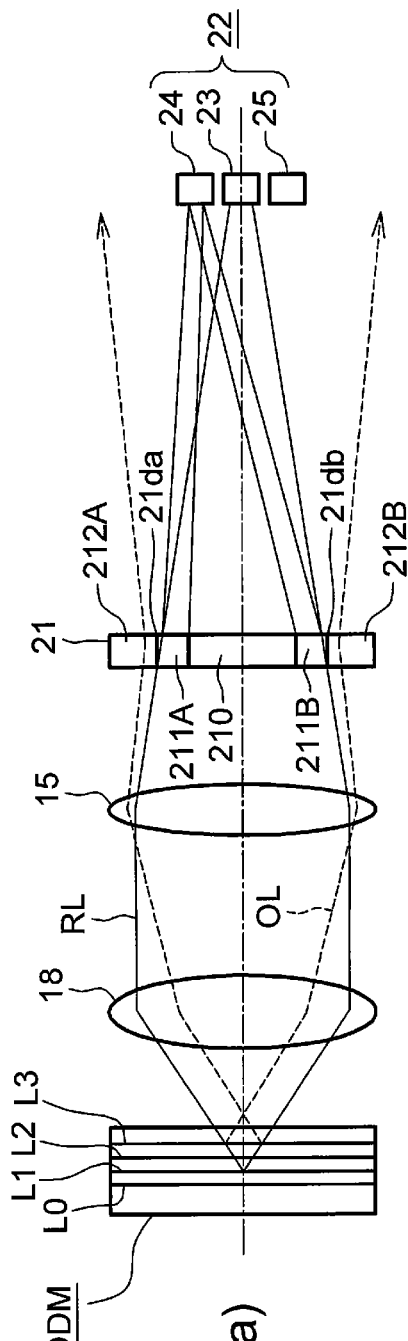
FIGS. 19(a) and 19(b) schematically illustrate part of the configuration of an optical head device including the hologram optical element in the fifth embodiment of the invention.
Figure 19B:
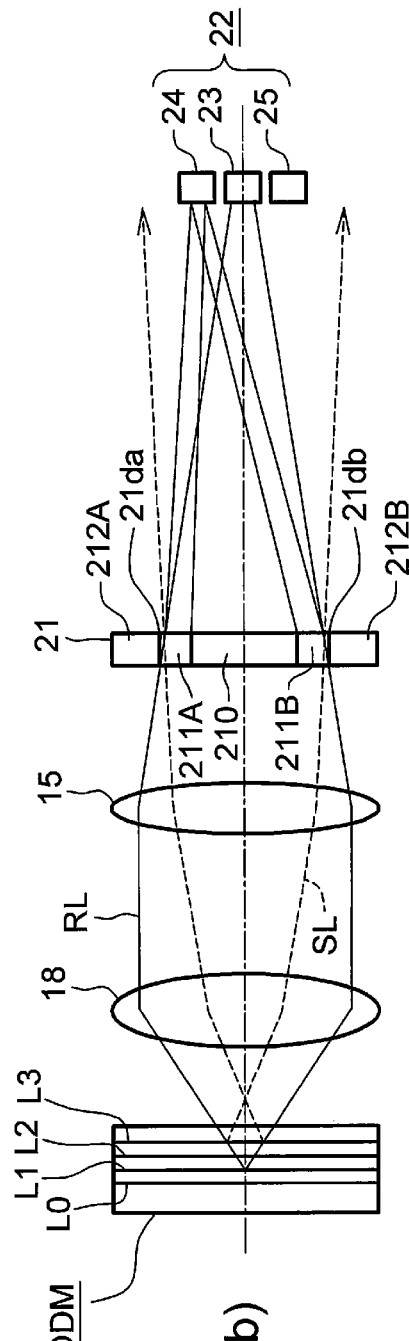

The explanation so far has dealt with an optical disc OD having a single information recording layer; the case of a multilayer optical disc having a plurality of information recording layers disposed one above another will now be described. FIGS. 19(a) and 19(b) are plan views schematically illustrating part of the configuration of the optical head device 3B including the hologram optical element 21. The optical disc ODM shown in FIG. 19 is a multilayer optical disc in which a plurality of information recording layers L0, L1, L2, L3 are disposed one above another.

FIG. 19(a) shows the paths of propagation of two returning light beams RL, OL reflected by the optical disc ODM. The returning light beam RL from the information recording layer L1 where information is recorded or reproduced is incident on the hologram optical element 21 after successive passage through the objective lens 18 and collimator lens 15. This returning light beam RL is transmissively diffracted by the primary diffraction region 210 and secondary diffraction regions 211A, 211B, and is incident on the main light-receiving section 23 and first secondary light-receiving section 24, as described with reference to FIGS. 16(a) and 16(b). With the multilayer optical disc ODM, spherical aberration occurs separately for information recording layers L0 to L3. The aberration correction mechanism 16A provided in the optical head device 3B can correct the spherical aberration of each information recording layer appropriately by displacing the collimator lens 15 along the light axis LA.

Returning light beam OL is a stray light component consisting of stray light reflected by information recording layers (such as information recording layer L3) other than the information recording layer L1 where information is recorded or reproduced, and is incident on the pair of peripheral diffraction regions 212A, 212B, which are disposed outward of the boundary lines 21da, 21db of the hologram optical element 21, after successive passage through the objective lens 18 and collimator lens 15. The diffraction efficiency and diffraction direction characteristics of the peripheral diffraction regions 212A, 212B are optimized so that the incident light is diffracted in a direction other than a direction toward the photodetector 22.

FIG. 19(b) shows the paths of propagation of two returning light beams RL, SL reflected by the optical disc ODM. Returning light beam RL is as described with reference to FIG. 19(a). Returning light beam SL is a stray light component consisting of stray light reflected by information recording layers (such as information recording layer L3) other than the information recording layer L1 where information is recorded or reproduced, and is incident inward of the boundary lines 21da, 21db of the hologram optical element 21, after successive passage through the objective lens 18 and collimator lens 15. This stray light component is split by the hologram optical element 21 into a zero-order diffracted stray light beam SL0 and a +1-order diffracted stray light beam (not shown). The zero-order diffracted stray light beam SL0 diffusely illuminates the photodetector 22. The +1-order diffracted stray light beam also illuminates the photodetector 22, but its light intensity is much weaker than the intensity of the zero-order diffracted stray light beam SL0, so it will be omitted from the following description.

Figure 20:
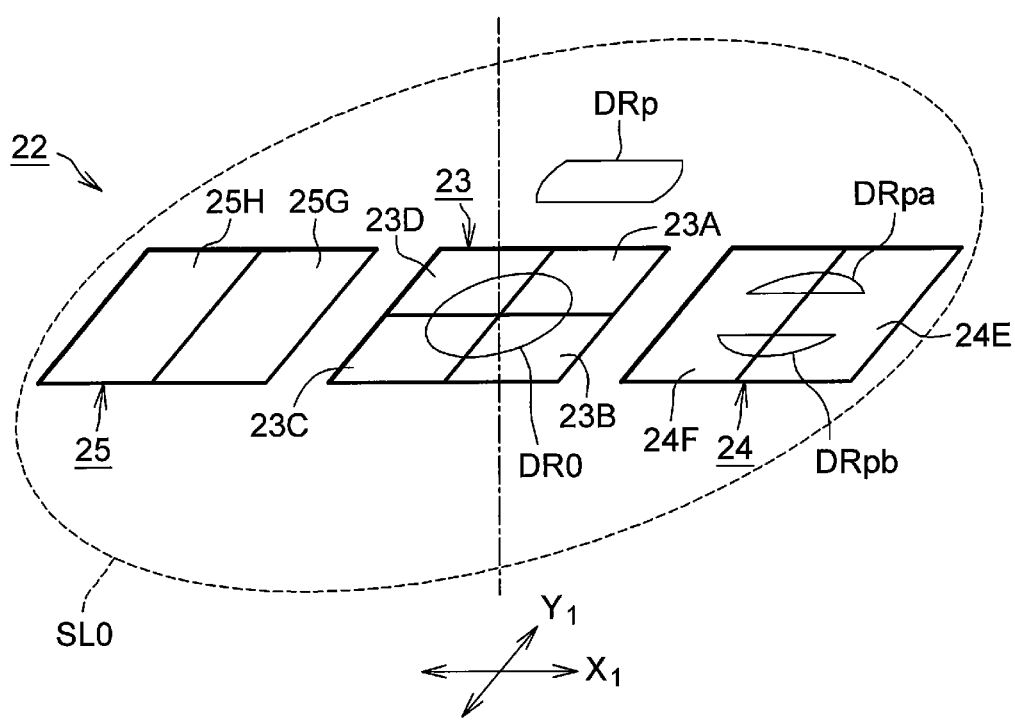
FIG. 20 is a perspective view of the photodetector in the fifth embodiment.

Like FIG. 16(b), FIG. 20 is a perspective view of the photodetector 22 in this embodiment; FIG. 20 shows the zero-order diffracted stray light beam SL0 described with reference to FIG. 19(b). The zero-order diffracted stray light beam SL0 diffusely illuminates the three light-receiving sections 23, 24, 25 of the photodetector 22, but the degree of diffusion depends on the optical design specifications of the optical head device 3B, the areas of the light-receiving sections 23, 24, and 25, and the spacing between information recording layers in the multilayer optical disc.

The photodetector 22 in the description given so far is a photodetector having a light-receiving surface pattern adapted for the general three-beam differential push-pull method, but the differential push-pull method of the present invention does not require the second secondary light-receiving section 25, because the light-receiving surfaces 25G, 25H of the second secondary light-receiving section 25 are not illuminated by any transmissively diffracted light beam. Therefore, the configuration of the optical head device 3B can be simplified by configuring the photodetector from the main light-receiving section 23 and first secondary light-receiving section 24 alone.

The sub-push-pull signal SPP detected by the light-receiving surface pattern corresponding to the general three-beam differential push-pull method is given by the above equation (8c). Because the light-receiving surfaces 25G, 25H of the second secondary light-receiving section 25 are not illuminated by any transmissively diffracted light beam, in principle the same signal should be obtained by use of either equation (8b) or equation (8c), but as made clear in the description of FIG. 20, in recording or reproduction using a multilayer optical disc, light reflected by information recording layers other than the intended information recording layer illuminates the photodetector 22 as a zero-order diffracted stray light beam SL0, so the light-receiving surfaces 25G, 25H generate a noise signal obtained by performing photoelectric conversion of the zero-order diffracted stray light beam SL0. Therefore, if the light-receiving surface pattern adapted for the general three-beam differential push-pull method is used, detection by equation (8b), without using the detection signals from the light-receiving surfaces 25G, 25H in the computation, is preferable from the viewpoint of the quality of the detected signal, although this is not a limitation.

The first secondary light-receiving section 24 has been shown as having two light-receiving surfaces, but it may have four light-receiving surfaces as does the main light-receiving section 23, or may have another light-receiving surface pattern, provided it has a pair of light receiving patterns aligned in the $X_1$-axis direction.

In recording on or reproduction from a multilayer optical disc, light reflected from information recording layers other than the intended information recording layer and light reflected from the intended information recording layer interfere with each other on the surface of the photodetector 22, adversely affecting the tracking error signal TES. The degree of interference increases as the intensities of the two interfering light beams become more equal. In this embodiment, since light reflected from information recording layers other than the intended information recording layer illuminates the photodetector 22 diffusely, the light intensity detected by the light-receiving sections is low. The light intensity of light reflected from the intended information recording layer detected by first secondary light-receiving section 24 is generally smaller than the intensity detected by the main light-receiving section 23. Therefore, the effects of interference on the sub-push-pull signal SPP detected by first secondary light-receiving section 24 need to be mitigated. For that purpose, the intensity of the sub-push-pull signal SPP should be increased, and the ±1-order diffraction efficiency of the secondary diffraction regions 211A, 211B should be set to a large value.

Although the sub-push-pull signal SPP in the general three-beam differential push-pull method is generated by making split light beams of the same optical intensity incident on two secondary light-receiving sections 24, 25, the sub-push-pull signal SPP in the differential push-pull method of the present invention is generated by use of a hologram optical element 21 having a blazed structure to make a diffracted light beam incident on a single secondary light-receiving section 24, so the light intensity of the light beam incident on the single secondary light-receiving section 24 can be doubled. The proportion of the light intensity of the stray light component from information recording layers other than the information recording layer can therefore be increased, and the effects of interference with the zero-order diffracted stray light beam SL0 in the sub-push-pull signal SPP can be greatly diminished.

Next the relation between the signal length of information recorded in the information recording layer of the optical disc OD and the reproduced information signal will be described. In general, in an optical disc OD on which information has been recorded, recorded mark regions and space regions are formed along an information track. The specifications of the optical disc OD define signal lengths nT (where n is a positive integer and T is a unit time such as a reproduction clock cycle) corresponding to the lengths of the recorded marks or spaces. For example, the Blu-ray Disc standard defines seven signal lengths 2T, 3T, 4T, 5T, 6T, 7T, and 8T. Since the light beam illuminating the information recording layer of the optical disc OD is diffracted when it is reflected by the recorded marks and spaces formed in the tangential direction (Y-axis direction), the returning light beam from the optical disc OD may include diffracted light caused by the tangential structure of the information recording layer.

Figures 21A, 21B:
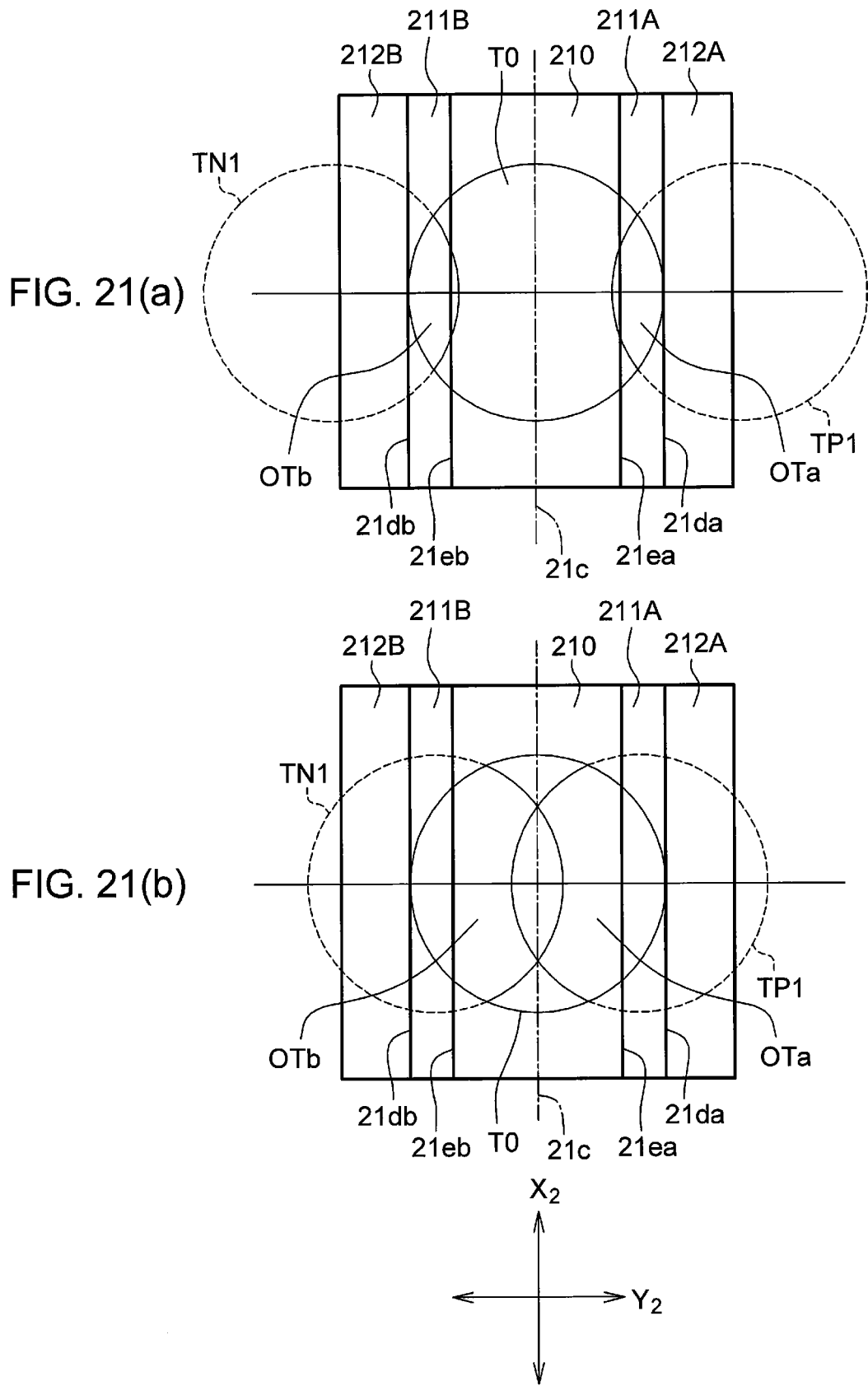
FIGS. 21(a) and 21(b) are plan views schematically illustrating the illumination of the hologram optical element by diffracted light as a function of signal length on the optical disc in the fifth embodiment.

FIGS. 21(a) and 21(b) are plan views schematically illustrating the illumination of the hologram optical element 21 by diffracted light attributable to the signal length on the optical disc OD. FIG. 21(a) shows the light spots of diffracted light corresponding to the 2T signal length defined by the Blu-ray Disc standard, and FIG. 21(b) shows the light spots of diffracted light corresponding to a relatively long signal length (such as a 6T signal length) recorded on the optical disc OD. As shown in FIGS. 21(a) and 21(b), these light spots illuminate the primary diffraction region 210 and the secondary diffraction regions 211A, 211B and include a zero-order light component T0 represented by a solid circle, part of the +1-order light component TP1 that overlaps the zero-order light component T0 in the $Y_2$-axis direction, and part the of −1-order light component TN1 that overlaps the zero-order light component T0 in the $Y_2$-axis direction. The illuminated areas of the light components OTa, OTb where the zero-order light component T0 overlaps the ±1-order light components TP1, TN1 depend on the signal length. If the signal length is short (a 2T signal length), the illuminated areas of the light components OTa, OTb are small, as shown in FIG. 21(a), and light components OTa and OTb fit substantially within the secondary diffraction regions 211A, 211B. If the signal length is relatively long (such as a 6T signal length), the illuminated areas of the light components OTa and OTb where the zero-order light component TO overlaps the ±1-order light components TP1, TN1 are large, light component OTa illuminates both the primary diffraction region 210 and the secondary diffraction region 211A, and light component OTb illuminates both the primary diffraction region 210 and the secondary diffraction region 211B, as shown in FIG. 21(b). If no information is recorded on the optical disc OD, the ±1-order light components TP1, TN1 are not generated, and the zero-order light component T0 matches the zero-order light component R0 shown in FIG. 14.

The reproduced RF signal ($=S_A+S_B+S_C+S_D$) given by equation (6) has a value corresponding to the intensity of the diffracted light illuminating the main light-receiving section 23. The size of the amplitude of the reproduced RF signal depends on the illuminated areas of light components OTa and OTb, which correspond to the signal length. Therefore, the intensity of the reproduced RF signal mainly depends on the zero-order diffraction efficiency of the primary diffraction region 210 and the zero-order diffraction efficiency of the secondary diffraction regions 211A, 211B in the hologram optical element 21. To increase the intensity of the reproduced RF signal, it suffices to form the primary diffraction region 210 and secondary diffraction regions 211A, 211B so that the zero-order diffraction efficiency of the primary diffraction region 210 and the zero-order diffraction efficiency of the secondary diffraction regions 211A, 211B of the hologram optical element 21 all have high values. If the signal length is short, the zero-order diffraction efficiency of the secondary diffraction regions 211A, 211B has a dominant effect; if the signal length is long, the intensity is affected by the zero-order diffraction efficiency of the primary diffraction region 210 as well as the zero-order diffraction efficiency of the secondary diffraction regions 211A, 211B. The reproduced RF signal corresponding to a short signal length generally has a low intensity, so detection errors are likely to occur in signal detection. To avoid detection errors, it is desirable to increase the intensity of the reproduced RF signals corresponding to short signal lengths by raising the zero-order diffraction efficiency of the secondary diffraction regions 211A, 211B to a level higher than the zero-order diffraction efficiency of the primary diffraction region 210 (hereinafter, requirement C). Let the zero-order diffraction efficiency of the primary diffraction region 210 be $\eta_x$ and the zero-order diffraction efficiency of the secondary diffraction regions 211A, 211B be $\eta_y$; then the range of $\eta_x$ and $\eta_y$ that satisfies requirement C is the range in which the following inequality holds.

$$\eta_x \leq \eta_y \tag{9}$$

Figure 22A:
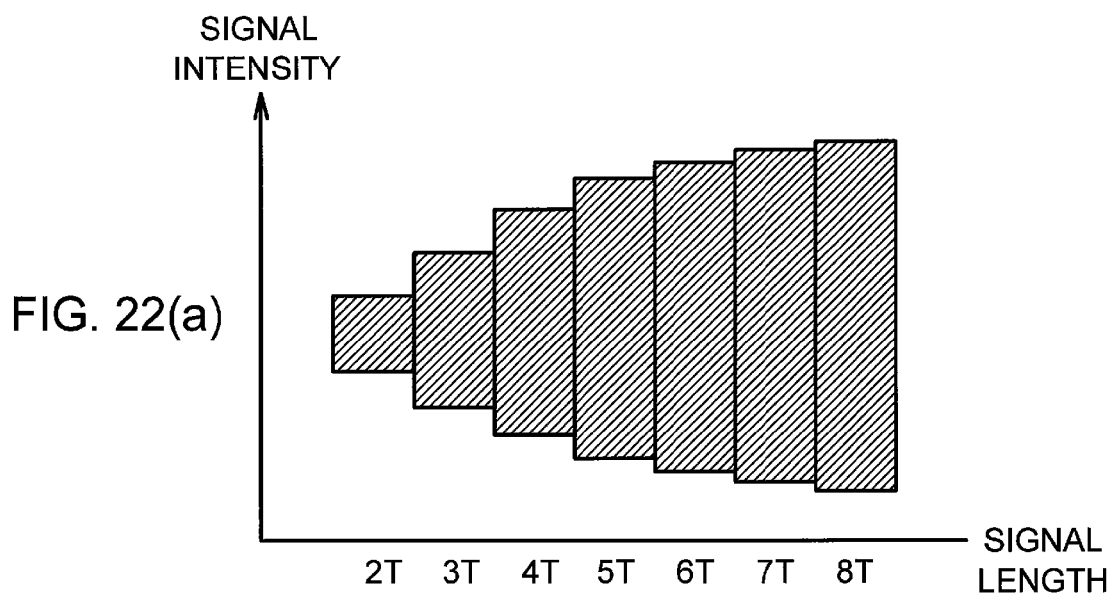
FIGS. 22(a) and 22(b) are plan views schematically illustrating exemplary intensity characteristics of the reproduced RF signal in relation to signal length in the fifth embodiment.
Figure 22B:
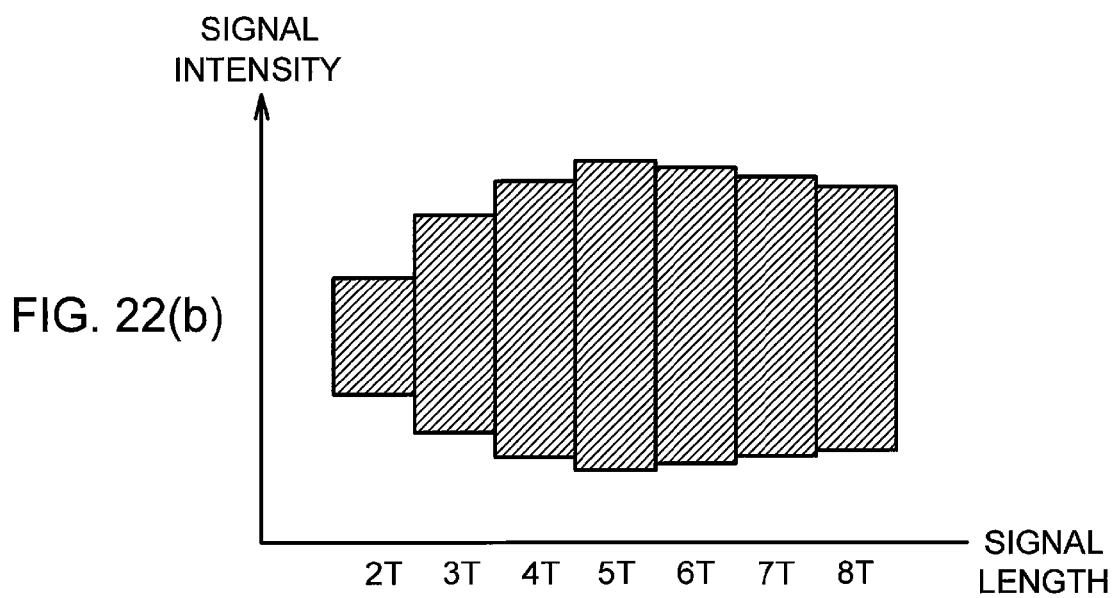

FIGS. 22(a) and 22(b) schematically illustrate exemplary intensity characteristics of the reproduced RF signal in relation to signal length. In FIGS. 22(a) and 22(b), the horizontal axis indicates signal length, and the vertical axis indicates the signal intensity of the reproduced RF signal. The graphs in FIGS. 22(a) and 22(b) were obtained by numerical simulation based on the Blu-ray Disc standard. FIG. 22(a) shows signal characteristics obtained when the zero-order diffraction efficiency $\eta_x$ of the primary diffraction region 210 equals the zero-order diffraction efficiency $\eta_y$ of the secondary diffraction regions 211A, 211B, or when the hologram optical element 21 is not used. As shown in FIG. 22(a), as the signal length increases, the signal intensity increases. FIG. 22(b) schematically illustrates the intensity characteristics when the zero-order diffraction efficiency $\eta_y$ of the secondary diffraction regions 211A, 211B is greater than the zero-order diffraction efficiency $\eta_x$ of the primary diffraction region 210 ($\eta_x < \eta_y$). The graph in FIG. 22(b) is preferable in that the signal intensity corresponding to the short signal length of 2T is strengthened, but although the signal intensity increases monotonically in the signal length range up to 5T, the signal intensity decreases monotonically in the signal length range above 5T, and the signal intensity at 6T is lower than the signal intensity at 5T. A change from monotonic increase to monotonic decrease in signal intensity (a reversal of signal intensity) thus occurs as the signal length increases. The signal reproduction circuit 6 generates a binary signal having a pulse width corresponding to the signal length by binarizing the reproduced RF signal supplied from the matrix circuit 5. If a reversal of signal intensity occurs, a pulse width corresponding to the signal length may not be obtained. Therefore, it is preferable that a reversal of signal intensity does not occur (hereinafter, requirement D).

To increase the signal intensity of the sub-push-pull signal SPP ($=S_E-S_F$) in the tracking error signal, as described above, the ±1-order diffraction efficiency of the secondary diffraction regions 211A, 211B should be high, but if the ±1-order diffraction efficiency is too high, the zero-order diffraction efficiency $\eta_3$, of the secondary diffraction regions 211A, 211B becomes low, lowering the amount of light detected by the main light-receiving section 23. This would make it impossible to satisfy the requirement D for strengthening the signal intensity of the reproduced RF signal corresponding to short signal lengths. From numerical simulation, the range of zero-order diffraction efficiencies $\eta_x$, $\eta_y$ for satisfying requirement D is preferably the range in which the following inequality holds.

$$\eta_y \leq 2 \times \eta_x \tag{10}$$

Figure 23A:
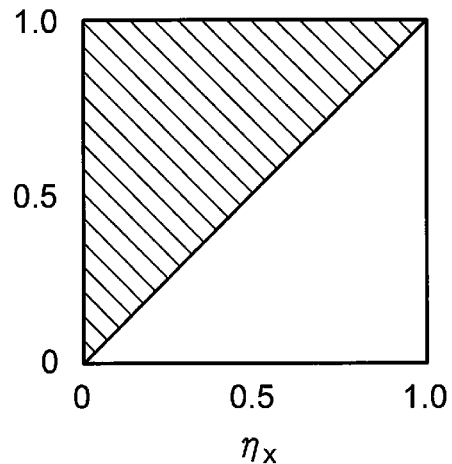
FIGS. 23(a), 23(b), and 23(c) are distribution diagrams illustrating desirable ranges of the zero-order diffraction efficiencies in the secondary diffraction regions and primary diffraction region in the fifth embodiment.
Figure 23B:
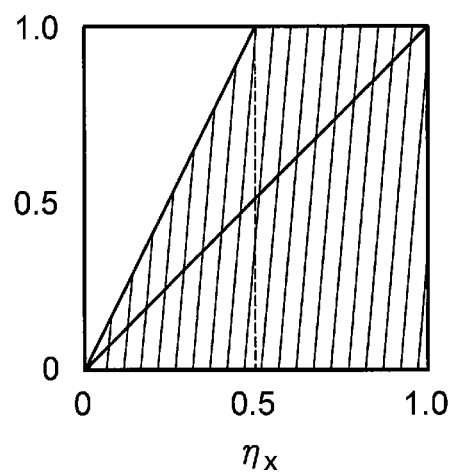
Figure 23C:
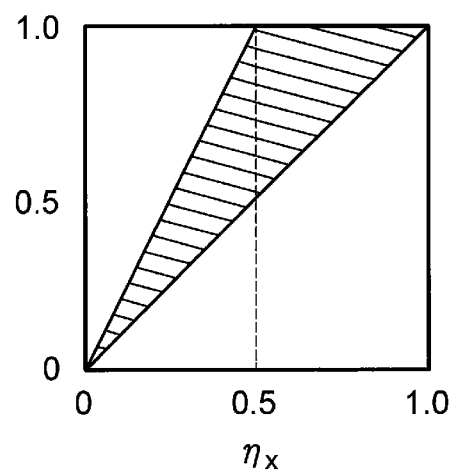

FIGS. 23(a), 23(b), and 23(c) are distribution diagrams illustrating desirable ranges of the zero-order diffraction efficiencies $\eta_x$, $\eta_y$ from the perspective of the signal intensity characteristics of the reproduced RF signal when the zero-order diffraction efficiency $\eta_y$ of the secondary diffraction regions 211A, 211B and the zero-order diffraction efficiency $\eta_x$ of the primary diffraction region 210 are taken as variables. In the graphs shown in FIGS. 23(a), 23(b), and 23(c), the horizontal axis indicates the zero-order diffraction efficiency $\eta_x$ of the primary diffraction region 210, and the vertical axis indicates the zero-order diffraction efficiency $\eta_y$ of the secondary diffraction regions 211A, 211B. The value of "0" on the horizontal and vertical axes is defined to indicate the absence of the zero-order light component of the transmissively diffracted light, and the value of "1" is defined to indicate the absence of all light components of orders other than the zero order of the transmissively diffracted light. FIG. 23(a) is a distribution diagram in which the hatched part indicates the range of zero-order diffraction efficiencies $\eta_x$ and $\eta_y$ satisfying requirement C ($\eta_x \leq \eta_y$), and FIG. 23(b) is a distribution diagram in which the hatched part indicates the range of zero-order diffraction efficiencies $\eta_x$ and $\eta_y$ satisfying requirement D ($\eta_y \leq 2 \times \eta_x$). From the perspective of the signal intensity characteristics of the information RF signal, the desirable range is the range of zero-order diffraction efficiencies $\eta_x$ and $\eta_y$ satisfying both requirement C and requirement D ($\eta_x \leq \eta_y$ and $\eta_x 2 \times \eta_x$). The hatched part in FIG. 23(c) indicates the range of zero-order diffraction efficiencies $\eta_x$ and $\eta_y$ satisfying both requirements C and D.

As described above, the hologram optical element 21 in this embodiment has a primary diffraction region 210 in which part of the zero-order light component ORa and the ±1-order light components ORp, ORn of the reflectively diffracted light beam are incident, and secondary diffraction regions 211A, 211B in which the remaining part of the zero-order light component ORa is incident and the ±1-order light components ORp, ORn of the reflectively diffracted light beam are not incident. The photodetector 22 includes a main light-receiving section 23 for receiving the zero-order light component DR0 of the transmissively diffracted light beam that has passed through the primary diffraction region 210 and the secondary diffraction regions 211A, 211B, and a secondary light-receiving section 24 for receiving the +1-order light components DRpa, DRpb of the transmissively diffracted light beam that has passed through the secondary diffraction regions 211A, 211B. Therefore, by using a photodetector 22 having a simple light-receiving surface pattern, a tracking error signal TES in which the offset component attributable to objective lens shift has been cancelled out can be generated.

The hologram optical element 21 has a blazed structure as shown in FIG. 15 and generates first-order diffracted light in only a single direction. Since the proportion of the light intensity of the +1-order light components DRpa, DRpb of the transmissively diffracted light beams that have passed through the secondary diffraction regions 211A and 211B, respectively, in stray light from information recording layers other than the information recording layer where information is recorded or reproduced in the multilayer optical disc can thereby be increased, the effect of interference on the sub-push-pull signal SPP can be greatly reduced, and the quality of the tracking error signal TES can be improved.

The hologram optical element 21 is structured to prevent light beams transmissively diffracted by the peripheral diffraction regions 212A, 212B from being incident on the photodetector 22 when a multilayer optical disc is used and stray light from information recording layers other than the information recording layer where information is recorded or reproduced is incident on the peripheral diffraction regions 212A, 212B, as shown in FIGS. 19(a) and 19(b). Since signals due to unnecessary stray light components are not detected, the quality of the tracking error signal TES can be improved.

The signal intensity of the reproduced RF signal corresponding to short signal lengths can be increased by setting the zero-order diffraction efficiency $\eta_y$ of the secondary diffraction regions 211A, 211B to a value greater than or equal to the zero-order diffraction efficiency $\eta_x$ of the primary diffraction region 210. Consequently, signal detection performance can be improved by using the optical head device 3B of this embodiment. Moreover, by setting the zero-order diffraction efficiency $\eta_y$ of the secondary diffraction regions 211A, 211B to a value not greater than twice the zero-order diffraction efficiency $\eta_x$ of the primary diffraction region 210, a reversal in the relation between signal length and signal intensity can be avoided, and signal detection performance can be further improved.

As described above, according to the optical head device of this embodiment, a signal component corresponding to the offset attributable to objective lens shift can be generated from signals detected by the secondary light-receiving section, and by use of this signal component, a tracking error signal in which the offset component has been cancelled out can be generated. As a result, stray light from information recording layers other than the desired information recording layer can be reduced without degrading the quality of the reproduced signal or decreasing the intensity of the light illuminating the optical disc, and a differential push-pull method that does not generate offset arising from objective lens shift for multilayer optical discs can be used. This signal component can be detected by using a photodetector having a simple light-receiving surface pattern.

Sixth Embodiment

Figure 24:
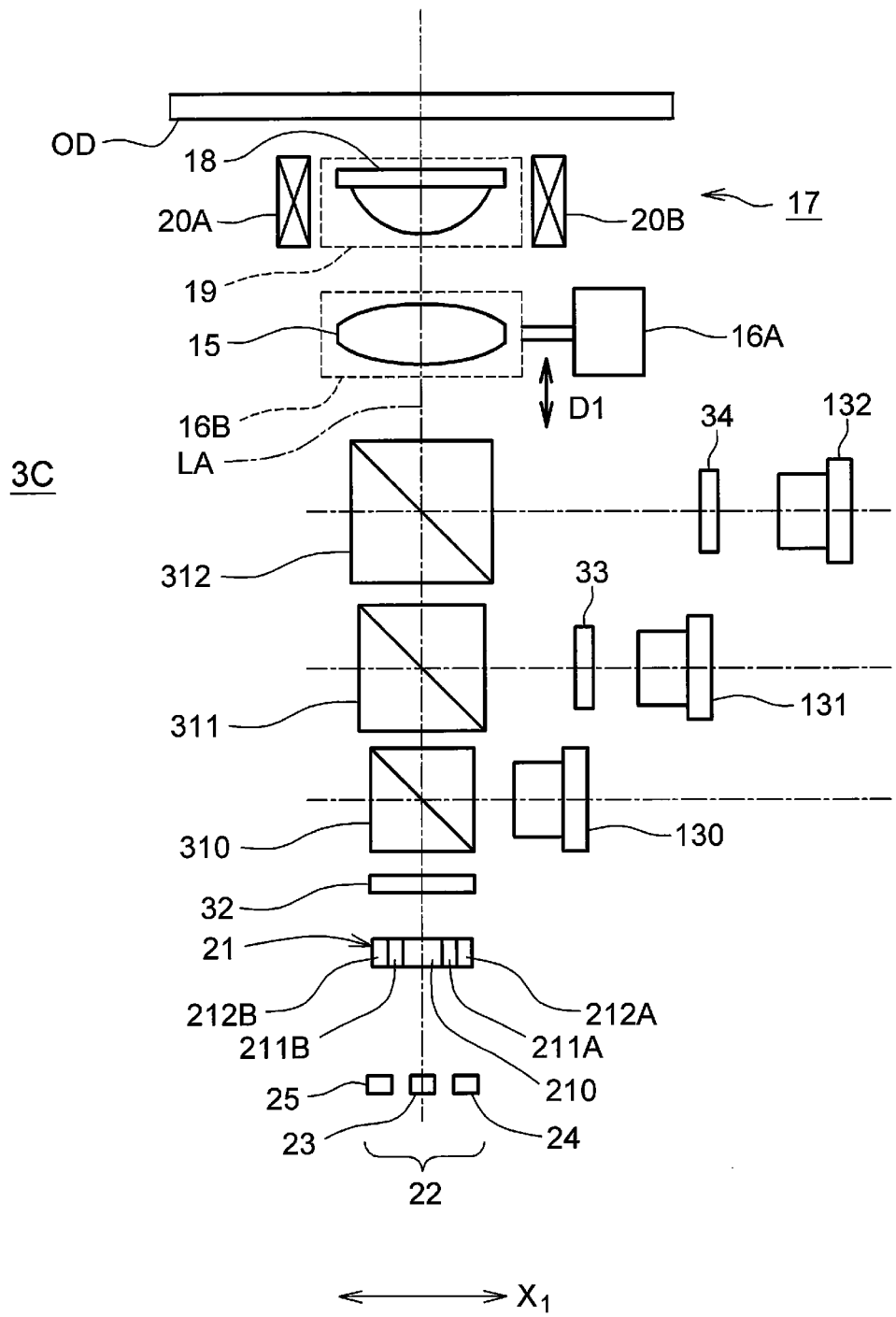
FIG. 24 is a perspective view showing the main elements in the configuration of the optical head device in a sixth embodiment of the invention.

A sixth embodiment according to the present invention will now be described. The configuration of the optical head device according to this embodiment is substantially the same as the configuration of the optical head device 3B in the fifth embodiment, except that a plurality of semiconductor laser light sources are used. FIG. 24 is a plan view schematically showing the main elements in the configuration of the optical head device 3C in the sixth embodiment of the invention. FIG. 24 shows an optical head device 3C that supports, for example, three currently used standards: BD (Blu-ray Disc), DVD (Digital Versatile Disc), and CD (Compact Disc). A two-layer optical disc has been standardized as a multilayer DVD. As a CD, only a single-layer optical disc has been standardized. For BDs, there are proposed standards for multilayer optical discs having up to four layers. Therefore, an optical head device 3C supporting these three standards must be designed to prevent stray light reflected by another information recording layer from being detected by the photodetector and degrading the quality of the differential push-pull signal of the present invention when applied to a multilayer BD optical disc.

As shown in FIG. 24, the optical head device 3C includes three semiconductor lasers 130, 131, 132. The first semiconductor laser 130 and the collimator lens 15, objective lens 18, actuator 17, hologram optical element 21, and photodetector 22 are substantially the same as the semiconductor laser 13, collimator lens 15, objective lens 18, actuator 17, hologram optical element 21, and photodetector 22 shown in FIG. 13. The first beam splitter 310 is shown as prism beam splitter, but it may be a plate beam splitter like the beam splitter 14 shown in FIG. 13. A cylindrical lens 32 is provided to induce astigmatism in the returning light beam reflected by the optical disc OD; this function is the same function as the function that induces astigmatism in the beam splitter 14 shown in FIG. 13. Laser light emitted from the first semiconductor laser 130 is reflected by the first beam splitter 310, which is aligned on the light axis LA, and is incident on the objective lens 18 through the second beam splitter 311 and third beam splitter 312, which will be described later, and the collimator lens 15. The returning light beam reflected by the optical disc OD is incident on the hologram optical element 21 after successive passage through the objective lens 18, collimator lens 15, third beam splitter 312, second beam splitter 311, first beam splitter 310, and cylindrical lens 32, and is split into a plurality of transmissively diffracted light beams, which are incident on the light-receiving sections 23, 24, 25 of the photodetector 22.

Laser light emitted from the second semiconductor laser 131 passes through a diffraction grating 33, is reflected by the second beam splitter 311, which is disposed between the first beam splitter 310 and the collimator lens 15, and is incident on the objective lens 18 through the third beam splitter 312 and collimator lens 15. The returning light beam reflected by the optical disc OD is incident on the light-receiving sections 23, 24, 25 of the photodetector 22 after successive passage through the objective lens 18, collimator lens 15, third beam splitter 312, second beam splitter 311, first beam splitter 310, cylindrical lens 32, and hologram optical element 21.

Laser light emitted from the third semiconductor laser 132 passes through a diffraction grating 34, is reflected by the third beam splitter 312, which is disposed between the first beam splitter 310 and the collimator lens 15, and is incident on the objective lens 18 through the collimator lens 15. The returning light beam reflected by the optical disc OD is incident on the light-receiving sections 23, 24, of the photodetector 22 after successive passage through the objective lens 18, collimator lens 15, third beam splitter 312, second beam splitter 311, first beam splitter 310, cylindrical lens 32, and hologram optical element 21.

In the optical head device 3C shown in FIG. 24, the first semiconductor laser 130 is adapted to the BD standard and has a lasing wavelength in the vicinity of 408 nm. The second semiconductor laser 131 is adapted to the DVD standard and has a lasing wavelength in the vicinity of 655 nm. The third semiconductor laser 132 is adapted to the CD standard and has a lasing wavelength in the vicinity of 785 nm. The objective lens 18 operates at these three wavelengths, having a numerical aperture in the vicinity of 0.85 when a BD optical disc is mounted, a numerical aperture in the vicinity of 0.6 to 0.65 when a DVD optical disc is mounted, and a numerical aperture in the vicinity of 0.5 when a CD optical disc is mounted. The collimator lens 15, cylindrical lens 32, and photodetector 22 maintain their respective functions at these three wavelengths. As the optical disc OD, optical discs compatible with the BD, DVD, and CD specifications are mounted from time to time. The diffraction grating 33 forms three light spots on the surface of the optical disc OD to perform tracking error detection on a DVD by the three-beam differential push-pull method. The diffraction grating 34 forms three light spots on the surface of the optical disc OD to perform tracking error detection on a CD by the three-beam differential push-pull method.

In the optical head device 3C shown in FIG. 24, the behavior of the light beam emitted from the semiconductor laser 130 adapted to the BD standard is the same as in the fifth embodiment of the present invention. The behavior of the light beam emitted from the semiconductor laser 132 adapted to the DVD standard and the behavior of the light beam emitted from the semiconductor laser 133 adapted to the CD standard are basically the same as in the fifth embodiment, except for the behavior in the hologram optical element 21 and photodetector 22.

Figure 25:
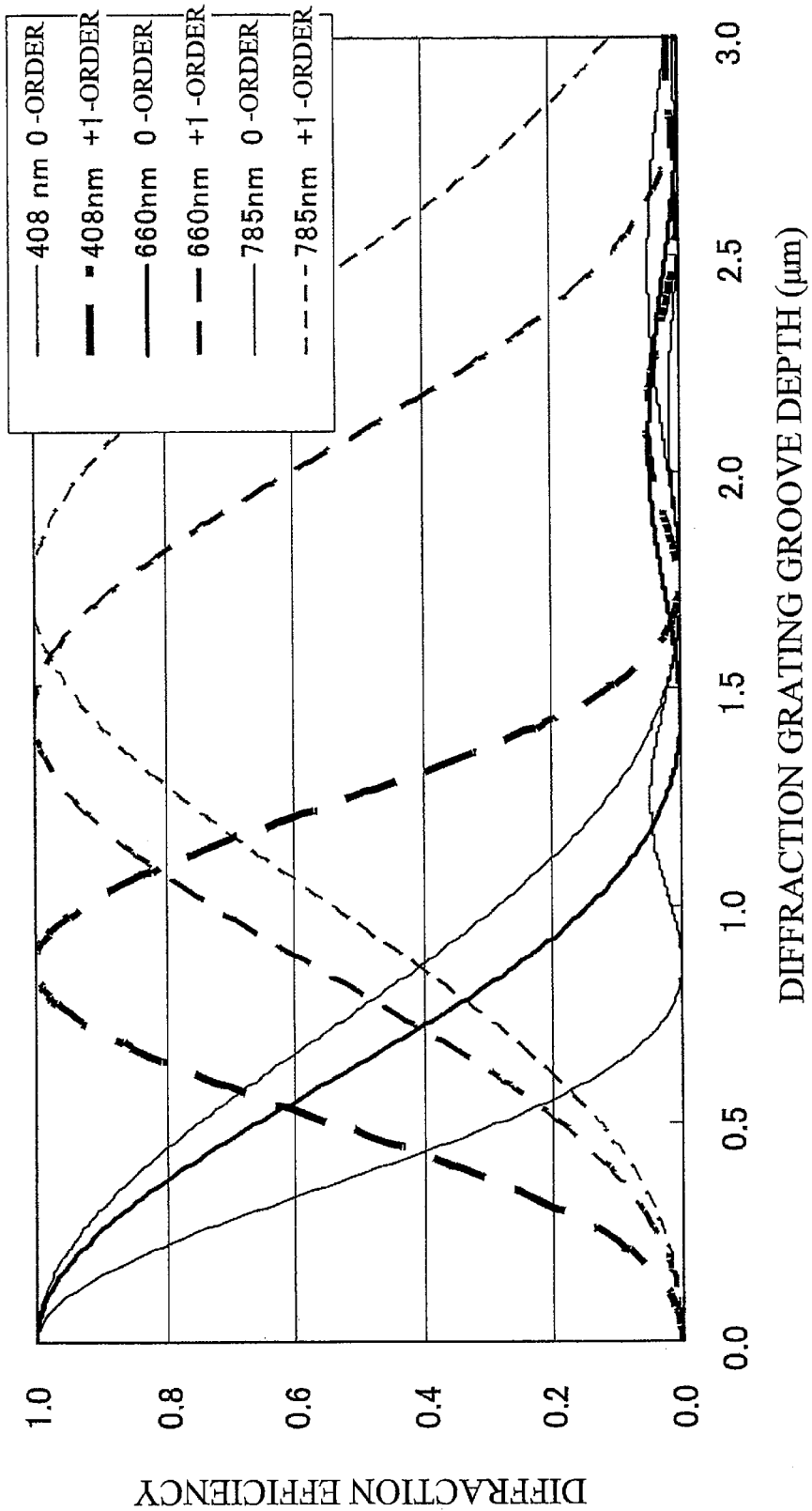
FIG. 25 is a graph showing the relation between the groove depth of the diffraction grating of the hologram optical element and diffraction efficiency in the sixth embodiment.

FIG. 25 is a graph showing the relation between the groove depth D of the diffraction grating in the hologram optical element 21 and diffraction efficiency in the present embodiment. In the calculation of the diffraction efficiency, use of silica glass as the material of the hologram optical element 21 was specified, and its refractive index was used. The material of the hologram optical element 21 is not limited to silica glass, however. As a diffraction efficiency setting, if the setting of the ratio of the zero-order diffraction efficiency to the +1-order diffraction efficiency to 4:1 in the BD standard is considered, for example, from the graph in FIG. 25, the groove depth of the diffraction grating that satisfies this condition is about 0.27 micrometers. When the light beam emitted from the second semiconductor laser 131 adapted to the DVD standard passes through a hologram optical element 21 formed with this diffraction grating groove depth, the ratio of the zero-order diffraction efficiency to the +1-order diffraction efficiency becomes about 19:1; the +1-order transmissively diffracted light beam is negligibly small at the wavelength in the DVD standard. Similarly, when the light beam emitted from the third semiconductor laser 132 adapted to the CD standard passes through, the ratio of the zero-order diffraction efficiency to the +1-order diffraction efficiency becomes about 29:1; the +1-order transmissively diffracted light beam is also negligibly small at the wavelength in the CD standard. Therefore, in the DVD or CD standard, the hologram optical element 21 can be approximately treated as a simple transparent plate with no diffractive function.

Figure 26A:
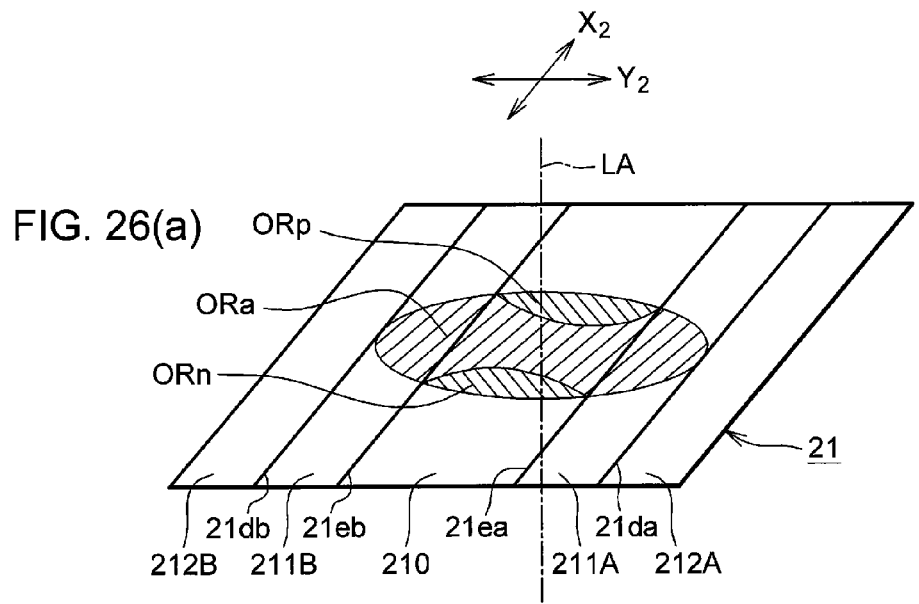
FIGS. 26(a) and 26(b) are perspective views of the hologram optical element and photodetector in the sixth embodiment when the first semiconductor laser is operating.
Figure 26B:
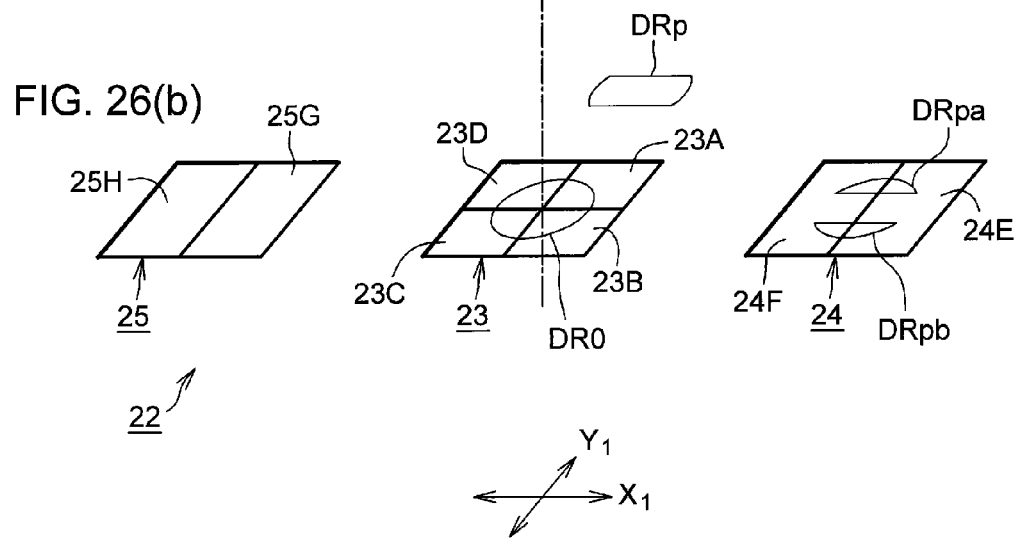

FIGS. 26(a) and 26(b) are perspective views of the hologram optical element 21 and photodetector 22 in this embodiment when the first semiconductor laser 130 is operating. The light beam exiting the diffraction regions 210, 211A, 211B of the hologram optical element 21 illuminates the light-receiving surfaces 23A to 23D, 24E, and 24F as in the operation described with reference to FIGS. 16(a) and 16(b).

Figure 27A:
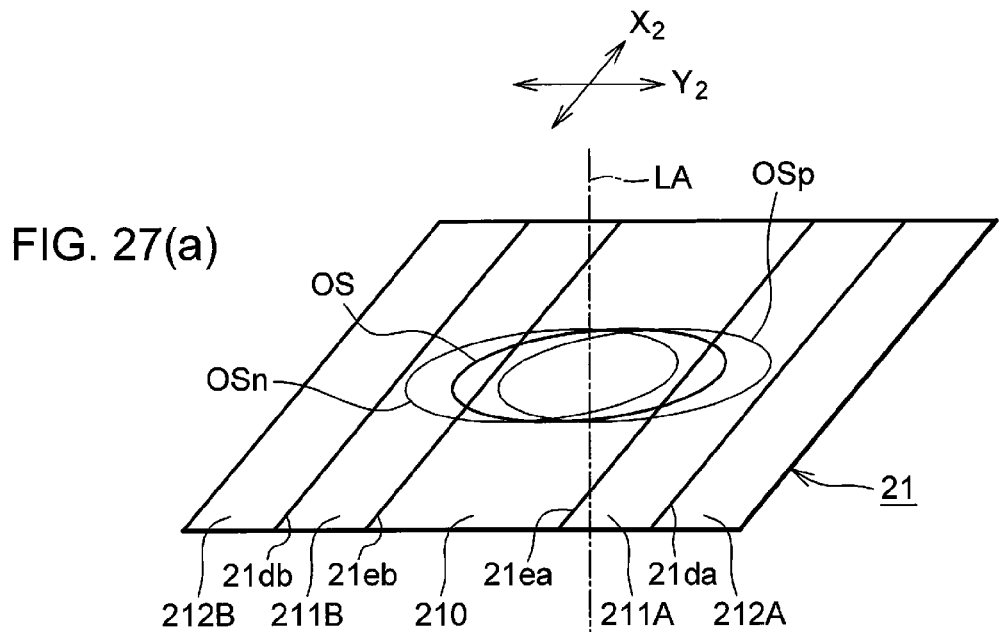
FIGS. 27(a) and 27(b) are perspective views of the hologram optical element and photodetector in the sixth embodiment when the second or third semiconductor laser is operating.
Figure 27B:
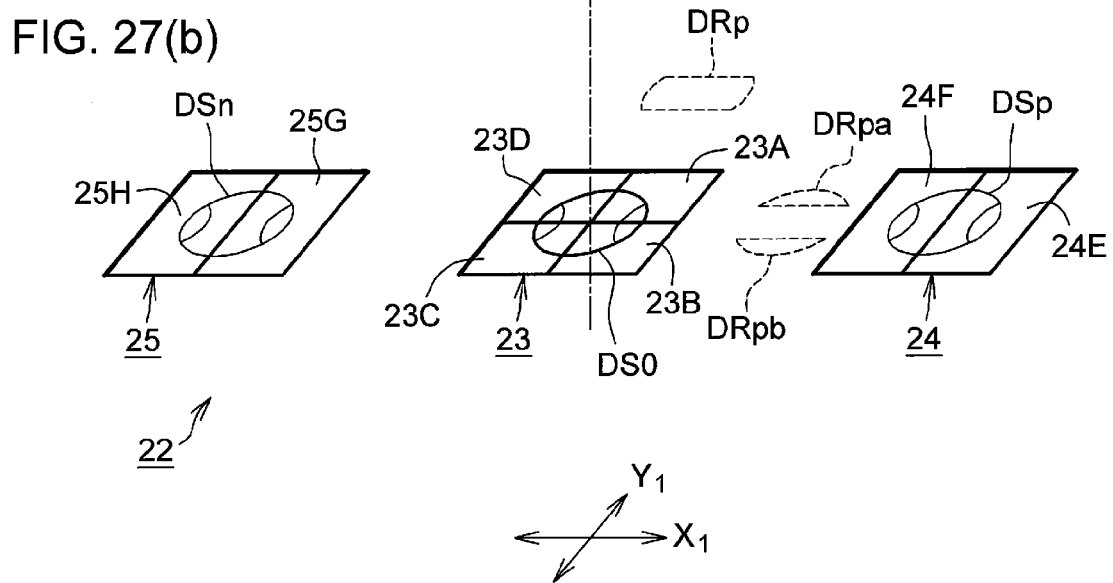

FIGS. 27(a) and 27(b) are perspective views of the hologram optical element 21 and photodetector 22 in this embodiment when the second semiconductor laser 131 or third semiconductor laser 132 is operating. Light component OS is a returning light spot, returning from the optical disc OD, of the main light beam among the three light beams split by the diffraction grating 33 or 34 for performing detection by the three-beam differential push-pull method. Light components OSp and OSn are returning light spots, returning from the optical disc OD, of the two sub-beams among the three light beams split by the diffraction grating 33 or 34. Since the numerical aperture of the objective lens 18 in the DVD standard to which the second semiconductor laser 131 is adapted and the CD standard to which the third semiconductor laser 132 is adapted is smaller than the numerical aperture in the BD standard to which the first semiconductor laser 130 is adapted, the diameter of the returning light beam incident on the hologram optical element 21 is reduced in proportion to the numerical aperture. The specifications of the diffraction gratings 33, 34, such as the spacing of the diffraction grating grooves, are optimized so that the sub light spots DSp and DSn used for detection by the three-beam differential push-pull method illuminate the central positions of the first secondary light-receiving section 24 and second secondary light-receiving section 25 respectively.

The signals in the DVD and CD standard are obtained from the equations below. The focus error signal FES is obtained from the following equation (11).

$$FES=(S_A+S_C)-(S_B+S_D) \quad (11)$$

The reproduced RF signal is obtained from the following equation (12).

$$RF=S_A+S_B+S_C+S_D \quad (12)$$

The tracking error signal TES is obtained from the following equation (13).

$$TES=MPP-k\times SPP \quad (13)$$

Here, k is a gain coefficient. MPP represents the main push-pull signal, and SPP represents the sub-push-pull signal. The main push-pull signal MPP and sub-push-pull signal SPP are given by the following equations (13a, 13b).

$$MPP=(S_A+S_B)-(S_C+S_D) \quad (13a)$$

$$SPP=(S_E-S_F)+(S_G-S_H) \quad (13b)$$

As described in the fifth embodiment, in the BD standard to which the first semiconductor laser 130 is adapted, the equation of the sub-push-pull signal SPP must be switched between the equation (8b) given in the fifth embodiment and the above equation (13b), depending on the standard.

In the photodetector 22, the distance by which the main light-receiving section 23 and first secondary light-receiving section 24 are separated preferably satisfies the design requirements described below. As illustrated in FIG. 25, at the respective lasing wavelengths of the second and third semiconductor lasers 131 and 132, there is a slight +1-order diffraction efficiency corresponding to the groove depth of the diffraction grating, so +1-order light components DRpa and DRpb of the transmissively diffracted light beams exiting the pair of secondary diffraction regions 211A and 211B are generated as shown in FIGS. 27(a) and 27(b). Because these components would become harmful components acting as noise in signal detection, the light-receiving surface pattern of the photodetector 22 is designed so that the main light-receiving section 23 and first secondary light-receiving section 24 are separated by an appropriate distance such that the first secondary light-receiving section 24 does not overlap the positions where the +1-order light components DRpa, DRpb occur. However, if the light intensity of the +1-order light components DRpa, DRpb is negligibly smaller than the light intensity of the sub light spot DSp used to detect the sub-push-pull signal SPP, all or parts of the +1-order light components DRpa, DRpb may overlap the first secondary light-receiving section 24.

In the description given above, tracking control is performed by the three-beam differential push-pull method for both DVD and CD, but this is not a limitation; whatever tracking error detection method is adopted, the point in common is that the light-receiving surface pattern of the photodetector should be optimized in consideration of the effects of the +1-order light components DRpa, DRpb.

In the description of the optical head device 3C in this embodiment given above, the first semiconductor laser 130 is adapted to the BD standard, the second semiconductor laser 131 is adapted to the DVD standard, and the third semiconductor laser 132 is adapted to the CD standard, but this is not a limitation; components adapted to next-generation standards, for example, may also be included. Although the optical head device 3C given as an example is configured to support three standards, needless to say, it may be configured to support two standards or four or more standards.

Although the semiconductor laser 130 adapted to the BD standard, the semiconductor laser 131 adapted to the DVD standard, and the semiconductor laser 132 adapted to the CD standard are arranged in this order in FIG. 24, they may arranged in a different order.

In the optical head device 3C in this embodiment, the objective lens 18 has specifications compatible with a plurality of standards. It is contemplated, however, that the objective lens may not be able to support all standards. In that case, a plurality of objective lenses adapted to respective standards may be disposed on the movable section 19, and the objective lens adapted to the standard of the intended optical disc may be used selectively. The means for selecting the objective lens may be configured to move the desired objective lens onto the light axis LA. Alternatively, an optical element such as a beam splitter, for example, may be disposed in a position in front of or behind the collimator lens 15 to split the light axis, and objective lenses adapted to different standards may be disposed on the respective split light axes.

As described above, although the optical head device 3C in this embodiment includes semiconductor lasers 130, 131, 132 having different wavelengths corresponding to a plurality of standards, as shown in FIG. 24, there are only one hologram optical element 21 and one photodetector 22. An optical head device 3C having a simple configuration can accordingly support plural standards and standards defining multilayer optical discs.

Even when optical discs compatible with different standards are used, the optical head device of this embodiment can mitigate stray light from information recording layers other than the intended information recording layer and allows the differential push-pull method, which can eliminate the offset component due to objective lens shift, to be used for a multilayer optical disc. Furthermore the signal components can be detected by use of a photodetector having a simple light-receiving surface pattern.

Seventh Embodiment

Figure 28:
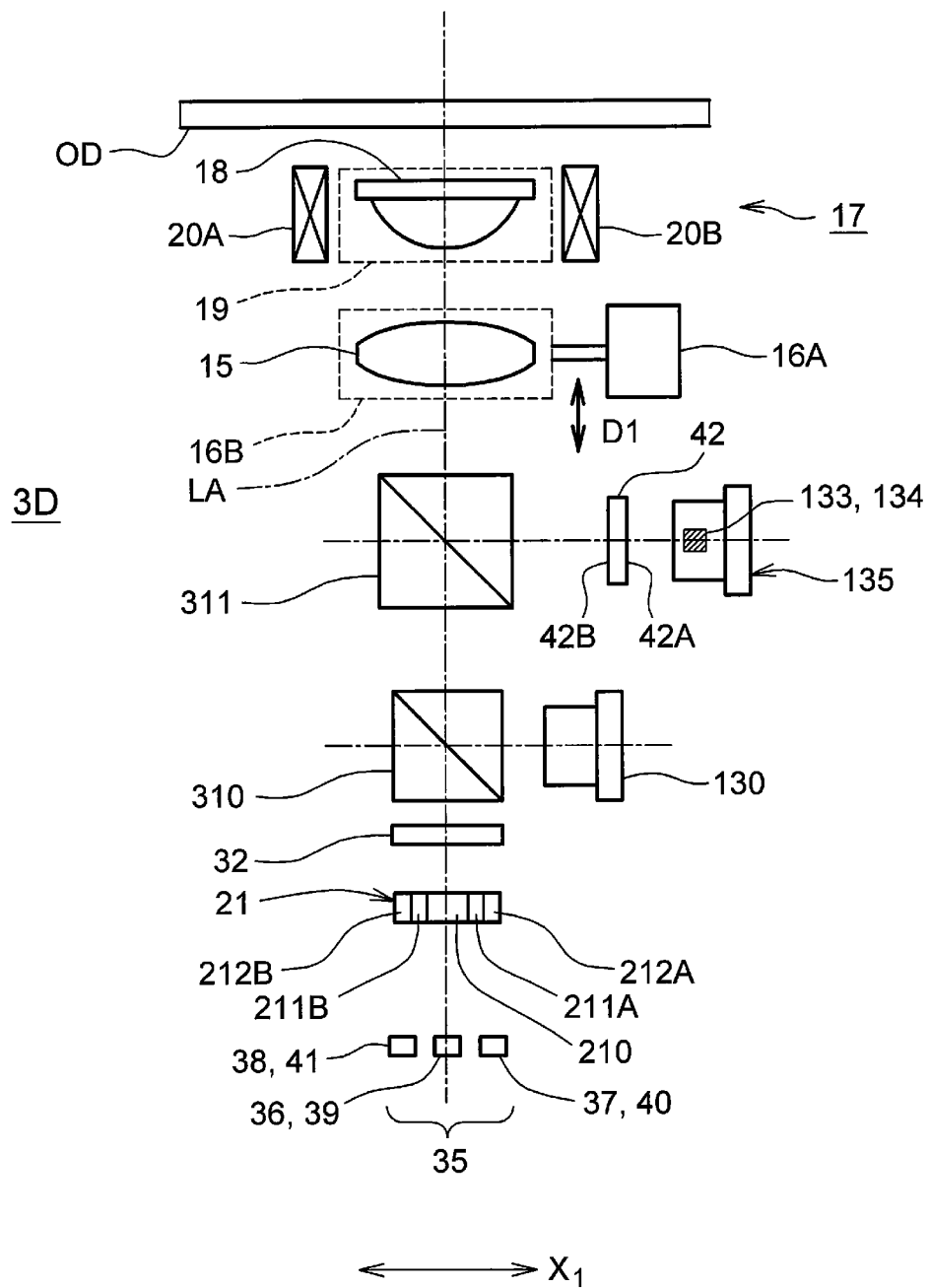
FIG. 28 is a perspective view showing the main elements in the configuration of the optical head device in a seventh embodiment of the invention.

A seventh embodiment of the present invention will now be described. The configuration of the optical head device in this embodiment is basically the same as the configuration of the optical head device 3C in the sixth embodiment, except that a single semiconductor laser package housing a plurality of semiconductor laser devices is used and except that photodetectors corresponding to the plurality of semiconductor laser devices are used. FIG. 28 is a plan view schematically showing the main elements in the configuration of the optical head device in the seventh embodiment of the invention. FIG. 28 also shows an optical head device 3D that supports, for example, three currently used standards: BD (Blu-ray Disc), DVD (Digital Versatile Disc), and CD (Compact Disc).

As shown in FIG. 28, the optical head device 3D includes three semiconductor lasers 130, 133, 134 (in FIG. 28, semiconductor lasers 133 and 134 overlap in a direction perpendicular to the plane of drawing sheet). The semiconductor laser 130 having the first wavelength and the first beam splitter 310, second beam splitter 311, collimator lens 15, objective lens 18, actuator 17, and hologram optical element 21 shown in FIG. 28 are respectively equivalent to the first semiconductor laser 130, first beam splitter 310, second beam splitter 311, collimator lens 15, objective lens 18, actuator 17, and hologram optical element 21 shown in FIG. 24. The photodetector 35 includes two paired main light-receiving sections 36, 39, two paired first light-receiving sections 37, 40, and two paired second light-receiving sections 38, 41 (in FIG. 28, the two paired main light-receiving sections 36, 39, the two paired first light-receiving sections 37, 40, and two paired second light-receiving sections 38, 41 overlap respectively in a direction perpendicular to the plane of drawing sheet). Laser light emitted from the first semiconductor laser 130 is reflected by the first beam splitter 310, which is aligned on the light axis LA, and is incident on the objective lens 18 through the second beam splitter 311 and collimator lens 15. The returning light beam reflected by the optical disc OD is incident on the hologram optical element 21 after successive passage through the objective lens 18, collimator lens 15, second beam splitter 311, first beam splitter 310, and cylindrical lens 32, and is split into a plurality of transmissively diffracted light beams, which are incident on the main light-receiving section 36 and first light-receiving section 37 of the photodetector 35.

Figure 29:
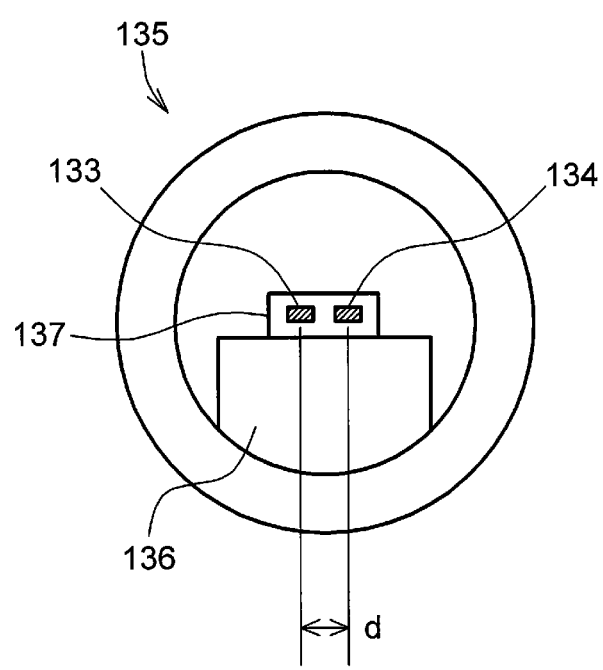
FIG. 29 is a front elevational view showing the semiconductor laser package in the seventh embodiment.

FIG. 29 is a front elevational view showing the semiconductor laser package in this embodiment. The semiconductor laser package 135 includes a semiconductor laser chip 137 disposed on a heat sink 136, and the semiconductor laser chip 137 includes two laser devices separated by a distance d: a second-wavelength semiconductor laser 133, and a third-wavelength semiconductor laser 134. Although the illustrated structure includes two laser devices built into a single semiconductor laser chip, a structure including two separate laser devices disposed with a distance d left between them may also be used.

Laser light emitted from the second-wavelength semiconductor laser 133 is incident on the diffraction grating 42. On one side of the diffraction grating 42, a diffraction grating surface 42A for splitting the laser light emitted from the second-wavelength semiconductor laser 133 into three beams is formed to support the three-beam differential push-pull method. The three transmissively diffracted light beams from the diffraction grating 42 are reflected by the second beam splitter 311, which is disposed between the first beam splitter 310 and the collimator lens 15, and are incident on the objective lens 18 through the collimator lens 15. The returning light beam reflected by the optical disc OD is incident on the main light-receiving section 36, first light-receiving section 37, and second light-receiving section 38 of the photodetector 35 after successive passage through the objective lens 18, collimator lens 15, second beam splitter 311, first beam splitter 310, cylindrical lens 32, and hologram optical element 21.

Laser light emitted from the third-wavelength semiconductor laser 134 is incident on the diffraction grating 42. On the other side of the diffraction grating 42, a diffraction grating surface 42B for splitting the laser light emitted from the third-wavelength semiconductor laser 134 into three beams is formed to support the three-beam differential push-pull method. The three light beams transmissively diffracted by the diffraction grating 42 are reflected by the second beam splitter 311 disposed between the first beam splitter 310 and the collimator lens 15 and are incident on the objective lens 18 through the collimator lens 15. The returning light beams reflected by the optical disc OD are incident on main light-receiving section 39, first light-receiving section 40, and second light-receiving section 41 of the photodetector 35 after successive passage through the objective lens 18, collimator lens 15, second beam splitter 311, first beam splitter 310, cylindrical lens 32, and hologram optical element 21.

Although the diffraction grating 42 is a unitary diffraction grating having diffraction grating surface 42A and diffraction grating surface 42B unitarily formed on its two sides, a combined configuration with two diffraction gratings, each having a single diffraction grating surface, may be used. Diffraction grating surface 42A has a diffractive function for the second wavelength and does not have a diffractive function for the third wavelength. Diffraction grating surface 42B has a diffractive function for the third wavelength and does not have a diffractive function for the second wavelength.

FIGS. 30(a) and 30(b) are perspective views of the hologram optical element and photodetector in this embodiment when the semiconductor laser having the first wavelength is operating. The photodetector 35 includes two sets of elements that are adapted, like the photodetector 22 shown in FIGS. 26(a) and 26(b), for detection by the three-beam differential push-pull method. The first set includes a main light-receiving section 36 having light-receiving surfaces 36A to 36D orthogonal to the light axis LA and a first secondary light-receiving section 37 and second secondary light-receiving section 38 disposed on the two sides of the first secondary light-receiving section 36. Main light-receiving section 36 includes a plurality of light-receiving surfaces 36A, 36B, 36C, 36D arranged in a matrix aligned in the $X_1$-axis direction and the $Y_1$-axis direction. The pair of light-receiving surfaces 36A, 36B and the pair of light-receiving surfaces 36C, 36D are aligned in the $X_1$-axis direction; the light-receiving surfaces 36A, 36B are aligned in the $Y_1$-axis direction; and the light-receiving surfaces 36C, 36D are aligned in the $Y_1$-axis direction. First secondary light-receiving section 37 has a pair of light-receiving surfaces 37E, 37F aligned in the $X_1$-axis direction, and second secondary light-receiving section 38 has a pair of light-receiving surfaces 38G, 38H aligned in the $X_1$-axis direction. The main light-receiving section 39, first secondary light-receiving section 40, and second secondary light-receiving section 41 of the second set are analogous to main light-receiving section 36, first secondary light-receiving section 37, and second secondary light-receiving section 38, with which they are aligned, though spaced apart, in parallel to the $Y_1$-axis direction; a light axis LA1 passes through the center of main light-receiving section 39. Main light-receiving section 39 includes a plurality of light-receiving surfaces 39A, 39B, 39C, 39D arranged in a matrix aligned in the $X_1$-axis direction and the $Y_1$-axis direction. The pair of light-receiving surfaces 39A, 39B and the pair of light-receiving surfaces 39C, 39D are aligned in the $X_1$-axis direction; light-receiving surfaces 39A, 39B are aligned in the $Y_1$-axis direction; and light-receiving surfaces 39C, 39D are aligned in the $Y_1$-axis direction. The first secondary light-receiving section 40 has a pair of light-receiving surfaces 40E, 40F aligned in the $X_1$-axis direction, and the second secondary light-receiving section 41 has a pair of light-receiving surfaces 41G, 41H aligned in the $X_1$-axis direction. The light-receiving surfaces 36A, 36B, 36C, 36D of the first secondary light-receiving section 36 output respective detection signals $S_{A1}$, $S_{B1}$, $S_{C1}$, $S_{D1}$ by photoelectric conversion of the zero-order light component DR0; the light-receiving surfaces 37E, 37F of the second secondary light-receiving section 37 output respective detection signals $S_{E1}$ $S_{F1}$ by photoelectric conversion of the +1-order light components DRpa, DRpb.

The separation between light axis LA and light axis LA1 corresponds to a quantity obtained by applying an optical magnification factor to the distance d between the second-wavelength semiconductor laser 133 and the third-wavelength semiconductor laser 134 in the semiconductor laser chip 137. In the BD standard to which the first semiconductor laser 130 having the first wavelength is adapted, the behavior of transmissively diffracted light beams from the diffraction regions 210, 211A, 211B of the hologram optical element 21 incident on the light-receiving surfaces 36A to 36D, 37E, 37F is the same as the behavior in the fifth embodiment described with reference to FIGS. 16(a) and 16(b), and the differential push-pull method of the present invention is applied.

The signals in the BD standard are obtained from the following equations. The focus error signal FES is obtained from the following equation (14).

$$FES1=(S_{A1}+S_{C1})-(S_{B1}+S_{D1}) \tag{14}$$

The reproduced RF1 signal is obtained from the following equation (15).

$$RF1=S_{A1}+S_{B1}+S_{C1}+S_{S1} \tag{15}$$

The tracking error signal TES1 is obtained from the following equation (16).

$$TES1=MPP1-k1\times SPP1 \tag{16}$$

Here, k1 is a gain coefficient. MPP1 represents the main push-pull signal, and SPP1 represents the sub-push-pull signal. The main push-pull signal MPP1 and sub-push-pull signal SPP1 are given by the following equations (17a, 17b).

$$MPP1=(S_{A1}+S_{B1})-(S_{C1}+S_{D1}) \tag{17a}$$

$$SPP1=S_{E1}-S_{F1} \tag{17b}$$

Figure 31A:
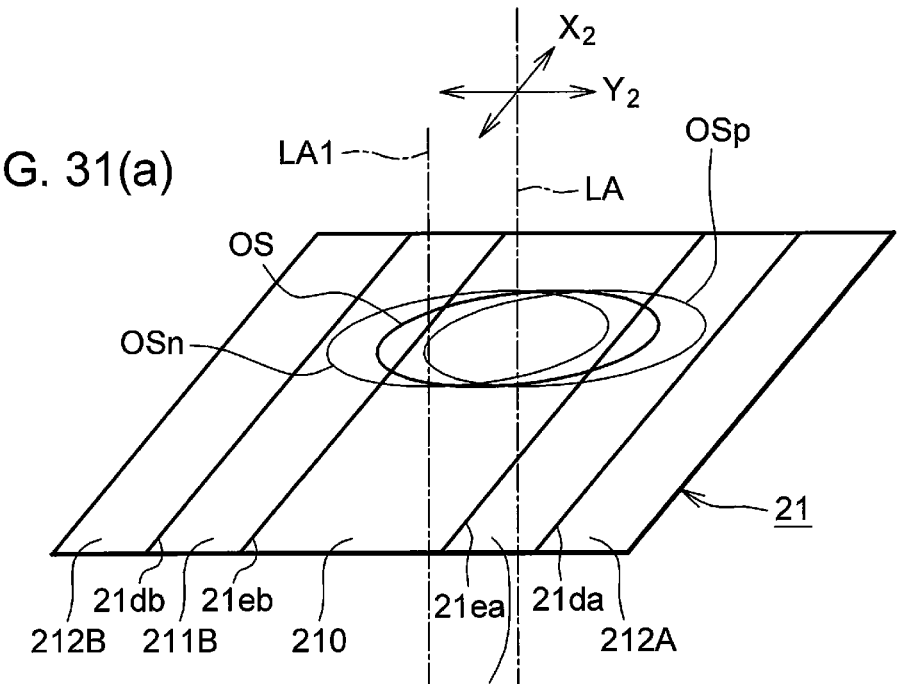
FIGS. 31(a) and 31(b) are perspective views of the hologram optical element and photodetector in the seventh embodiment when the second semiconductor laser is operating.
Figure 31B:
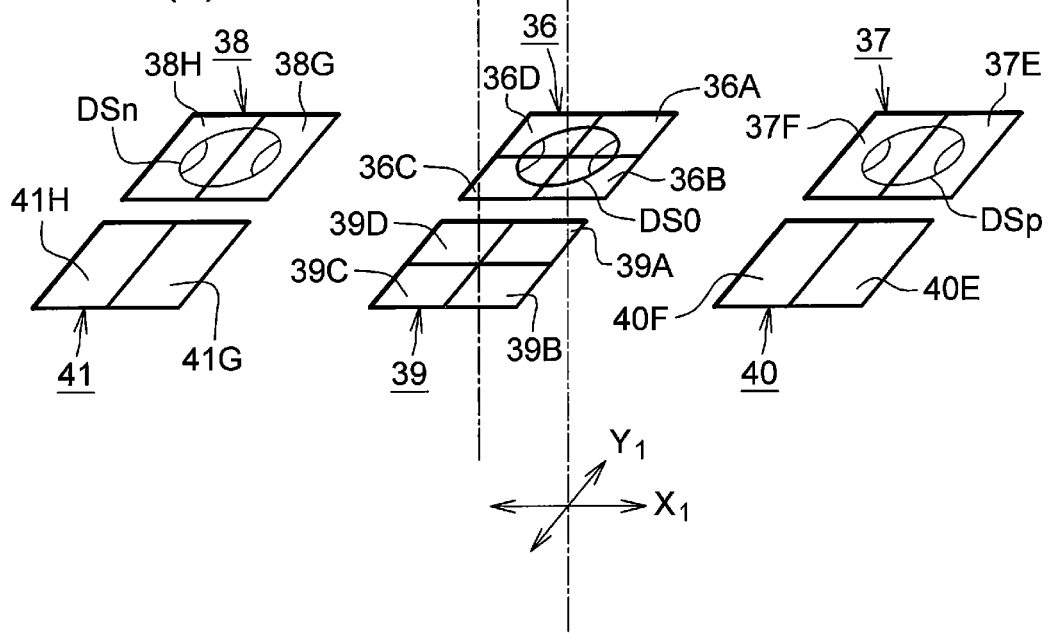

FIGS. 31(a) and 31(b) are perspective views of the hologram optical element and photodetector in this embodiment when the second-wavelength semiconductor laser 133 is operating. Light component OS is a returning light spot, returning from the optical disc OD, of the main light beam among the three light beams split by diffraction grating surface 42A of the diffraction grating 42 for performing detection by the three-beam differential push-pull method. Light components OSp and OSn are returning light spots, returning from the optical disc OD, of the two sub-beams among the three light beams split by diffraction grating surface 42A of the diffraction grating 42. In the DVD standard to which the second-wavelength semiconductor laser 133 is adapted, these returning light spots are aligned with light axis LA. Since the numerical aperture of the objective lens 18 that functions for the DVD standard is smaller than the numerical aperture for the BD standard to which the first semiconductor laser 130 is adapted, the diameter of the light beam returning to the hologram optical element 21 is reduced in proportion to the numerical aperture. The specifications of diffraction grating surface 42A of the diffraction grating 42, such as the spacing of the diffraction grating grooves, are optimized so that the sub light spots DSp, DSn used for detection by the three-beam differential push-pull method illuminate the central positions of the first secondary light-receiving section 37 and second secondary light-receiving section 38, respectively.

Light-receiving surfaces 38G and 38H of the second secondary light-receiving section 38 output respective detection signals SG1, SH1 after photoelectric conversion. Therefore, the signals in the DVD standard are detected by the following computations. The focus error signal FES1 is obtained from the equation (14) given above. The reproduced RF1 signal is obtained from the equation (15) given above. The tracking error signal TES11 is obtained from the following equation (18).

$$TES11=MPP1-k11\times SPP11 \tag{18}$$

Here, k11 is a gain coefficient. The sub-push-pull signal SPP1 is given by the following equation (19).

$$SPP11=(S_{E1}-S_{F1})+(S_{H1}-S_{G1}) \tag{19}$$

Detection of the tracking error signal is not limited to the three-beam differential push-pull method based on equation (18).

Figure 32A:
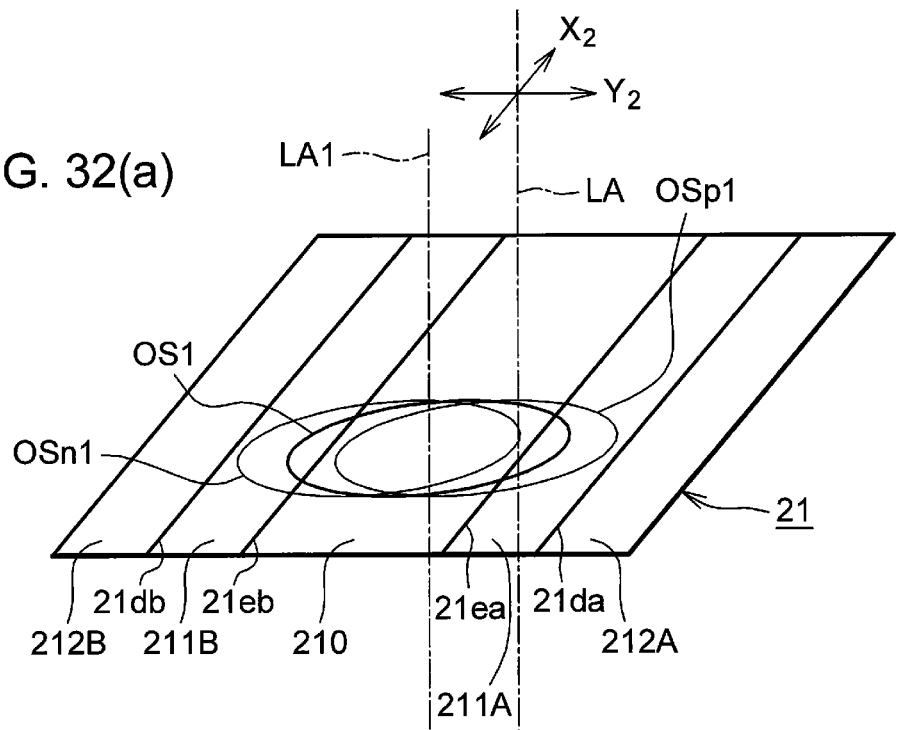
FIGS. 32(a) and 32(b) are perspective views of the hologram optical element and photodetector in the seventh embodiment when the third semiconductor laser is operating.
Figure 32B:
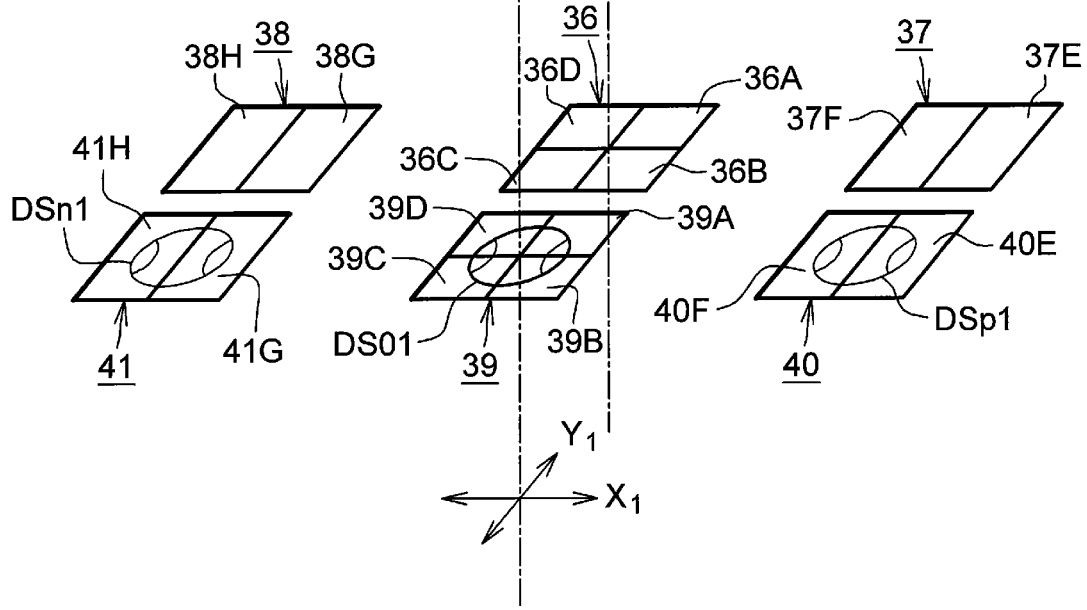

FIGS. 32(a) and 32(b) are perspective views of the hologram optical element and photodetector in this embodiment when the third-wavelength semiconductor laser 134 is operating. Light component OS1 is a returning light spot, returning from the optical disc OD, of the main light beam among the three light beams split by diffraction grating surface 42B of the diffraction grating 42 for performing detection by the three-beam differential push-pull method. Light components OSp1 and OSn1 are returning light spots, returning from the optical disc OD, of the two sub-beams among the three light beams split by diffraction grating surface 42B of the diffraction grating 42. In the CD standard to which the third-wavelength semiconductor laser 134 is adapted, these returning light spots are aligned with light axis LA1. Since the numerical aperture of the objective lens 18 that functions in the CD standard is smaller than the numerical aperture in the DVD standard to which the second semiconductor laser 133 is adapted, the diameter of the light beam returning to the hologram optical element 21 is reduced in proportion to the numerical aperture. The specifications of diffraction grating surface 42B of the diffraction grating 42, such as the spacing of the diffraction grating grooves, are optimized so that the sub light spots DSp1 and DSn1 for detection by the three-beam differential push-pull method illuminate the central positions of the first secondary light-receiving section 40 and second secondary light-receiving section 41, respectively.

The light-receiving surfaces 39A, 39B, 39C, 39D of main light-receiving section 39 output respective detection signals $S_{A2}$, $S_{B2}$, $S_{C2}$, $S_{D2}$ after photoelectric conversion. The light-receiving surfaces 40G, 40H of first secondary light-receiving section 40 output respective detection signals $S_{E2}$, $S_{F2}$ after photoelectric conversion. The light-receiving surfaces 41G, 41H of second secondary light-receiving section 41 output respective detection signals $S_{G2}$, $S_{H2}$ after photoelectric conversion. Therefore, the signals in the CD standard are obtained by the following computations. The focus error signal FES2 is obtained from the following equation (20).

$$FES2=(S_{A2}+S_{C2})-(S_{B2}+S_{D2}) \tag{20}$$

The reproduced signal RF2 is obtained from the following equation (21).

$$RF2=S_{A2}+S_{B2}+S_{C2}+S_{D2} \tag{21}$$

The tracking error signal TES2 is obtained from the following equation (22).

$$TES2 = MPP2 - k2 \times SPP2 \quad (22)$$

Here, k2 is a gain coefficient. MPP2 represents a main push-pull signal, and SPP2 represents a sub-push-pull signal. The main push-pull signal MPP2 and sub-push-pull signal SPP2 are given by the following equations (24a, 24b).

$$MPP2 = (S_{A2} + S_{B2}) - (S_{C2} + S_{D2}) \quad (24a)$$

$$SPP2 = S_{E2} - S_{F2} \quad (24b)$$

Detection of the tracking error signal is not limited to the three-beam differential push-pull method based on equation (22). In the description given above, the BD, DVD, and CD standards are used as an example of three standards, but the standards are not limited to these. Two standards or four or more standards may be supported, with photodetectors and semiconductor lasers having wavelengths corresponding to those standards being used, needless to say.

In the description given above, detection by the main light-receiving section 36 and secondary light-receiving sections 37, 38 of light beams related to the semiconductor laser having the second wavelength and detection by main light-receiving section 39 and secondary light-receiving sections 40, 41 of light beams related to the semiconductor laser having the third wavelength is shown as an example, but this example is non-limiting.

In the description given above, the main light-receiving section 39, first secondary light-receiving section 40, and second secondary light-receiving section 41 of the second set are shown as configured analogously to the main light-receiving section 36, first secondary light-receiving section 37, and second secondary light-receiving section 38 of the first set, being aligned therewith at a distance in parallel to the $Y_1$-axis direction, but the first and second sets of light-receiving sections need not have analogous geometries. Moreover, the separation between main light-receiving section 36 and secondary light-receiving sections 37 and 38 need not match the separation between main light-receiving section 39 and secondary light-receiving sections 40 and 41.

In the description given above, the semiconductor lasers having the second wavelength and the third wavelength are housed in a single semiconductor laser package, but this configuration is non-limiting. A single semiconductor laser package housing all the semiconductor lasers may be used.

In the description given above, a single objective lens is adapted to all the standards, but a plurality of objective lenses adapted to different standards may be provided. If a plurality of objective lenses are used, a selected objective lens may be moved onto the light axis LA, or alternatively, the optical path after the collimator lens 15 may be split into a plurality of new light axes by a beam splitter, for example, and the objective lenses may be disposed on the respective new light axes.

As described above, the optical head device 3D in this embodiment includes a plurality of semiconductor lasers 130, 133, 134 having different wavelengths adapted to different standards, and semiconductor lasers 133, 134 are housed in a single semiconductor laser package 135, as shown in FIG. 28. Therefore, an optical head device having a simple configuration with a reduced number of beam splitters and diffraction gratings can support plural standards and standards defining multilayer optical discs.

Eighth Embodiment

Figure 33:
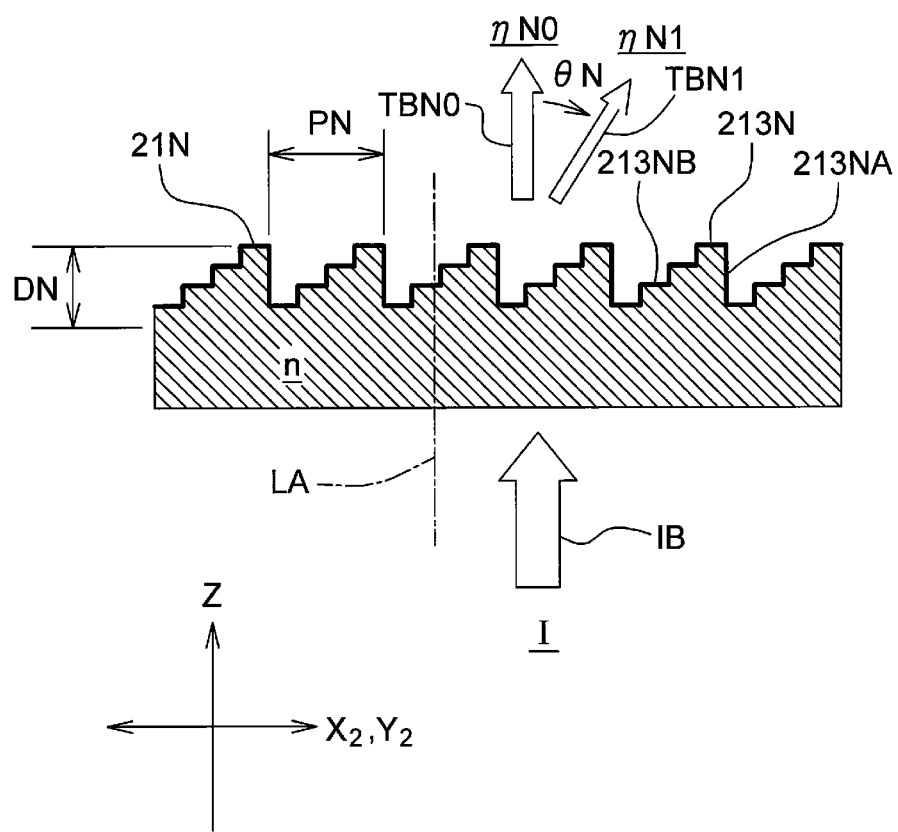
FIG. 33 is a sectional diagram illustrating the diffraction grating grooves of the hologram optical element in an eighth embodiment.

An eighth embodiment of the present invention will now be described. The configuration of an optical head device in this embodiment is the same as the configuration of the optical head device 3B in the fifth embodiment, the optical head device 3C in the sixth embodiment, and the optical head device 3D in the seventh embodiment, except for the hologram optical element. FIG. 33 is a sectional diagram illustrating the diffraction grating grooves of the hologram optical element 21N in the present embodiment. In more detail, whereas the diffraction grating grooves 213 of the hologram optical element 21 shown in FIG. 15 illustrating the fifth embodiment have a blazed structure, the diffraction grating grooves 213N of the hologram optical element 21N in the present embodiment have a staircase-like sectional profile. One grating wall 213NA is formed parallel to the Z-axis and another grating wall 213NB is formed to have a staircase-like profile in the Z-axis direction. Grating walls 213NB having four steps are shown here as an example, but this example is non-limiting. Any grating wall having three steps or more may be used; as the number of steps increases, the structure approaches the blazed structure of the hologram optical element 21 shown in FIG. 15.

In the hologram optical element 21N as shown in FIG. 33, let n be the refractive index, let PN be the period of the diffraction grating grooves 213N, and let DN be the depth of the diffraction grating grooves 213N. Let λ be the wavelength of the semiconductor laser. From a light beam IB incident on the hologram optical element 21N, diffraction grating grooves having a staircase structure generally generate a zero-order diffracted light beam TBN0 that passes through the hologram optical element 21N directly and a first-order diffracted light beam TBN1 angled in one oblique direction with respect to the zero-order diffracted light beam TBN0. Here, the first-order diffracted light beam TBN1 may be defined as the +1-order diffraction component. The conditions that determine the proportions of the diffraction efficiency $\eta_{N0}$ of the zero-order diffracted light beam TBN0 and the diffraction efficiency $\eta_{N1}$ of the +1-order diffracted light beam TBN1 with respect to the light intensity I of the incident light beam IB are the refractive index n and depth DN of the hologram optical element 21N and the wavelength λ. The conditions that determine the diffraction angle $\theta_N$ of the +1-order diffracted light beam TB1 are the period PN of the hologram optical element 21N and the wavelength λ. The wavelength λ of the semiconductor laser is usually fixed at a specific value, and the refractive index n is determined by the glass, plastic, or other optical material used in the hologram optical element 21N, so the proportions of diffraction efficiencies $\eta_{N0}$, $\eta_{N1}$ and the diffraction angle $\theta_N$ can be adjusted to desired design values by using the period PN and depth DN of the diffraction grating grooves 213N as variables.

Figure 34:
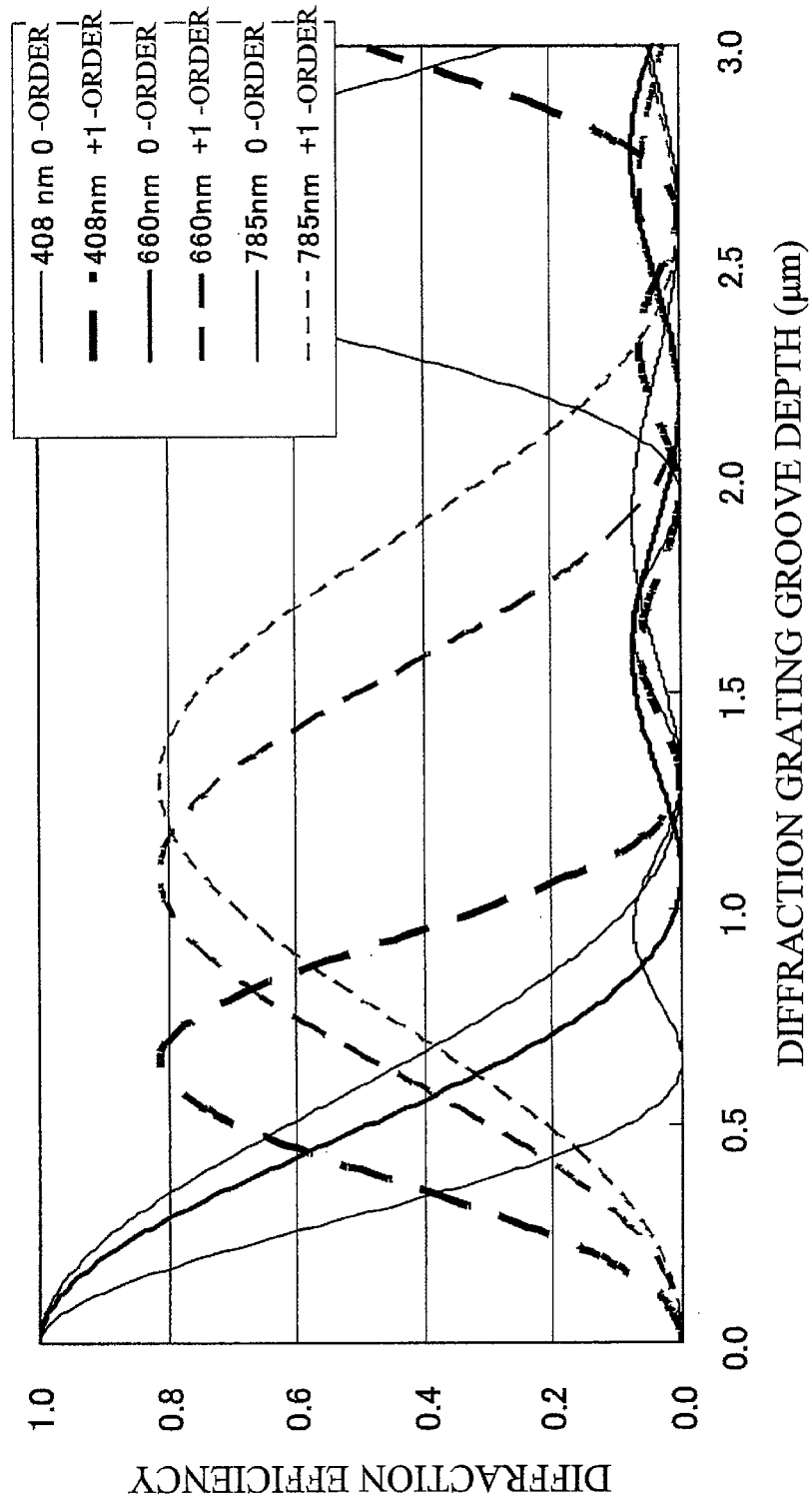
FIG. 34 is a graph showing the relation between the groove depth of the diffraction grating of the hologram optical element and diffraction efficiency in the eighth embodiment.

FIG. 34 is a graph showing the relation between the groove depth DN of the diffraction grating of the hologram optical element 21N and diffraction efficiency in this embodiment; the illustrated diffraction efficiencies were calculated by selecting four steps as the number of steps in the staircase structure and specifying use of silica glass as the material of the hologram optical element 21N. The material of the hologram optical element 21N is not limited to silica glass, however. If the setting of the ratio of the zero-order diffraction efficiency to the +1-order diffraction efficiency to 4:1 in the BD standard is considered, from the graph in FIG. 34, the groove depth of the diffraction grating satisfying this condition is about 0.21 micrometers. When the light beam emitted from the second semiconductor laser 131 adapted to the DVD standard passes through a hologram optical element 21N formed with this diffraction grating groove depth, the ratio of the zero-order diffraction efficiency to the +1-order diffraction efficiency becomes about 19:1; the +1-order transmissively diffracted light beam is negligibly small at the wavelength in the DVD standard. When the light beam emitted from the third semiconductor laser 132 adapted to the CD standard passes through, the ratio of the zero-order diffraction efficiency to the +1-order diffraction efficiency becomes about 29:1; the +1-order transmissively diffracted light beam is negligibly small at the wavelength in the CD standard. Therefore, in the DVD standard or CD standard, the hologram optical element 21N can be approximately treated as a simple transparent plate with no diffractive function.

As an example, FIG. 33 shows grating wall 213NB of the hologram optical element 21N as having four steps, but this example is non-limiting. The grating wall may have five or more steps; as the number of steps increases, the structure approaches the blazed structure of the hologram optical element 21 shown in FIG. 15, and the curves of zero-order diffraction efficiency and +1-order diffraction efficiency with respect to diffraction grating groove depth shown in FIG. 34 approach the curves of zero-order diffraction efficiency and +1-order diffraction efficiency with respect to diffraction grating groove depth of the hologram optical element 21 having the blazed structure shown in FIG. 25.

The hologram optical element 21 shown in FIG. 14 described in the fifth embodiment has three types of diffraction regions: the primary diffraction region 210, a pair of secondary diffraction regions 211A, 211B, and a pair of peripheral diffraction regions 212A, 212B. The diffraction regions with a staircase-like structure in the present embodiment may be the above three types of diffraction regions or may be regions of any particular one type.

As described above, since the hologram optical element 21N in this embodiment has a staircase structure, the diffraction grating grooves 213N can be formed more easily than grooves having a blazed structure, and the cost of the hologram optical element can be reduced.

Ninth Embodiment

A ninth embodiment of the present invention will now be described. The configuration of the optical head device in this embodiment is the same as the configuration of the optical head device 3B in the fifth embodiment, except for the relation between the zero-order diffraction efficiency $\eta_y$ of the secondary diffraction regions 211A, 211B and the zero-order diffraction efficiency $\eta_x$ of the primary diffraction region 210 in the hologram optical element 21 shown in the fifth embodiment. The configuration of the optical head device in this embodiment is the same as the configuration of the optical head device 3C in the sixth embodiment, except for the relation between the zero-order diffraction efficiency $\eta_y$ of the secondary diffraction regions 211A, 211B and the zero-order diffraction efficiency $\eta_x$ of the primary diffraction region 210 in the hologram optical element 21 shown in the sixth embodiment. The configuration of the optical head device in this embodiment is the same as the configuration of the optical head device 3D in the seventh embodiment, except for the relation between the zero-order diffraction efficiency $\eta_y$ of the secondary diffraction regions 211A, 211B and the zero-order diffraction efficiency $\eta_x$ of the primary diffraction region 210 in the hologram optical element 21 shown in the seventh embodiment. The hologram optical element 21N shown in the eighth embodiment has the same configuration as the hologram optical element 21N in the eighth embodiment, except for the relation between the zero-order diffraction efficiency $\eta_y$ of the secondary diffraction regions and the zero-order diffraction efficiency $\eta_x$ of the primary diffraction region.

Figure 35:
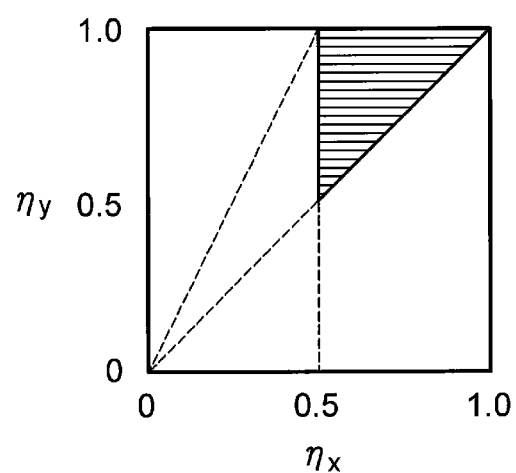
FIG. 35 is a distribution diagram illustrating a preferred range of the zero-order diffraction efficiencies in the secondary diffraction regions and primary diffraction region in a ninth embodiment.

FIG. 35 is a distribution diagram in which the hatched part indicates a preferred range of the zero-order diffraction efficiencies $\eta_y$ and $\eta_x$ in the optical head device in the present embodiment. This range satisfies the requirements $\eta_x \geq 0.5$, $\eta_x \leq \eta_y$, and $\eta_y \leq 2 \times \eta_x$.

In the fifth to eight embodiments, the range of zero-order diffraction efficiencies $\eta_x$, and $\eta_y$ that simultaneously satisfy requirements C and D is the range satisfying the two inequalities $\eta_x \leq \eta_y$, and $\eta_y \leq 2 \times \eta_x$, as shown in FIG. 23(c). A zero-order diffraction efficiency $\eta_x$ close to zero means that most of the transmissively diffracted light is diffracted light other than zero-order diffracted light. When the zero-order diffraction efficiency $\eta_x$ of the primary diffraction region 210 is close to zero, for example, this means that the intensities of the first-order light components DRp, DRn that are not incident on the photodetector 22 increase, while the intensity of the zero-order light component DR0 incident on the photodetector 22 decreases. In this embodiment, in order to stabilize signal detection, a minimum value of 0.5 is specified for the zero-order diffraction efficiency $\eta_x$.

As described above, according to this embodiment, the intensity of the light beam incident on the photodetector 22 can be increased because the zero-order diffraction efficiency $\eta_x$ of the hologram optical elements 21 and 21N is set to a value not less than 0.5. Use of the optical head device in this embodiment can therefore stabilize signal detection performance.

Tenth Embodiment

Figure 36:
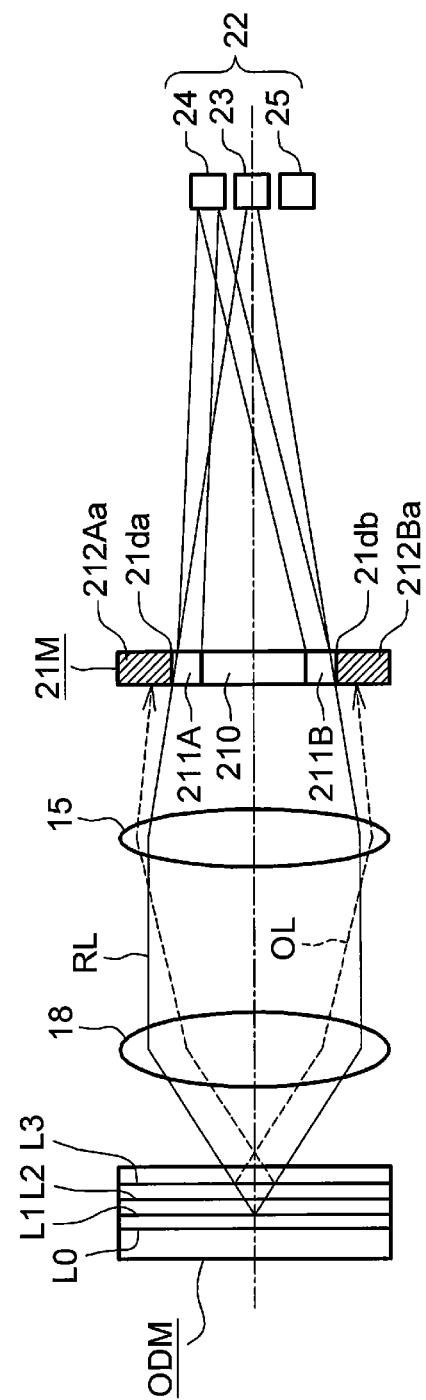
FIG. 36 schematically illustrates part of the configuration of an optical head device including the hologram optical element in a tenth embodiment of the invention.

A tenth embodiment of the present invention will now be described. The configuration of the optical head device in this embodiment is the same as the configuration of the optical head device 3B in the fifth embodiment, except for the hologram optical element. The hologram optical element in the present embodiment can be applied in place of the hologram optical element in the optical head device 3C in the sixth embodiment and the optical head device 3D in the seventh embodiment. Except for the pair of peripheral diffraction regions, the hologram optical element in the present embodiment can also be used as the hologram optical element 21N in the eighth embodiment. FIG. 36 is a plan view schematically illustrating part of the configuration of an optical head device including the hologram optical element 21M in this embodiment. The optical disc ODM shown in FIG. 36 is a multilayer optical disc having a plurality of information recording layers L0, L1, L2, and L3 disposed one above another.

FIG. 36 shows the paths of propagation of two returning light beams RL, OL reflected by the optical disc ODM. The returning light beam RL from the information recording layer L1 where information is recorded or reproduced is incident on the hologram optical element 21M after successive passage through the objective lens 18 and collimator lens 15.

Returning light beam OL is a stray light beam reflected by information recording layers (such as information recording layer L3) other than the information recording layer L1 where information is recorded or reproduced. The hologram optical element 21M in this embodiment includes a primary diffraction region 210 and secondary diffraction regions 211A, 211B having the same structure as in the hologram optical element 21 described in the fifth, sixth, and seventh embodiments, and also includes light-blocking regions 212Aa, 212Ba instead of peripheral diffraction regions 212A, 212B. The stray light OL reflected by information recording layer L3, for example, can therefore be blocked by the light-blocking regions 212Aa, 212Ba of the hologram optical element 21M and prevented from illuminating the main light-receiving section 23, first secondary light-receiving section 24, or second secondary light-receiving section 25 of the photodetector 22. The light-blocking regions 212Aa, 212Ba can be formed by applying an opaque material or a light absorbing material to, depositing an opaque metal film on, or attaching an opaque metal sheet to the regions corresponding to the peripheral diffraction regions 212A, 212B.

As described above, since the hologram optical element 21M in this embodiment does not allow stray light generated by a multilayer disc to strike the photodetector 22, the photodetector 22 does not detect unwanted signal components other than the innately necessary signal components. Use of the optical head device in this embodiment can therefore stabilize signal detection performance. If peripheral diffraction regions 212A, 212B were present, light diffracted by the peripheral diffraction regions 212A, 212B might be reflected by peripheral hardware and detected by the photodetector 22 as stray light, but the hologram optical element 21M, having the light-blocking regions 212Aa, 212Ba, can prevent such stray light from occurring.

Eleventh Embodiment

Figure 37:
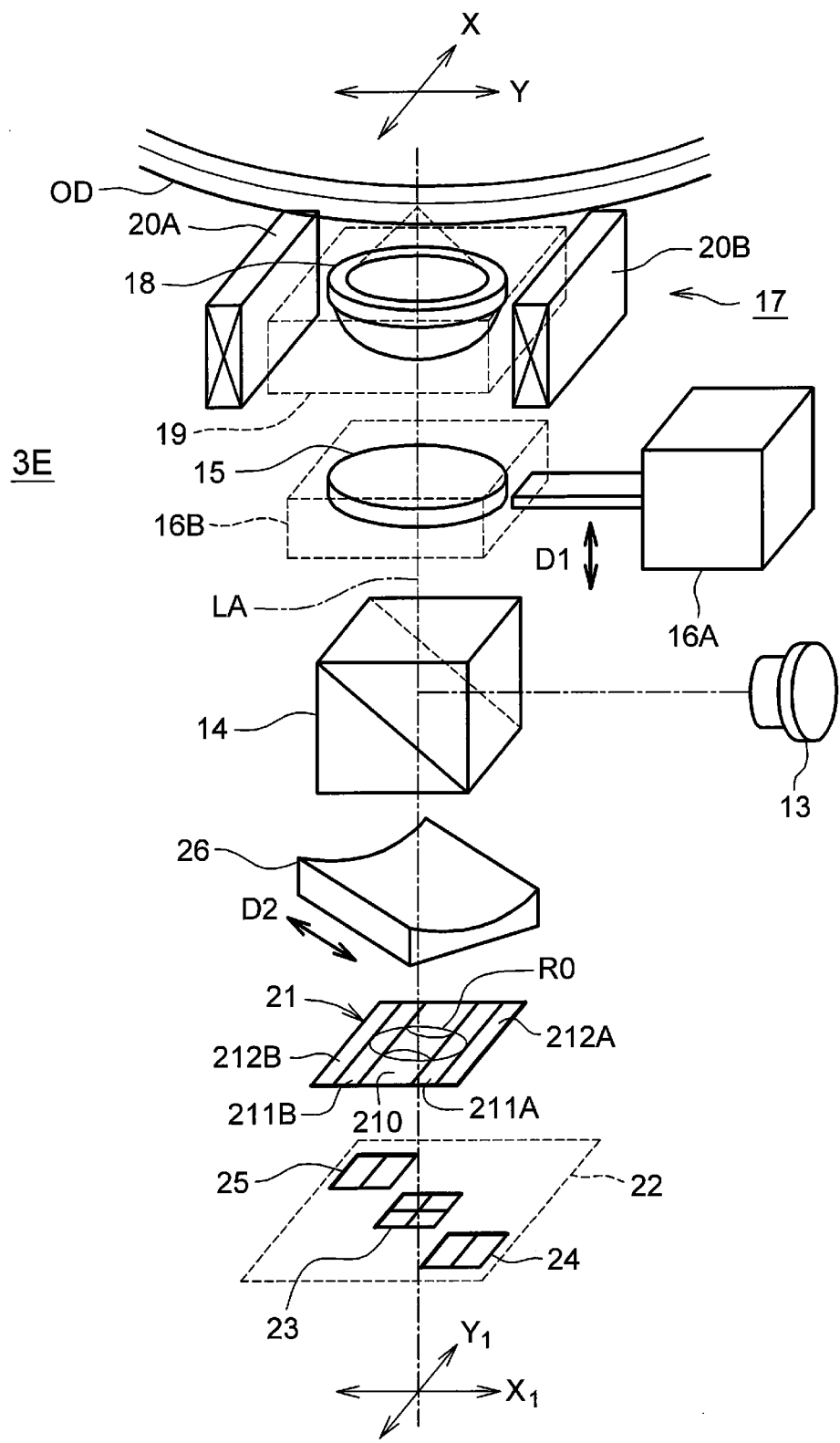
FIG. 37 is a perspective view schematically showing the configuration of the optical head device in an eleventh embodiment.

An eleventh embodiment of the present invention will now be described. FIG. 37 is a perspective view schematically showing the main elements in the configuration of the optical head device 3E in this embodiment. As shown in FIG. 37, the optical head device 3E includes a semiconductor laser 13, which is a laser light source, a beam splitter 14, a collimator lens 15, an objective lens 18, an actuator 17, a cylindrical lens 26, a hologram optical element 21, and a photodetector 22. The semiconductor laser 13 operates under control of the laser control circuit 7 in FIG. 1, and the laser control circuit 7 controls the optical intensity of laser light emitted from the semiconductor laser 13 on the basis of commands from the controller 12. Laser light emitted from the semiconductor laser 13 is reflected by the beam splitter 14 and is incident on the objective lens 18 through the collimator lens 15. As the beam splitter 14, a cubic half mirror can be used, for example. The objective lens 18, which is disposed in such a way as to scan a radial line of the optical disc OD, focuses the incident light beam from the beam splitter 14 onto the information recording layer of the optical disc OD and forms a light spot on the information recording layer. The returning light beam reflected by the optical disc OD passes through the objective lens 18, collimator lens 15, beam splitter 14, and cylindrical lens 26 in that order and is then incident on the hologram optical element 21. The cylindrical lens 26 generates a function to detect focus error by the well known astigmatic method and is disposed in such manner that the direction D2 of the generator of its cylindrical surface is disposed at an angle of approximately 45 degrees to the $X_1$-axis direction corresponding to the radial direction (X-axis direction). A cylindrical lens 26 having a concave lens shape, for example, may be used in this embodiment. The X-axis direction, which is the radial direction of the optical disc OD, and the $X_1$-axis direction, which corresponds to the radial direction, are substantially orthogonal to each other in FIG. 37. This is because of the astigmatism of the returning light beam induced by the cylindrical lens 26.

Alternatively, the cylindrical lens 26 may have a convex lens shape. Instead of the cubic half mirror, a parallel-plate beam splitter may be used as the beam splitter 14. This is because passage through a parallel plate induces astigmatism in the returning light beam exiting the collimator lens 15.

The hologram optical element 21, which is a diffractive optical element, transmits and diffracts the incident light, splitting it into a plurality of transmissively diffracted light beams, and directs these transmissively diffracted light beams toward respective light-receiving sections 23, 24, 25 of the photodetector 22. As shown in FIG. 37, the light-receiving sections 23, 24, 25 of the photodetector 22 are disposed in the plane of the photodetector 22, which is substantially parallel to the hologram optical element 21, and are offset from the $X_1$-axis direction corresponding to the radial direction (X-axis direction), the two secondary light-receiving sections 24, 25 being disposed at equal distances in diagonally opposite directions from the single main light-receiving section 23.

Each of the three light-receiving sections 23, 24, 25 has a plurality of light-receiving surfaces; each light-receiving surface generates an electrical signal by performing photoelectric conversion of the transmissively diffracted light beam incident from the hologram optical element 21 and outputs the electrical signal to the matrix circuit 5 shown in FIG. 1.

In FIG. 1, the matrix circuit 5 generates a variety of signals needed to record or reproduce information, such as a reproduced RF signal that represents the result of detection of recorded information on the optical disc OD, focus and tracking error signals, and other servo control signals, by performing a matrix calculation process on the electrical signals supplied from the optical head device 3E. The reproduced RF signal is output to the signal reproduction circuit 6. The signal reproduction circuit 6 generates a modulated signal by performing a binarizing process on the reproduced RF signal, extracts a reproduction clock from this modulated signal, and generates a reproduced information signal by carrying out demodulation, error correction, and decoding processes on the modulated signal. The reproduced information signal is transferred by the controller 12 to a host device (not shown) such as an audio-video device or a personal computer.

The servo circuit 8 operates on the basis of commands from the controller 12, generates drive signals for focus and tracking adjustments on the basis of the focus and tracking error signals supplied from the matrix circuit 5, and supplies the drive signals to the actuator 17 (FIG. 37) of the optical head device 3E. The actuator 17 includes magnetic circuits 20A, 20B and a movable section 19 disposed between the magnetic circuits 20A and 20B, as schematically shown in FIG. 37. The movable section 19 includes a lens holder (not shown) for securing the objective lens 18 and a focus coil and tracking coil (both not shown) wound around the lens holder. The focus coil is wound around the central axis of the objective lens 18, and the tracking coil is wound around an axis orthogonal to the light axis LA and the X-axis direction of the optical disc OD. The objective lens 18 can be moved in the focusing direction (the direction of the light axis LA) by supplying drive current (a drive signal) to the focus coil, and can be moved in the X-axis direction by supplying drive current (a drive signal) to the tracking coil. As described above, the laser control circuit 7, optical head device 3E, matrix circuit 5, and servo circuit 8 form a focus servo loop and a tracking servo loop and can make the laser light emitted from the semiconductor laser 13 follow a track on the optical disc OD.

The aberration correction mechanism control circuit 9 controls the operation of the aberration correction mechanism 16A provided in the optical head device 3E shown in FIG. 37, in accordance with the quality of the reproduced information signal input to the controller 12. The collimator lens 15 is an optical component that corrects optical aberration such as spherical aberration occurring in the light spot focused onto an information recording layer of the optical disc OD; the aberration correction mechanism control circuit 9 can correct optical aberration appropriately and with high precision by moving the lens holder 16B holding the collimator lens 15 in a direction D1 along the light axis LA. The method of correcting spherical aberration in the light spot is not limited to movement of the lens as described above. For example, a method using a liquid crystal element and performing phase control of the liquid crystal element to cancel optical aberration in the light spot may be used.

Figure 38:
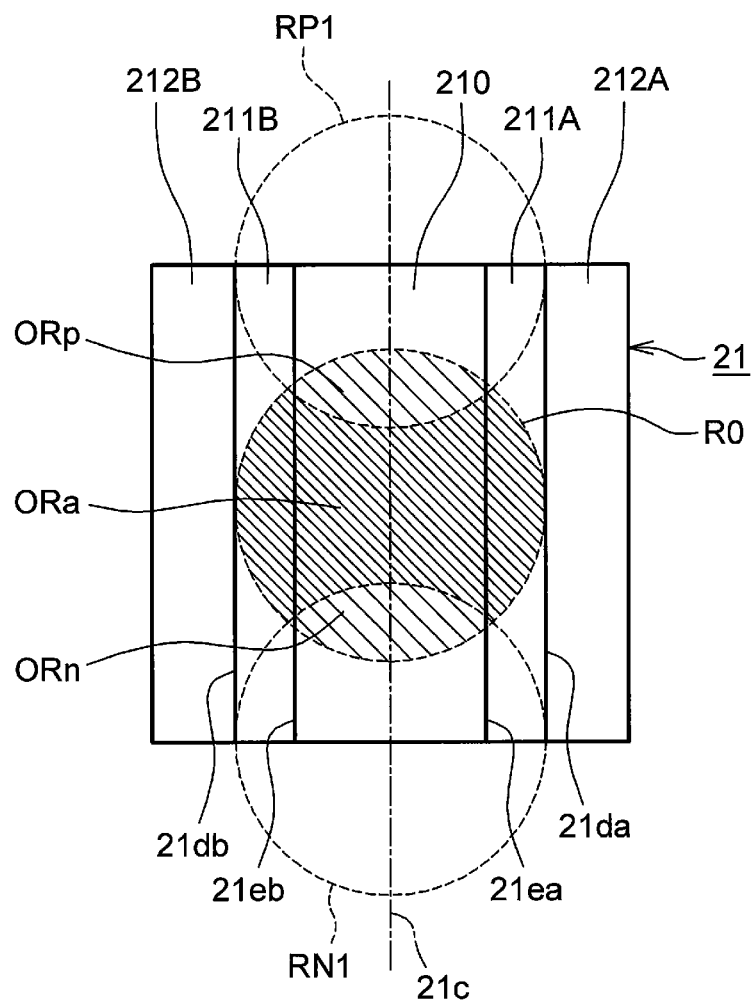
FIG. 38 is a plan view schematically showing the configuration of the hologram optical element in the eleventh embodiment.

FIG. 38 is a plan view schematically illustrating the configuration of the light incidence surface of the hologram optical element 21. The hologram optical element 21 has three types of diffraction regions: a primary diffraction region 210, a pair of secondary diffraction regions 211A, 211B, and a pair of peripheral diffraction regions 212A, 212B. A separate diffractive pattern (e.g., the profile, direction, or spacing of the diffraction grooves) may be formed in each of these three types of diffraction regions. The secondary diffraction regions 211A, 211B are disposed outward of the primary diffraction region 210 in a $Y_2$-axis direction corresponding to the tangential direction (Y-axis direction) of the optical disc OD. The peripheral diffraction regions 212A, 212B are disposed outward of the secondary diffraction regions 211A, 211B in the $Y_2$-axis direction. The shapes of the secondary diffraction regions 211A, 211B are line-symmetric with respect to a centerline 21c running in an $X_2$-axis direction (corresponding to the radial direction), which is orthogonal to the $Y_2$-axis direction; the shapes of the peripheral diffraction regions 212A, 212B are also line-symmetric with respect to the centerline 21c. The primary diffraction region 210 and secondary diffraction region 211A are separated by a boundary line 21ea parallel to the $X_2$-axis direction, and the primary diffraction region 210 and secondary diffraction region 211B are separated by a boundary line 21eb parallel to the $X_2$-axis direction. Peripheral diffraction region 212A and secondary diffraction region 211A are separated by a boundary line 21da parallel to the $X_2$-axis direction, and peripheral diffraction region 212B and secondary diffraction region 211B are separated by a boundary line 21db parallel to the $X_2$-axis direction.

The returning light beam from the optical disc OD includes diffracted light beams (reflectively diffracted light beams) caused by the radial or X-axis direction structure of the information recording layers (mainly by the structure of the information tracks) of the optical disc OD. The light incidence surface of the hologram optical element 21 is illuminated by light spots of the returning light. As shown in FIG. 38, the light spots include a light component ORp where a zero-order light component R0 represented by a dotted circle overlaps a +1-order light component RP1 represented by a dotted circle, a light component ORn where the zero-order light component R0 represented by the dotted circle overlaps a −1-order light component RN1 represented by another dotted circle, and a light component ORa where the zero-order light component R0 does not overlap the ±1-order light components RP1, RN1. Since the objective lens 18 is disposed so as to scan a radial line on the optical disc OD, the line formed by the zero-order light component R0, the +1-order light component RP1, and the −1-order light component RN1 is aligned in the $X_2$-axis direction corresponding to the radial direction. The primary diffraction region 210 is formed in a position where part of the zero-order light component R0 (the central part of the light spot of the zero-order light component R0) and all or part of the light components ORp and ORn are incident. The secondary diffraction regions 211A, 211B are formed in positions where at least the remaining part of the zero-order light component R0 is incident and none or only part of light components ORp and ORn is incident. The peripheral diffraction regions 212A, 212B are formed in positions where neither the zero-order light component R0 nor the ±1-order light components RP1, RN1 are incident.

The width of the primary diffraction region 210 in the $Y_2$-axis direction is designed to be less than the diameter of the light spot of the zero-order light component R0 in the $Y_2$-axis direction and equal to or less than the width of light components ORp and ORn in the $Y_2$-axis direction, as shown in FIG. 38. In this embodiment, boundary lines 21da, 21db are disposed in positions where they are substantially tangent to the outer diameter extremities of the zero-order light component R0 in the $Y_2$-axis direction. Boundary lines 21ea, 21eb are disposed in positions where they touch the extremities of light components ORp and ORn in the $Y_2$-axis direction. The primary diffraction region 210 therefore has a rectangular shape with a width substantially equal to the width of light components ORp and ORn in the $Y_2$-axis direction, and the secondary diffraction regions 211A, 211B have rectangular shapes with a width equal to the spacing between the outer diameter extremities of the zero-order light component R0 and the extremities of light components ORp and ORn in the $Y_2$-axis direction. To increase the light component diffracted by the secondary diffraction regions 211A, 211B, the areas of the secondary diffraction regions 211A, 211B may be enlarged by moving the boundary lines 21ea, 21eb toward the primary diffraction region 210 in the $Y_2$-axis direction so that parts of light components ORp, ORn are incident on the secondary diffraction regions 211A, 211B.

FIGS. 39(a) and 39(b) are perspective views of the hologram optical element 21 and photodetector 22 aligned on the light axis LA. FIGS. 39(a) and 39(b) are diagrams showing the hologram optical element 21 and photodetector 22, respectively. The $X_2$-axis direction, which corresponds to the radial direction, and the $X_1$-axis direction are substantially orthogonal to each other in FIGS. 39(a) and 39(b). That is because of the function of the cylindrical lens 26 that induces astigmatism in the returning light beam.

As shown in FIG. 39(b), the photodetector 22 includes, in a plane orthogonal to the light axis LA, a main light-receiving section 23 having light-receiving surfaces 23A to 23D, and a first secondary light-receiving section 24 and a second secondary light-receiving section 25 disposed on opposite sides of the main light-receiving section 23 in a direction oblique to the $X_1$-axis. The plurality of light-receiving surfaces 23A, 23B, 23C, 23D included in the main light-receiving section 23 are arranged in a matrix substantially aligned with the $X_1$-axis and $Y_1$-axis directions. The pair of light-receiving surfaces 23A, 23B and the pair of light-receiving surfaces 23C, 23D are substantially aligned in the $X_1$-axis direction, light-receiving surfaces 23A, 23B being substantially aligned in the $Y_1$-axis direction and light-receiving surfaces 23C, 23D also being substantially aligned in the $Y_1$-axis direction. The first secondary light-receiving section 24 has a pair of light-receiving surfaces 24E, 24F substantially aligned in the $X_1$-axis direction, and the second secondary light-receiving section 25 has a pair of light-receiving surfaces 25G, 25H substantially aligned in the $X_1$-axis direction. That is, the main light-receiving section 23 has four rectangular light-receiving surfaces formed by dual partitioning in the longitudinal and transverse directions, although the partitioning directions need not be accurately aligned with the $X_1$-axis direction and $Y_1$-axis direction.

The principal diffraction efficiencies of the primary diffraction region 210 with respect to the returning light beam are the zero-order and +1-order diffraction efficiencies; the principal diffraction efficiencies of the secondary diffraction regions 211A, 211B with respect to the returning light beam are the zero-order and +1-order diffraction efficiencies. The zero-order light component DR0 of the light beam (referred to below as the transmissively diffracted light beam) exiting the primary diffraction region 210 and the secondary diffraction regions 211A, 211B illuminates the light-receiving surfaces 23A to 23D of the main light-receiving section 23, forming a light spot. This light spot includes the zero-order and ±1-order reflectively diffracted light beam components caused by the radial structure of the optical disc OD. The +1-order light component DRp and the −1-order light component DRn of the transmissively diffracted light beam exiting the primary diffraction region 210 illuminate an area lying outside the main light-receiving section 23 in the $Y_1$-axis direction, as shown in FIG. 39(b). The photodetector 22 does not receive these ±1-order light components DRp, DRn. The +1-order light components DRpa and DRpb of the transmissively diffracted light beams exiting the secondary diffraction region 211A and 211B illuminate the light-receiving surfaces 24E and 24F, respectively, of the first secondary light-receiving section 24, and the −1-order light components DRna and DRnb illuminate the light-receiving surfaces 25G, 25H of the second secondary light-receiving section 25.

The pattern of the eight light-receiving surfaces 23A to 23D, 24E, 24F, 25G, 25H is similar to the light-receiving surface pattern used in the well-known general differential push-pull method to generate a tracking error signal. The light-receiving surfaces 23A, 23B, 23C, 23D of the main light-receiving section 23 output respective detection signals $S_A$, $S_E$, $S_C$, $S_D$ by photoelectric conversion (photocurrent-voltage conversion) of the zero-order light component DR0. The light-receiving surfaces 24E, 24F of the first secondary light-receiving section 24 output respective detection signals $S_E$, $S_F$ by photoelectric conversion of the +1-order light components DRpa, DRpb. The light-receiving surfaces 25G, 25H of the second secondary light-receiving section 25 output respective detection signals $S_G$, $S_H$ by photoelectric conversion of the −1-order light components DRna, DRnb. The matrix circuit 5 then generates a focus error signal FES having a signal level obtained from the equation (25) below in accordance with the astigmatic method.

$$FES=(S_A+S_C)-(S_B+S_D) \quad (25)$$

The matrix circuit 5 generates a reproduced RF signal having a signal level obtained from the following equation (26).

$$RF=S_A+S_B+S_C+S_D \quad (26)$$

The matrix circuit 5 also generates a tracking error signal TES having a signal level obtained from the following equation (27).

$$TES=MPP-k\times SPP \quad (27)$$

Here, k is a gain coefficient. MPP represents a main push-pull signal, and SPP represents a sub-push-pull signal. The main push-pull signal MPP and sub-push-pull signal SPP are given by the following equations (27a, 27b).

$$MPP=(S_A+S_B)-(S_C+S_D) \quad (27a)$$

$$SPP=(S_E-S_F)+(S_G-S_H) \quad (27b)$$

The main push-pull signal MPP and sub-push-pull signal SPP have the same phase in relation to objective lens shift, and an offset component attributable to objective lens shift is obtained as the sub-push-pull signal SPP. Therefore, a tracking error signal TES in which the offset component arising from the objective lens shift is cancelled out can be obtained by appropriate adjustment of the gain coefficient k and amplification of the sub-push-pull signal SPP with the adjusted gain. Note that the tracking error signal TES detected by the above calculation differs from the tracking error signal based on the general differential push-pull method.

The general differential push-pull method will now be described. A conventional optical head device is configured to let the light beam emitted from the semiconductor laser pass through a diffraction grating in the optical path preceding incidence on the objective lens. Before becoming incident on the objective lens, the light beam emitted from the semiconductor laser is split into three light beams by the diffraction grating: into one main light spot on the information recording surface of the optical disc and a pair of sub light spots on two sides of the main light spot. Of the three returning light beams reflected by the information recording surface of the optical disc, the returning light beam from the main light spot illuminates the main light-receiving section 23, and the returning light beams from the pair of sub light spots illuminate the first secondary light-receiving section 24 and 25 respectively.

In the optical head device 3E of this embodiment, since there is no diffraction grating in the optical path between the semiconductor laser 13 and the objective lens 18, the light beam emitted from the semiconductor laser is not split and illuminates the objective lens as a single light beam, forming a single light spot on the information recording surface of the optical disc. When the returning light beam reflected by the information recording surface of the optical disc passes through the hologram optical element 21, it is split into a plurality of transmissively diffracted light beams, and these beams illuminate the main light-receiving section 23, first secondary light-receiving section 24, and second secondary light-receiving section 25.

Since a single light spot is formed on the information recording surface of the optical disc in this embodiment, the method employed in this embodiment will be referred to as the differential push-pull method of the present invention, to distinguish it from the general differential push-pull method. The general differential push-pull method will be referred to as the three-beam differential push-pull method.

FIG. 40 is a table describing the information recording layers defined for a four-layer BD optical disc, as an example of a multilayer optical disc. The spacing between the layers varies. Since the effects of stray light from other information recording layers increase as the inter-layer spacing decreases, the effects of stray light from information recording layers adjacent to the information recording layer selected as the layer where information is reproduced or read is the greatest. Because of the various spacings between layers, in a BD optical disc, the greatest effect of stray light from layer L3 is on layer L2, and the greatest effect of stray light from layer L2 is on layer L3.

FIGS. 41(a) and 41(b) show plan views schematically illustrating the distribution of stray light on the photodetector 22. The main light-receiving section 23, first secondary light-receiving section 24, and second secondary light-receiving section 25 of the photodetector 22 are aligned away from the $X_1$-axis direction corresponding to the radial direction (X-axis direction), the first secondary light-receiving section 24 and second secondary light-receiving section 25 being disposed at equal distances in diagonally opposite directions from the main light-receiving section 23. As stray light conditions when the information recording layer selected as the layer where information is reproduced or recorded is layer L1, FIG. 41(a) illustrates the distribution of stray light SL0 generated in layer L0, FIG. 41(b) illustrates the zero-order light component DR0 of the returning light beam from layer L1, FIG. 41(c) illustrates stray light SL2 generated in layer L2, and FIG. 41(d) illustrates stray light SL3 generated in layer L3. The stray light components SL0, SL2, SL3 are defocused and are widely spread on the light-receiving surface of the main light-receiving section 23, having obliquely elliptical distributions as shown in FIGS. 41(a), 41(c), and 41(d). This is an effect of passage through the cylindrical lens 26; the inclination of the ellipse depends on the direction D2 of the generator of the cylindrical lens 26. The degree of defocusing depends on the optical design specifications of the optical head device 3E, the spacing between information recording layers in the multilayer optical disc, and so on. Here, since the information recording layer selected as the layer where information is reproduced or recorded is layer L1, the stray light components SL0, SL2 respectively generated in the adjacent layers L0, L2 are more convergent than the stray light SL3 generated in layer L3. Therefore, the separation between the main light-receiving section 23 at the center and the first secondary light-receiving section 24 and second secondary light-receiving section 25 is selected so as to prevent the stray light components SL0, SL2 respectively generated in the layers L0, L2 adjacent to the information recording layer L1 from being incident on the first secondary light-receiving section 24 and second secondary light-receiving section 25. Although part of the stray light SL3 generated in the layer L3 that is not adjacent to the information recording layer L1 strikes the first secondary light-receiving section 24 and second secondary light-receiving section 25, the wide spacing between layer L1 and layer L3 causes the stray light SL3 to be greatly defocused. Consequently, the light intensity of the stray light SL3 that is incident on the first secondary light-receiving section 24 and second secondary light-receiving section 25 is too weak to affect the quality of the tracking error signal.

FIGS. 42(a) to 42(c) schematically illustrate the relations between objective lens shift (displacement of the objective lens 18 in the radial direction with respect to the photodetector 22) and the positions of the illuminated light spots on the photodetector 22. FIG. 42(b) shows the positions (reference positions) in which the light beams illuminate the light-receiving surfaces of the photodetector 22 when the central axis of the objective lens 18 is on the light axis LA. In this case, the light spot of the zero-order light component DR0 is positioned at the center of the main light-receiving section 23 in both the $X_1$-axis and $Y_1$-axis directions, the +1-order light components DRpa, DRpb are positioned at the center of the first secondary light-receiving section 24 in the $X_1$-axis direction, and the −1-order light components DRna, DRnb are positioned at the center of the second secondary light-receiving section 25 in the $X_1$-axis direction. FIG. 42(a) shows the positions of the light beams illuminating the light-receiving surfaces of the photodetector 22 when the objective lens 18 is displaced toward the inner perimeter of the optical disc OD. In this case, the light spot of the zero-order light component DR0 is displaced toward light-receiving surface 23C or 23D, the +1-order light components DRpa, DRpb are displaced toward light-receiving surface 24F, and the −1-order light components DRna, DRnb are displaced toward light-receiving surface 2H. FIG. 42(c) shows the positions of the light beams illuminating the light-receiving surfaces of the photodetector 22 when the objective lens 18 is displaced toward the outer perimeter of the optical disc OD. In this case, the light spot of the zero-order light component DR0 is displaced toward light-receiving surfaces 23A, 23B, the +1-order light components DRpa, DRpb are displaced toward light-receiving surface 24E, and the −1-order light components DRna, DRnb are displaced toward light-receiving surface 25G.

Figure 43A:
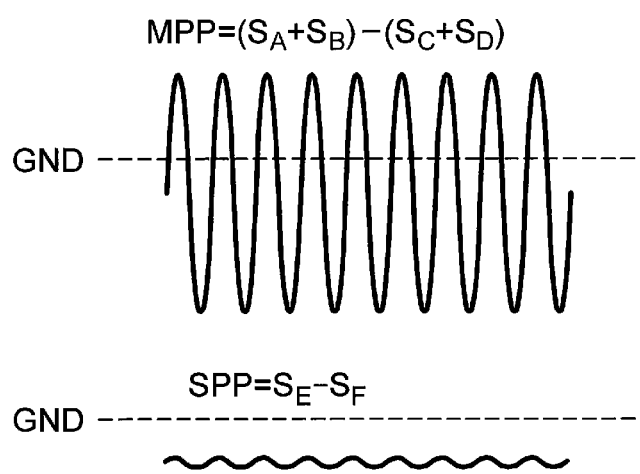
FIGS. 43(a), 43(b), and 43(c) are waveform diagrams illustrating the relation between objective lens shift and the MPP and SPP signal components of the tracking error signal in the eleventh embodiment.
Figure 43B:
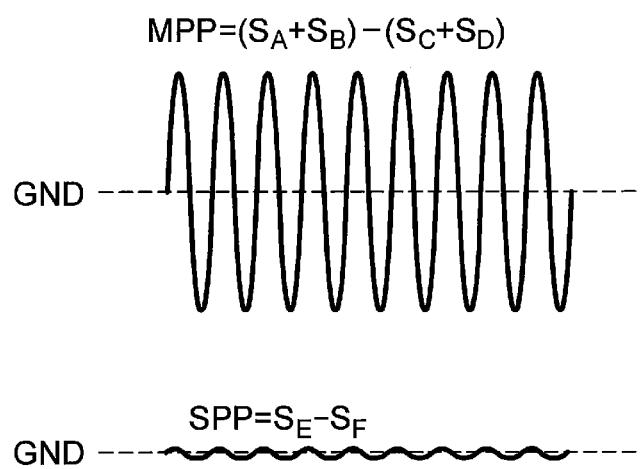
Figure 43C:
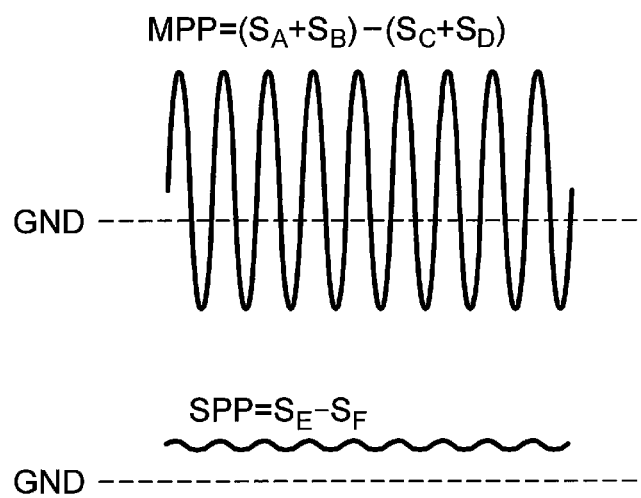

FIGS. 43(a) to 43(c) show waveform diagrams schematically illustrating the relation between objective lens shift and the signal components MPP, SPP of the tracking error signal TES. In FIGS. 43(a) to 43(c), the horizontal axis indicates time, and the vertical axis indicates signal intensity. FIGS. 43(a), 43(b), and 43(c) show the waveform of the main push-pull signal MPP and sub-push-pull signal SPP detected when the optical head device 3E has moved in the radial direction at a constant speed. These main push-pull signals MPP and sub-push-pull signals SPP are obtained when focus control of the optical disc device is performed but tracking control is not performed.

FIGS. 43(a), 43(b), and 43(c) correspond respectively to FIGS. 42(a), 42(b), and 42(c). If the objective lens 18 is on the light axis LA and is not displaced in the radial direction, the DC component (direct-current component) of the main push-pull signal MPP matches the GND level and the DC component of the sub-push-pull signal SPP also matches the GND level, as shown in FIG. 43(b). The sub-push-pull signal SPP has substantially a direct-current waveform. The reason is that the +1-order light components DRpa, DRpb and −1-order light components DRna, DRnb of the transmissively diffracted light beams contributing to the sub-push-pull signal SPP include none or only parts of light components ORp and ORn in FIG. 38 (the light components in which the zero-order light R0 and the ±1-order light RP1, RN1 of the reflectively diffracted light beam from the optical disc OD overlap). If the objective lens 18 is displaced toward the inner perimeter, the waveform of the DC component of the main push-pull signal MPP has a negative offset, and the substantially direct-current waveform of the sub-push-pull signal SPP also has a negative offset, as shown in FIG. 43(a). If the objective lens 18 is displaced toward the outer perimeter, the waveform of the DC component of the main push-pull signal MPP has a positive offset, and the substantially direct-current waveform of the sub-push-pull signal SPP also has a positive offset, as shown in FIG. 43(c). Therefore, the main push-pull signal MPP and sub-push-pull signal SPP have the same phase in relation to objective lens shift, and the offset of the sub-push-pull signal SPP has a value corresponding to the amount by which the objective lens 18 is displaced. Therefore, by deducting the value obtained by multiplying the value of the sub-push-pull signal SPP by k from the value of the main push-pull signal MPP, a tracking error signal TES in which the offset component arising from objective lens shift is cancelled out can be generated.

With a multilayer optical disc, spherical aberration of the light spot occurs separately for information recording layers L0 to L3. The aberration correction mechanism 16A provided in the optical head device 3E can correct the spherical aberration of the light spot of each information recording layer appropriately by displacing the collimator lens 15 along the light axis LA, and stable recording or reproduction can be performed on each information recording layer.

Figure 44:
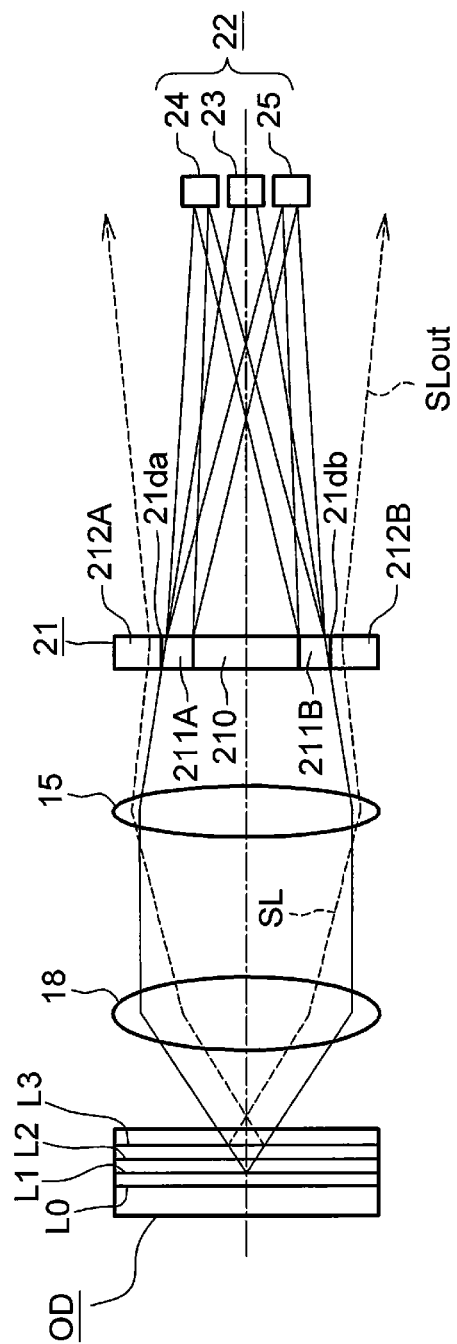
FIG. 44 is a schematic drawing of an optical head device including the hologram optical element in the eleventh embodiment.

FIG. 44 is a schematic drawing illustrating part of the configuration of an optical head device including the hologram optical element. If the information recording layer selected as the layer where information is reproduced or recorded is layer L1, stray light SL reflected by the other information recording layers (such as layer L3) includes a stray light component SLout which passes through the objective lens 18 and the collimator lens 15 in that order and is incident on the pair of peripheral diffraction regions 212A, 212B located outward of the two boundary lines 21da, 21db of the hologram optical element 21. The characteristics of the peripheral diffraction regions 212A, 212B, including their diffraction efficiency and diffraction directions, are optimized so that after passage through the peripheral diffraction regions 212A, 212B the stray light component SLout is diffracted in a direction other than the direction toward the photodetector 22.

In the description given so far, the first secondary light-receiving section 24 and second secondary light-receiving section 25 in the photodetector 22 are spaced apart from the main light-receiving section 23 so that stray light originating from layers adjacent to the information recording layer selected as the layer where information is reproduced or recorded in the multilayer optical disc is not incident on the first secondary light-receiving section 24 or second secondary light-receiving section 25. As described above, the light intensity of stray light depends on the optical design specifications of the optical head device 3E and the spacing between the information recording layers of the multilayer optical disc. In an actual BD optical disc, as shown in FIG. 40, the spacing between layers varies. Layer L2 is adjacent to both layers L1 and L3, but is closer to layer L3, so stray light originating in layer L3 requires special consideration.

FIGS. 45(a) to 45(d) show plan views schematically illustrating different distributions of stray light on the photodetector 22 in this embodiment. As stray light conditions when the information recording layer selected as the layer where information is reproduced or recorded is layer L2, FIG. 45(a) illustrates the distribution of stray light SL0 generated in layer L0, FIG. 45(b) illustrates the distribution of stray light SL1 generated in layer L1, FIG. 45(c) illustrates the distribution of the zero-order light component DR0 of the returning light beam from layer L2, and FIG. 45(d) illustrates the distribution of stray light SL3 generated in layer L3. The stray light components SL0, SL2, SL3 are defocused and are widely spread on the light-receiving surface of the main light-receiving section 23, having obliquely elliptical distributions as shown in FIGS. 45(a), 45(b), 45(d). This is an effect of passage through the cylindrical lens 26; the inclination of the ellipse depends on the direction D2 of the generator of the cylindrical lens 26. Here, since the information recording layer is layer L2, the stray light components SL1, SL3 respectively generated in the adjacent layers L1, L3 are more convergent than the stray light SL0 generated in layer L0. Further, since the spacing between layers L2 and L3 is smallest in a BD optical disc, as shown in FIG. 40, the stray light SL3 generated in layer L3 is more convergent than the stray light SL1 generated in layer L1. Therefore, the separation between the centrally located main light-receiving section 23 and the first secondary light-receiving section 24 and second secondary light-receiving section 25 is selected so as to prevent all of the stray light SL3 generated in layer L3, adjacent to the information recording layer L2, from being incident on the first secondary light-receiving section 24 and second secondary light-receiving section 25. In this configuration, although part of the stray light SL1 generated in layer L1, adjacent to the information recording layer L2, is incident on the first secondary light-receiving section 24 and second secondary light-receiving section 25, the wider spacing between layers L1 and L2 causes stray light SL1 to have a lesser degree of convergence, such that the light intensity of the stray light SL1 that is incident on the first secondary light-receiving section 24 and second secondary light-receiving section 25 is too weak to affect the quality of the tracking error signal. The same holds for the stray light SL0 generated in layer L0: the degree of convergence is reduced still further; the light intensity of stray light SL0 is too weak to affect the quality of the tracking error signal.

FIGS. 46(a) to 46(d) show plan views schematically illustrating the distribution of stray light on the photodetector 22 when the information recording layer selected as the layer where information is reproduced or recorded is layer L3. FIG. 46(a) illustrates the distribution of the stray light SL0 generated in layer L0, FIG. 46(b) illustrates the distribution of the stray light SL1 generated in layer L1, FIG. 46(c) illustrates the distribution of the stray light SL2 generated in layer L2, and FIG. 46(d) illustrates the distribution of the zero-order light component DR0 of the returning light beam from layer L3, respectively. Based on the spacing between layers shown in FIG. 40, the degree of convergence of the stray light components SL2, SL1, SL0 decreases in that order. Since the spacing between layers L2 and L3 is the narrowest, none of the stray light L2 generated in layer L2 is incident on the first secondary light-receiving section 24 and second secondary light-receiving section 25, as shown in FIGS. 41(a) to 41(d). Although part of the stray light SL1 generated in layer L1 is incident on the first secondary light-receiving section 24 and second secondary light-receiving section 25, because of the wider spacing between layers L1 and L3, stray light SL1 does not converge greatly, and the light intensity of the stray light SL1 that is incident on the first secondary light-receiving section 24 and second secondary light-receiving section 25 is therefore too weak to affect the quality of the tracking error signal. The same applies to the stray light SL0 generated in layer L0: the degree of convergence is reduced further; the light intensity of stray light SL0 is too weak to affect the quality of the tracking error signal.

As described above, in a multilayer optical disc, stray light from other information recording layers affects the tracking error signal TES with respect to the information recording layer selected as the layer where information is reproduced or recorded because light reflected from the information recording layers other than the selected information recording layer and light reflected from the selected information recording layer interfere with each other on the surface of the photodetector 22. The +1-order light components DRpa, DRpb formed on the first secondary light-receiving section 24 and the −1-order light components DRna, DRnb formed on the second secondary light-receiving section 25 are light beams diffracted by the pair of secondary diffraction regions 211A, 211B of the hologram optical element 21. The secondary diffraction regions 211A, 211B are formed in positions such that none or only part of light components ORp and ORn are incident. If it is desired to increase the light intensity of these first-order light components, the areas of the secondary diffraction regions 211A and 211B may be enlarged by moving the boundary lines 21ea, 21eb toward the primary diffraction region 210 in the $Y_2$-axis direction to allow greater incidence of light components ORp and ORn. If there is no definite need to increase the light intensity of these first-order light components, the areas of the secondary diffraction regions 211A, 211B may be reduced by moving the boundary lines 21ea, 21eb away from the primary diffraction region 210 in the $Y_2$-axis direction to prevent light components ORp and ORn from being incident on the secondary diffraction regions 211A, 211B at all. In that case, the sub-push-pull signal SPP shown in FIGS. 43(a) to 43(c) includes only a DC component. These alignments of the secondary diffraction regions 211A, 211B depend on the optical design specifications of the optical head device 3E, the areas of the light-receiving sections 23, 24, 25, and the spacing between the information recording layers in the multilayer optical disc and should be optimized appropriately.

Figure 47:
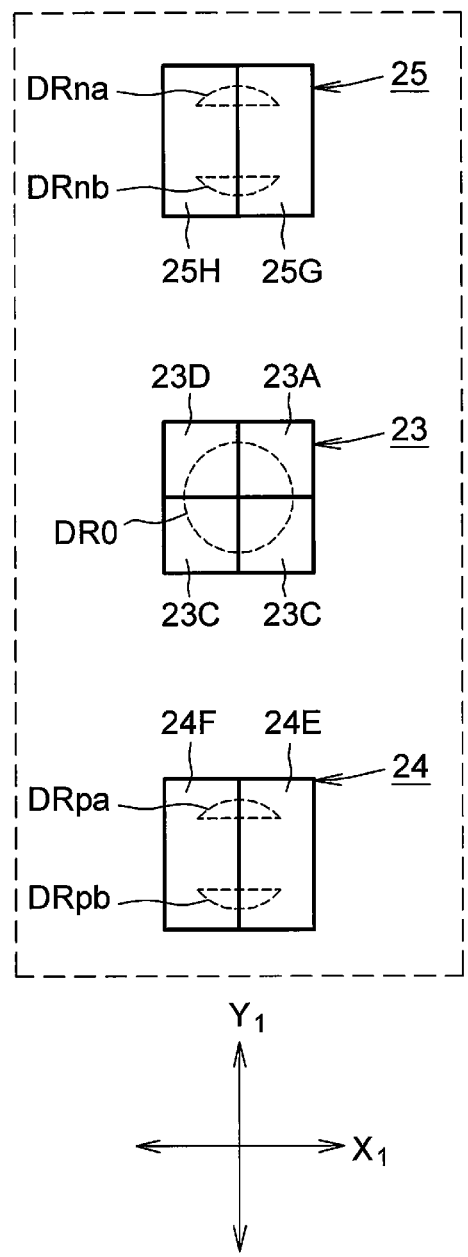
FIG. 47 is a plan view representing another layout of the photodetector in the eleventh embodiment.
Figure 48:
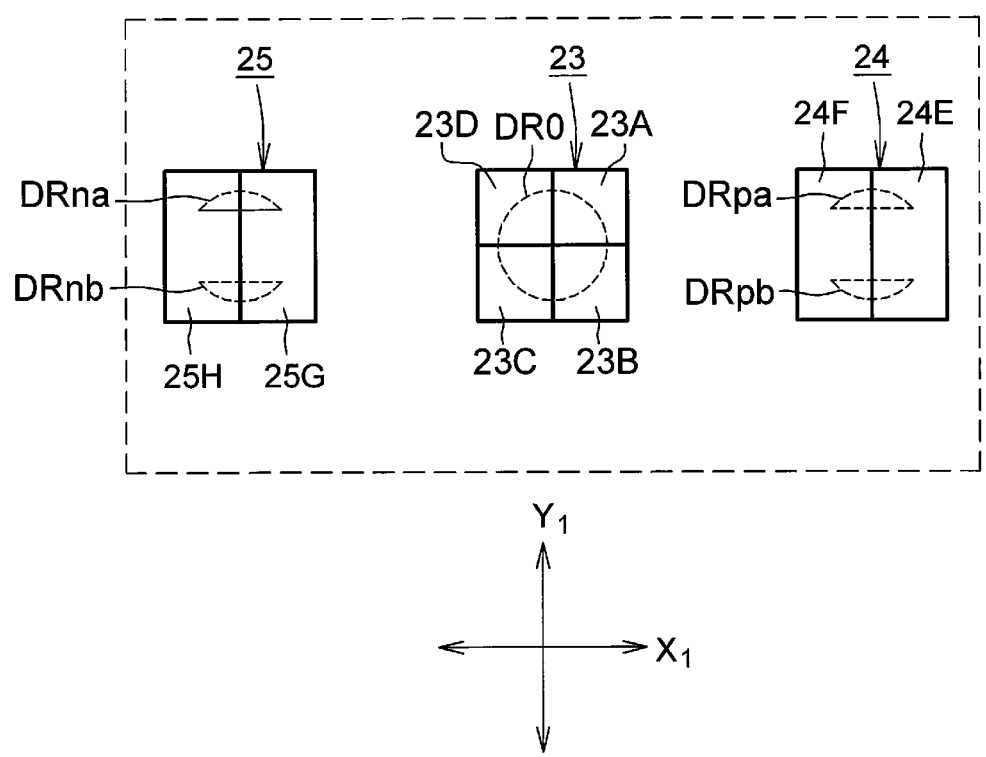
FIG. 48 is a plan view representing another layout of the photodetector in the eleventh embodiment.

In this embodiment, the first secondary light-receiving section 24 and second secondary light-receiving section 25 are disposed on opposite sides of the main light-receiving section 23 in an oblique direction with respect to the $X_1$ axis, but this arrangement is non-limiting. FIG. 47 is a plan view representing another layout of the photodetector 22. As shown in FIG. 47, the main light-receiving section 23 may be aligned with the first secondary light-receiving section 24 and second secondary light-receiving section 25 in a line extending in the $Y_1$-axis direction corresponding to the tangential direction (Y-axis direction). FIG. 48 is a plan view representing another layout of the photodetector 22. As shown in FIG. 48, the main light-receiving section 23 may be aligned with the first secondary light-receiving section 24 and second secondary light-receiving section 25 in a line extending in the $X_1$-axis direction corresponding to the radial direction (X-axis direction).

Even if the positions of the first secondary light-receiving section 24 and second secondary light-receiving section 25 are changed as shown in FIG. 47 or 48, the +1-order light components DRpa, DRpb and −1-order light components DRna, DRnb can be made to illuminate the first secondary light-receiving section 24 and second secondary light-receiving section 25, respectively, by changing the direction of the diffraction grating grooves of the pair of secondary diffraction regions 211A, 211B of the hologram optical element 21 in accordance with the changed positions, thereby changing the main exiting directions of the diffracted light.

In this embodiment, the first secondary light-receiving section 24 and second secondary light-receiving section 25 have two light-receiving surfaces, but they may have four light-receiving surfaces, as does the main light-receiving section 23, or may have another light-receiving surface pattern. The sizes of the light-receiving surfaces of the main light-receiving section 23, first secondary light-receiving section 24, and second secondary light-receiving section 25 may differ.

As described above, the hologram optical element 21 in this embodiment includes a primary diffraction region 210 on which the ±1-order light components ORp, ORn and part of the zero-order light component ORa of the reflectively diffracted light beam are incident and secondary diffraction regions 211A, 211B on which none or only parts of the ±1-order light components ORp, ORn of the reflectively diffracted light beam are incident and the remaining part of the zero-order light component ORa is incident. The photodetector 22 includes a main light-receiving section 23 for receiving the zero-order light component DR0 of the transmissively diffracted light beam that has passed through the primary diffraction region 210 and the secondary diffraction regions 211A, 211B, a first secondary light-receiving section 24 for receiving the +1-order light components DRpa, DRpb of the transmissively diffracted light beams that have passed through the secondary diffraction regions 211A, 211B, and a second secondary light-receiving section 25 for receiving the −1-order light components DRna, DRnb. Therefore, a sufficient signal intensity can be ensured, and a tracking error signal TES in which the offset component arising from objective lens shift is cancelled out can be generated.

Furthermore, in this embodiment, the photodetector 22 is configured to prevent stray light from layers adjacent to the information recording layer selected as the layer where information is reproduced or recorded, or from the layer with the closest spacing thereto, in a multilayer optical disc, from illuminating the first secondary light-receiving section 24 and second secondary light-receiving section 25, as shown in FIGS. 41(a) to 41(d). Since signals due to unnecessary stray light components are not detected, the quality of the tracking error signal TES can be improved.

As described above, according to the optical head device of this embodiment, a signal component corresponding to the offset attributable to objective lens shift can be generated from signals detected by the secondary light-receiving sections, and by use of this signal component, a tracking error signal in which the offset component has been cancelled out can be generated. As a result, in a multilayer optical disc, the influence of stray light from information recording layers other than the information recording layer selected as the layer where information is reproduced or recorded can be eliminated without decreasing the intensity of light illuminating the optical disc, and a tracking error signal in which the offset component arising from objective lens shift is cancelled out can be detected. This signal can be detected by using a photodetector having a simple light-receiving surface pattern.

Twelfth Embodiment

Figure 49:
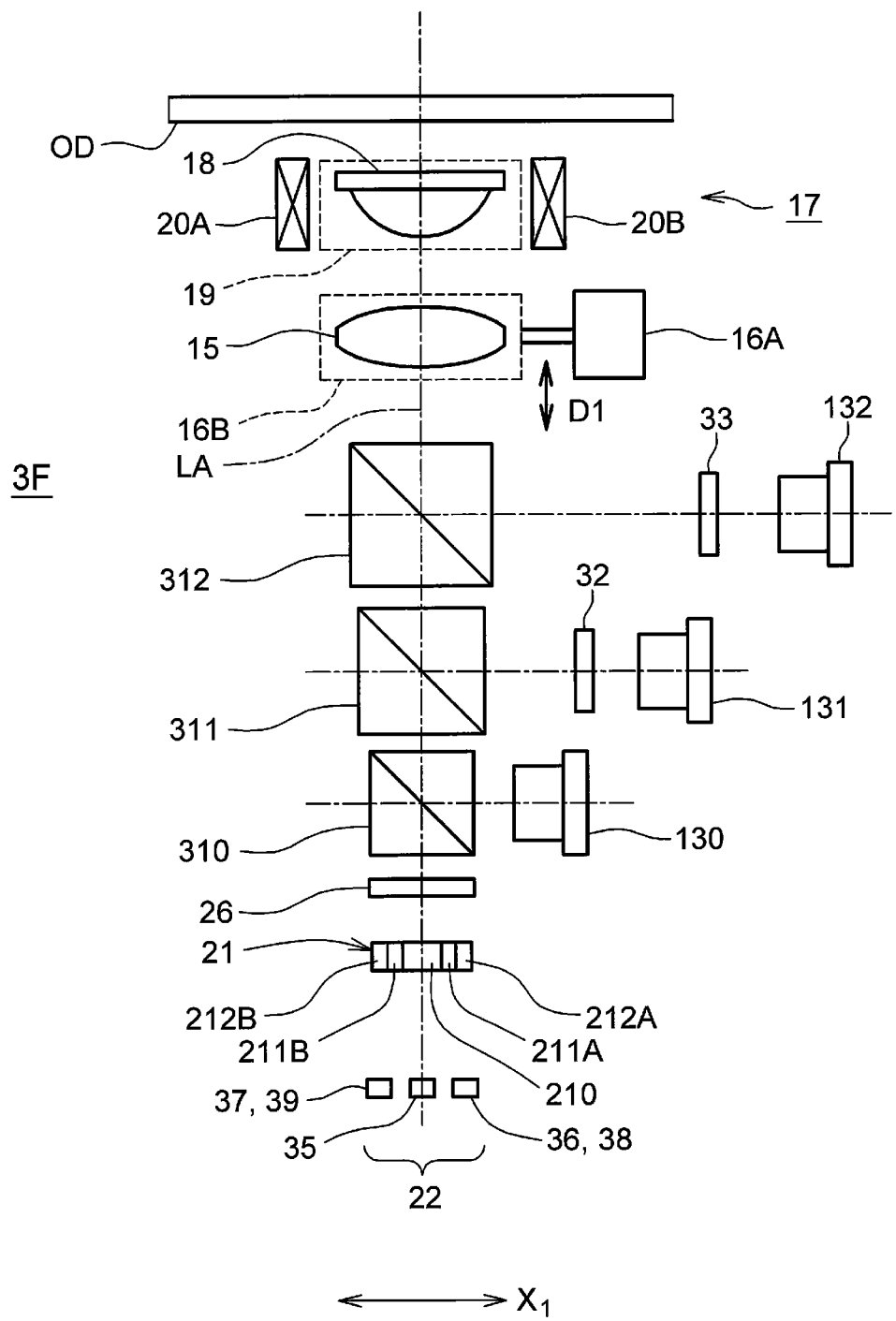
FIG. 49 is a perspective view schematically showing the configuration of the optical head device according to a twelfth embodiment.

A twelfth embodiment of the present invention will now be described. The configuration of the optical head device according to this embodiment is the same as the configuration of the optical head device in the eleventh embodiment, except that it includes a plurality of light sources. FIG. 49 is a plan view schematically showing the main elements in the configuration of the optical head device 3F in the present embodiment. The optical head device 3F of this embodiment shown in FIG. 49 supports, for example, three standards currently in use: BD (Blu-ray Disc), DVD (Digital Versatile Disc), and CD (Compact Disc). Multilayer BD optical discs having up to four layers have been standardized as described earlier. A dual-layer optical disc has been standardized as a multilayer DVD. Only single-layer CD optical discs have been standardized. Therefore, the optical head device 3F supporting these three standards must be designed to prevent stray light reflected by another information recording layer from being detected by the photodetector and degrading the quality of the differential push-pull signal of the present invention when applied to a multilayer BD optical disc.

As shown in FIG. 49, the optical head device 3F in this embodiment includes three semiconductor lasers 130, 131, 132. The first semiconductor laser 130, collimator lens 15, objective lens 18, actuator 17, cylindrical lens 26, and hologram optical element 21 shown in FIG. 49 are respectively the same as the semiconductor laser 13, collimator lens 15, objective lens 18, actuator 17, cylindrical lens 26, and hologram optical element 21 shown in FIG. 37. The photodetector 34 has five light-receiving sections, which will be described later.

FIGS. 50(a) and 50(b) show perspective views of the hologram optical element 21 and photodetector 34 in the twelfth embodiment. The hologram optical element 21 shown in FIG. 50(a) is the same as the hologram optical element shown in FIGS. 39(a) and 39(b). The photodetector 34 shown in FIG. 50(b) includes a main light-receiving section 35 having light-receiving surfaces 35A to 35D orthogonal to the light axis LA, a first secondary light-receiving section 36 and a second secondary light-receiving section 37 disposed on opposite sides of the main light-receiving section 35 in an oblique direction with respect to the $X_1$ axis, and a third secondary light-receiving section 38 and a fourth secondary light-receiving section 39 disposed on opposite sides of the main light-receiving section 35 along the $X_1$ axis, in the plane of the photodetector 34, which is substantially parallel to the hologram optical element 21. The first secondary light-receiving section 36 and second secondary light-receiving section 37 are spaced apart from the main light-receiving section 35 by distances such that they do not receive stray light generated in the layer most narrowly spaced from, or the layer adjacent to, the information recording layer selected as the layer where information is reproduced or recorded.

The main light-receiving section 35 includes a plurality of light-receiving surfaces 35A, 35B, 35C, 35D arranged in a matrix substantially aligned in the $X_1$-axis and $Y_1$-axis directions. The pair of light-receiving surfaces 35A, 35B and the pair of light-receiving surfaces 35C, 35D are substantially aligned in the $X_1$-axis direction, light-receiving surfaces 35A, 35B being substantially aligned in the $Y_1$-axis direction and light-receiving surfaces 35C, 35D also being substantially aligned in the $Y_1$-axis direction. That is, the main light-receiving section 35 has four rectangular light-receiving surfaces formed by dual partitioning in longitudinal and transverse directions, although the directions of partitioning need not be precisely aligned in the $X_1$-axis direction and $Y_1$-axis direction. The first secondary light-receiving section 36 includes a pair of light-receiving surfaces 36E, 36F substantially aligned in the $X_1$-axis direction; the second secondary light-receiving section 37 includes a pair of light-receiving surfaces 37G, 37H substantially aligned in the $X_1$-axis direction; the third secondary light-receiving section 38 includes a pair of light-receiving surfaces 38I, 38J substantially aligned in the $X_1$-axis direction; the fourth secondary light-receiving section 39 includes a pair of light-receiving surfaces 39K, 39L substantially aligned in the $X_1$-axis direction.

Laser light emitted from the first semiconductor laser 130 is reflected by the first beam splitter 310, which is aligned on the light axis LA, and is incident on the objective lens 18 through the second beam splitter 311 and third beam splitter 312, which will be described later, and the collimator lens 15. The returning light beam reflected by the optical disc OD is incident on the hologram optical element 21 after successive passage through the objective lens 18, collimator lens 15, third beam splitter 312, second beam splitter 311, first beam splitter 310, and cylindrical lens 26, and is split into a plurality of transmissively diffracted light beams, which are incident on the main light-receiving section 35, first secondary light-receiving section 36, and second secondary light-receiving section 37 of the photodetector 34. Laser light emitted from the second semiconductor laser 131 passes through a diffraction grating 32, is reflected by the second beam splitter 311, which is disposed between the first beam splitter 310 and the collimator lens 15, and is incident on the objective lens 18 through the third beam splitter 312 and collimator lens 15. The returning light beam reflected by the optical disc OD is incident on the main light-receiving section 35, third secondary light-receiving section 38, and fourth secondary light-receiving section 39 of the photodetector 34 after successive passage through the objective lens 18, collimator lens 15, third beam splitter 312, second beam splitter 311, first beam splitter 310, cylindrical lens 26, and hologram optical element 21. Laser light emitted from the third semiconductor laser 132 passes through a diffraction grating 33, is reflected by the third beam splitter 312, which is disposed between the first beam splitter 310 and the collimator lens 15, and is incident on the objective lens 18 through the collimator lens 15. The returning light beam reflected by the optical disc OD is directed toward the main light-receiving section 35, third secondary light-receiving section 38, and fourth secondary light-receiving section 39 of the photodetector 34 after successive passage through the objective lens 18, collimator lens 15, third beam splitter 312, second beam splitter 311, first beam splitter 310, cylindrical lens 26, and hologram optical element 21.

In the optical head device 3F shown in FIG. 49, the first semiconductor laser 130 is adapted to the BD standard and has a lasing wavelength in the vicinity of 408 nm. The second semiconductor laser 131 is adapted to the DVD standard and has a lasing wavelength in the vicinity of 655 nm. The third semiconductor laser 132 is adapted to the CD standard and has a lasing wavelength in the vicinity of 785 nm. The objective lens 18 operates at these three wavelengths, for example, having a numerical aperture in the vicinity of 0.85 for laser light having a wavelength of 408 nm for a BD optical disc, a numerical aperture in the vicinity of 0.6 to 0.65 for laser light having a wavelength of 655 nm for a DVD optical disc, and a numerical aperture in the vicinity of 0.5 for laser light having a wavelength of 785 nm for a CD optical disc. The collimator lens 15, cylindrical lens 26, and photodetector 34 maintain their respective functions at these three wavelengths. As the optical disc OD, optical discs compatible with the BD, DVD, and CD standards are mounted from time to time. Diffraction grating 32 forms three light spots on the surface of the optical disc OD to perform tracking error detection on a DVD by the three-beam differential push-pull method. Diffraction grating 33 forms three light spots on the surface of the optical disc OD to perform tracking error detection on a CD by the three-beam differential push-pull method.

In the optical head device 3F shown in FIG. 49, the behavior of the light beam emitted from the semiconductor laser 131 adapted to the BD standard is the same as in the eleventh embodiment. The behavior of the light beam emitted from the semiconductor laser 132 adapted to the DVD standard and the behavior of the light beam emitted from the semiconductor laser 133 adapted to the CD standard differ from the behavior of the light beam emitted from the semiconductor laser 131 adapted to the BD standard because a diffraction grating is disposed in the optical path between the semiconductor laser and the hologram optical element.

Figure 51:
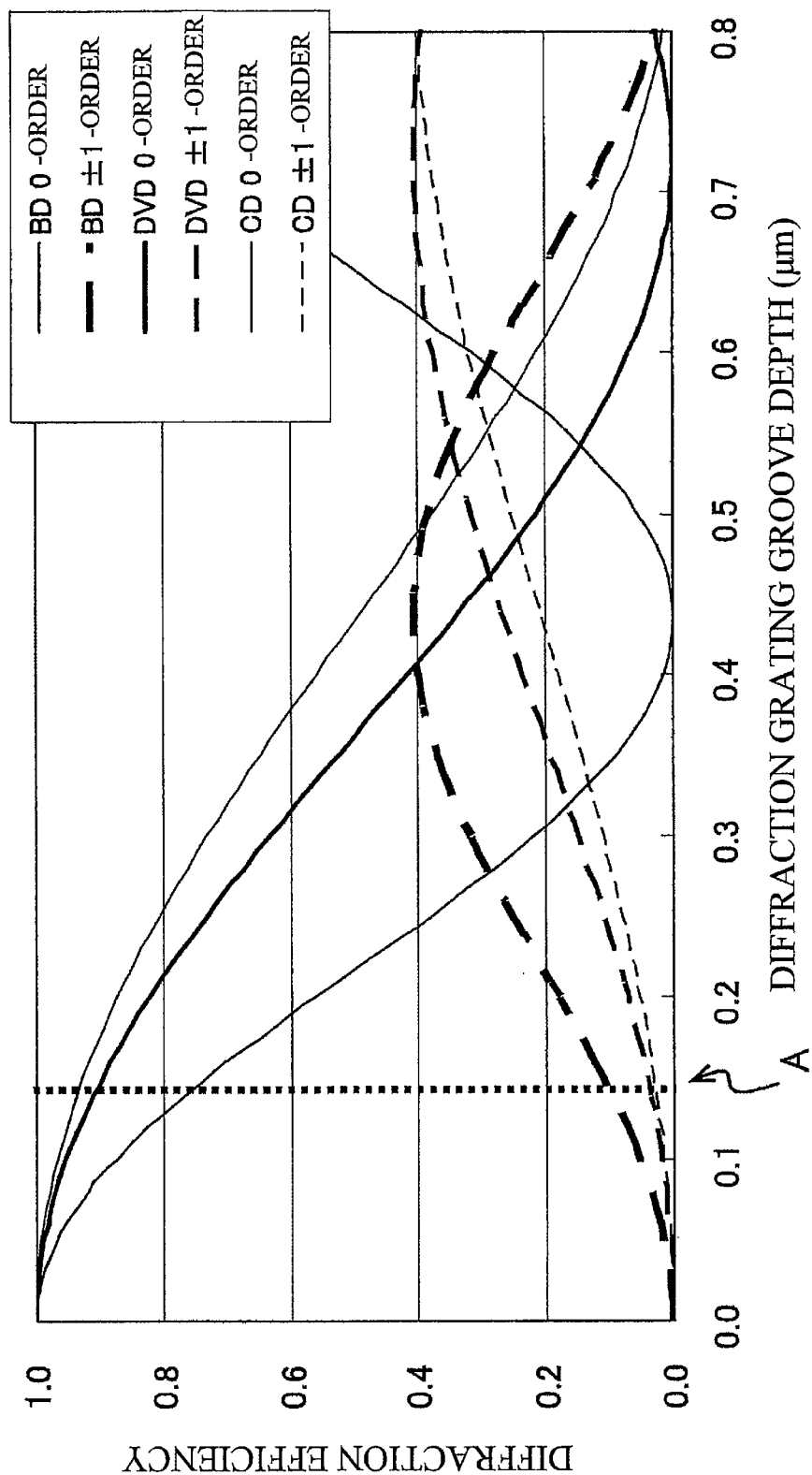
FIG. 51 is a graph showing the relation between the groove depth of the diffraction grating of the hologram optical element and diffraction efficiency in the twelfth embodiment.

FIG. 51 is a graph showing the relation between the groove depth D of the diffraction grating of the hologram optical element 21 and diffraction efficiency in this embodiment. The illustrated diffraction efficiencies were calculated by specifying silica glass as the material of the hologram optical element 21 and using the refractive index corresponding to the lasing wavelength of each semiconductor laser. The material of the hologram optical element 21 is not limited to silica glass, however. The shape of the hologram optical element 21 has a binary structure, which is the most basic shape. In this structure, convex parts and concave parts of the grating have equal width and are formed periodically. If the ratio of the zero-order diffraction efficiency to the +1-order diffraction efficiency and the ratio of the zero-order diffraction efficiency to the −1-order diffraction efficiency are both set to 8:1 as the diffraction efficiency settings in the BD standard, the groove depth of the diffraction grating satisfying this condition is about 0.14 micrometers, as indicated by line A in FIG. 51. The characteristic curves that cross line A in FIG. 51 indicate the following: when the light beam emitted from the second semiconductor laser 131 adapted to the DVD standard passes through the hologram optical element 21 formed with this diffraction grating groove depth of 0.14 micrometers, the ratio of the zero-order diffraction efficiency to the +1-order diffraction efficiency becomes about 25:1, and the ratio of the zero-order diffraction efficiency to −1-order diffraction efficiency also becomes about 25:1; the ±1-order transmissively diffracted light beam is negligibly small at the wavelength in the DVD standard. When the light beam emitted from the third semiconductor laser 132 adapted to the CD standard passes through, the ratio of the zero-order diffraction efficiency to the +1-order diffraction efficiency becomes about 37:1, and the ratio of the zero-order diffraction efficiency to the −1-order diffraction efficiency also becomes about 37:1; the ±1-order transmissively diffracted light beam is negligibly small at the wavelength in the CD standard. Therefore, at the lasing wavelength of the semiconductor laser in the DVD standard or CD standard, the hologram optical element 21 can be approximately treated as a simple transparent plate with no diffractive function.

Figure 50:
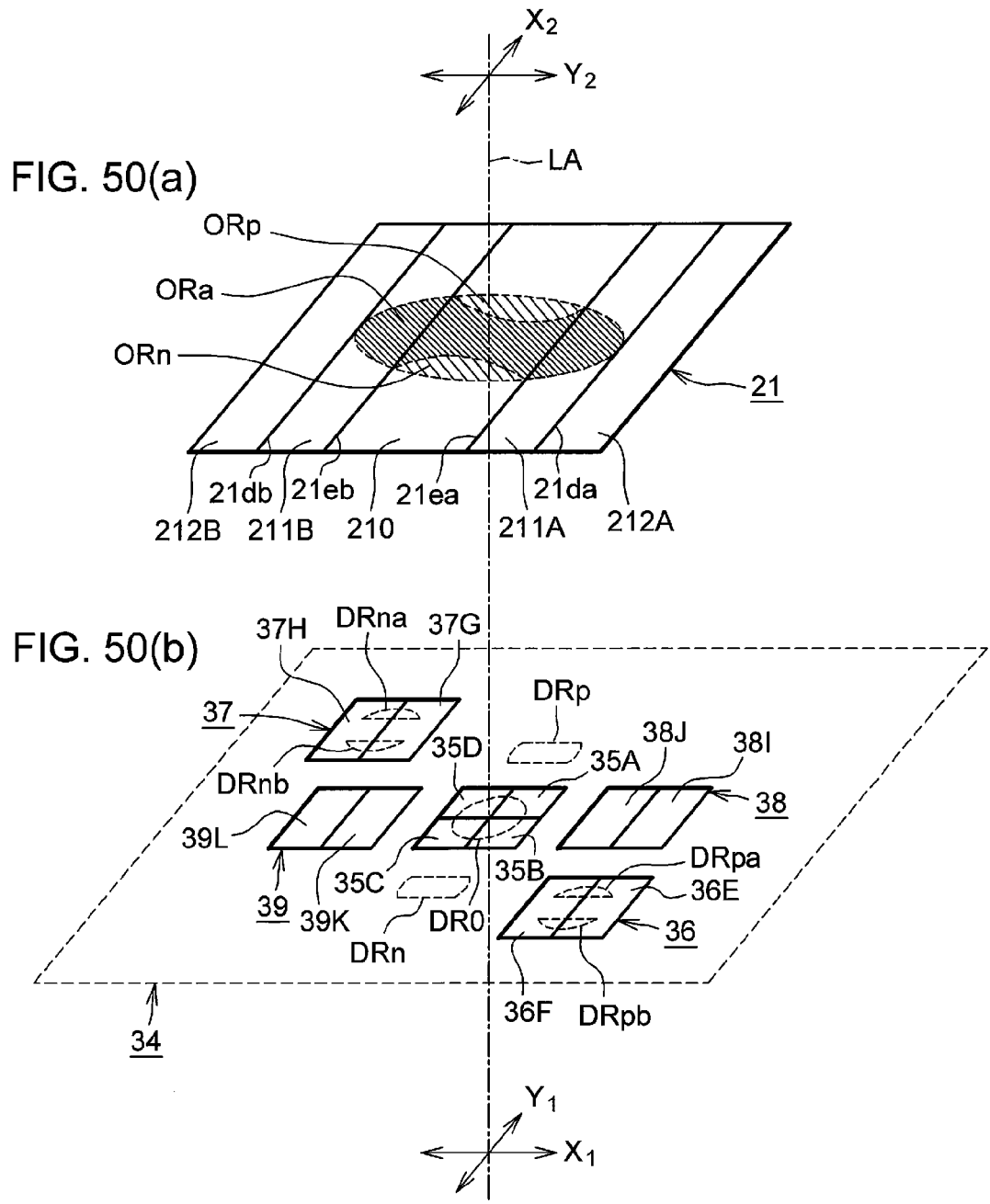
FIGS. 50(a) and 50(b) are perspective views of the hologram optical element and photodetector in the twelfth embodiment.

FIG. 50(*b*) shows the reflectively diffracted light beam incident on the hologram optical element and the transmissively diffracted light beam incident on the photodetector when the first semiconductor laser is operating. Operation when the light beams transmissively diffracted by the diffraction regions 210, 211A, 211B of the hologram optical element 21 are incident on the light-receiving surfaces 35A to 35D of the main light-receiving section 35, the light-receiving surfaces 36E, 36F of the first secondary light-receiving section 36, and the light-receiving surfaces 37G, 37H of the second secondary light-receiving section 37 in the photodetector 34 is the same as described with reference to FIGS. 39(*a*) and 39(*b*) in the eleventh embodiment.

FIGS. 52(*a*) and 52(*b*) show perspective views of the hologram optical element and photodetector when the second or third semiconductor laser is operating in this embodiment. Light component OS, which is included in the reflectively diffracted light beam incident on the hologram optical element, is a returning light spot, returning from the optical disc OD, of the main light beam among the three light beams split by diffraction grating 32 or 33 for performing detection by the three-beam differential push-pull method. Similarly, light components OSp and OSn are returning light spots, returning from the optical disc OD, of the two sub-beams among the three light beams split by diffraction grating 32 or 33. Since the numerical aperture of the objective lenses 18 that function for the lasing wavelength of the second semiconductor laser 131 adapted to the DVD standard and the lasing wavelength of the third semiconductor laser 132 adapted to the CD standard is smaller than the numerical aperture of the objective lens 18 that functions for the lasing wavelength of the first semiconductor laser 130 adapted to the BD standard, the diameter of the returning light beam returning to the hologram optical element 21 is reduced in proportion to the numerical aperture. The specifications of the diffraction gratings 32, 33, such as the spacing of the diffraction grating grooves, are optimized so that the sub light spots DSp and DSn used for detection by the three-beam differential push-pull method illuminate the central positions of the third secondary light-receiving section 38 and fourth secondary light-receiving section 39, respectively, in this embodiment.

The signals used with the DVD or CD optical discs are obtained from the equations below. The focus error signal FES is obtained from the following equation (28).

$$FES=(S_A+S_C)-(S_B+S_D) \tag{28}$$

The reproduced RF signal is obtained from the following equation (29).

$$RF=S_A+S_B+S_C+S_D \tag{29}$$

The tracking error signal TES is obtained from the following equation (30).

$$TES=MPP \times k \times SPP \tag{30}$$

Here, k is a gain coefficient. MPP represents the main push-pull signal, and SPP represents the sub-push-pull signal. The main push-pull signal MPP and sub-push-pull signal SPP are given by the following equations (31a, 31b). The light-receiving surfaces 38I, 38J of the third secondary light-receiving section 38 output respective detection signals $S_I$, $S_J$ by photoelectric conversion (photocurrent-voltage conversion) of the +1-order light component DSp. The light-receiving surfaces 39K, 39L of the fourth secondary light-receiving section 39 output respective detection signals $S_K$, $S_L$ by photoelectric conversion of the −1-order light components DSn.

$$MPP=(S_A+S_B)-(S_C+S_D) \tag{31a}$$

$$SPP=(S_I-S_J)+(S_K-S_L) \tag{31b}$$

As described in the eleventh embodiment, in the light beam from the first semiconductor laser 130 adapted to the BD standard, the sub-push-pull signal SPP is given by equation (27b). Accordingly, in the optical head device in the present embodiment, when the first semiconductor laser 130 adapted to the BD standard is used, the sub-push-pull signal SPP given by equation (27b) must be used, and when the second semiconductor laser 131 adapted to the DVD standard or the third semiconductor laser 132 adapted to the CD standard is used, the sub-push-pull signal SPP given by equation (31b) must be used. The specifications of the optical disc OD differ depending on these standards, and the optical characteristics of the semiconductor laser differ depend on the standard to which it is adapted, so the gain coefficient k is set to the optimum value corresponding to each of these standards.

In the description given above, tracking control is performed by the three-beam differential push-pull method for both DVD and CD, but this is not a limitation; the light-receiving surface pattern of the photodetector may be optimized for whatever tracking error detection method is adopted.

In the description given above, the first to fourth secondary light-receiving sections have two light-receiving surfaces, but they may have four light-receiving surfaces, as does the main light-receiving section 35, or may have another light-receiving surface pattern. The main light-receiving section 35 and the first to fourth secondary light-receiving sections may also have light-receiving surfaces of different sizes.

In the description given above, the first secondary light-receiving section 36 and second secondary light-receiving section 37 are disposed on opposite sides of the main light-receiving section 35 in an oblique direction with respect to the $X_1$ axis, but the oblique direction is not a limitation, provided they are sufficiently separated from the main light-receiving section 35 to prevent incidence of stray light generated in the layer most narrowly spaced from or the layer adjacent to the selected information recording layer. As described in the eleventh embodiment, they may be aligned in a direction (the $Y_1$-axis direction) corresponding to the tangential direction, as shown in FIG. 47, or in a direction (the $X_1$-axis direction) corresponding to the radial direction, as shown in FIG. 48.

In the description of the optical head device 3F in this embodiment given above, the first semiconductor laser 130 is adapted to the BD standard, the second semiconductor laser 131 is adapted to the DVD standard, and the third semiconductor laser 132 is adapted to the CD standard, but this is not a limitation; components adapted to next-generation standards, for example, may also be included. Although the optical head device given as an example is configured to support three standards, the optical head device may be configured to support two standards or four or more standards.

Although the optical system in this embodiment is configured with the semiconductor laser 130 adapted to the BD standard, the semiconductor laser 131 adapted to the DVD standard, and the semiconductor laser 132 adapted to the CD standard arranged in this order as shown in FIG. 49, the optical system may be configured so that they are arranged in a different order.

In the optical head device 3F in this embodiment, the objective lens 18 has specifications compatible with a plurality of standards and can be used with semiconductor lasers having different lasing wavelengths. It is contemplated, however, that the objective lens may not be able to support the lasing wavelengths of all standards. In that case, a plurality of objective lenses adapted to lasing wavelengths of respective standards may be disposed on the movable section 19, and the objective lens adapted to the standard of the intended optical disc may be used selectively. The means for selecting the objective lens may be configured to move the desired objective lens onto the light axis LA. Alternatively, an optical element such as a beam splitter, for example, may be disposed in a position in front of or behind the collimator lens 15 to split the light axis, and objective lenses adapted to different standards may be disposed on the respective split light axes. The plurality of objective lenses may be spaced apart on a radial line of the optical disc OD. Alternatively, one objective lens may be disposed on a radial line of the optical disc OD, and the other objective lens or lenses may be spaced apart from the radial line of the optical disc OD in the tangential direction.

As described above, according to the optical head device 3F of this embodiment, a signal component corresponding to the offset attributable to objective lens shift can be generated from signals detected by the secondary light-receiving sections, and by use of this signal component, a tracking error signal in which the offset component has been cancelled out can be generated. As a result, in a multilayer optical disc, the influence of stray light from information recording layers other than the information recording layer selected as the layer where information is reproduced or recorded can be eliminated without decreasing the intensity of light illuminating the optical disc, and a tracking error signal in which the offset component arising from objective lens shift has been cancelled out can be detected. This signal can be detected by using a photodetector having a simple light-receiving surface pattern.

Although the optical head device 3F in this embodiment includes a plurality of semiconductor lasers 130, 131, 132 having different wavelengths corresponding to a plurality of optical disc standards, as shown in FIG. 49, there are only one hologram optical element 21 and one photodetector 34. An optical head device having a simple configuration can accordingly support optical discs of plural standards and optical discs for which a multilayer structure is defined.

Thirteenth Embodiment

Figure 53:
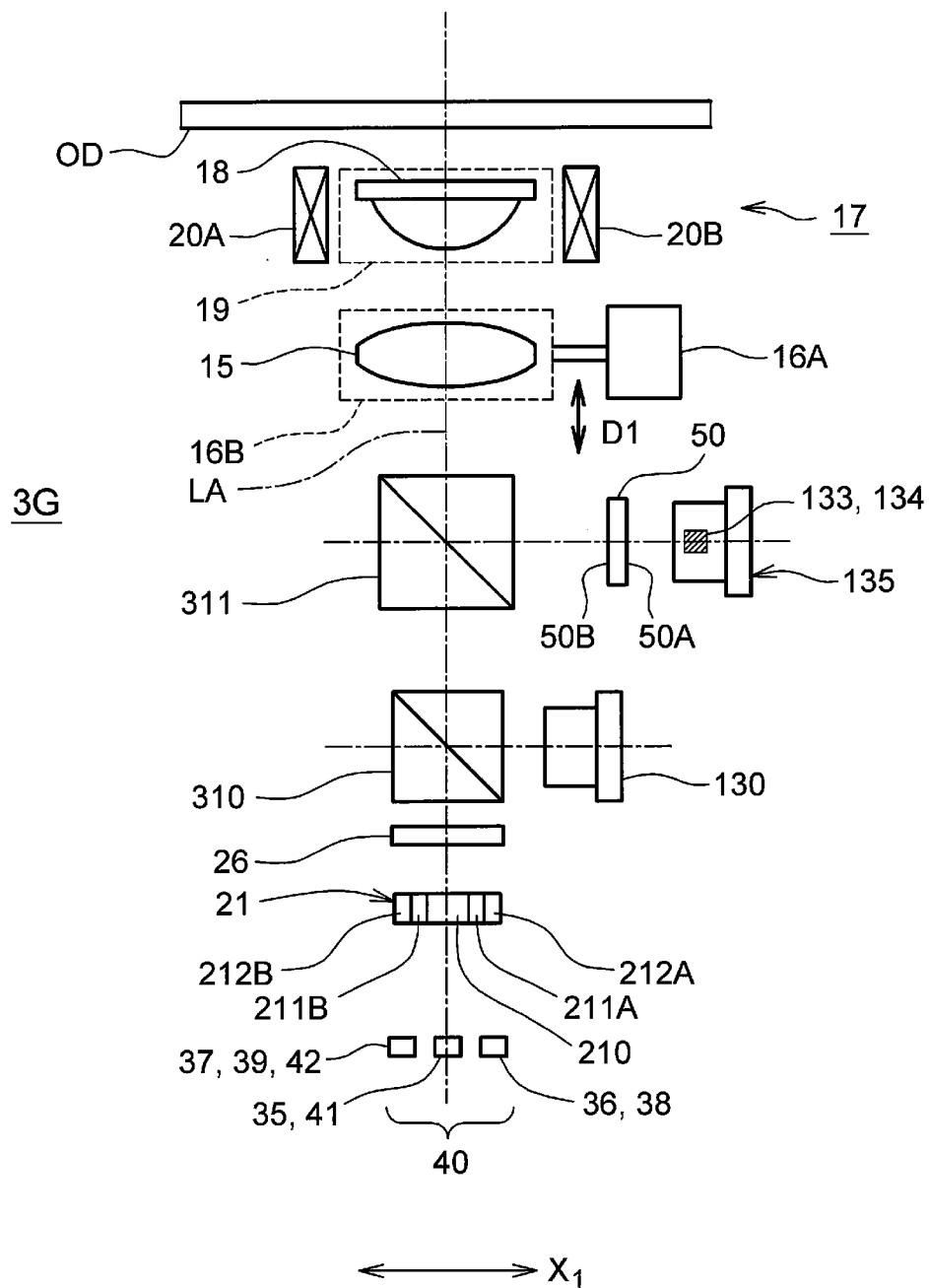
FIG. 53 is a plan view schematically showing the configuration of the optical head device according to a thirteenth embodiment.

A thirteenth embodiment according to the present invention will now be described. The configuration of the optical head device in this embodiment is the same as the configuration of the optical head device 3F in the twelfth embodiment except that a single semiconductor laser package housing a plurality of semiconductor laser devices is used and a photodetector corresponding to the plurality of semiconductor laser devices is used. FIG. 53 is a plan view schematically showing the main elements in the configuration of an optical head device 3G in the present embodiment. FIG. 53 shows an optical head device 3G that supports, for example, three currently used standards: BD (Blu-ray Disc), DVD (Digital Versatile Disc), and CD (Compact Disc).

As shown in FIG. 53, the optical head device 3G in this embodiment includes three semiconductor lasers 130, 133, 134 (in FIG. 53, semiconductor lasers 133 and 134 overlap in the direction perpendicular to the plane of drawing sheet). The first semiconductor laser 130, first beam splitter 310, second beam splitter 311, collimator lens 15, objective lens 18, actuator 17, cylindrical lens 26, and hologram optical element 21 are the same as in the twelfth embodiment, shown in FIG. 49. The photodetector 40 includes two main light-receiving sections 35, 41 and five secondary light-receiving sections 36, 37, 38, 39, 42 (in FIG. 53, the two main light-receiving sections 36, 41, the two secondary light-receiving sections 36, 38, and the three secondary light-receiving sections 37, 39, 42 overlap, respectively, in the direction perpendicular to the plane of drawing sheet). Laser light emitted from the first semiconductor laser 130 is reflected by the first beam splitter 310, which is aligned on the light axis LA, and is incident on the objective lens 18 through the second beam splitter 311 and collimator lens 15. The returning light beam reflected by the optical disc OD is incident on the hologram optical element 21 after successive passage through the objective lens 18, collimator lens 15, second beam splitter 311, first beam splitter 310, and cylindrical lens 26, and is split into a plurality of transmissively diffracted light beams, which are directed toward main light-receiving section 35 and two secondary light-receiving sections 36, 37 of the photodetector 40.

Figure 54:
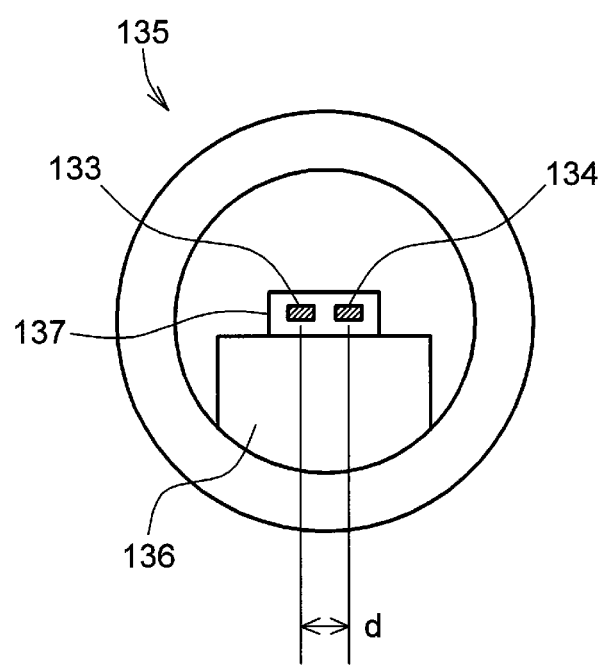
FIG. 54 is a front elevational view showing the semiconductor laser package in the thirteenth embodiment.

FIG. 54 is a front elevational view showing the semiconductor laser package in this embodiment. The semiconductor laser package 135 includes a semiconductor laser chip 137 disposed on a heat sink 136, and the semiconductor laser chip 137 includes two laser devices separated by a distance d: a second semiconductor laser 133 and a third semiconductor laser 134. Although the illustrated structure includes two laser devices built into a single semiconductor laser chip, a structure including two separate laser chips, each including a single laser device, with a distance d left between them may also be used.

As shown in FIG. 53, laser light emitted from the second semiconductor laser 133 is incident on a diffraction grating 50. On one side of the diffraction grating 50, a diffraction grating surface 50A for splitting the laser light emitted from the second semiconductor laser 133 into three beams is formed to support the three-beam differential push-pull method. The three transmissively diffracted light beams from the diffraction grating 50 are reflected by the second beam splitter 311, which is disposed between the first beam splitter 310 and the collimator lens 15, and are incident on the objective lens 18 through the collimator lens 15. The returning light beam is reflected by the optical disc OD toward the main light-receiving section 35 and two secondary light-receiving sections 38, 39 of the photodetector 40 after successive passage through the objective lens 18, collimator lens 15, second beam splitter 311, first beam splitter 310, cylindrical lens 26, and hologram optical element 21.

Laser light emitted from the third semiconductor laser 134 is incident on the diffraction grating 50. On the other side of the diffraction grating 50, a diffraction grating surface 50B for splitting the laser light emitted from the third semiconductor laser 134 into three beams is formed to support the three-beam differential push-pull method. The three transmissively diffracted light beams from the diffraction grating 50 are reflected by the second beam splitter 311, which is disposed between the first beam splitter 310 and the collimator lens 15, and are incident on the objective lens 18 through the collimator lens 15. The returning light beam is reflected by the optical disc OD toward main light-receiving section 41 and two secondary light-receiving sections 36, 42 of the photodetector 40 after successive passage through the objective lens 18, collimator lens 15, second beam splitter 311, first beam splitter 310, cylindrical lens 26, and hologram optical element 21.

Although the diffraction grating 50 is a unitary diffraction grating having a diffraction grating surface 50A and a diffraction grating surface 50B unitarily formed on its two sides, a combined configuration with two diffraction gratings, each having a single diffraction grating surface, may be used. Diffraction grating surface 50A has a diffractive function for the wavelength of laser light emitted from the second semiconductor laser and does not have a diffractive function for the wavelength of laser light emitted from the third semiconductor laser. Diffraction grating surface 50B has a diffractive function for the wavelength of laser light emitted from the third semiconductor laser and does not have a diffractive function for the wavelength of laser light emitted from the second semiconductor laser.

Figure 55A:
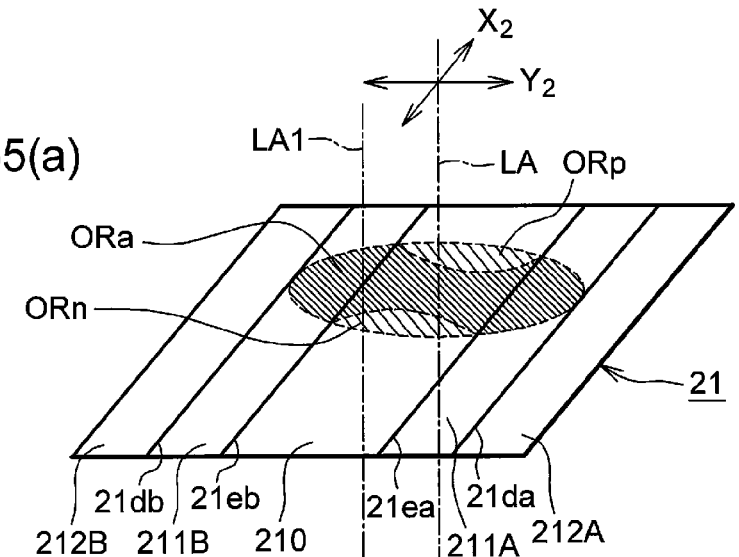
FIGS. 55(a) and 55(b) are perspective views of the hologram optical element and photodetector in the thirteenth embodiment.
Figure 55B:
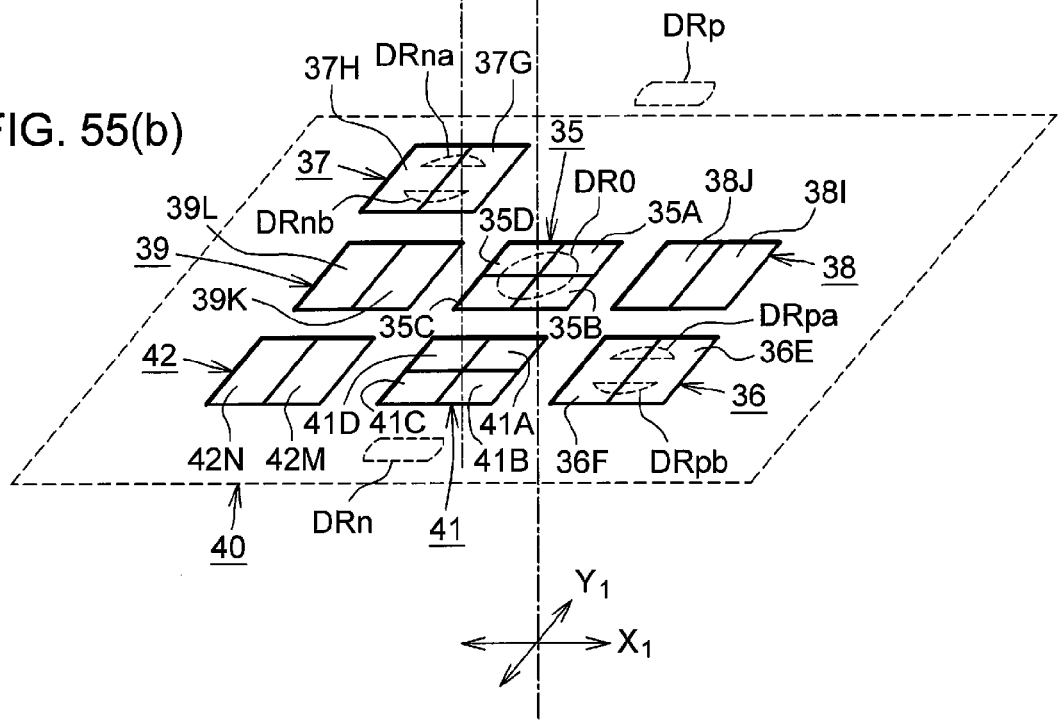

FIGS. 55(*a*) and 55(*b*) are perspective views of the hologram optical element and photodetector in this embodiment, when the first semiconductor laser is operating. As shown in FIG. 55(*b*), the photodetector 40 differs from the photodetector 34 in the twelfth embodiment shown in FIG. 50(*b*) in that the main light-receiving section 35 becomes a first main light-receiving section, and a second main light-receiving section 41 and a fifth secondary light-receiving section 42 are newly added. The configuration of the first to fourth secondary light-receiving sections 36 to 39 and the positional relations among these secondary light-receiving sections and the first main light-receiving section 35 are the same as the positional relations among the secondary light-receiving sections and main light-receiving section shown in FIG. 50(*b*). Respective incidence of the zero-order light component DR0 on the first main light-receiving section 35, the +1-order light components DRpa, DRpb on the first secondary light-receiving section 36, the −1-order light components DRna, DRnb on the second secondary light-receiving section 37 when the first semiconductor laser is operating is also the same as in the operation described with reference to FIG. 50(*b*). The method of computation of the detected signals is also as described in the twelfth embodiment. The configuration of the newly provided second main light-receiving section 41 and fifth secondary light-receiving section 42 will be described later.

Figure 56A:
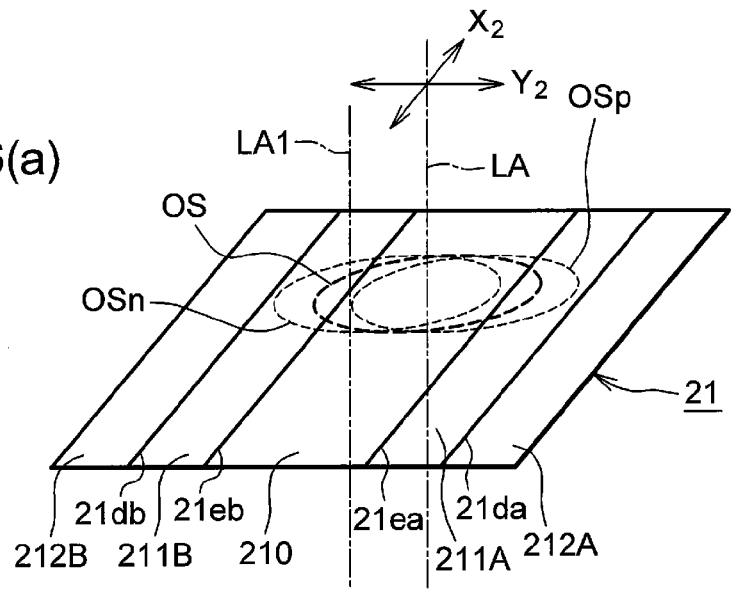
FIGS. 56(a) and 56(b) are perspective views of the hologram optical element and photodetector in the thirteenth embodiment.
Figure 56B:
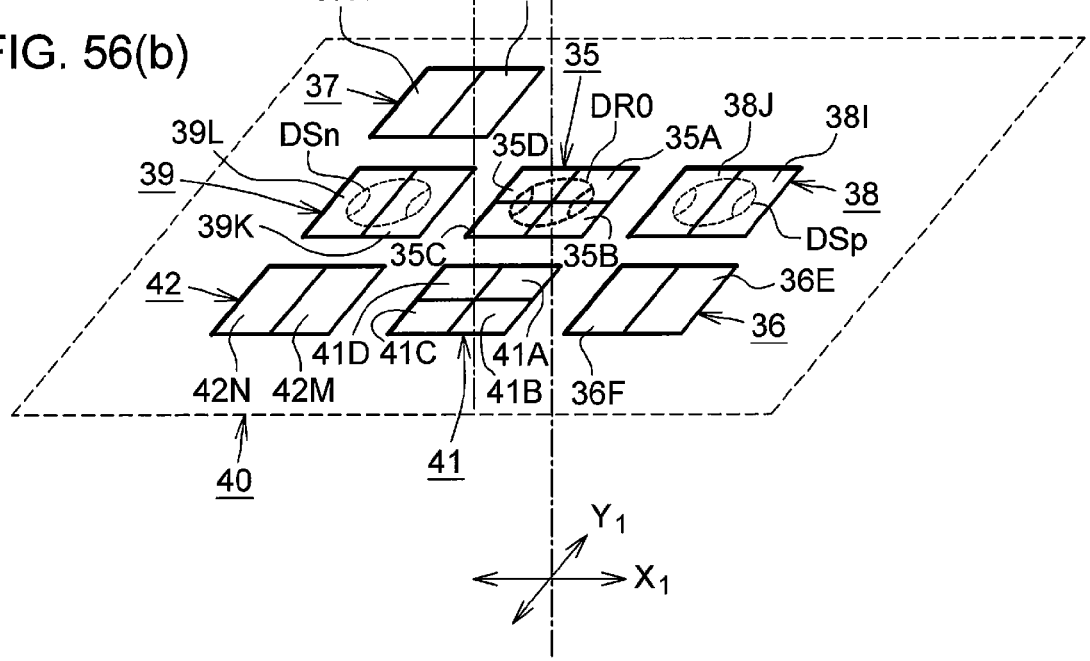

FIGS. 56(*a*) and 56(*b*) are perspective views of the hologram optical element and photodetector in this embodiment when the second semiconductor laser 133 is operating. Light component OS contained in the reflectively diffracted light beam illuminating the hologram optical element is a returning light spot, returning from the optical disc OD, of the main light beam among the three light beams split by diffraction grating surface 50A of the diffraction grating 50 for performing detection by the three-beam differential push-pull method. Light components OSp and OSn are returning light spots, returning from the optical disc OD, of the two sub-beams among the three light beams split by diffraction grating surface 50A of the diffraction grating 50. The light axis of the light spots of the light beams returning from the second semiconductor laser 133 adapted to the DVD standard is aligned with light axis LA of the light spots of the light beams returning from the first semiconductor laser 130 adapted to the BD standard. Since the numerical aperture of the objective lens 18 corresponding to the lasing wavelength of the second semiconductor laser 133 adapted to the DVD standard is smaller than the numerical aperture of the objective lens 18 corresponding to the lasing wavelength of the first semiconductor laser 130 adapted to the BD standard, the diameter of the light beam returning to the hologram optical element 21 is reduced in proportion to the numerical aperture. The specifications of diffraction grating surface 50A of the diffraction grating 50, such as the spacing of the diffraction grating grooves, are optimized so that the sub light spots DSp, DSn used for detection by the three-beam differential push-pull method illuminate the central positions of the first secondary light-receiving section 36 and second secondary light-receiving section 37, respectively. The computation of signals for a DVD optical disc is the same as the computation of signals described in the twelfth embodiment.

Figure 57A:
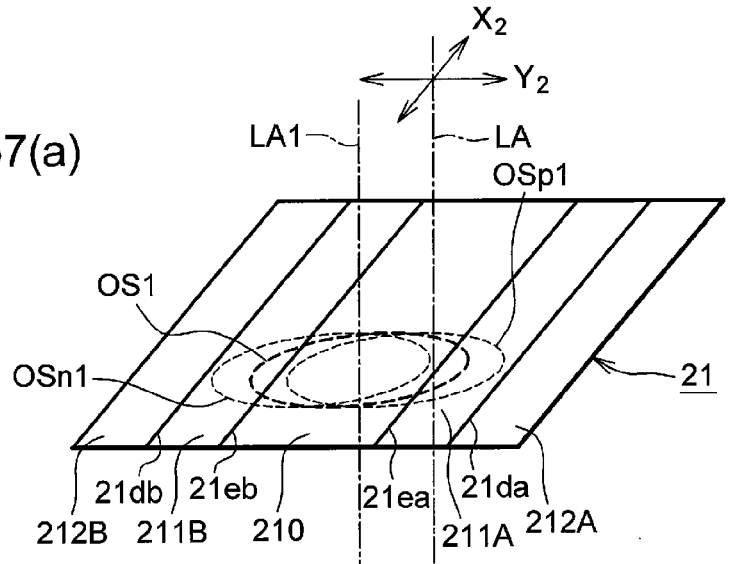
FIGS. 57(a) and 57(b) are perspective views of the hologram optical element and photodetector in the thirteenth embodiment.

FIGS. 57(*a*) and 57(*b*) are perspective views of the hologram optical element and photodetector in this embodiment when the third semiconductor laser 134 is operating. Light component OS1 contained in the reflectively diffracted light beam illuminating the hologram optical element is a returning light spot, returning from the optical disc OD, of the main light beam among the three light beams split by diffraction grating surface 50B of the diffraction grating 50 for performing detection by the three-beam differential push-pull method. Light components OSp1 and OSn1 are returning light spots, returning from the optical disc OD, of the two sub-beams among the three light beams split by diffraction grating surface 50B of the diffraction grating 50. The light axis LA1 of the returning light spots of the light beams from the third semiconductor laser 134 adapted to the CD standard is separated from light axis LA. The separation between light axis LA and light axis LA1 corresponds to a quantity obtained by applying an optical magnification factor to the distance d between the second semiconductor laser 133 and third semiconductor laser 134 in the semiconductor laser chip 137.

The photodetector 40 includes a second main light-receiving section 41 and a fifth secondary light-receiving section 42 in addition to the first main light-receiving section 35 and first to fourth secondary light-receiving sections 36 to 39. The second main light-receiving section 41 includes a plurality of light-receiving surfaces 41A, 41B, 41C, 41D arranged around the light axis LA in a matrix aligned with the $X_1$-axis and $Y_1$-axis directions. The pair of light-receiving surfaces 41A, 41B and the pair of light-receiving surfaces 41C, 41D are aligned in the $X_1$-axis direction, light-receiving surfaces 41A, 41B being aligned in the $Y_1$-axis direction and light-receiving surfaces 41C, 41D also being aligned in the $Y_1$-axis direction. That is, the second main light-receiving section 41 has four rectangular light-receiving surfaces formed by dual partitioning in longitudinal and transverse directions, although the directions of partitioning need not be accurately aligned in the $X_1$-axis direction and $Y_1$-axis direction. The fifth secondary light-receiving section 42 is disposed in a substantially line-symmetrical position about the $X_1$-axis direction on the other side of the second main light-receiving section 41. The fifth secondary light-receiving section 42 includes a pair of light-receiving surfaces 42M, 42N substantially aligned in the $X_1$-axis direction. Since the numerical aperture of the objective lens 18 corresponding to the lasing wavelength of the third semiconductor laser 132 adapted to the CD standard is smaller than the numerical aperture of the objective lens 18 corresponding to the lasing wavelength of the second semiconductor laser 131 adapted to the DVD standard, the diameter of the light beam returning to the hologram optical element 21 is reduced in proportion to the numerical aperture. In this embodiment, the specifications of diffraction grating surface 50B of the diffraction grating 50, such as the spacing of the diffraction grating grooves, are optimized so that the sub light spots DSp, DSn used for detection by the three-beam differential push-pull method illuminate the central positions of the first secondary light-receiving section 36 and fifth secondary light-receiving section 42, respectively.

The light-receiving surfaces 41A, 41B, 41C, 41D of the second main light-receiving section 41 output respective detection signals $S_{A1}$, $S_{B1}$, $S_{C1}$, $S_{D1}$ by photoelectric conversion of the zero-order light component DR0, the light-receiving surfaces 36E, 36F of the first secondary light-receiving section 36 output respective detection signals $S_E$, $S_F$ by photoelectric conversion of the +1-order light component DSp1, and the light-receiving surfaces 42M, 42N of the fifth secondary light-receiving section 42 output respective detection signals $S_M$, $S_N$ by photoelectric conversion of the −1-order light component DSn1. Therefore, the signals in the CD standard are detected by the following computations. The focus error signal FES1 is obtained from the following equation (32).

$$FES1=(S_{A1}+S_{C1})-(S_{B1}+S_{D1}) \quad (32)$$

The reproduced signal RF1 is obtained from the following equation (33).

$$RF1=S_{A1}+S_{B1}+S_{C1}+S_{D1} \quad (33)$$

The tracking error signal TES1 is obtained from the following equation (34).

$$TES1=MPP1-k1 \times SPP1 \quad (34)$$

Here, k1 is a gain coefficient. MPP1 represents a main push-pull signal, and SPP1 represents a sub-push-pull signal. The main push-pull signal MPP1 and sub-push-pull signal SPP1 are given by the following equations (35a, 35b).

$$MPP1=(S_{A1}+S_{B1})-(S_{C1}+S_{D1}) \quad (35a)$$

$$SPP1=(S_E-S_F)+(S_M-S_N) \quad (35b)$$

Detection of the tracking error signal is not limited to the three-beam differential push-pull method based on equation (34).

In this embodiment, detection by the first main light-receiving section 35, third secondary light-receiving section 38, and fourth secondary light-receiving section 39 of light beams related to the second semiconductor laser 133 and detection by the second main light-receiving section 36, first secondary light-receiving section 36, and fifth secondary light-receiving section 42 of light beams related to the third semiconductor laser 134 are shown as an example, but this example is non-limiting. The light-receiving sections by which light beams related to the second semiconductor laser 133 are detected and the light-receiving sections by which light beams related to the third semiconductor laser 134 are detected may be interchanged.

Figure 57B:
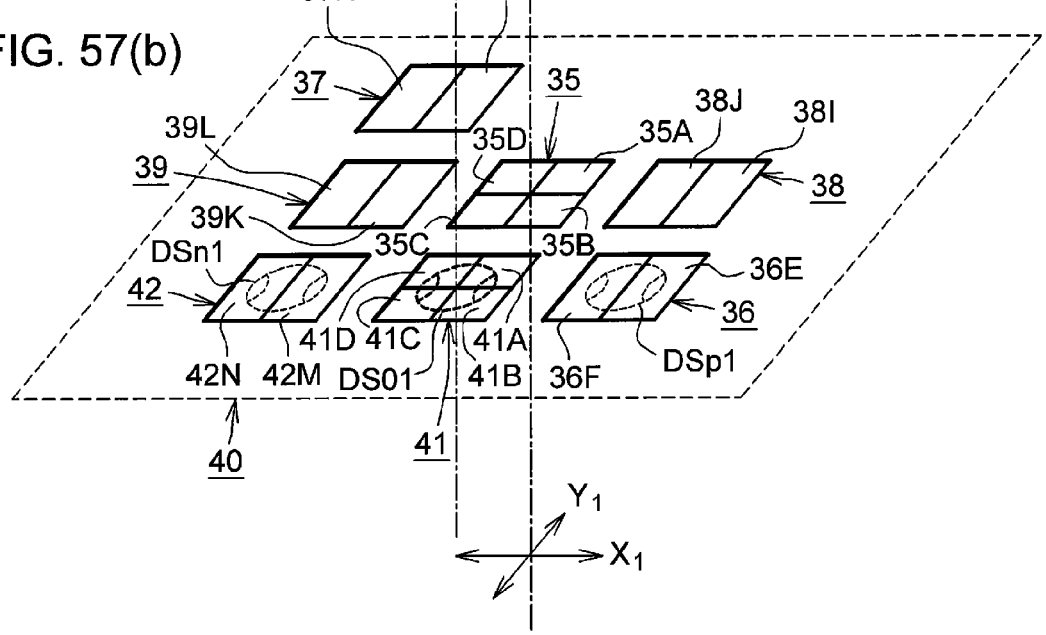

The +1-order light component DSp1 is received by the first secondary light-receiving section 36 in this embodiment as shown in FIG. 57(b), but a sixth secondary light-receiving section may be included, separate from the first secondary light-receiving section 36, the sixth secondary light-receiving section and the fifth secondary light-receiving section 42 being disposed in line-symmetrical positions, substantially aligned with the $X_1$ axis, on opposite sides of the second main light-receiving section 41, the +1-order light component DSp1 being incident on the sixth secondary light-receiving section.

The first secondary light-receiving section 36 and second secondary light-receiving section 37 are disposed on opposite sides of the main light-receiving section 35 in an oblique direction with respect to the $X_1$ axis, but provided they are sufficiently separated from the main light-receiving section 35 to prevent stray light generated in the layer most narrowly spaced from, or the adjacent to, the information recording layer selected as the layer where information is reproduced or recorded from illuminating them, the oblique direction is not a limitation; they may be disposed in a direction corresponding to the tangential direction ($Y_1$-axis direction) as shown in FIG. 47 or in a direction corresponding to the radial direction ($X_1$-axis direction) as shown in FIG. 48.

In this embodiment, the first to fifth secondary light-receiving sections have been shown as having two light-receiving surfaces, but they may have four light-receiving surfaces, as does main light-receiving section 35 or 41, or may have another light-receiving surface pattern. The light-receiving surfaces of main light-receiving section 35 or 41 and the first to fifth secondary light-receiving sections may vary in size.

In the description given above, the second semiconductor laser and the third semiconductor laser are housed in a single semiconductor laser package, but this configuration is non-limiting. A single semiconductor laser package housing all the semiconductor lasers may be used.

In the optical head device 3G in this embodiment, the single objective lens is adaptable to semiconductor lasers having different lasing wavelengths compatible with a plurality of standards, but a plurality of objective lenses adapted to respective standards may be used. In that case, the plurality of objective lenses corresponding to the respective lasing wavelengths of the standards may be disposed on the movable section 19, and the objective lens adapted to the standard of the intended optical disc may be used selectively. The means for selecting the objective lens may be configured to move the desired objective lens onto the light axis LA. Alternatively, an optical element such as a beam splitter, for example, may be disposed in a position in front of or behind the collimator lens 15 to split the light axis, and objective lenses adapted to different standards may be disposed on the respective split light axes.

As described above, according to the optical head device 3G of this embodiment, a signal component corresponding to the offset attributable to objective lens shift can be generated from signals detected by the secondary light-receiving sections, and by use of this signal component, a tracking error signal in which the offset component has been cancelled out can be generated. As a result, the influence of stray light from information recording layers other than the information recording layer selected as a layer where information is reproduced or recorded can be eliminated without decreasing the intensity of the light illuminating the optical disc, and a tracking error signal in which the offset component attributable to objective lens shift has been cancelled out can be detected. This signal component can be detected by using a photodetector having a simple light-receiving surface pattern.

As shown in FIG. 53, although the optical head device 3G in this embodiment includes a plurality of semiconductor lasers 130, 133, 134 having different wavelengths to be compatible with a plurality of optical disc standards, there are only one hologram optical element 21 and one photodetector 34. An optical head device having a simple configuration can accordingly support optical discs of plural standards and optical discs for which a multilayer structure is defined.

Figure 58A:
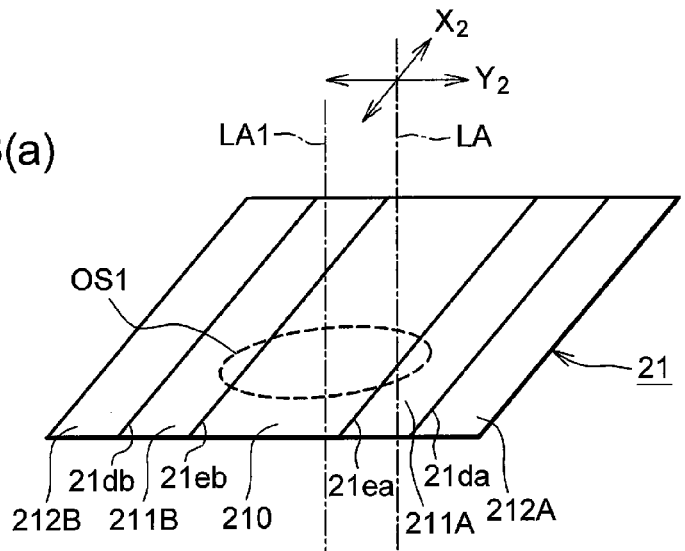
FIGS. 58(a) and 58(b) are perspective views of the hologram optical element and photodetector in the thirteenth embodiment.
Figure 58B:
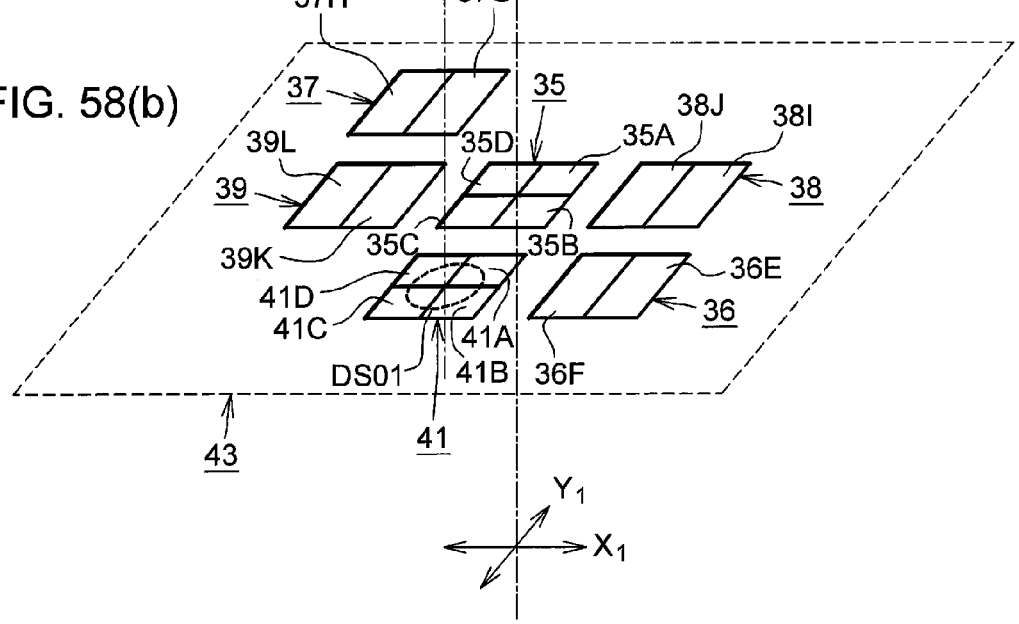

FIGS. 58(a) and 58(b) are perspective views of the hologram optical element and another photodetector when the third semiconductor laser 134 is operating in a modification of this embodiment. The configuration shown is that of an optical head device for a CD optical disc. In reproduction, detection of the tracking error signal can be performed easily by a single beam, using the well known phase difference method, for example, instead of using the three-beam differential push-pull method. Therefore, diffraction grating surface 50B of the diffraction grating 50 becomes unnecessary. The returning light spot returning from the optical disc OD includes only light component OS1. The photodetector 43 differs from the photodetector 40 shown in FIG. 57(b) in that the fifth secondary light-receiving section 42 is removed from the configuration. Light component OS1 is received by the second main light-receiving section 41, and various signals are detected.

In this embodiment, the BD, DVD, and CD standard are described as an example of three standards, but the standards are not limited to these. The optical head device may support two standards or four or more standards, and an optical head device similar to the one in this embodiment can be configured by using photodetectors and semiconductor lasers having lasing wavelengths corresponding to those standards.

Fourteenth Embodiment

The optical head device in a fourteenth embodiment according to the present invention will now be described. While the diffraction grating of the hologram optical element used in the optical head devices 3E, 3F, 3G in the eleventh to thirteenth embodiments has a blazed structure having a sawtooth sectional shape, the diffraction grating of the hologram optical element used in the optical head device in this embodiment has a binary structure having a rectangular or a sine-wave sectional shape.

Figure 59A:
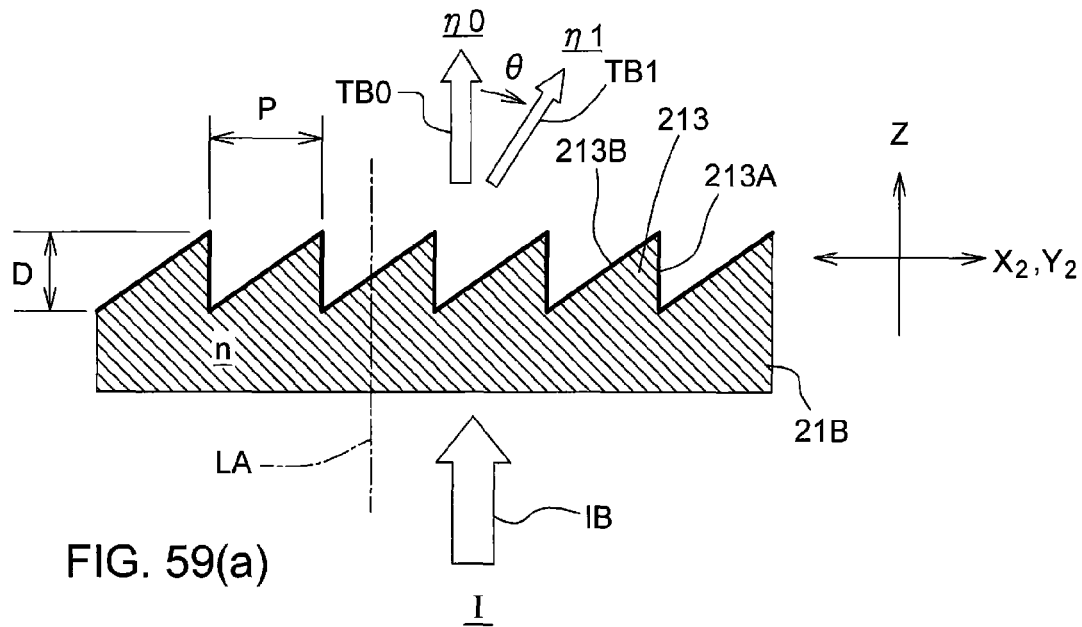
FIG. 59(a) is a schematic sectional diagram of the hologram optical element in a fourteenth embodiment.
Figure 59B:
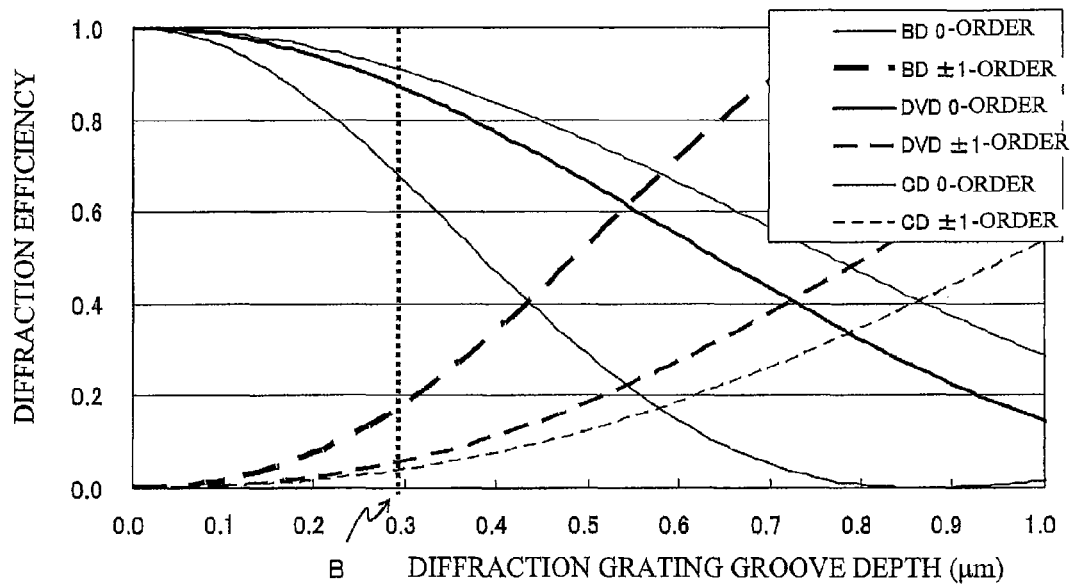
FIG. 59(b) is a graph illustrating characteristics of the hologram optical element in the fourteenth embodiment.

FIG. 59(a) is a schematic sectional diagram showing the diffraction grating grooves of a hologram optical element 21B in this embodiment. FIG. 59(b) is a graph showing the relation between the groove depth of the diffraction grating and diffraction efficiency. This embodiment will mow be described in further detail. While the hologram optical element described with reference to the eleventh to thirteenth embodiments has diffraction grating grooves with a binary structure, the hologram optical element 21B in the present embodiment has diffraction grating grooves with a blazed structure. As in the eleventh embodiment, the hologram optical element 21B has three types of diffraction regions: a primary diffraction region, a pair of secondary diffraction regions, and a pair of peripheral diffraction regions. In FIG. 59(a), the diffraction grating grooves 213 are formed periodically in a direction in the plane formed by the $X_2$ axis and the $Y_2$ axis, perpendicular to the Z axis which is parallel to the light axis LA, and the diffraction grating grooves 214 are formed with a sawtooth-like shape having a grating wall 213A parallel to the Z axis and another grating wall 213B in an oblique plane canted with respect to the Z axis.

In a hologram optical element 21B as shown in FIG. 59(a), let n be the refractive index of the material of the optical element, let P be the period of the diffraction grating grooves 213, and let D be the depth of the diffraction grating grooves 213. Let λ be the wavelength of the semiconductor laser. The general blazed structure diffracts a light beam IB incident on the hologram optical element 21B to a zero-order diffracted light beam TB0 that passes through the hologram optical element 21B directly and a first-order diffracted light beam TB1 angled in one oblique direction with respect to the zero-order diffracted light beam TBN0. Here, the first-order diffracted light beam TB1 may be defined as the +1-order diffraction component. The conditions that determine the proportions of the diffraction efficiency $\eta_0$ of the zero-order diffracted light beam TB0 and the diffraction efficiency $\eta_1$ of the +1-order diffracted light beam TB1 with respect to the light intensity I of the incident light beam IB are the refractive index n of the hologram optical element 21B, the depth D of the diffraction grating grooves 213, and the wavelength λ of the semiconductor laser. The conditions that determine the diffraction angle θ of the +1-order diffracted light beam TB1 from the zero-order diffracted light beam TB0 are the period P of the hologram optical element 21B and the wavelength λ. In the optical head device, the wavelength λ of the semiconductor laser is usually fixed at a specific value, and the refractive index n of the hologram optical element is determined by the glass, plastic, or other optical material used in the hologram optical element 21B, so the proportions of diffraction efficiencies $\eta_0$, $\eta_1$ and the diffraction angle θ can be adjusted to desired design values by using the period P and depth D of the diffraction grating grooves 213 as variables.

In a hologram optical element having a binary structure, the +1-order diffracted light beam and the −1-order diffracted light beam appear with the same light intensity. Accordingly, as described in the eleventh to thirteenth embodiments, the photodetector always has a pair of secondary light-receiving sections that receive the first-order diffracted light beams. With the hologram optical element 21B having the blazed structure in the present embodiment, since only the +1-order diffracted light beam is present (the −1-order diffracted light beam is not present), to receive the +1-order diffracted light beam, of the pair of secondary light-receiving sections, it is only necessary to provide at least one secondary light-receiving section, so the configuration of the photodetector can be simplified.

FIG. 59(b) is a graph showing the relation between the groove depth D of the diffraction grating of the hologram optical element 21B and diffraction efficiency in this embodiment; the illustrated diffraction efficiencies were calculated by specifying silica glass as the material of the hologram optical element 21B and by using the refractive index corresponding to the wavelength of the light source. The material of the hologram optical element 21B is not limited to silica glass, however. As an example of diffraction efficiency settings in the binary structure described in the eleventh embodiment, at the wavelength corresponding to the BD standard, for example, the ratio of the zero-order diffraction efficiency to the +1-order diffraction efficiency is set to 8:1 and the ratio of the zero-order diffraction efficiency to the −1-order diffraction efficiency is set to 8:1. Since −1-order diffracted light is not present in the blazed structure, if the ratio of the zero-order diffraction efficiency to the +1-order diffraction efficiency is set to 4:1, these conditions become identical to those of the binary structure. From the graph in FIG. 59(b), the groove depth of the diffraction grating satisfying this condition is about 0.29 micrometers. When the light beam emitted from the second semiconductor laser adapted to the DVD standard passes through a hologram optical element 21B formed with this diffraction grating groove depth, the ratio of the zero-order diffraction efficiency to the +1-order diffraction efficiency becomes about 16:1; the ±1-order transmissively diffracted light beam is negligibly small at the wavelength in the DVD standard. When the light beam emitted from the third semiconductor laser adapted to the CD standard passes through, the ratio of the zero-order diffraction efficiency to the +1-order diffraction efficiency becomes about 25:1; the ±1-order transmissively diffracted light beam is negligibly small at the wavelength in the CD standard. Therefore, at the wavelength in the DVD standard or CD standard, the hologram optical element 21B can be approximately treated as a simple transparent plate with no diffractive function.

In this embodiment, the sub-push-pull signal SPP is generated by making the +1-order diffracted light beam incident on a single secondary light-receiving section by use of a hologram optical element 21B having a blazed structure, so the light intensity of the light beam incident on the single secondary light-receiving section can be doubled. The ratio of the light intensity of the sub-push-pull signal SPP to the light intensity of the stray light component from information recording layers other than the information recording layer can therefore be increased, the effects of interference with the zero-order diffracted stray light beam SL0 in the sub-push-pull signal SPP can be greatly diminished, and the quality of the tracking error signal in the multilayer optical disc can be improved.

In this embodiment, all regions or a specific region of the primary diffraction region, the pair of secondary diffraction regions, and the pair of peripheral diffraction regions of the hologram optical element 21B may have a blazed structure.

Fifteenth Embodiment

The optical head device in a fifteenth embodiment according to the present invention will now be described. While the diffraction grating grooves of the hologram optical element used in the optical head device in the fourteenth embodiment have a sectional shape with a blazed structure, the diffraction grating grooves of the hologram optical element used in the optical head device of the present embodiment have a staircase-like sectional profile.

Figure 60A:
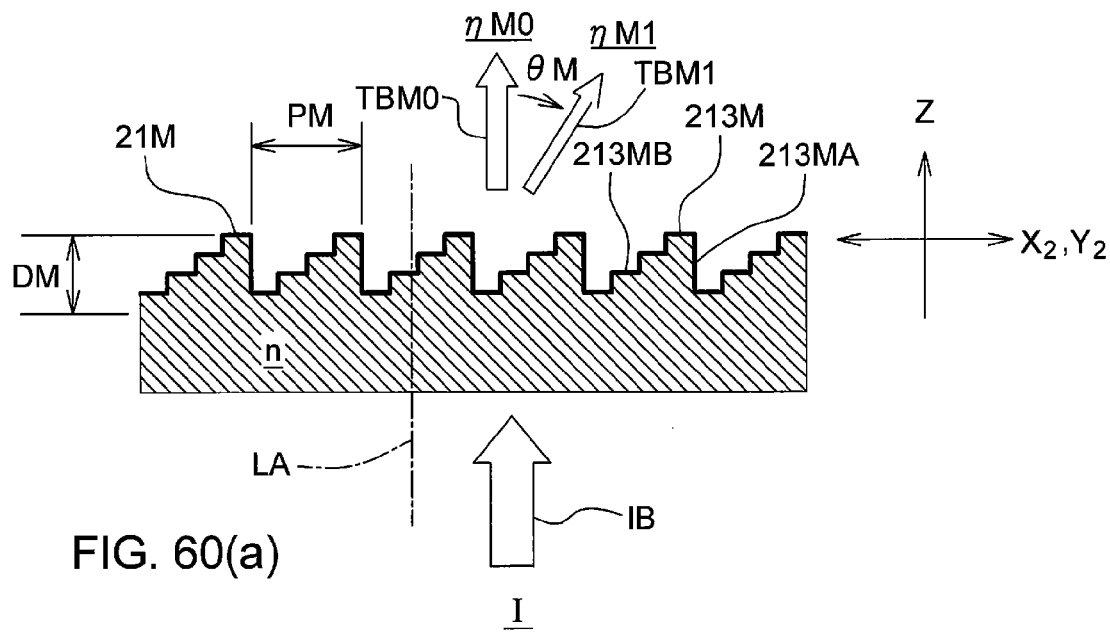
FIG. 60(a) is a schematic sectional diagram of the hologram optical element in a fifteenth embodiment.
Figure 60B:
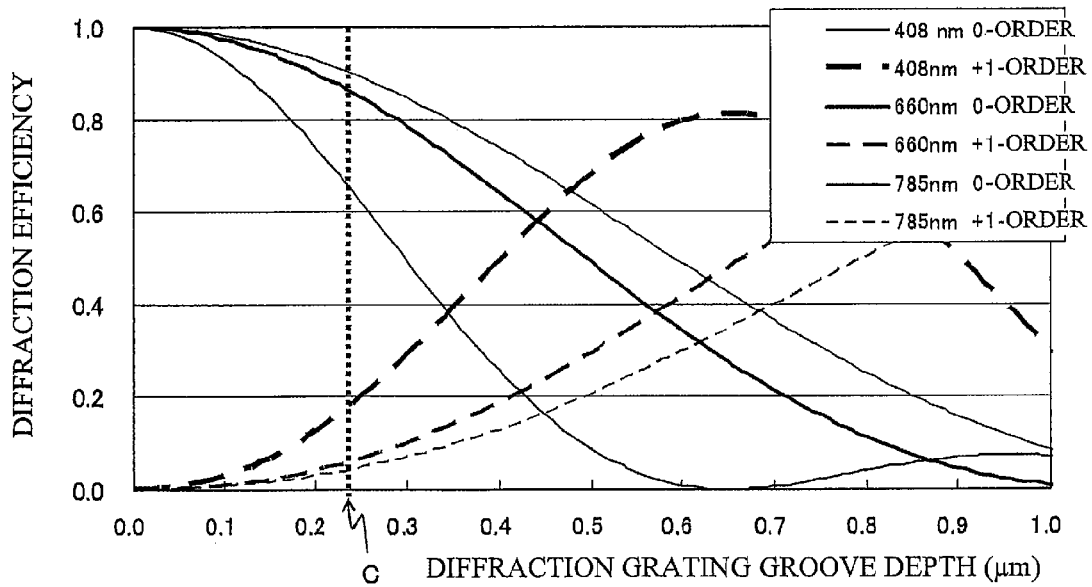
FIG. 60(b) is a graph illustrating characteristics of the hologram optical element in the fifteenth embodiment.

FIG. 60(a) is a schematic sectional diagram showing the diffraction grating grooves of the hologram optical element 21M in this embodiment, and FIG. 60(b) is a graph showing the relation between the groove depth of the diffraction grating and diffraction efficiency. As shown in FIG. 60(a), the diffraction grating grooves 213M have a grating wall 213MA parallel to the Z axis and a staircase-like grating wall 213MB in the Z-axis direction. Grating walls 213MB having four steps are shown here as an example, but this example is non-limiting. Any grating wall having three steps or more may be used; as the number of steps increases, the structure approaches the blazed structure of the hologram optical element 21B shown in FIGS. 59(a) and 59(b).

In a hologram optical element 21M as shown in FIG. 60(a), let n be the refractive index, let PM be the period of the diffraction grating grooves 213M, and let DM be the depth of the diffraction grating grooves 213M. Let λ be the wavelength of the semiconductor laser. Diffraction grating grooves having a staircase structure generally diffract a light beam IB incident on the hologram optical element 21M to a zero-order diffracted light beam TBM0 that passes through the hologram optical element 21M directly and a first-order diffracted light beam TBM1 angled in one oblique direction with respect to the zero-order diffracted light beam TBM0. Here, the first-order diffracted light beam TBM1 may be defined as the +1-order diffracted light beam. The conditions that determine the proportions of the diffraction efficiency $\eta_{M0}$ of the zero-order diffracted light beam TBM0 and the diffraction efficiency $\eta_{M1}$ of the +1-order diffracted light beam TBM1 with respect to the light intensity I of the incident light beam IB are the refractive index n and depth DM of the hologram optical element 21M and the wavelength λ. The conditions that determine the diffraction angle $\theta_M$ of the +1-order diffracted light beam TBM1 are the period PM of the hologram optical element 21M and the wavelength λ. The wavelength λ of the semiconductor laser is usually fixed at a specific value, and the refractive index n is determined by the glass, plastic, or other optical material used in the hologram optical element 21M, so the proportions of diffraction efficiencies $\eta_{M0}$, $\eta_{M1}$ and the diffraction angle $\theta_M$ can be adjusted to desired design values by using the period PM and depth DM of the diffraction grating grooves 213M as variables.

FIG. 60(b) is a graph showing the relation between the groove depth DM of the diffraction grating of the hologram optical element 21M and diffraction efficiency in this embodiment; the illustrated diffraction efficiencies were calculated by specifying silica glass as the material of the hologram optical element 21M, selecting four steps as the number of steps in the grating walls 213MB, and using a refractive index corresponding to the wavelength of the light source. The material of the hologram optical element 21M is not limited to silica glass, however. If the setting of the ratio of the zero-order diffraction efficiency to the +1-order diffraction efficiency to 4:1 at a wavelength corresponding to the BD standard is considered, the groove depth of the diffraction grating satisfying this condition is about 0.23 micrometers, as indicated by line C in FIG. 60(b). When the light beam emitted from the second semiconductor laser 131 adapted to the DVD standard passes through a hologram optical element 21M formed with this diffraction grating groove depth, the ratio of the zero-order diffraction efficiency to the +1-order diffraction efficiency becomes about 16:1; the +1-order transmissively diffracted light beam is negligibly small at the wavelength in the DVD standard. When the light beam emitted from the third semiconductor laser 132 adapted to the CD standard passes through, the ratio of the zero-order diffraction efficiency to the +1-order diffraction efficiency becomes about 24:1; the +1-order transmissively diffracted light beam is negligibly small at the wavelength in the CD standard. Therefore, in the DVD standard or CD standard, the hologram optical element 21N can be approximately treated as a simple transparent plate with no diffractive function.

As an example, FIG. 60(a) shows the grating wall 213MB of the hologram optical element 21M as having four steps, but this example is non-limiting. The grating wall may have five or more steps; as the number of steps increases, the structure approaches the blazed structure of the hologram optical element 21B in the fourteenth embodiment shown in FIG. 59(a), and the curves of zero-order diffraction efficiency and +1-order diffraction efficiency with respect to diffraction grating groove depth shown in FIG. 60(b) approach the curves of zero-order diffraction efficiency and +1-order diffraction efficiency with respect to diffraction grating groove depth of the hologram optical element 21B having the blazed structure shown in FIG. 59(b).

In this embodiment, all regions or a specific region among the primary diffraction region, the pair of secondary diffraction regions, and the pair of peripheral diffraction regions of the hologram optical element 21M may have a staircase structure.

As described above, since the hologram optical element in this embodiment has a staircase structure, the diffraction grating grooves can be formed more easily than grooves having a blazed structure, and the cost of the hologram optical element can be reduced.

Sixteenth Embodiment

The optical head device in a sixteenth embodiment according to the present invention will now be described. While the hologram optical element used in the optical head devices 3E, 3F, 3G of the eleventh to thirteenth embodiments has a peripheral diffraction region, in the hologram optical element used in the optical head device of the present embodiment the region corresponding to the peripheral diffraction region is a light-blocking region.

Figure 61:
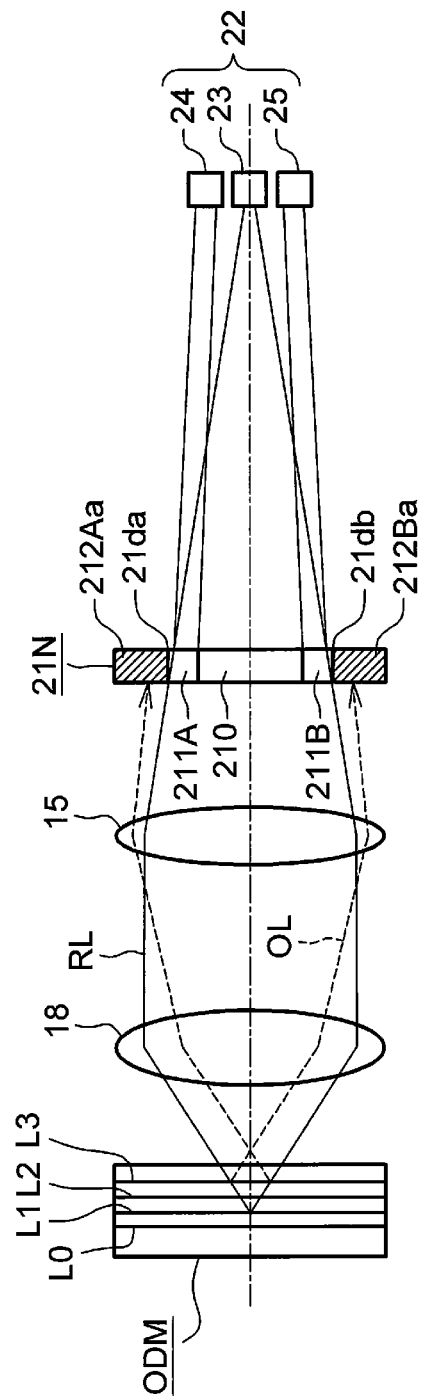
FIG. 61 is a schematic drawing of an optical head device including the hologram optical element in a sixteenth embodiment.

FIG. 61 is a plan view schematically showing the configuration of an optical head device including the hologram optical element 21N in this embodiment. The optical disc ODM shown in FIG. 61 is a multilayer optical disc in which a plurality of information recording layers L0, L1, L2, L3 are disposed one above another. The photodetector 22 is the same as in the eleventh embodiment. The beam splitter and cylindrical lens are omitted from the drawing. FIG. 61 shows the paths of propagation of two returning light beams RL, OL reflected by the optical disc ODM. Returning light beam RL is reflected from the information recording layer L1 selected as the layer where information is recorded or reproduced, and is incident on the hologram optical element 21N after successive passage through the objective lens 18 and collimator lens 15. Returning light beam OL is stray light reflected by information recording layers (such as layer L3) other than the information recording layer L1 selected as the layer where information is recorded or reproduced.

The hologram optical element 21N in this embodiment includes a primary diffraction region 210 and secondary diffraction regions 211A, 211B having the same structure as in the hologram optical element 21 described in the eleventh embodiment shown in FIG. 44, but makes the peripheral diffraction regions 212A, 212B into respective light-blocking regions 212Aa, 212Ba. Use of a hologram element including light-blocking regions enables the stray light OL reflected by layer L3, for example, to be blocked by the light-blocking regions 212Aa, 212Ba of the hologram optical element 21N and prevented from illuminating the main light-receiving section 23, first secondary light-receiving section 24, or second secondary light-receiving section 25 of the photodetector 22, as shown in FIG. 61. The light-blocking regions 212Aa, 212Ba can be formed by applying an opaque material or a light absorbing material to, depositing an opaque metal film on, or attaching an opaque metal sheet to the surface of the hologram element.

Since the optical head device configured as described above does not allow stray light due to light reflection from information recording layers other than the information recording layer selected as a layer where information is reproduced or recorded in a multilayer disc to strike the photodetector, the photodetector does not detect unwanted signal components other than the innately necessary signal components. Therefore, signal detection performance can be stabilized.

If the hologram optical element has peripheral diffraction regions, light diffracted by these regions might be reflected by peripheral hardware and detected by the photodetector as secondary stray light, but by using the peripheral diffraction regions as light-blocking regions, occurrence of such secondary stray light can be prevented.

An example in which light-blocking regions are provided in a hologram optical element having a blazed structure has been shown in this embodiment, but light-blocking regions can also be provided in a hologram optical element having a different structure as shown in the fourteenth or fifteenth embodiment.

Seventeenth Embodiment

The optical head device in a seventeenth embodiment according to the present invention will now be described. While the hologram optical element used in the optical head device of the eleventh to thirteenth embodiments has rectangular secondary diffraction regions, the secondary diffraction regions of the hologram optical element used in the optical head device of the present embodiment have a different shape.

Figure 62:
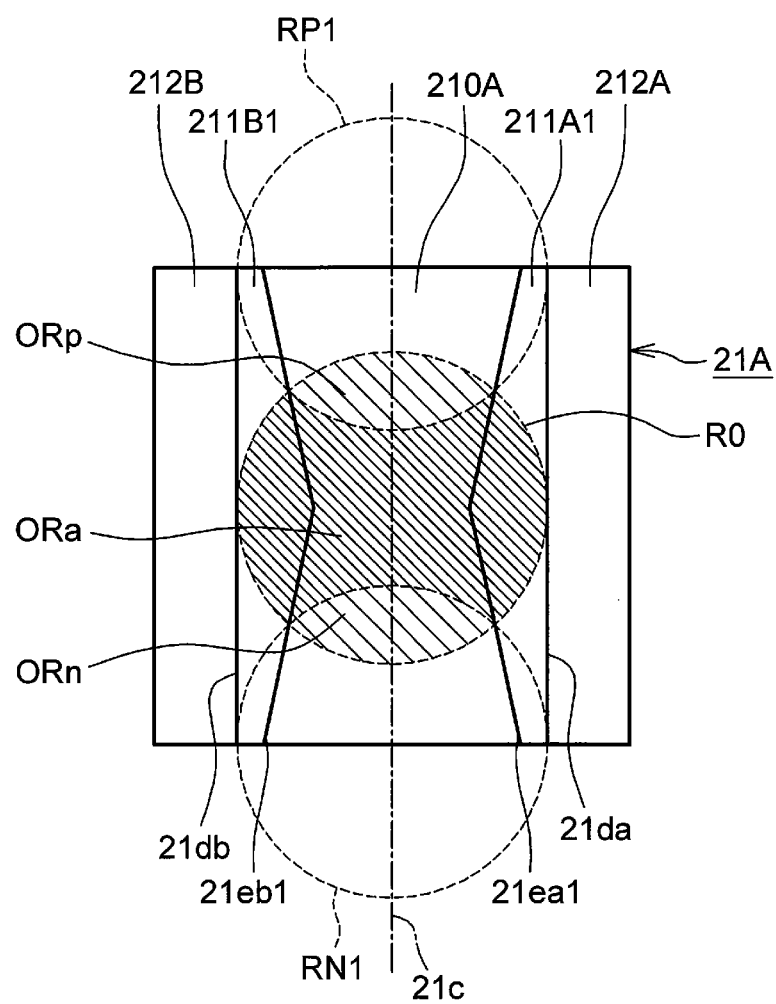
FIG. 62 is a plan view schematically illustrating the configuration of the hologram optical element in a seventeenth embodiment.

FIG. 62 is a plan view schematically illustrating the configuration of the light incidence surface of the hologram optical element 21A in this embodiment. The hologram optical element 21A includes three types of diffraction regions: a primary diffraction region 210A, a pair of secondary diffraction regions 211A1, 211B1, and a pair of peripheral diffraction regions 212A, 212B. A separate diffractive pattern (e.g., the profile, direction, and spacing of the diffraction grooves) may be formed in each of these three types of diffraction regions.

The secondary diffraction regions 211A1, 211B1 are disposed outward of the inner primary diffraction region 210A in a $Y_2$-axis direction corresponding to the tangential direction (Y-axis direction) of the optical disc OD. The peripheral diffraction regions 212A, 212B are disposed outward of the secondary diffraction regions 211A1, 211B1 in the $Y_2$-axis direction. The shapes of the secondary diffraction regions 211A1, 211B1 are symmetric with respect to a centerline 21c running in an $X_2$-axis direction (corresponding to the radial direction), which is orthogonal to the $Y_2$-axis direction; the shapes of the peripheral diffraction regions 212A, 212B are also symmetric with respect to the centerline 21c. The primary diffraction region 210A and secondary diffraction region 211A1 are separated by a boundary line 21ea1; boundary line 21ea1 has a 'V' shape composed of two straight lines, the bottom of the 'V' being directed toward the centerline 21c. The primary diffraction region 210A and secondary diffraction region 211B1 are separated by a boundary line 21eb1; boundary line 21eb1 has a 'V' shape composed of two straight lines, the bottom of the 'V' being directed toward the centerline 21c. Peripheral diffraction region 212A and secondary diffraction region 211A1 are separated by a boundary line 21da parallel to the $X_2$-axis direction, and peripheral diffraction region 212B and secondary diffraction region 211B1 are separated by a boundary line 21db parallel to the $X_2$-axis direction. Therefore, in the secondary diffraction regions 211A1, 211B1, the width of the central part in the $Y_2$-axis direction is greater than the width of the ends in the $Y_2$-axis direction.

The returning light beam from the optical disc OD includes reflectively diffracted light beams caused by the radial or X-axis-direction structure of the information recording layers (mainly by the structure of the information tracks) of the optical disc OD. The light incidence surface of the hologram optical element 21A is illuminated by light spots of the returning light. As shown in FIG. 62, the light spots include a light component ORp where a zero-order light component R0 represented by a dotted circle overlaps a +1-order light component RP1 represented by another dotted circle, a light component ORn where the zero-order light component R0 represented by the dotted circle overlaps a −1-order light component RN1 represented by another dotted circle, and a light component ORa where the zero-order light component R0 does not overlap the ±1-order light components RP1, RN1. The primary diffraction region 210A is formed in a position where part of the zero-order light component R0 (the central part of the light spot of the zero-order light component R0) and part or all of the ORp and ORn light components are incident. The secondary diffraction regions 211A1, 211B1 are formed in positions where the remaining part of the zero-order light component R0 is incident and none or only parts of the ORp and ORn light components are incident. The peripheral diffraction regions 212A, 212B are formed in positions where neither the zero-order light component R0 nor the ±1-order light components RP1, RN1 are incident.

The width of the primary diffraction region 210A in the $Y_2$-axis direction is designed to be less than the diameter of the light spot of the zero-order light component R0 in the $Y_2$-axis direction, to be less than or equal to the width of light components ORp and ORn in the $Y_2$-axis direction, and to become narrower toward the central position of the zero-order light component R0 in the $X_2$-axis direction, as shown in FIG. 62. Therefore, the configuration and operation of the hologram element differs from the hologram optical element 21 in the eleventh embodiment described with reference to FIG. 38 in the following respects: while the boundary lines 21ea, 21eb shown in FIG. 38 are straight lines parallel to the $X_2$-axis direction, the boundary lines 21ea1, 21eb1 in the present embodiment are 'V' shaped lines with the bottom of the 'V' facing the central position of the zero-order light component R0 in the $X_2$-axis direction. This reduces the zero-order light component R0 incident on the primary diffraction region 210A and increases the remaining part of the zero-order light component R0 incident on the secondary diffraction regions 211A1, 211B1. Therefore, the ratio of the light intensity of the sub-push-pull signal SPP to the light intensity of the stray light components from the information recording layers other than the information recording layer can be increased, and consequently the quality of the tracking error signal can be improved.

In this embodiment, the boundary lines 21ea1, 21eb2 are 'V' shaped, but this is not a limitation; their boundaries may be any polylines, curves, or combinations of lines and curves that increase the zero-order light component R0 incident on the secondary diffraction regions 211A1, 211B1.

Since the hologram optical element 21A in this embodiment can increase the zero-order light component incident on the secondary diffraction regions, as described above, the ratio of the light intensity of the sub-push-pull signal SPP to the light intensity of the stray light component from the information recording layers other than the information recording layer can be increased, and consequently the quality of the tracking error signal can be improved.

Eighteenth Embodiment

The optical head device in an eighteenth embodiment according to the present invention will now be described. In this embodiment, in an optical head device using a plurality of objective lenses adapted for different wavelengths corresponding to a plurality of standards and the position of an objective lens is spaced apart from a radial line of the optical disc in the tangential direction, degradation of the quality of the tracking error signal when the objective lens moves radially away from this position is minimized. Here, the radial line is shown in FIG. 63 as a line R that passes through the center of the optical disc OD, and the radial direction in which the objective lens moves is indicated in FIG. 63 by a line R1 that parallels the radial line R at a position separated therefrom in the tangential direction.

Figure 63:
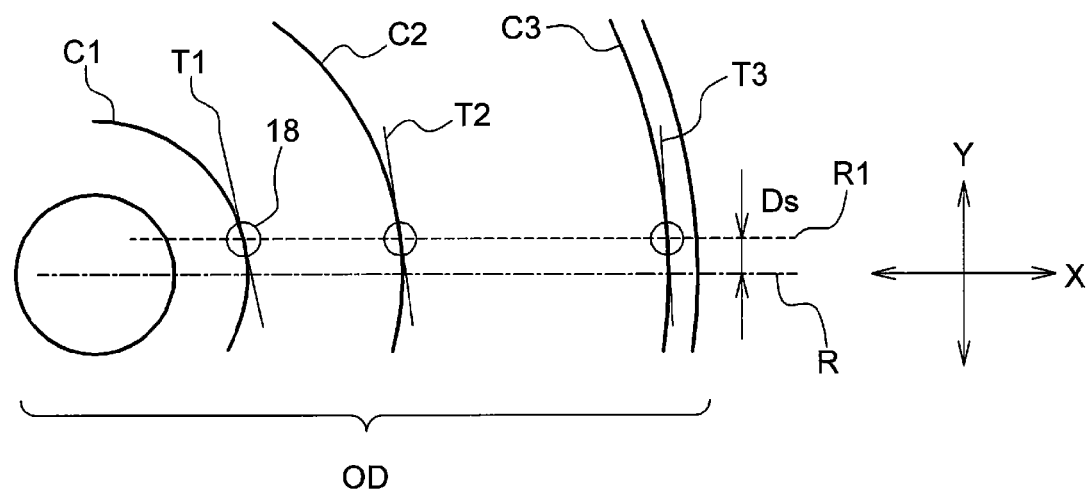
FIG. 63 is a plan view schematically illustrating the positioning relationship of the surface of the optical disc and the objective lens in an eighteenth embodiment.

FIG. 63 is a plan view illustrating the positioning relationship between part of the surface of the optical disc and the objective lens in the optical head device in this embodiment. The objective lens 18 moves on a scanning line R1 spaced apart from the radial line R of the optical disc OD by a distance Ds in the tangential direction (Y-axis direction), parallel to the radial direction (X-axis direction), from the innermost track C1 to the outermost track C3 in the information recording region of the optical disc OD, and recording or reproduction is carried out at a desired position from the center of the optical disc. Let T1 be the tangent to the innermost track C1 at the position of the objective lens 18, and let T3 be the tangent to the outermost track C3 at the position of the objective lens 18. The objective lens is normally configured to scan the radial line R of the optical disc from the innermost track to the outermost track. As described in the twelfth embodiment, there is an optical head device that uses a plurality of objective lenses at different wavelengths corresponding to a plurality of standards. In a configuration contemplated for that type of optical head device, a single objective lens may be disposed to scan the radial line R of the optical disc OD, and the other objective lenses may be spaced from the radial line R in the tangential direction. When the objective lens scans on the radial line R of the optical disc OD, the direction of the tangent line at an arbitrary radius is limited to the tangential direction (Y-axis direction), but on the scanning line R1 parallel to the radial line R at a separation distance Ds, the direction of the tangential line depends on the separation distance Ds and the position from the center of the optical disc, as shown in FIG. 63. If the separation distance Ds is 5 mm and the tangent angles based on the BD standard are represented as acute angles with respect to the Y-axis direction, these angles are as follows. Since the radius of the innermost track in the information recording region in the BD standard is 21 mm, the tangent angle at a separation distance Ds of 5 mm is 14.2 degrees. Since the radius of the outermost track in the information recording region is 58.5 mm, the tangent angle at a separation distance Ds of 5 mm is 4.9 degrees. The tangent angle has a nonlinear relation to the position from the center of the optical disc. The radius of track C2 where the tangent T2 makes an angle of 9.6 degrees, which is midway between the tangent angles at the innermost track and the outermost track, is calculated to be 30.4 mm.

Figure 64:
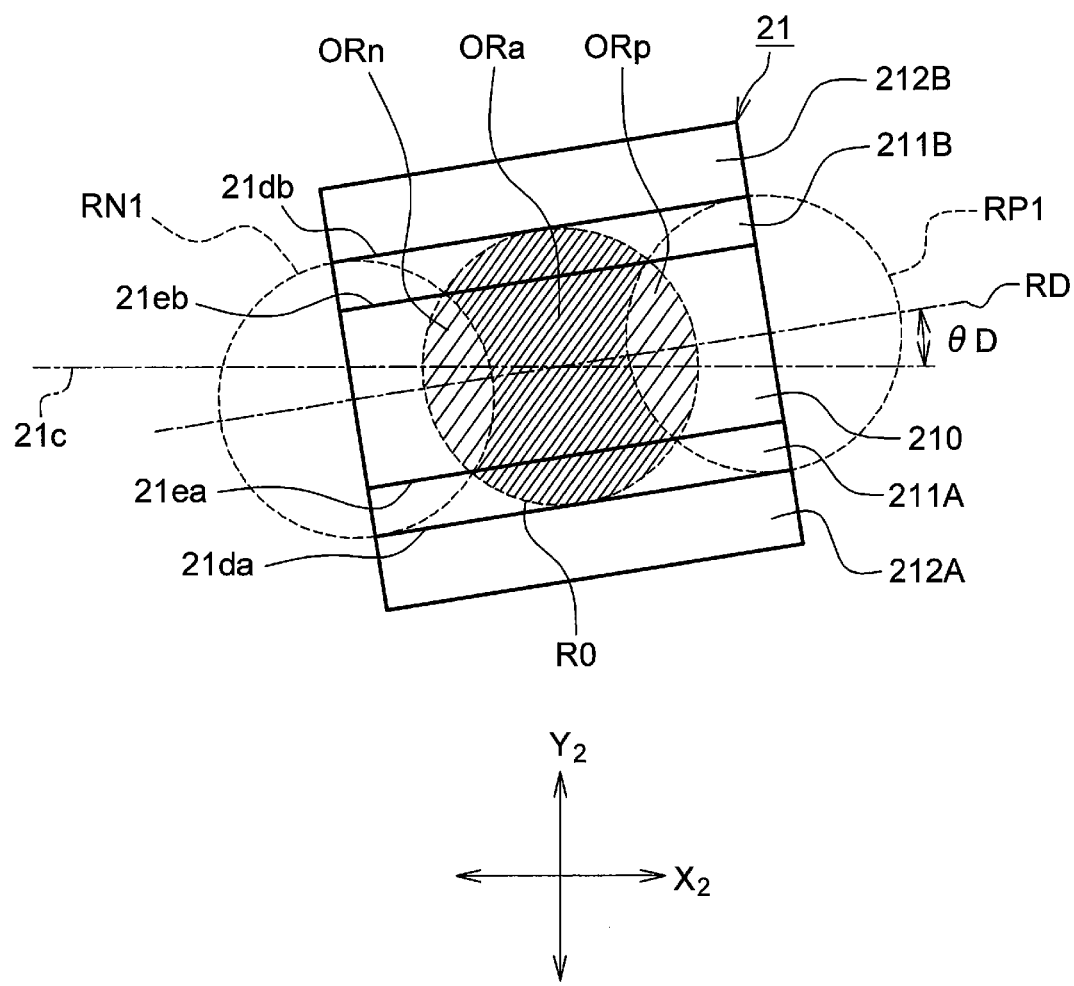
FIG. 64 is a plan view schematically illustrating the positional relationship of the hologram optical element and the light spot in the eighteenth embodiment.

FIG. 64 is a plan view schematically illustrating the positional relationship of the configuration of the light incidence surface of the hologram optical element 21 and the light spots in this embodiment when the objective lens 18 is on the scanning line R1 spaced apart from the radial line R of the optical disc OD. The hologram optical element 21 has the same configuration as shown in the eleventh embodiment, with the same three diffraction regions and boundaries as in the eleventh embodiment. Since the objective lens 18 is on the scanning line R1 spaced apart from the radial line R of the optical disc OD, the three light spots of the zero-order light component R0, +1-order light component RP1, and −1-order light component RN1 illuminating the hologram optical element 21 are formed on a line oblique to the radial direction ($X_2$-axis direction). The hologram optical element 21 is disposed obliquely at an angle $\theta_D$ from the radial direction ($X_2$-axis direction). In other words, the direction in parallel to which the primary diffraction region 210 and secondary diffraction regions 211A, 211B are arranged is slanted by $\theta_D$ from the tangential direction ($Y_2$-axis direction). The configuration of the three diffraction regions and their boundaries in the hologram optical element 21 with respect to the light spots is the same as in the eleventh embodiment. The angle $\theta_D$ of obliquity of the hologram optical element 21 is invariant even if the objective lens 18 moves in the radial direction, but the angle of the line on which light spots R0, RP1, RN1 illuminating the hologram optical element 21 are disposed varies with the position of the objective lens 18 from the center of the optical disc.

Figure 65A:
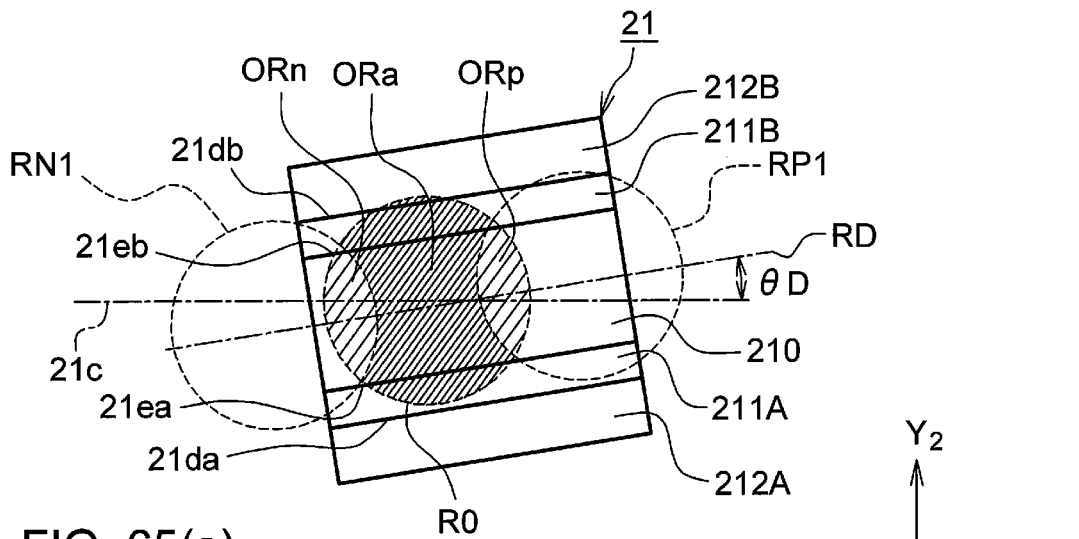
FIGS. 65(a), 65(b), and 65(c) are plan views schematically illustrating the positional relationship of the hologram optical element and the light spot in the eighteenth embodiment.
Figure 65B:
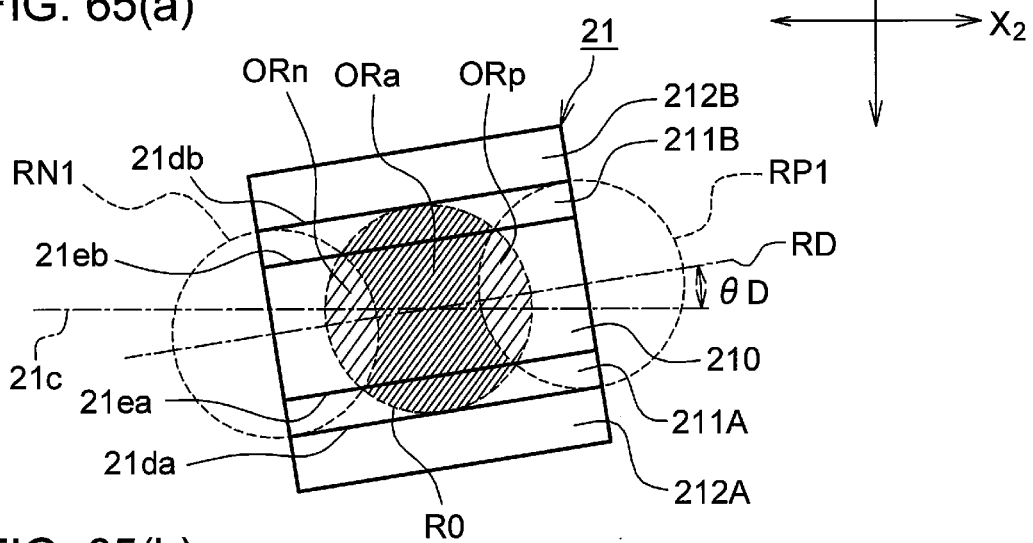
Figure 65C:
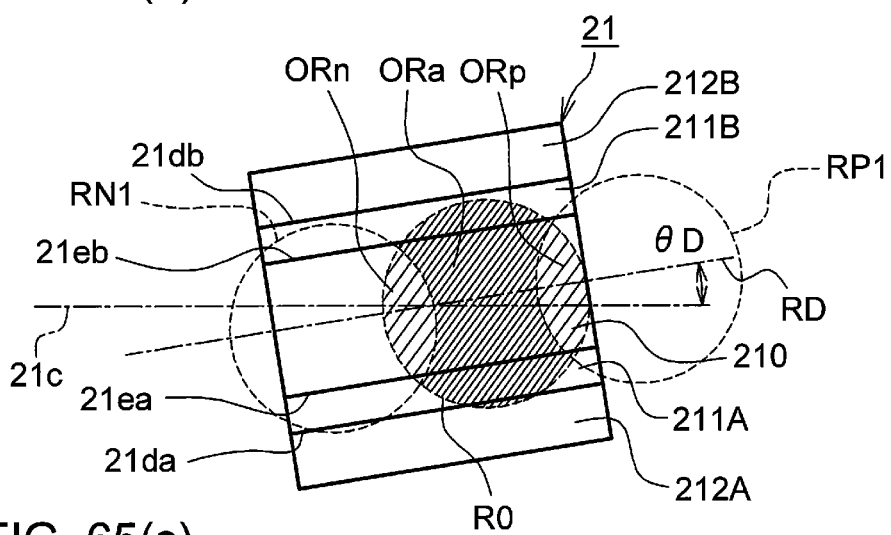

FIGS. 65(a) to 65(c) show plan views schematically illustrating the positional relationship between the light incidence surface of the hologram optical element and the light spots in this embodiment when the objective lens moves in the radial direction. FIG. 65(b) shows the case in which the hologram optical element 21 is disposed at the fixed angle of $\theta_D$ and the three light spots R0, RP1, RN1 are formed obliquely at the same angle. This state occurs when the objective lens 18 is in some position (such as position C2 in FIG. 63) between the innermost track C1 and the outermost track C3 in the information recording region of the optical disc. FIGS. 65(a) and 65(c) show the positional relationships between the light incidence surface of the hologram optical element and the light spots when the objective lens 18 shifts from the position corresponding to FIG. 65(b) in the radial direction ($X_2$-axis direction) of the optical disc OD. The objective lens 18 must move in the radial direction in a tracking operation to follow the information track: for example, FIG. 65(a) represents movement toward the inner perimeter of the optical disc OD, and FIG. 65(c) represents movement toward the outer perimeter of the optical disc OD. Because the movement of the objective lens 18 is in the radial direction, the three light spots R0, RP1, RN1 are displaced in the radial direction ($X_2$-axis direction) on the surface of the hologram optical element 21. Therefore, the angle $\theta_D$ of obliquity of the hologram optical element 21 differs from the direction of movement of the three light spots R0, RP1, RN1. Consequently, when the objective lens 18 moves toward the inner perimeter of the optical disc, for example, part of the zero-order light component R0 is incident on peripheral diffraction region 212B, as shown in FIG. 65(a). Conversely, when the objective lens 18 moves toward the outer perimeter of the optical disc, part of the zero-order light component R0 is incident on peripheral diffraction region 212A, as shown in FIG. 65(c). Similar phenomena arise in the overlapping light components ORp, ORn. The movement of the objective lens 18 in the radial direction changes the tracking error signal in accordance with the amount of movement and degrades the signal quality. This problem cannot be avoided when the objective lens 18 is on a scanning line R1 spaced apart from the radial line R of the optical disc OD.

To minimize degradation of the quality of the tracking error signal described above, the angle $\theta_D$ of obliquity of the hologram optical element 21 shown in FIG. 64 is preferably specified as follows. Since the direction of movement of the three light spots R0, RP1, RN1 caused by the shift of the objective lens 18 is limited to the radial direction ($X_2$-axis direction), $\theta_D$ is preferably not oblique to the $X_2$-axis direction (0 degrees). The largest angle of obliquity of the three light spots R0, RP1, RN1 occurs when the objective lens 18 is on the innermost track C1 in the information recording region, and the angle is 14.2 degrees in the BD standard when the separation distance Ds of the scanning line R1 is 5 mm. Therefore, if the angle $\theta_D$ of obliquity of the hologram optical element 21 is specified in the range of 0 to 14.2 degrees, preferably at the midpoint angle of 7.1 degrees, the incidence of part of the zero-order light component R0 or part of the overlapping light components ORp, ORn on an undesired diffraction region is minimized generally across the information recording region, and degradation of the quality of the tracking error signal can be minimized. In other words, the angle between the direction in which the primary diffraction region 210 and the secondary diffraction regions 211A, 211B are aligned and the tangent to the optical disc on the radial line R is preferably smaller than the angle between the tangent line T1 at the innermost track of the optical disc OD and the tangent line at the radial line R of the optical disc, and is preferably set at half that angle.

In this embodiment, since the angle $\theta_D$ of obliquity of the hologram optical element 21 is less than or equal to the tangent angle of the information track when the objective lens 18 is placed on the innermost track C1 in the information recording region and is preferably half that angle, degradation of the quality of the tracking error signal can be minimized generally across the range from the innermost track to the outermost track.

Although the whole of the hologram optical element 21 was disposed obliquely, it may have any external shape, such as an external shape parallel to the $X_2$-axis and $Y_2$-axis directions.

A hologram optical element in which the peripheral regions are light-blocking regions may be used as shown in the sixteenth embodiment.

Nineteenth Embodiment

The optical head device in a nineteenth embodiment according to the present invention will now be described. While the secondary diffraction regions of the hologram optical element used in the optical head device including a plurality of objective lenses in the eighteenth embodiment have a rectangular shape, the secondary diffraction regions of the hologram optical element used in the optical head device of the present embodiment have a non-rectangular shape. The objective lens in this embodiment is assumed to be on a scanning line R1 at a distance Ds from the radial line R of the optical disc OD.

Figure 66:
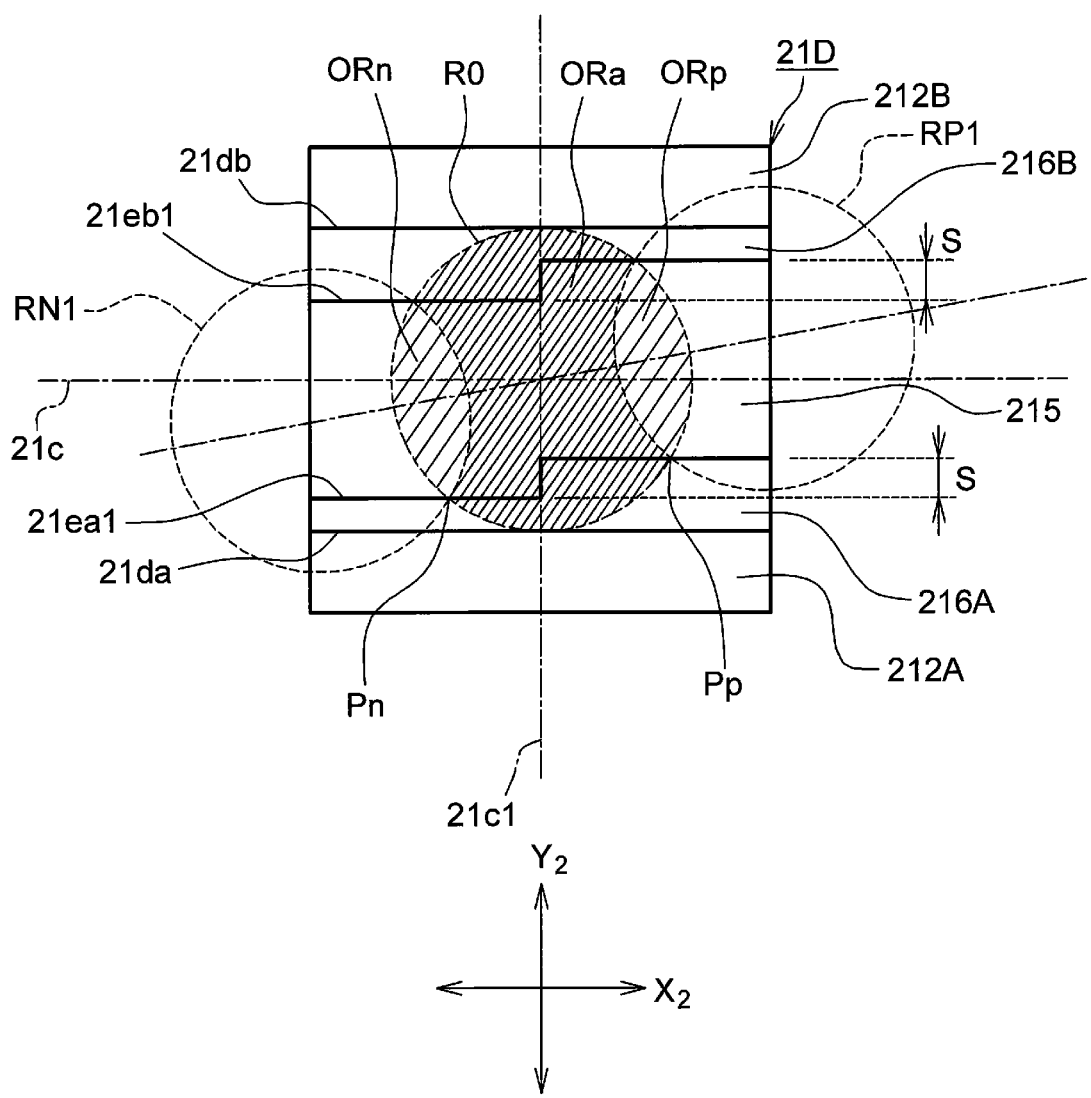
FIG. 66 is a plan view schematically illustrating the positional relationship of the hologram optical element and the light spot in a nineteenth embodiment.

FIG. 66 is a plan view schematically illustrating the positional relationship between the configuration of the light incidence surface of the hologram optical element 21D and the light spots in this embodiment. The hologram optical element 21D has three types of diffraction regions: a primary diffraction region 215, a pair of secondary diffraction regions 216A, 216B, and a pair of peripheral diffraction regions 212A, 212B. A separate diffractive pattern (e.g., the profile, direction, and spacing of the diffraction grooves) may be formed in each of these three types of diffraction regions.

The secondary diffraction regions 216A, 216B are disposed outward of the inner primary diffraction region 215 in a tangential direction ($Y_2$-axis direction) of the optical disc OD. The peripheral diffraction regions 212A, 212B are disposed outward of the secondary diffraction regions 216A, 216B in the $Y_2$-axis direction. The shapes of the secondary diffraction regions 216A, 216B are rotationally symmetric by rotation through 180 degrees around the point of intersection of the centerline 21c in the $X_2$-axis direction (radial direction), which is orthogonal to the $Y_2$-axis direction, and a centerline 21c1 in the $Y_2$-axis direction; the shapes of the peripheral diffraction regions 212A, 212B are symmetric with respect to centerline 21c. The primary diffraction region 215 and secondary diffraction region 216A are separated by a stepped boundary line 21ea1 composed of three straight lines, including two lines parallel to the $X_2$-axis direction and one line running along centerline 21c1; the primary diffraction region 215 and secondary diffraction region 216B are separated by a stepped boundary line 21eb1 composed of three straight lines, including two lines parallel to the $X_2$-axis direction and one line running along centerline 21c1. These two boundary lines 21ea1, 21eb1 are rotationally symmetric by rotation through 180 degrees around the point of intersection of centerline 21c and the centerline 21c1 in the $Y_2$-axis direction and also have a step height S along centerline 21c1. Peripheral diffraction region 212A and secondary diffraction region 216A are separated by a boundary line 21da parallel to the $X_2$-axis direction, and peripheral diffraction region 212B and secondary diffraction region 216B are separated by a boundary line 21db parallel to the $X_2$-axis direction. The configuration of the peripheral diffraction regions 212A, 212B and boundary lines 21da, 21db in the description above is the same as the configuration of the hologram optical element 21 in the eleventh embodiment, shown in FIG. 38.

The step height S of the two boundary lines 21ea1, 21eb1 is specified as follows. Assume that the objective lens 18 is on a scanning line R1 spaced from the radial line R of the optical disc OD as shown in FIG. 63 in the eighteenth embodiment, and the tangent angle of the information track on which the objective lens 18 is positioned is midway between the tangent angles of the innermost and outermost tracks. For example, in the BD standard, if the distance Ds of the objective lens 18 from the radial line R is 5 mm, the tangent angle is 9.6 degrees and the radius is 30.4 mm, as described above. In that case, the angle with respect to the radial direction ($X_2$-axis direction) made by the line connecting the center points of the +1-order light component RP1 and −1-order light component RN1 is also 9.6 degrees. As shown in FIG. 66, let Pp be one point of intersection of the respective circular arcs of the light component ORp of the overlapping region of the zero-order light component and +1-order light component. Let Pn be the point of intersection on the same side in the tangential direction ($Y_2$-axis direction) as intersection Pp of the respective circular arcs of the light component ORn of the overlapping region of the zero-order light component and −1-order light component. The line connecting the two intersections Pp, Pn also makes an angle of 9.6 degrees with respect to the radial direction ($X_2$-axis direction). The step height S of the two boundary lines 21ea1, 21eb1 is set equal to the spacing between the two intersections Pp and Pn in the tangential direction ($Y_2$-axis direction).

The value of the step height S is set to the spacing in the tangential direction ($Y_2$-axis direction) between the two intersections of the respective circular arcs of the light components of the overlapping region of the 0-order light component and the ±1-order light components; this spacing matches the spacing in the tangential direction ($Y_2$-axis direction) between the respective centers of the two overlapping light components ORp, ORn. The width in the tangential direction ($Y_2$-axis direction) between the two boundary lines 21ea1 is constant and is set to a value substantially equal to the width of the overlapping light components ORp, ORn in the tangential direction ($Y_2$-axis direction). Therefore, the two intersections Pp, Pn are positioned on one boundary line 21ea1.

In the optical head device in this embodiment, when the objective lens 18 moves, the overlapping light components ORp, ORn of the zero-order light component R0 and the ±1-order light component are displaced in the radial direction ($X_2$-axis direction), and the two intersections Pp, Pn also move in the radial direction ($X_2$-axis direction), so the zero-order light component R0 and the overlapping light components ORp, ORn do not protrude from the proper diffraction regions.

Since the step height S of the two boundary lines 21ea1, 21eb1 is invariant, when the objective lens 18 moves in the inward or outward direction, part of the zero-order light component R0 and part of the overlapping light components ORp, ORn are incident outside the proper diffraction region, degrading the quality of the tracking error signal, but since the step height S is specified on the basis of the mean tangent angle, the effect of the degradation of the quality of the tracking error signal is minimized.

As has been described above, since the step height S in the two boundary lines 21ea1, 21eb1 shown in FIG. 66 is specified at a radial position of the objective lens 18 at which the tangent to the information track is midway between the tangent at the innermost track and the tangent at the outermost track, degradation of the quality of the tracking error signal can be minimized generally across the range from the innermost track to the outermost track.

As described in the eleventh embodiment, by intentionally making part of the light components ORp, ORn incident on the secondary diffraction regions 216A, 216B, the effects of stray light from other layers of a multilayer optical disc can be suppressed, so the spacing between the boundary lines 21ea1 and 21eb1 may be adjusted as desired.

As described in the sixteenth embodiment, a hologram optical element in which the peripheral regions are light-blocking regions may be used.

Twentieth Embodiment

The optical head device in a twentieth embodiment according to the present invention will now be described. The primary diffraction region and secondary diffraction regions of the hologram optical element used in the optical head device having a plurality of objective lenses in the nineteenth embodiment are separated by stepped boundaries composed of three lines, including two lines parallel to the $X_2$-axis direction and one line aligned on the centerline. The primary diffraction region and secondary diffraction regions of the hologram optical element used in the optical head device in the present embodiment are separated by boundaries composed of three lines, including two lines parallel to the $X_2$-axis direction and one oblique line crossing the centerline at an angle. The objective lens in this embodiment is on a scanning line R1 spaced at a distance Ds from the radial line R of the optical disc OD. In this embodiment, the center of the hologram optical element 21D need not match the center of the zero-order light R0, and the positioning tolerance between the center of the hologram optical element 21D; the center of the zero-order light R0 will be denoted T/2.

Figure 67:
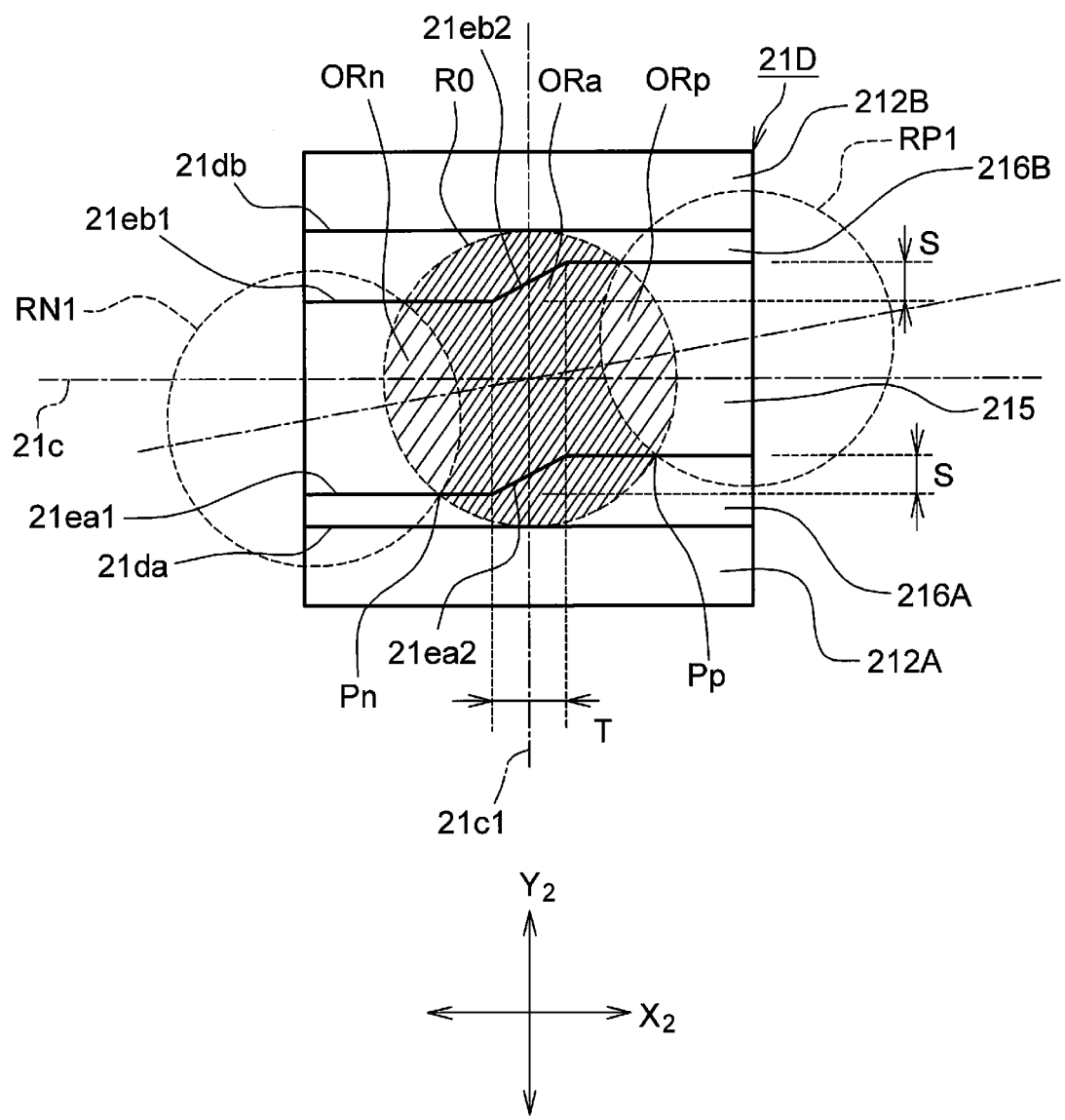
FIG. 67 is a plan view schematically illustrating the positional relationship of the hologram optical element and the light spot in a twentieth embodiment.

FIG. 67 is a plan view schematically illustrating the positional relationship between the configuration of the light incidence surface of the hologram optical element 21D and the light spots in this embodiment. The hologram optical element 21D has three types of diffraction regions: a primary diffraction region 215, a pair of secondary diffraction regions 216A, 216B, and a pair of peripheral diffraction regions 212A, 212B. A separate diffractive pattern (e.g., the profile, direction, and spacing of the diffraction grooves) may be formed in each of these three types of diffraction regions.

The secondary diffraction regions 216A, 216B are disposed outward of the inner primary diffraction region 215 in the tangential direction ($Y_2$-axis direction) of the optical disc OD. The peripheral diffraction regions 212A, 212B are disposed outward of the secondary diffraction regions 216A, 216B in the $Y_2$-axis direction. The shapes of the secondary diffraction regions 216A, 216B are rotationally symmetric by rotation through 180 degrees around the point of intersection of a centerline 21c in the $X_2$-axis direction (radial direction) orthogonal to the $Y_2$-axis direction and a centerline 21c1 in the $Y_2$-axis direction, and the shapes of the peripheral diffraction regions 212A, 212B are symmetric with respect to centerline 21c. The primary diffraction region 215 and secondary diffraction region 216A are separated by a boundary line 21ea1 composed of three straight lines, including two lines parallel to the $X_2$-axis direction and an oblique line 21ea2 crossing centerline 21c1 obliquely; the primary diffraction region 215 and secondary diffraction region 216B are separated by a boundary line 21eb1 composed of three straight lines, including two lines parallel to the $X_2$-axis direction and an oblique line 21eb2 crossing centerline 21c1 obliquely. The oblique lines 21ea2, 21eb2 crossing centerline 21c1 obliquely have the step height S described in the nineteenth embodiment and a width corresponding to T, where the positioning tolerance between the center of the hologram optical element 21D and the center of the zero-order light R0 is T/2.

A hologram optical element in which the boundary between the primary diffraction region and the secondary diffraction regions is a single straight line, as described in the eleventh to eighteenth embodiments, requires positioning adjustment in the $Y_2$-axis direction but does not require positioning adjustment in the $X_2$-axis direction. A hologram optical element in which the boundary between the primary diffraction region and secondary diffraction regions is stepped as described in the nineteenth embodiment does not require positioning adjustment with respect to the $X_2$-axis direction if the center of the zero-order light R0 coincides with the center of the steps, but requires precise positioning adjustment in the $X_2$-axis direction as well if the center of the zero-order light R0 does not coincide with the center of the steps.

Even if the center of the hologram optical element 21D does not coincide with the center of the zero-order light R0, by configuring the boundary between the primary diffraction region and the secondary diffraction regions by a line including an oblique line which has step height S and a width corresponding to the positioning tolerance ±T/2 between the center of the hologram optical element 21D and the center of the zero-order light R0 and crosses the centerline 21c1 obliquely, as in this embodiment, the need for positioning adjustment in the $X_2$-axis direction can be eliminated.

A variety of embodiments according to the present invention have been described with reference to the drawings, but they merely show examples of the present invention; various embodiments that have not been described above can also be adopted. The optical head device and optical disc device according to the present invention can be used in business, home, and automotive applications, and other applications.

REFERENCE CHARACTERS 1 optical disc device, 2 spindle motor, 3, 3A-3G optical head device, 4 sled mechanism, 5 matrix circuit, 6 signal reproduction circuit, 7 laser control circuit, 8 servo circuit, 9 aberration correction mechanism control circuit, 10 sled control circuit, 11 spindle control circuit, 12 controller, 13 semiconductor laser, 14 beam splitter, 15 collimator lens, 16A aberration correction mechanism, 16B lens holder, 17 actuator, 18 objective lens, 19 movable section, 20A, 20B magnetic circuit, 21, 21M, 21N hologram optical element, 210 primary diffraction region, 211A, 211B secondary diffraction region, 212A, 212B peripheral diffraction region, 22 photodetector, 23 main light-receiving section, 23A-23D, 24E, 24F, 25G, 25H light-receiving surface, 24 first secondary light-receiving section, 25 second secondary light-receiving section.

What is claimed is:

1. An optical head device comprising:
a laser light source;
an objective lens for focusing a light beam emitted from the laser light source onto an optical disc;
a diffractive optical element for diffracting a returning light beam that has been reflected by the optical disc and has passed through the objective lens and outputting a transmissively diffracted light beam; and
a photodetector for receiving the transmissively diffracted light beam;
the diffractive optical element including
a primary diffraction region disposed in a position where parts of ±1-order reflectively diffracted light beam components and part of a zero-order reflectively diffracted light beam component included in the returning light beam are incident, having a zero-order diffractive function and a ±1-order diffractive function, and
secondary diffraction regions disposed outward of the primary diffraction region in a second direction orthogonal to a first direction, the first direction being the direction of a row formed by the zero-order reflectively diffracted light beam component and the ±1-order reflectively diffracted light beam components, in positions where a different part of the zero-order reflectively diffracted light beam component and different parts of the ±1-order reflectively diffracted light beam components are incident, having the zero-order diffractive function and the ±1-order diffractive function, the secondary diffraction regions including partial regions in which the incident different part of the zero-order reflectively diffracted light beam component and the incident different parts of the ±1-order reflectively diffracted light beam components partly overlap each other; and the photodetector including
a main light-receiving section for receiving a zero-order transmissively diffracted light beam component that has passed through the primary diffraction region and the secondary diffraction regions, and
a secondary light-receiving section for receiving one of ±1-order transmissively diffracted light beam components that have passed through the secondary diffraction regions;
the secondary light-receiving section having at least two light-receiving surfaces.

2. The optical head device of claim 1, wherein the photodetector includes:
a first secondary light-receiving section that is the secondary light-receiving section; and
a second secondary light-receiving section having two light-receiving surfaces for receiving the other of the ±1-order transmissively diffracted light beam components, disposed in a position symmetrical to the first secondary light-receiving section on an opposite side of the main light-receiving section.

3. The optical head device of claim 1, wherein:
the optical disc includes first and second information recording layers; and
the secondary light-receiving section is disposed in a position at which a light component reflected from the first information recording layer adjacent to the second information recording layer where information is recorded or reproduced is not incident.

4. The optical head device of claim 1, wherein:
the optical disc includes first and second information recording layers; and
the secondary light-receiving section is disposed in a position at which a light component reflected from the first information recording layer, where information is not recorded or reproduced, spaced most narrowly from the second information recording layer where information is recorded or reproduced is not incident.

5. The optical head device of claim 1, wherein:
the main light-receiving section includes a first set of light-receiving surfaces and a second set of light-receiving surfaces aligned substantially in a third direction in which the objective lens moves over a surface of the optical disc;
the first set of light-receiving surfaces comprises a plurality of light-receiving surfaces aligned substantially in a fourth direction, corresponding to a tangential direction of the optical disc; and
the second set of light-receiving surfaces comprises a plurality of light-receiving surfaces aligned substantially in the fourth direction.

6. The optical head device of claim 1, wherein:
the diffractive optical element further includes peripheral diffraction regions disposed outward of the secondary diffraction regions in the second direction; and
the peripheral diffraction regions have a diffractive structure for diffracting light of the returning light beam incident on the peripheral diffraction regions in a direction other than a direction of the photodetector.

7. An optical head device comprising:
a plurality of laser light sources for emitting respective light beams having different wavelengths;
an objective lens for focusing a light beam emitted from one of the plurality of laser light sources onto an optical disc;
a diffractive optical element for diffracting a returning light beam that has been reflected by the optical disc and has passed through the objective lens and outputting a transmissively diffracted light beam; and a photodetector for receiving the transmissively diffracted light beam;

the diffractive optical element including a primary diffraction region disposed in a position where parts of ±1-order reflectively diffracted light beam components and part of a zero-order reflectively diffracted light beam component included in the returning light beam, having a first wavelength among the wavelengths of the light beams emitted from the plurality of laser light sources, are incident, the primary diffraction region having a zero-order diffractive function and a ±1-order diffractive function for light having the first wavelength, and secondary diffraction regions disposed outward of the primary diffraction region in a second direction orthogonal to a first direction, the first direction being the direction of a row formed by the zero-order reflectively diffracted light beam component and the ±1-order reflectively diffracted light beam components, in a position where a different part of the zero-order reflectively diffracted light beam component and different parts of the ±1-order reflectively diffracted light beam components are incident, having the zero-order diffractive function and at least one of the ±1-order diffractive functions for light having the first wavelength, the secondary diffraction regions including partial regions in which the incident different part of the zero-order reflectively diffracted light beam component and the incident different parts of the ±1-order reflectively diffracted light beam components partly overlap each other; and the photodetector including a main light-receiving section for receiving a zero-order transmissively diffracted light beam component having the first wavelength that has passed through the primary diffraction region and the secondary diffraction regions, and a secondary light-receiving section for receiving either one of ±1-order light components of the transmissively diffracted light beam having the first wavelength that have passed through the secondary diffraction regions;

the secondary light-receiving section having at least two light-receiving surfaces.

8. The optical head device of claim 7, wherein:

the optical disc includes first and second information recording layers; and the secondary light-receiving section is disposed in a position at which a light component reflected from the first information recording layer adjacent to the second information recording layer where information is recorded or reproduced by use of the first wavelength is not incident.

9. The optical head device of claim 7, wherein:

the optical disc includes first and second information recording layers; and the secondary light-receiving section is disposed in a position at which a light component reflected from the first information recording layer, where information is not recorded or reproduced, most narrowly spaced the second information recording layer where information is recorded or reproduced by use of the first wavelength is not incident.

10. An optical head device comprising:

a plurality of laser light sources for emitting respective light beams having different wavelengths;

an objective lens for focusing a light beam emitted from one of the plurality of laser light sources onto an optical disc;

a diffractive optical element for diffracting a returning light beam that has been reflected by the optical disc and has passed through the objective lens and outputting a transmissively diffracted light beam; and a photodetector for receiving the transmissively diffracted light beam;

the diffractive optical element including a primary diffraction region disposed in a position where parts of ±1-order reflectively diffracted light beam components and part of a zero-order reflectively diffracted light beam component included in the returning light beam having a first wavelength among the wavelengths of the light beams emitted from the plurality of laser light sources are incident, having a zero-order diffractive function and a ±1-order diffractive function for light having the first wavelength, and secondary diffraction regions disposed outward of the primary diffraction region in a second direction orthogonal to a first direction, the first direction being the direction of a row formed by the zero-order reflectively diffracted light beam component and the ±1-order reflectively diffracted light beam components, in a position where a different part of the zero-order reflectively diffracted light beam component and different parts of the ±1-order reflectively diffracted light beam components are incident, having a zero-order diffractive function and a ±1-order diffractive function for light having the first wavelength;

the photodetector including a first main light-receiving section for receiving a zero-order transmissively diffracted light beam component having the first wavelength that has passed through the primary diffraction region and the secondary diffraction regions, a first secondary light-receiving section for receiving a ±1-order transmissively diffracted light beam component having the first wavelength that has passed through the secondary diffraction regions, a second main light-receiving section for receiving a zero-order transmissively diffracted light beam component having a second wavelength other than the first wavelength that has passed through the primary diffraction region and the secondary diffraction regions, and a second secondary light-receiving section for receiving a zero-order transmissively diffracted light beam component having the second wavelength that has passed through the secondary diffraction regions;

the first secondary light-receiving section and the second secondary light-receiving section each including at least a pair of light-receiving surfaces.

11. The optical head device of claim 10, wherein:

the optical disc includes first and second information recording layers; and the first secondary light-receiving section is disposed in a position at which a light component reflected from the first information recording layer adjacent to the second information recording layer where information is recorded or reproduced by use of the first wavelength is not incident.

12. The optical head device of claim 10, wherein:

the optical disc includes first and second information recording layers; and the first secondary light-receiving section is disposed in a position at which a light component reflected from the first information recording layer, where information is not recorded or reproduced, spaced most narrowly from the second information recording layer where information is recorded or reproduced by use of the first wavelength is not incident.

13. The optical head device of claim 1, wherein a boundary between the secondary diffraction regions and the primary diffraction region is formed by a line, a curve, or a combination of a line and a curve.

14. The optical head device of claim 7, wherein the objective lens for focusing the light beam having the first wavelength, emitted from one of the plurality of laser light sources, onto the optical disc is movable on a line parallel to a radial line of the optical disc, spaced apart from the radial line in a tangential direction of the optical disc.

15. The optical head device of claim 14, wherein a direction parallel to which the primary diffraction region and the secondary diffraction regions of the diffractive optical element are disposed has a different angle from a tangent line on the radial line of the optical disc.

16. The optical head device of claim 7, wherein a boundary between the secondary diffraction regions and the primary diffraction region is formed by a line, a curve, or a combination of a line and a curve.

17. The optical head device of claim 10, wherein a boundary between the secondary diffraction regions and the primary diffraction region is formed by a line, a curve, or a combination of a line and a curve.

18. The optical head device of claim 10, wherein the objective lens for focusing the light beam having the first wavelength, emitted from one of the plurality of laser light sources, onto the optical disc is movable on a line parallel to a radial line of the optical disc, spaced apart from the radial line in a tangential direction.

19. The optical head device of claim 18, wherein a direction parallel to which the primary diffraction region and the secondary diffraction regions of the diffractive optical element are disposed has a different angle from a tangent line on the radial line of the optical disc.

* * * * *